United States Patent [19]
Jenkins

[11] Patent Number: 6,057,847
[45] Date of Patent: May 2, 2000

[54] SYSTEM AND METHOD OF IMAGE GENERATION AND ENCODING USING PRIMITIVE REPROJECTION

[76] Inventor: Barry Jenkins, 248 Meadow Dr., Auburn, Pa. 17922

[21] Appl. No.: 08/852,899

[22] Filed: May 9, 1997

Related U.S. Application Data

[60] Provisional application No. 60/033,710, Dec. 20, 1996.

[51] Int. Cl.[7] .................................................. G06F 15/00
[52] U.S. Cl. ............................................................ 345/422
[58] Field of Search ................................... 345/422, 421, 345/423, 113, 114, 115, 473, 474

[56] References Cited

U.S. PATENT DOCUMENTS

| | | | |
|---|---|---|---|
| 4,479,784 | 10/1984 | Mallinson et al. | 434/43 |
| 5,031,117 | 7/1991 | Minor et al. | 364/521 |
| 5,043,922 | 8/1991 | Matsumoto | 364/522 |
| 5,091,960 | 2/1992 | Butler | 382/1 |
| 5,138,699 | 8/1992 | Minor et al. | 395/131 |
| 5,222,204 | 6/1993 | Swanson | 395/127 |
| 5,239,624 | 8/1993 | Cook et al. | 395/125 |
| 5,289,577 | 2/1994 | Gonzales et al. | 395/163 |
| 5,293,480 | 3/1994 | Miller et al. | 395/163 |
| 5,317,689 | 5/1994 | Nack et al. | 395/163 |
| 5,371,896 | 12/1994 | Gove et al. | 395/800 |
| 5,414,801 | 5/1995 | Smith et al. | 395/119 |
| 5,491,780 | 2/1996 | Fyles et al. | 395/153 |
| 5,493,643 | 2/1996 | Soderberg et al. | 395/162 |
| 5,511,156 | 4/1996 | Nagasaka | 395/133 |
| 5,550,959 | 8/1996 | Freeman | 395/127 |
| 5,596,686 | 1/1997 | Duluk, Jr. | 345/522 |
| 5,600,763 | 2/1997 | Greene et al. | 395/120 |

OTHER PUBLICATIONS

Nishimura, Satoshi, et al., "A Flexible Parallel Graphics Architecture Based on a Conflict–Free Multiport Frame Buffer", Department of Information Science–Faculty of Science; The University of Tokyo, Mar. 12–14, 1991, pp. 1–8.

De Sa, Luis, et al., "A Parallel Architecture for Real Time Video Coding", Microprocessing and Microprogramming Proc. Euromicro, Aug. 30, 1990, pp. 439–445.

Mao, W.D., "A Real Time Pipeline Interleaving Approach for Image/Video Signal Processing", IEEE International Symposium on Circuits and Systems, May 1–3, 1990, pp. 3046–3049.

(List continued on next page.)

Primary Examiner—Phu K. Nguyen
Attorney, Agent, or Firm—Oblon, Spivak, McClelland, Maier & Neustadt, P.C.

[57] ABSTRACT

A computer-implemented method of image generation that makes efficient use of reprojective techniques to reduce the cost of image generation. The method employs a technique of primitive reprojection in which convex graphics primitives are the reprojected elements. The visibility of elements known to be visible in a previous frame is first determined by transformation and depth-comparison rasterization of these elements. Regions of the image that may contain newly visible elements are located by occlusion-exposure transitions in the depth buffer and from incremental view volume motion. In these regions a depth-prioritized, data-access method of visible surface determination, spatial-subdivision ray casting, is employed to identify newly visible primitives which are added to the list of previously visible primitives for rasterization. The method employs a system of classifying objects based on their dynamic occlusive properties to increase the accuracy, efficiency and versatility of the reprojective approach. Because the method employs a hybrid approach to visible surface determination in which newly visible primitives are identified for each frame it can be implemented as a graphics server employing an efficient on-demand, progressive geometry transmission protocol for client-server image generation. This client-server system employs a method of visibility event encoding in which data representing newly visible and newly invisible primitives for each frame are transmitted to a client unit which is a conventional graphics display system. The visibility event codec method can also be used to encode and store information representing a computer animation for later interactive playback.

114 Claims, 69 Drawing Sheets

OTHER PUBLICATIONS

Parke, Frederick I., "Perception–Based Animation Rendering", New York Institute of Technology, Jul. 1990, pp. 44–51.

Fu, Sheng, et al., "An Accelerated Rendering Algorithm for Stereoscopic Display", Comput. & Graphics, vol. 20, No. 2, pp. 223–229, 1996.

Chen, Shenchang Eric, et al., "View Interpolation for Image Synthesis", Computer Graphics Proceedings, Annual Conference Series, 1993, pp. 279–288.

Painter, James, et al., "Antialiased Ray Tracing by Adaptive Progressive Refinement", Computer Graphics, vol. 23, No. 3, Jul. 1989, pp. 281–288.

Kirk, David, et al., "The Rendering Architecture of the DN10000VS", Computer Graphics, vol. 24, No. 4, Aug. 1990, pp. 299–307.

Apgar, Brian, et al., "A Display System for the Stellar™ Graphics Supercomputer Model GS10000™", Computer Graphics, vol. 22, No. 4, Aug. 1988, pp. 255–262.

Fisher, Ralph W., "13.4/3:50 P.M.: A Variable Acuity Display _ Applications", McDonnell Aircraft Co., (1994).

Fisher, R.W., "17.4: Psychophysical Problems and Solutions in Variable Acuity Displays", McDonnell Aircraft Co., (1994).

Glenn, William E., "Digital Image Compression Based on Visual Perception", Perceptual Aspects of Image Coding, pp. 63–71, 1994.

Eckert, Michael P. et al., "The Significance of Eye Movements and Image Acceleration for Coding Television Image Sequences", Perceptual Aspects of Image Coding, pp. 89–97. 1994.

Hearty, Paul J., "Achieving and Confirming Optimum Image Quality", Measurement and Prediction of Visual Quality, pp. 149–161. 1994.

Reddy, M., "Scrooge: Perceptually–Driven Polygon Reduction", Computer Graphics forum, vol.15, No. 4, 1996, pp. 191–203.

Schmalstieg, Dieter, et al., "Demand–Driven Geometry Transmission for Distributed Virtual Environments", Eurographics '96, vol. 15, No. 3, 1996, pp. C–421–C–431.

Molnar, Steven, et al., "PixelFlow: High–Speed Rendering Using Image Composition", Computer Graphics, vol. 26, No. 2, Jul. 1992, pp. 231–240.

Bolin, Mark R., et al., "A Frequency Based Ray Tracer", Computer Graphics Proceedings, Annual Conference Series, 1995, pp. 409–418.

Adelson, Stephen J., et al., "Generating Exact Ray–Traced Animation Frames by Reproduction", IEEE Computer Graphics and Applications, May 1995, pp. 43–51.

Levoy, Marc, "Polygon–Assisted JPEG and MPEG Compression of Synthetic Images", Computer Graphics Proceedings, Annual Conference Series, 1995, pp. 21–27.

Mueller, Carl, "The Sort–First Rendering Architecture for High–Performance Graphics", Symposium on Interactive 3D Graphics, 1995, pp. 75–84.

Maciel, Paulo W., et al., "Visual Navigation of Large Environments Using Textured Clusters", Symposium on Interactive 3D Graphics, 1995, pp. 95–102.

Lin, T., et al., "Image Reconstruction Error for Optical Flow", Vision Interface '94, 1994, pp. 73–80.

Shirley, Peter, "Discrepancy as a Quality Measure for Sample Distributions", Eurographices '91, 1991, pp. 183–194.

Tost, Daniele, "An Algorithm of Hidden Surface Removal Based on Frame–To–Frame Coherence", Eurographics '91, 1991, pp. 261–273.

van Walsum, Theo, et al., "Refinement criteria for adaptive stochastic ray tracing of textures", Eurographics '91, 1991, pp. 155–166.

Fano, Andrew, et al., "Maintaining Visual Model of a Scene Using Change Primitives", Vision Interface '94, 1994, pp. 172–177.

Olano, Marc, et al., "Combatting Rendering Latency", Symposium on Interactive 3D Graphics, 1995, pp. 19–24.

Funkhouser, Thomas A., "Ring: A Client–Server System for Multi–User Virtual Environments" Symposium on Interactive 3D Graphics, 1995, pp. 85–92.

Sistare, Steve, et al., A Distributed System for Near–Real–Time Display of Shaded Three–Dimensional Graphics, Graphics Interface '89, 1989, pp. 283–290.

Jevans, David A., "Object Space Temporal Coherence for Ray Tracing", Graphics Interface '92, 1992, pp. 175–183.

Chapman, J., et al., "Spatio–Temporal Coherence in Ray Tracing", Graphics Interface '91, 1991, pp. 101–106.

"EEEI Standard for Scalable Coherent Interface (SCI)", The Institute of Electrical and Electronics Engineers, Inc., 1993, pp. 1–38.

Molnar, Steven, "A Sorting Classification of Parallel Rendering", IEEE Computer Graphics and Applications, Jul. 1994, pp. 23–32.

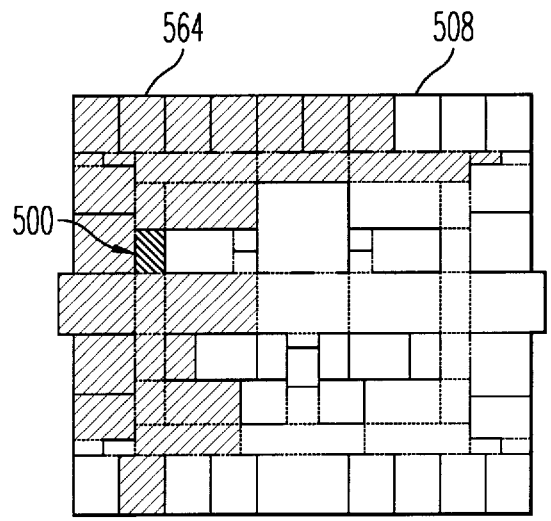
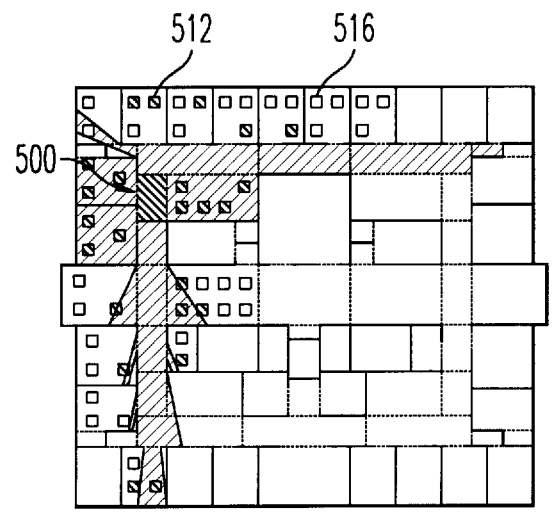
*FIG. 5A*  *FIG. 5B*
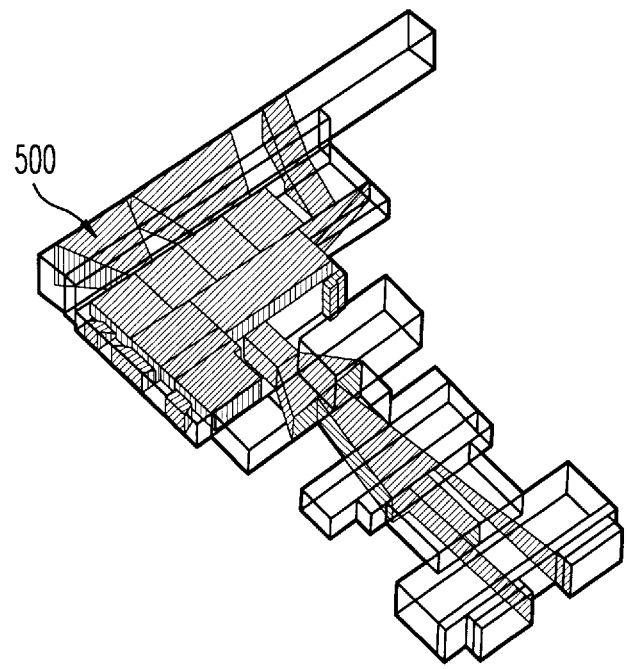
*FIG. 5C*

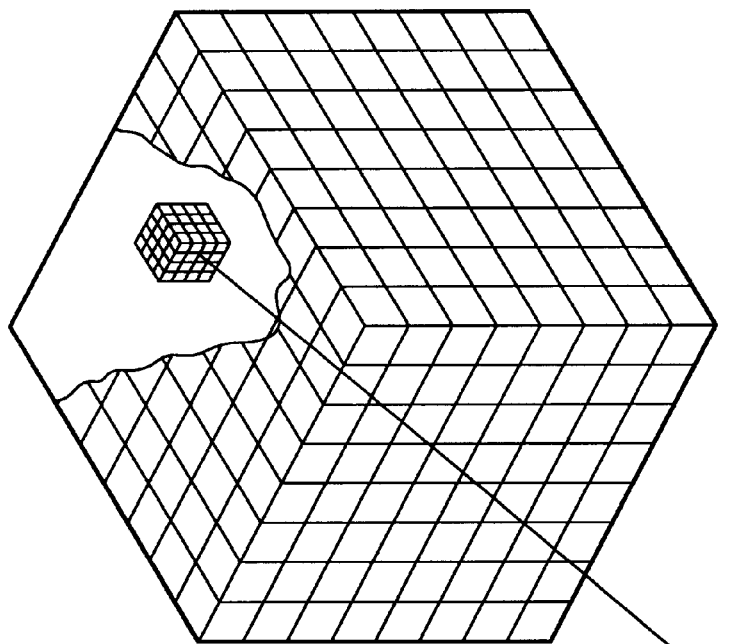
*FIG. 7C*
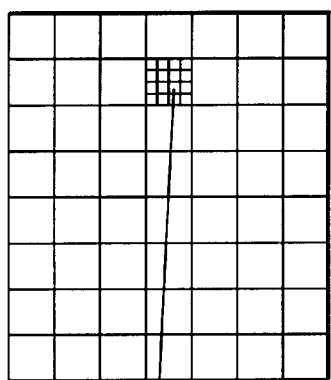
*FIG. 7A*
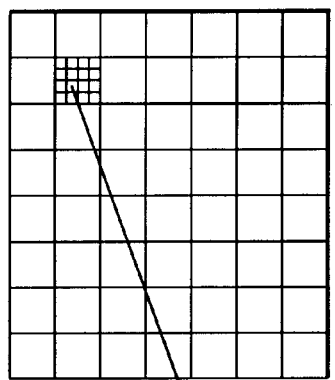
*FIG. 7B*

```
struct sample_buffer_sample    /* Elements of augmented depth buffer */
{
    int element_ID;            /* eg. Index of source primitive- */
                               /* in local display list */
    float z;                   /* Depth value of sample */
    char object_class;         /* Source object & other information- */
                               /* 0==None_Deeper, 1==OcOc, 2==NoOc,- */
                               /* 3==OcNo, 4==NoNo, 5==OCCLUDED,   - */
                               /* 6==INVALID, 7==LOD               - */
    char moving_or_not;        /* 0== Source object is static, 1==Moving */
};

struct sample_buffer_element    /* Elements in multilevel depth buffer */
{
    /* Temporal sample A */
    /* Depth sorted samples with maximum of 5 levels */
    struct sample_buffer_sample A [5];

/* Temporal sample B */
    /* Depth sorted samples with maximum of 5 levels */
    struct sample_buffer_sample B [5];
};

/* Multilevel Depth Buffer
struct sample_buffer element Depth_Buffer [Xi] [Yi];
```

*FIG. 19*

```
struct primitive              /* Element in subimage primitive reprojection list      */
{
    int primitive_id;         /* Unique value for each primitive in database.         */
                              /* Used to confirm new visibility                        */
    int vertex [3];           /* index to a vertex in vertex reprojection list        */
    int object;               /* Index to source object in the object list            */
    float normal [3];         /* primitive normal                                      */
    char object_class;        /* classification of source object based on dynamic     */
                              /* occlusion properties see below                        */
    char moving_or_not;       /* =0 if source object is static (stationary in         */
                              /* three space), =1 if not                               */
    int birth_frame;          /* time when the primitive first became exposed         */
    int cur_frame;            /* last frame in which the primitive had sample         */
};                            /* visible in  subimage. Value of current frame         */
                              /* read to this field during read of                     */
                              /* image/subimage to determine if primitive is          */
                              /* occluded. If following this process cur_frame-       */
                              /* Not equal to Current Frame number then primitive     */
                              /* could be                                              */ struct vertex                 /* Element of separate subimage vertex reprojection */
{                             /* list */
    int vertex_id;            /* Unique vertex identifier */
    short int prim_count;     /* number of primitives in subimage display */
                              /* list sharing the vertex */
    float x [3];              /* vertex values */
    float y [3];
    float z [3];
    float xn [3];             /* vertex normal values */
    float yn [3];
    float zn [3];
    float texval [2];         /* texture values */
};
```

*FIG. 28*

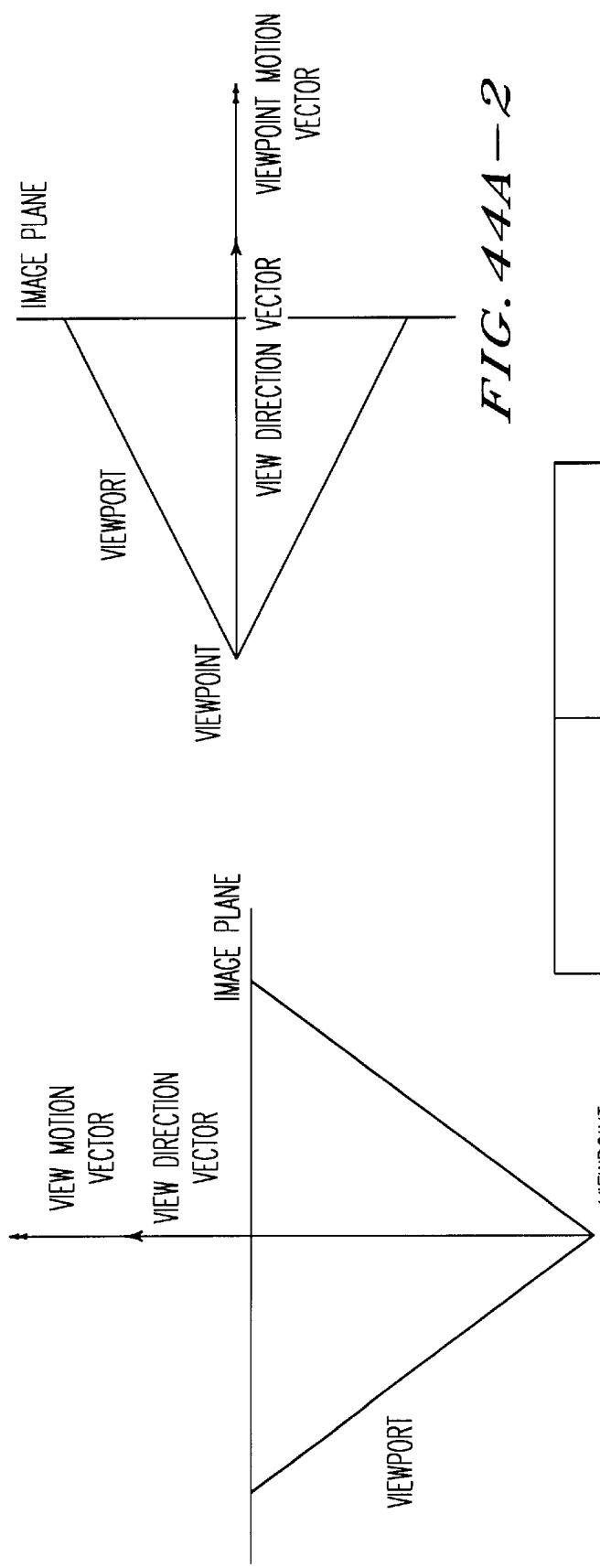
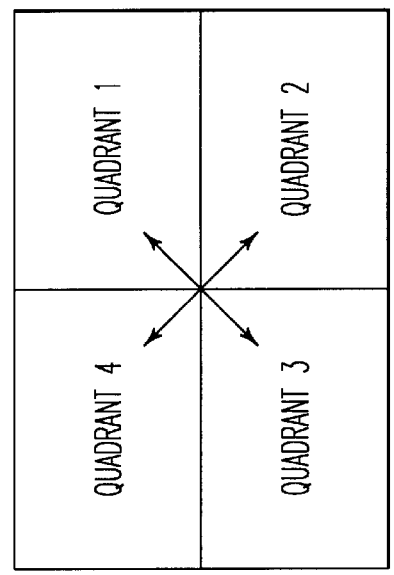
FIG. 44A-1
FIG. 44A-2
FIG. 44A-3

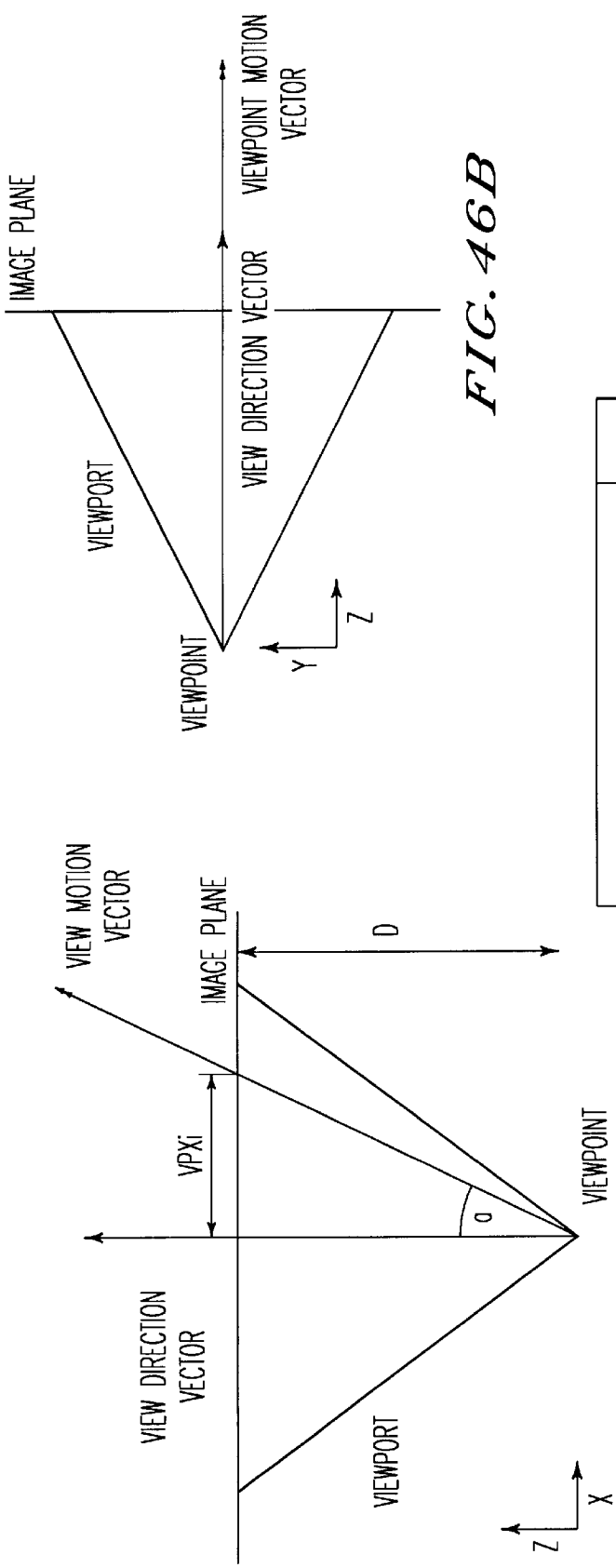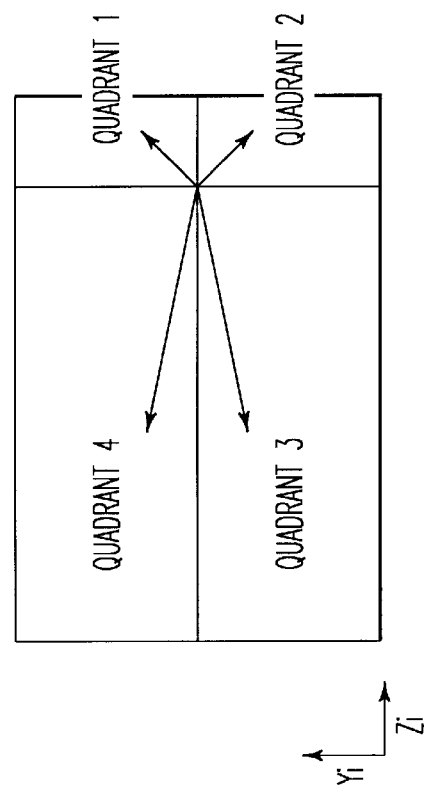

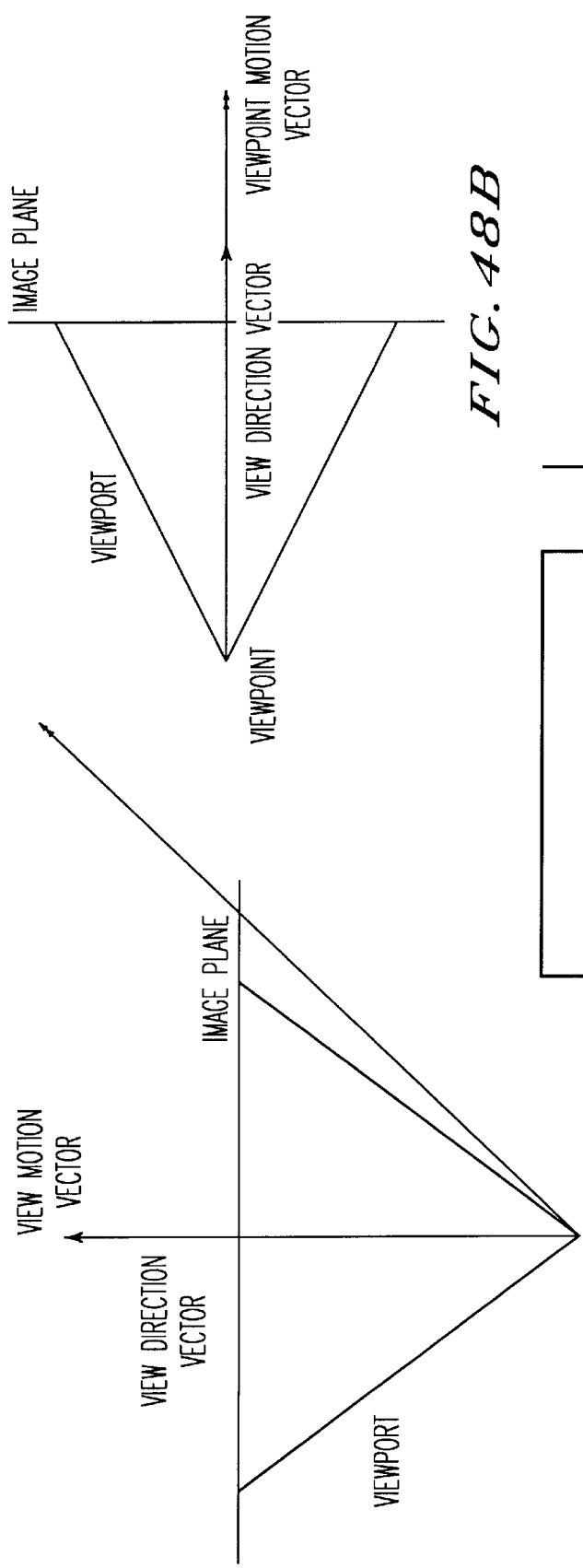
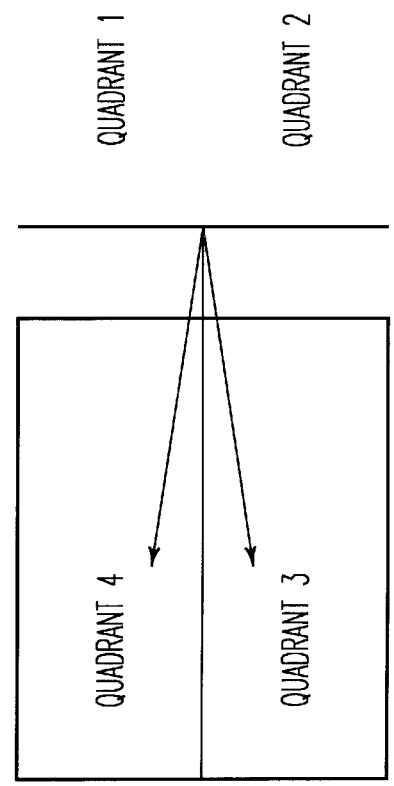
FIG. 48B
FIG. 48C
FIG. 48A

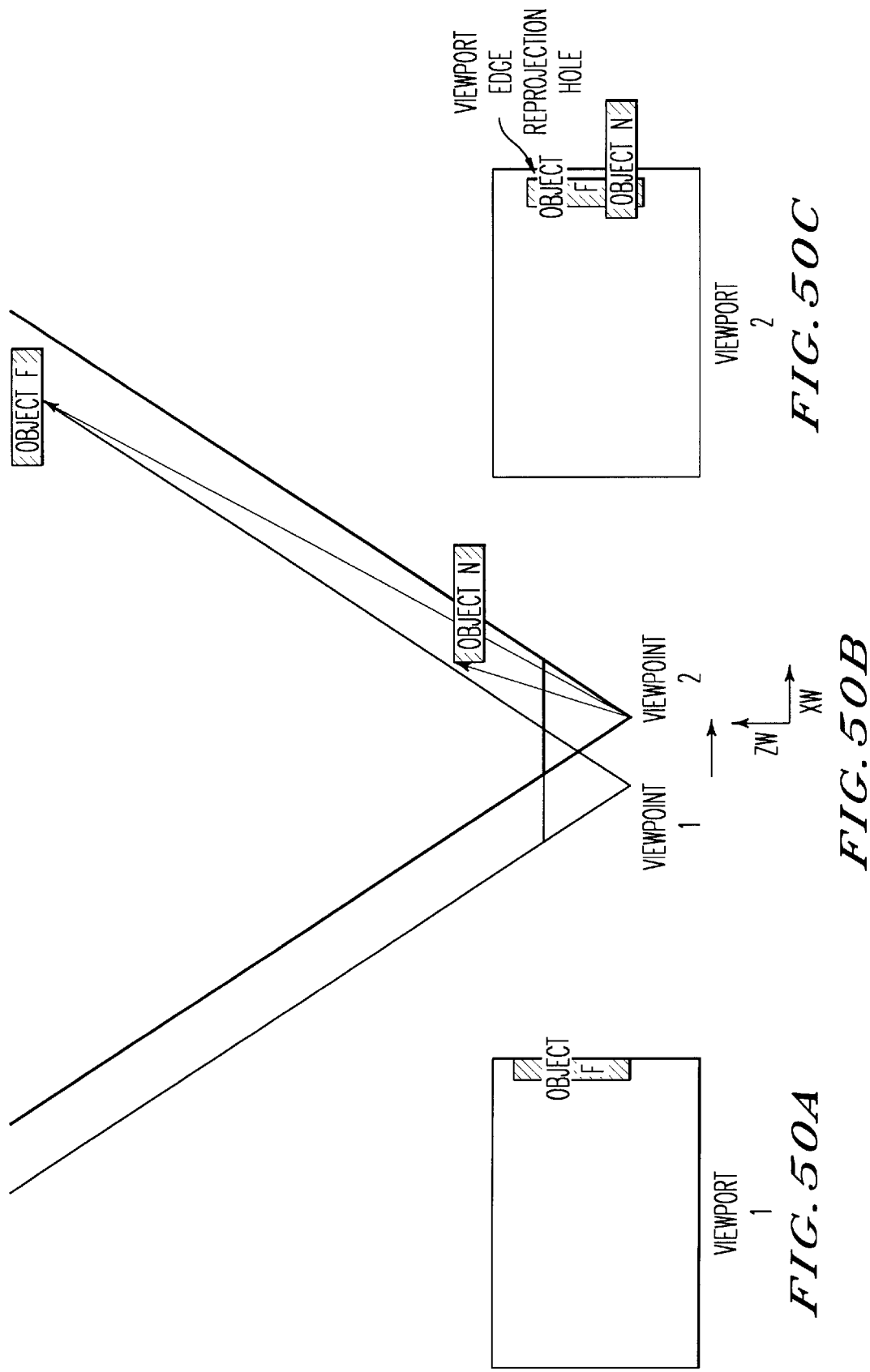

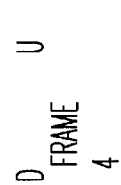
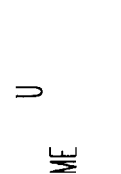
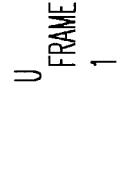
FIG. 51A  FIG. 51B  FIG. 51C  FIG. 51D  FIG. 51E

SYSTEM AND METHOD OF IMAGE GENERATION AND ENCODING USING PRIMITIVE REPROJECTION

CROSS-REFERENCE TO RELATED CO-PENDING APPLICATION

The present application is related to copending application Ser. No. 08/853,139, attorney docket number 7840-004-28, also naming Barry Jenkins as sole inventor and filed on even date herewith. The contents of the copending application are incorporated herein by reference.

This is a non-provisional application based on provisional application Ser. No. 60/033,710, filed on Dec. 20, 1996, incorporated herein by reference.

BACKGROUND OF THE INVENTION

1. Field of the Invention

This invention relates to a method and system for generating and encoding images using primitive reprojection.

2. Description of Background

Computer-based graphics rendering typically is performed based on one of two techniques—either: 1) rasterization, or 2) ray tracing. The uses and advantages of each system are discussed below.

Most commercially available general-purpose real-time image generation systems employ a common approach to visible surface determination. As shown in FIG. 1, this approach is based on a graphics pipeline in which primitives undergo geometric processing 200 in the first stage and some type of depth-comparison rasterization 204 in a later stage. Parallel implementations of this method generally employ a two stage pipeline in which the first stage is object parallel and the second stage is intrinsically image parallel. This depth-comparison rasterization approach to visible surface determination has been implemented in a variety of different hardware architectures with the goal of real-time performance. Although these implementations demonstrate significant architectural differences, they share similar communication costs and scalability limits imposed by the underlying object-order organization of the pipelines.

Molnar et al (hereinafter "Molnar") disclose in "A Sorting Classification of Parallel Rendering", published in IEEE Computer Graphics and Applications, June 1994, a useful classification of the three main parallel graphics architectures, based on how the object parallel phase and the image parallel phase of the pipelines are combined. This classification can also be considered to be based on how the geometry processing stage and the rasterization stage of the pipeline access primitive data. The three parallel graphics architectures are 1) sort-middle, 2) sort-last, and 3) sort-first. Most real-time image generation systems are based on a sort-middle architecture. As shown in FIG. 2, in a parallel sort-middle architecture, primitives from the graphics database are arbitrarily assigned to one of the object-parallel pipes where there are subjected to geometry processing 200. As a result, screen-space primitive information is distributed by broadcast or crossbar networks to a set of image parallel rasterization processors which perform z-buffer rasterization 204. As shown in FIG. 3, other real-time image generation systems employ a sort-last or image composition architecture in which primitives are initially arbitrarily assigned to processors that perform both primitive transformation (in geometry processing 200) and rasterization 204. Based on the primitives which it has received, each of these processors rasterizes an incomplete image of a partial set of the primitives. In the compositioning phase 208, the complete image is constructed by a depth buffered composition of the plurality of incomplete images from all processors. In this case the primitive distribution crossbar is replaced by a high bandwidth image composition interconnection network. The interconnection network is either: a) a sort-last sparse (SL-sparse) interconnection network that receives only pixels generated during rasterization, or b) a SL-full interconnection network which receives a fall image from each processor. To achieve their desired performance, these primitive crossbars or image composition networks are currently implemented as dedicated special purpose hardware.

These depth-comparison rasterization architectures generally require special purpose high bandwidth geometry buses or image composition networks to effect the convergence of the object parallel and image parallel stages of the graphics pipeline. The communication costs associated with this task generally are met with dedicated special purpose interconnects only found in special purpose hardware.

In addition to the special purpose communication hardware required to recombine the object parallel and image parallel stages of the pipeline, most graphics systems also employ hardwired communication channels between rasterizers and frame buffer. A hardwired connection between rasterizers and z-buffer/frame buffer generally does not allow for dynamic, task-adaptive rasterization processor assignment. As a result, for most sort-middle or z-buffer architectures, the fixed relationship between rasterization processors and the z-buffer creates an intrinsic tradeoff between primitive overlap and load balancing. Rasterizers that are mapped to relatively large contiguous regions of the z-buffer are susceptible to load imbalance when too many primitives project to a small area of the viewport. Alternatively, a rasterizer-to-z-buffer mapping in which each rasterizer sub-serves several small interspersed regions of the z-buffer reduces the clumping that tends to occur in larger contiguous regions. However larger primitives and smaller sub-image regions increase the primitive overlap factor which increases the communication requirement and produces additional per-primitive setup calculations. The Silicon Graphics Reality Engine (Akeley 1993), a high performance system, uses small interspersed subregions and a triangle bus that supports essentially all-to-all broadcast to the rasterizers. As with many high performance graphics systems, the Reality Engine employs a hardwired communication channel between rasterizers and frame buffer.

The Pixel-Planes 5 (Fuchs et. al. 1989) graphics system is a sort-middle architecture in which a single dedicated communication system (based on a ring) sub-serves both primitive distribution to the rasterizers and transmission of pixel information from the rasterizers to a frame buffer. Each of the rasterizers is hardwired to a small 128 pixel square z-buffer. The pixel block corresponding to this small z-buffer can be dynamically mapped to the frame buffer. As described above, the rendered pixel data is transferred from the rasterizers to the frame buffer over the ring network. Since this architecture does not depend upon a fixed connection between a rasterizer and a frame buffer, it accommodates task adaptive load balancing to reduce load imbalances caused by primitive clumping. However, like other architectures based on depth buffered rasterization it requires a high-speed dedicated communication network to sub-serve primitive distribution and pixel transmission.

As described in Molnar, the high communication cost of primitive distribution, image composition, and pixel transmission to frame buffer is prohibitively expensive to implement on typical multiprocessor-memory communication channels and generally limits implementation of high performance depth-comparison rasterization to special-purpose dedicated hardware. In contrast some early graphics architectures like the Stellar Graphics Supercomputer (described in Proceedings of ACM SIGGRAPH Vol 22, Number 4, 1988. pp 255–262, incorporated herein by reference) were based on a truly unified model of communication in which all of the communication requirements were met on the main processor-memory bus. Unfortunately the communication cost of this process makes the memory bus a significant bottleneck to performance. Even with the greater processor-memory bandwidth provided by modern shared-memory multiprocessor interconnects, these communication costs quickly become performance limiting.

Molnar describes that the sort-first architecture is the least explored architecture and would potentially have a lower communication cost than either a sort-last or a sort-middle architecture. However, Molnar further indicates that no one is known to have been able to build a sort-first architecture. As shown in FIG. 4, in this architecture each processor is assigned a portion of the image to render. Unlike sort-last processors, each processor in a sort-first architecture transforms and rasterizes all primitives for its corresponding image region. No compositing of the sub-images is required. During pre-transformation, primitives are initially applied arbitrarily to processors to determine to which region(s) each primitive falls. Then each primitive is transmitted to the processor(s) in which the primitive may appear. This partitioning of primitives also forms the initial distribution of primitives for the next frame. In this architecture primitives are only transferred when they cross from one processor to another. Since the image-space distribution of primitives generally changes very little from frame to frame, only a small fraction of the primitives need to be communicated for each frame. In this way a sort-first architecture can, in principle, substantially lower communication costs by exploiting frame-to-frame coherence. As explained by Molnar and Mueller (The First-Sort Rendering Architecture for High-Performance graphics, published in the ACM 1995 Symposium on interactive 3D Graphics, 1995), a typical image sequence contains a substantial coherence of on-screen primitive movement that can be exploited by the sort-first method to reduce the rate at which primitives need to be redistributed between subimage display lists. Neither of the other two depth-comparison rasterization architecture can exploit frame-to-frame coherence in this way.

Unfortunately while the sort-first architecture is efficient at resolving visibility relationships among primitives that were visible in an earlier frame, the classification and communication costs are high for primitives not visible in an earlier frame. In addition the classification and distribution of primitives that become invisible is also problematic. Primarily for these reasons, no system employing a sort-first architecture has been built.

Another disadvantage of known rasterization architectures is that performance and scalability is limited by the object-order organization of the pipeline. In principle each primitive in the database must be transformed, projected to the viewplane, and clipped to the viewport in order to determine potential visibility by inclusion in the viewing frustrum. As a result the geometry phase of the pipeline is intrinsically O(n) in the number of primitives in the database. The use of bounding volumes or spatial subdivision of the database can reduce the computational cost of the geometry phase by a constant factor. Hierarchal organization of the bounding volumes can produce additional reductions in the number of primitives processed in the geometry phase.

However, these methods of view frustum culling still produce O(logn) dependence on the number of primitives in the database. The scalability of known rasterization architectures is also limited because primitive rasterization is not amenable to a front-to-back depth prioritization. In principle the visibility problem is most efficiently solved in a front to back order from the viewpoint. However, the spatial extent of polygonal primitives prevents a simple front-to-back solution of the visibility problem on a per-primitive basis. As a result these methods depend upon rasterizing all forward facing primitives in the view volume and comparing depth at each sample point produced by the rasterization. The cost of such rasterization is intrinsically linear in the total number of forward facing primitives in the view volume. Thus, the cost of rasterization is O(n) in the depth complexity of the scene. Rasterization performance can also be improved by employing pre-computed visibility sets which are lists of primitives that are potentially visible from specific regions of a 3-D database. As shown in FIG. 5A, a source cell 500 is chosen, and it is initially pre-computed which visible cells 504 can be seen from the source cell 500 versus which occluded cells 508 cannot be seen. Then, as shown in FIG. 5B, it is pre-computed which primitives correspond to individual visible objects 512 in the visible cells 504 and which primitives correspond to occluded objects 516 in either visible cells 504 or occluded cells 508. Likewise, as shown in FIG. 5C, the technique can be expanded to pre-compute visibility in three-dimensions rather than two dimensions. In FIG. 5C the visible beams are determined based on the source cell 500. These pre-computation methods generally use a spatial subdivision of the database together with frustrum clipping techniques that determine the potentially visible primitive set for each cell of the subdivision based on knowledge of the portals (e.g., doors and windows) within the regions.

Several different methods of polygon flow minimization based on pre-computed visibility sets have been proposed. One of the most notable techniques is the technique described by M. Abrash published in 1996 in Zen of Graphics Programming by the Coriolis Group, Inc., incorporated herein by reference. This technique is used in the multi-player, first-person action game called Quake which is distributed by ID Software. Such methods are generally applicable to models in which visibility is restricted by wall-like geometry and unrestricted by window-like openings and perform poorly for less restricted types of virtual environments. The National Research Council's Committee on Virtual Reality Research and Development 1995 Report concludes that there is at present no general solution available to the problem of polygon flow minimization or pre-computed visibility for known graphics architectures.

Known depth-comparison and list-priority approaches to visibility determination do not solve the visibility problem in the most efficient front-to-back order. An alternate method of visibility determination that proceeded in a prioritized front to back order, stopping when the nearest visible sample is encountered, would scale better with the overall depth complexity of the scene. Visibility tracing methods of image synthesis including ray tracing and ray casting solve the visible surface problem in an intrinsically depth-prioritized front-to-back order. In the method of ray casting and ray tracing, rays which originate at the viewpoint are intersected with objects in the environment as shown in FIG. 6. When this intersection is conducted by extending the ray incrementally from the viewpoint into the environment (e.g., stepping through grid structure spatially subdividing the database as shown in FIGS. 7A, 7B, 7C) then the visible surface determination is made in a depth-prioritized, front-to-back order.

Unfortunately the high computational cost of ray tracing and ray casting has prevented efficient general purpose real-time implementations. Real-time ray casting methods have been developed for specially restricted databases such as the height-mapped databases and associated 2-D grids found in DOOM (distributed by ID Software), Commanche (U.S. Pat. No. 5,550,959; Assignee: Nova Logic, Inc.) and related computer games. In DOOM and similar games, as shown in FIG. 8A, a series of rays are cast from a player's position so that they cover the player's field of view. When a ray hits an object in the height-mapped database, the texture of the object is copied from a texture map into the final three-dimensional view, starting at the base of the object and continuing upwards for the height of the object. (If an object does not extend completely to the ceiling then the system searches for the next object behind the initial object.) When all rays have been cast and the textures mapped, a three-dimensional view, such as shown in FIG. 8B is generated and displayed.

As shown in FIG. 9, real-time ray casting has also been employed for voxel databases organized by hierarchical three-dimensional grids, as described in U.S. Pat. No. 5,317,689, incorporated herein by reference. While these methods are quite scalable in database size and depth complexity the geometric restrictions imposed by the height field and voxel representations generally limit their usefulness to relatively few special applications.

A method called reprojection was later developed to reduce the high computational cost of ray tracing. The premise behind reprojection is to employ information from the current frame of an image sequence to reduce the amount of computation required to generate the subsequent frame. In the typical implementation image samples from one frame are transformed and reprojected to the viewport for the subsequent frame using known transformation matrices for perspective projection. This process is shown for two different viewpoints and corresponding viewports in FIG. 10 from a paper by Sig Badt entitled in "Two algorithms for taking advantage of temporal coherence in ray tracing," and published in Visual Computer, Number 4, 1988, the contents of which are incorporated herein by reference. In the FIG. 10 samples are effectively moved from their position in one image to their position in another image by applying a concatenated transformation matrix representing object motion, camera motion, and perspective projection. Ray tracing is required only to fill the deficiencies or "holes" left in the image by this reprojection of previously visible samples. Sig Badt first suggested reprojecting image samples, which have a dualistic image-space object-space character, to decrease the amount of ray tracing required to generate frames in an animated sequence. Subsequent development of the reprojective paradigm followed two different paths. Initially reprojection was further developed as an adjunct to ray tracing. An alternative developmental path has resulted in systems of image based rendering that employ approximations to reprojection.

Adelson et al. (1993), Adelson et al. (1995), and Fu (1996) refined the techniques of sample reprojection as applied to ray tracing by recognizing that depth buffering could be employed to resolve the visibility among previously visible samples. In addition these authors identified two different types of image deficiencies or "holes" caused by reprojection. The exposure hole is the result of a newly visible surface being exposed in the image sequence and requires ray tracing to fill. The expansion hole is the result of intersample expansion caused by perspective projection and can sometimes be filled by a more efficient interpolative method described by Fu.

Existing methods of sample reprojection are generally restricted to rendering static environments under camera motion. This restriction results because exposure of moving objects is not limited to identifiable exposure areas that can be selectively ray traced. Similarly, existing reprojective methods of image synthesis can fail to render certain static objects that penetrate the view volume as a result of view volume motion. This failure occurs because the exposure of such newly penetrating objects is also not limited to specific exposure areas identified by the reprojection of previously visible samples. In addition existing reprojective methods of image generation are prone to certain visibility errors that result from finite temporal sampling. Moreover existing methods of reprojective image generation experience serious performance degradation for image sequences which contain a high rate of occlusion-exposure transitions. The aforementioned limitations have significantly restricted the application of existing methods of reprojective image synthesis. For example, there is at present no system which performs actual reprojective image synthesis in real-time. In a later section of this specification it is disclosed how the present invention corrects these specific deficiencies and otherwise improves on the accuracy, efficiency and versatility of existing reprojective methods to allow a real-time implementation.

Existing reprojective methods have limited commercial importance as applied to ray tracing since sample reprojection is practically limited to reducing only the number of first generation rays traced. In commercial renderers ray tracing is usually not employed as a method of primary visible surface determination but more as an illumination method employing only higher generation reflected and refracted rays. In addition with the exception of a few interesting systems, that are discussed later in this specification, general-purpose real-time image generation systems do not employ a ray tracing or ray casting method of visible surface determination that would be amenable to acceleration by sample reprojection.

Perhaps the most important commercial application of the reprojective paradigm has been in image based rendering or view interpolation techniques that are essentially interpolative approximations to sample reprojection. The general view interpolation method of Chen et al. (1993) in principle allows unrestricted camera motion in the display of a static database. The method does not actually synthesize images in the conventional fashion from a database representing three dimensional objects. Rather it employs a very large number of pre-rendered images to compute visibility using what is essentially an interpolative approximation to reprojection. The size of the image database must be sufficient to include images that encode the visibility of the entire surface of every object in the model from any possible view position and direction. The size of the database required to encode this total visibility within a 3-D model is prohibitively large for practical implementations. No commercial implementations of this method have been developed.

Plenoptic image based rendering methods (such as Quicktime®VR described by Chen (1995)), are essentially highly constrained reprojective methods in which camera motion is restricted to pan and zoom capability. The simplified type of optical flow that results from this restricted camera motion does not produce occlusion or exposure events. This allows image sequences representing view direction vector rotation from a single viewpoint to be computed by the reprojection of a single panoramic image in real-time.

A recently disclosed graphics architecture that makes limited use of approximate reprojective methods is Microsoft's Talisman architecture described in Torborg et al. (1996). In this method of real-time image generation, affine image-space approximations to actual reprojection are applied to entire images of individual objects that are stored in separate object image buffers. Visibility among previously visible objects is resolved by composition of these individual images. In this architecture object-space primitive transformation and rasterization operations are replaced by less expensive image-space image processing operations which approximate the object-space transformations. Unfortunately affine image-space transformations applied on an object basis cannot accurately approximate the complex optical flow patterns caused by object-space transformations. Such transformations typically result in a heterogenous pattern of optical flow for a single object that is poorly approximated by a single affine image-space transformation (or combination of such transformations) applied to the entire object. In addition the technique of applying image-space transformations to images of entire objects neglects the visibility changes that result from object self-occlusion or self-exposure. By approximating the image of a moving object with the moving image of an object the method produces visibility errors along the terminator silhouette of objects. The Talisman architecture attempts to exploit temporal image coherence in a very simplistic way by essentially modeling three dimensional scenes as a collection of 2-D multiplane layers. In addition because it provides no method to identify or search exposure regions and does not remove occluded objects from processing the method fails to realize the full power of the reprojective approach to visible surface determination.

Another limitation of existing real-time image generation architectures is that the intrinsic organization of known rasterization pipelines is not well suited to efficient client-server implementations. The goal of an efficient client-server system is to decrease the computational and storage demands on the client while minimizing communication between client and server. Existing methods of distributed three-dimensional graphics generally employ an image transmission approach in which the server generates images in real-time which are transmitted to the client for display. Alternatively the data representing three dimensional objects is stored on a server unit and is completely downloaded to a client unit. In this geometry replication approach the server unit functions in the capacity of a database server which makes the three dimensional database available to client units. Client units generally download the complete database and perform image generation on the downloaded database. Systems such as Distributed Interactive Simulation, using the Department of Defense Advanced Research Projects Agency SIMNET protocol, and game servers allow limited data representing avatar, vehicle or player information to be updated in real-time and transmitted to client units.

In methods of client-server graphics that employ image transmission, the server unit methods require a relatively high bandwidth connection even if real-time image compression and decompression is employed.

Geometric replication methods such as VRML generally have a lower bandwidth requirement but do not decrease the storage or processing requirements of the client. For these systems the client must be capable of rendering the complete replicated database in real time. The "server" does not provide image generation services. Rather it functions primarily as a database server. Levoy, in Polygon-Assisted JPEG and MPEG Compression of Synthetic Images published in the SIGGRAPH 95 Conference Proceedings, discloses a somewhat more efficient client-server method based on hybrid image transmission/geometry transmission approach. In this method the server unit maintains a low level-of-detail database and a high level of detail database. For each frame of a real-time image stream images are generated from both the low level-of-detail and high level-of-detail database. The difference between the two images is computed using known methods of image processing. A client unit contains only a low level-of-detail geometric database and renders this database for each frame. The difference image computed on the sever is compressed and transmitted to the client in real-time which decompresses and composites it together with the image generated by the client from the low level-of-detail database. The result is a high level-of-detail, high quality image which requires a relatively low transmission bandwidth (to transmit the relatively low information difference image) and which requires relatively limited client storage and processing capabilities. While this method can decrease the computational load of the client and reduce the communication costs, it requires both real-time image compression and decompression and further requires that special image compositing be added to the pipeline. In addition the entire low level-of-detail database must be stored and processed by the client. Alternatively Levoy discusses the optional approach of transmitting a transformed and compressed low level-of-detail representation of the geometric database in screen-space representation. This would require that the low level-of-detail geometric primitives be transmitted for every frame which increases the required connection bandwidth. While only the primitives that are actually visible for each frame would need to be transmitted in this approach, Levoy does not indicate how these visible primitives would be identified. Moreover since primitives visible in a current frame are likely to be visible in a subsequent frame, the repeated transmission of primitives that have been transformed to image-space representation is an inefficient use of available bandwidth.

Another approach to distributed client-server image generation is based on demand-driven geometry transmission to the client, and is disclosed in Demand-Driven Geometry Transmission for Distributed Virtual Environments, by Schmalstieg et al., published as part of Eurographics 96, and incorporated herein by reference. In this method the server determines and periodically updates a list of potentially visible primitives for each client using a spherical clipping volume around the viewpoint. The result is compared to a list of primitives previously transmitted to the corresponding client and only those potentially visible primitives that have not been previously transmitted are sent to the client. This method reduces communication cost by limiting transmission to those primitives that have just become potentially visible. Since the client replaces primitives in the client display list when they are no longer included in the spherical clipping volume, the storage and compute requirements of the client are limited to only those primitives in the potentially visible set. However, since this method uses a limited inclusion volume, one disadvantage is that the method can somewhat arbitrarily exclude distant primitives from the potentially visible set. Moreover the use of a spherical inclusion volume results in the inclusion and transmission of a large number of geometric primitives that are not visible in the current frame and are unlikely to be visible in upcoming frames (for examples primitives in the inclusion sphere "behind" the viewpoint). As a result the methods makes inefficient use of available transmission bandwidth and available client storage and compute resources. Another disadvantage of this method is that the client must compute removal of primitives by clipping to the inclusion volume and must also implement display list replacement and compaction protocols.

In addition to the computation and display of computer generated imagery in real-time, images can be synthesized in non-real-time and stored on recordable streaming media for later real-time display. A variety of different approaches have been developed which allow users to exercise various degrees of interactivity during the replay of prerecorded computer generated image sequences. On one extreme, interactivity is limited to the ability to start and stop a pre-rendered image sequence that may be stored on a recordable medium. While this type of interactivity is extremely limited, a streaming data source has the advantage that, given sufficient decoding performance, its display is limited only by the transmission requirements of the data stream. This limited degree of interactivity is in contrast to the more complete level of interactivity that results when an entire 3-D graphic database is downloaded to a display unit capable of real time image generation. In this data replication case interactivity with the database is complete but the rendering performance of the receiving unit limits the size of the database that can be visualized and hence the viewable graphic content. Some systems attempt to combine the advantages of a streaming image sequence with the interactivity of a 3-D database. One example is MegaRace II and similar games of the "rail shooter" genre. In this system a rendered image sequence forms the background on which a limited 3-D database is rendered in real-time. In typical implementations vehicles and obstacles comprise the 3-D database which are under interactive control. The pre-rendered sequence provides the background on which the interactive image generation occurs. Typically the pre-rendered image sequence portrays a "flyover" type view of a roadway or other pathway to which the 3-D objects are confined. Movement of the user's vehicle to predetermined locations on the roadway initiates the streaming of the image sequence of the roadway and associated wayside. In this way a "chase" view of the users vehicle is provided as the vehicle negotiates the pathway. The speed of the chasing camera can in principle be regulated by controlling the number of frames per unit distance that are displayed while keeping the number of frames per second constant. In practice to provide a choice of 10 different speeds would require an animation with 10 times the number of frames required for a constant speed implementation. Moreover the incremental encoding schemes employed by typical video codecs often do not allow display of every nth frame of an animation. As a result current implementations do not allow the speed of the camera to be varied. Typically as the target vehicle changes speed the camera sequence is forced to suddenly start and stop discontinuously. Because of a limited ability to control the speed and the inability to control view direction such pre-rendered sequences cannot be employed for first-person views, e.g. from within the vehicle.

Another approach to providing increased interactivity with a pre-rendered image sequence is to allow changes in the view direction vector during replay of the animation. This capability is provided by systems such as QuickTimeVR movie system. In this method a wide field-of-view image is encoded for each viewpoint in the animation. The image is stored as a cylindric projection which can be converted to a planar perspective projection during decoding. The field-of-view used during the production of the image sequence is larger than the field-of-view of the decoded, displayed sequence. In this method the decoding unit selectively accesses sections of each cylindrical image that map to the decoding unit's current viewport. The decoding unit performs the cylindrical to planar projective remapping in real-time. The actual set of viewpoints defining the animation is constrained by this method to follow a fixed trajectory defined by a space-time curve. Thus while the datastream provides the user with a limited type of "look around" capability during replay of the image sequence; the actual vantage points are constrained by the initial encoding.

SUMMARY OF THE INVENTION

Accordingly, it is one of the objects of the present invention to address shortcomings in the state of the art of three-dimensional image generation systems.

Accordingly it is an object of the present invention to provide a method of real-time image generation that is more computationally efficient than known rasterization methods.

It is an object of the present invention to provide a method of real-time image generation in which the performance is less affected by the number of primitives in the database than existing image generation systems based on object-order rasterization pipelines.

It is yet another object of the present invention to provide a method of real-time image generation in which the performance is less affected by the depth complexity of the scene than existing image generation systems based on object-order rasterization pipelines.

It is another object of the present invention to provide a method of real-time image generation that does not require application-specific polygon flow minimization techniques to display even very large databases.

It is yet another object of the present invention to provide a method of real-time image generation that exploits the natural interframe coherence of an image stream to substantially reduce the communication costs associated with a parallel hardware implementation of the method. Advantageously, this reduces communication requirements and allows a hardware implementation of the method using general purpose distributed or centralized shared-memory multiprocessor hardware. Such a shared-memory multiprocessor implementation facilitates the incorporation of dynamic, task-adaptive load-balancing techniques that further improve the performance of the method. Additionally the shared memory multiprocessor implementation facilitates the incorporation of advanced shading, lighting, and perception-based rendering methods that are not easily integrated into known rasterization architectures. The perception-based rendering methods include novel techniques for perception based spatiotemporal sampling that are described in the co-pending patent application in which the present invention is specified as an example embodiment.

It is yet another object of the present invention to provide a method of image generation which exploits the interframe coherence of the image stream in a manner that addresses the visibility problems of "off screen" primitives encountered with previously proposed "sort-first" architectures.

It is yet another object of the present invention to provide a method of image generation in which sub-image display lists are limited to actually visible primitives and in which newly visible primitives are identified by an efficient depth-prioritized search of specifically identified exposure regions of the image. Advantageously, this allows the image generation method to exploit a more significant type of temporal image coherence, temporal visibility coherence, to reduce both communication and processing costs. Temporal visibility coherence results because optical flow patterns of typical image sequences substantially limit the rate at which newly visible primitives are exposed.

It is another object of the present invention to provide a method of reprojective image generation in which the exposure of newly visible elements that penetrate the view volume is determined by searching specific view volume incursion regions defined by the non-union of consecutive view frustrums. Advantageously this increases the accuracy of identifying newly penetrating elements when compared to existing reprojective methods which limit the search for newly penetrating elements to inaccurate viewport edge reprojection holes.

It is yet another object of the present invention to provide a method of reprojective image generation in which entire objects are classified by their dynamic occlusive properties. Advantageously this classification system allows the method to achieve increased accuracy, efficiency and versatility compared to existing reprojective methods of image synthesis.

It is another object of the present invention to provide an efficient client-server image generation method in which the server identifies those primitives that become newly visible during the frame and transmits these to the client for addition to the current display list. The method therefore significantly reduces the required server-client connection bandwidth compared to image transmission methods and significantly reduces the storage and processing requirements of the client by limiting the client display list to primitives that are actually currently visible. To further reduce the processing requirements of the client, the server determines client display list removal and insertion actions. Thus the present invention significantly reduces both the connection bandwidth and client storage-processing requirements when compared to incremental geometric transmission methods that transmit potentially visible primitives.

It is another object of the present invention to provide a method of efficiently encoding a computer generated image sequence (either generated in real-time or non-real-time) by determining and storing for each frame the list of primitives that become newly visible during the frame interval.

It is another object of the present invention to provide a method of efficiently encoding a computer generated image sequence by determining and storing for each frame information describing the set of primitives that become newly invisible during the frame interval.

It is yet another object of the present invention to provide a method of efficiently transmitting such an encoded image stream by pre-transmitting texture, lighting and other scene data and by incrementally transmitting information describing newly visible primitives, newly invisible primitives, and keyframe animation values.

It is yet another object of the present invention to provide a method of efficiently decoding such an encoded image stream using a receiver unit that performs conventional real-time depth-comparison rasterization using a display list containing the incrementally transmitted visible graphics primitives.

It is an advantage of the present invention that the storage and transmission requirements for image sequence encoding are less dependent on the displayed image resolution than conventional image-based codecs.

It is yet another object of the present invention to decrease the computational demand placed on this receiver unit by transmitting, along with the aforementioned data, the display list insertion location and visibility lifetime for each transmitted primitive in a manner that significantly simplifies the display list replacement activity of the receiver.

It is yet another object of the present invention to efficiently utilize available transmission bandwidth by utilizing periods of low primitive transmission rate to pre-transmit primitives before they actually become visible in the image stream.

It is yet another object of the present invention to reduce the computational demand such a pre-transmission places on the receiver unit by transmitting along with such primitives an activation time indicating the frame number when the primitive becomes visible in the image stream and when it must be added to the active receiver display list.

It is yet another object of the present invention to provide a codec for computer generated image sequences that allows more interactivity during replay than can be achieved with existing image-based codec methods. Advantageously this visibility event based codec provides unprecedented interactive control of viewpoint velocity, viewpoint position, and view direction during replay of the prerecorded encoding.

The aforementioned objects and advantages are achieved in accordance with the present invention which employs a hybrid method of visible surface determination based on a unique combination of depth-comparison rasterization and optimized ray casting. Spatial-subdivision ray casting is used to identify primitives that become newly visible in the image stream. This is accomplished using hierarchical spatial subdivision ray casting that is optimized to adaptively sample specific exposure regions in the image to search for newly visible primitives. This demand-driven, data-access, depth prioritized strategy is a very efficient method of identifying newly visible primitives since the cost of this method is relatively independent of the database size and scene depth complexity. The newly exposed primitives identified by this process are added to a display list containing at least all other visible primitives. The image is actually generated by processing primitives in this display list using depth-comparison rasterization. Because the display list contains only primitives that are actually visible the cost of this rasterization is much less than rasterizing the entire database.

For the subsequent frame, primitives in this display list are processed using an existing transformation, depth-comparison rasterization (e.g. z-buffer) method. Following the rasterization of all previously visible primitives, specific exposure regions are identified in the image buffer that will require depth-prioritized search for newly visible primitives which is effected by the spatial subdivision ray casting. These exposure regions are of two types: view-volume incursion regions, and emergence regions.

View volume incursion regions are identified by image regions which contain the projection of the non-union of consecutive view frustrums. Emergence regions are identified by three different criteria. For each of these criteria the state of the current image is compared to the state of the previous image using a temporally double-buffered image depth buffer in which the source primitive for each image sample is recorded along with the image and depth information. A first criteria for identifying emergence regions is the location of regions in a buffer for the current frame in which no image samples have been written by rasterization of previously visible primitives. These regions correspond to reprojection "holes" and are, if not within view volume incursion regions, considered to be emergence regions. A second criteria identifies as potential emergence regions: all current frame image regions for which the corresponding previous frame samples belong to different source primitives and for which the corresponding previous frame samples are more distant than the current samples. A third criteria is employed in which potential emergence regions are defined not by primitive occlusion-exposure transitions, as in the second criteria, but by more efficient object occlusion-exposure transitions. This criteria employs precomputed primitive groups based on the membership of individual primitives in a group or groups of primitives that comprise substantially convex, closed objects in three space. Employing this criteria, potential emergence regions are defined by current image regions in which the source primitive for current frame samples belong to a different convex primitive group than source primitives from the corresponding last frame samples and in which the current frame samples are relatively more distant than the current frame samples. The use of the third criteria for primitives that have been so pregrouped allows the method to exploit an important type of dynamic image-space object visibility coherence to reduce the size and number of potential exposure regions that require ray-cast visibility search.

According to the present method, exposure regions are sampled for newly exposed primitives using the aforementioned optimized ray casting search method. The traditionally high cost of ray casting is reduced because its use is limited to regions of potentially newly exposed primitives. The interframe coherence of typical image sequences tends to limit the size of these exposure regions. The cost of visibility tracing is further reduced by employing an adaptive sampling strategy in which sampling between two samples from the same convex primitive is not conducted if the two samples are separated by a minimum predetermined object space distance selected to prevent drop-out of small primitives. This adaptive, search directed sampling is conducted in a manner that exploits the image-space coherence of graphics primitives to accelerate the identification of primitives that are newly visible. This search strategy uses spatially coherent sampling along with a check of the most recently encountered primitives to rapidly identify newly visible primitives.

In addition to ray casting a technique of approximate beam tracing is employed which provides a more rapid but less accurate search of any region for newly visible primitives. The beam tracing technique identifies at least all newly visible primitives but includes some primitives that are not actually visible. The approximate beam tracing technique is accelerated by an adaptive sampling strategy to search for a type of occlusion coherence that limits the depth of the beam tracing.

The sample density required to search exposure regions by either ray casting or beam tracing is substantially reduced by employing a hierarchical level-of-detail database that is integrated into the hierarchical spatial subdivision grid data structures.

Newly exposed primitives identified by the depth-prioritized visibility search process are added to the primitive display list for subsequent rasterization. Primitives are removed from this list when they become backfacing or when they fail to clip to the view volume during the transformation clipping sequence. In addition the present method also allows the identification of primitives that remain in the view volume and are forward facing but which are completely occluded by other primitives. Such occluded primitives are also removed from the display list periodically. Efficient reprojective image generation requires that the cost of visibility search in exposure regions (e.g., by ray casting) be offset by the savings produced by the removal of occluded elements from the reprojection list. An object classification system is employed by the present invention to achieve an efficient balance between the cost of determining exposure and occlusion and the savings produced by removing occluded elements from the reprojection display list. This is achieved by classifying objects based on their occluding efficiency which is defined as the ratio of the static occlusion area to the dynamic emergence region area produced by an object. Objects with low occluding efficiency produce little effective occlusion but result in a large emergence trail which incurs a high visibility search cost. Reprojected elements (e.g., primitives) that are covered by such objects are not considered occluded and are not removed from display lists. Classification of poorly occluding objects as non-occluding decreases the requirement for ray-cast visibility search without significantly increasing the number of elements in the display list. The net result is to decrease the computational cost of image generation.

The aforementioned object classification system is also employed to increase the accuracy of reprojection by eliminating exposure errors produced by objects with low occluding efficiency. Such objects can produce discontinuous occlusion paths and exposure regions in the double buffered depth buffer as a result of temporal undersampling. This undersampling can result in "exposure gaps" in the buffer in which objects fail to leave an occlusion-exposure transition in the temporally extended depth buffer. These missed emergence regions result in the failure to search for and identify newly exposed primitives. The object classification technique allows such objects to be identified. The present method includes three specific techniques that are applied to primitives belonging to these objects to reduce or eliminate exposure errors that occur because of temporal undersampling.

The aforementioned object classification system is also employed to allow moving objects to be rendered within the context of a reprojective paradigm by classifying primitives belonging to such objects as non-occludable. The exposure of moving objects is not limited to identifiable emergence regions. By classifying primitives belonging to moving objects as non-occludable they are not removed from display list by occlusion and consequently need not be identified by visibility search in emergence regions. In contrast, moving objects (with a relatively high occluding efficiency) can be classified as occluding and result in the removal of occluded, occludable primitives. This object classification system based on the dynamic occlusion characteristics is inexpensive to implement. Objects can often be preclassified and optionally reclassified dynamically. This classification technique extends the accuracy, efficiency, and versatility of known reprojective techniques and can be employed in more traditional sample reprojection methods as well as the present method of primitive reprojection.

The present invention also includes a technique which allows certain moving objects to be removed from the display list when they outclip the view volume. The exposure of moving objects as they penetrate the view volume is not limited to the aforementioned identifiable view volume incursion regions which are valid only for static objects with view volume motion. Consequently the primitives belonging to moving objects must generally be permanently retained in the display list. The present invention employs a technique in which the view volume incursion regions are extended to specifically reflect the maximum image-plane velocity of certain moving objects with image-plane velocities below a predetermined value. The extended view volume incursion regions are called view volume incursion perimeters. Visibility search by ray casting within the view volume incursion perimeter guarantees the identification of these moving objects which may then be safely removed from the display list as a result of view volume outclipping.

The present image generation method is especially well suited to implementation using general purpose distributed or centralized shared memory multiprocessors. The preferred embodiment employs a scalable distributed shared memory non-uniform memory access (NUMA) architecture. Processors function as subimage processors in which each subimage processor generates the image information for one or more subimages. Subimages are relatively rectangular subwindow-like regions of the image that effect a tiling of the entire image. Subimage processors contain a local display list that is substantially limited to those primitives visible in the subimage. (As well as possibly some non-occludable primitives that are not actually visible). Redistribution of primitives between subimage processors is performed by a technique of primitive-subimage classification which is optimized to detect the penetration of primitives into neighboring subimages. Reprojective redistribution of primitives occurs over the memory-processor interconnection network which may be bus or crossbar based. The natural temporal image coherence of a typical image sequence produces a corresponding temporal locality of data reference for subimage processors which minimizes the communication cost of primitive redistribution. The invention employs a dynamic load balancing method in which subimage windows are translated and scaled so as to substantially track the primitives in their local display lists which further reduces the communication cost of reprojective redistribution.

In addition to implementation on existing distributed shared-memory multiprocessor hardware the present invention specifies an efficient 2-stage pipelined implementation in which each pipeline stage is a shared memory multiprocessor. In this embodiment corresponding subimage processors in each stage are connected using a simple message passing connection. Stage I subimage processors perform transformation, vertex lighting, and redistribution of reprojected visible object-space primitives among stage I subimage processors (using the stage I shared memory interconnect). Stage II processors receive transformed image-space primitives from the corresponding stage I subimage processor. Stage II subimage processors perform rasterization of these image-space primitives, identification of exposure regions, and ray casting or beam casting to identify newly visible primitives. Newly visible primitives identified in stage II are rasterized and subsequently communicated to stage I for later reprojective transformation. This communication employs the aforementioned interprocessor connection. Additionally the corresponding stage I processor may periodically identify occluded primitives by a read operation of the non-occluded elements in the subimage depth buffer. The array index of newly occluded primitives in the stage I primitive display list is likewise communicated to the stage I processor which effects the removal of this primitive from the primitive display list.

In one implementation of the invention the image generation system functions as a visibility event server that implements an efficient on-demand geometry transmission protocol for client-server graphics systems. In this implementation a list of primitives representing all primitives newly visible to the entire image for each frame is determined by the server. In an image-parallel implementation this newly visible primitive list is determined by examining the set of newly visible primitives for each subimage (which is already produced during primitive reprojection) for prior representation in any other subimage. This test for new visibility with respect to the image employs a global visibility array in which the visibility of every primitive in the database is encoded for each frame. This array has one element for each primitive in the database. It is modified incrementally between frames to reflect newly visible and newly invisible primitives in the image stream. Primitives newly visible to a subimage and not previously visible to the image (as determined by a corresponding NULL value in the global visibility array) are actually newly visible to the image stream and are added to a list of newly visible primitives for each frame which are transmitted to a client unit for each frame. The client unit is a conventional image generation pipeline that transforms and rasterizes primitives in a client (destination) display list. The present method employs a technique in which the client (destination) display list is an image of a server (source) display list which contains all currently visible primitives. This technique allows the display list insertion and replacement activities to be computed by the server. The results are effectively transmitted to the client by sending a destination display list index location with each newly visible primitive.

In addition to a list of newly visible primitives transmitted for each frame the visibility event server periodically determines a list of primitives that are newly invisible to a frame and transmits the index of newly invisible primitives in the destination display list to the client unit. Newly invisible primitives include those that reproject completely outside of the viewport (outclip) and those that become completely occluded. The present invention specifies two methods of determining if a primitive that is newly occluded to a subimage is also newly occluded throughout the entire image. In a first method if a primitive is newly occluded in a subimage its projection in the viewport is examined in order to identify all other subimages in which the primitive projects. The display list of each of these subimages to which the primitive projects is examined to determine if the primitive is exposed or occluded. If the primitive is not exposed in any of the subimages to which it projects then it is considered newly occluded for the subimage and added to the visibility event information for the frame. In a second method the aforementioned global visibility array is not maintained by incremental interframe modifications but is completely zeroed and initialized anew for each frame. In this method the global visibility array is first zeroed and then all exposed primitives (i.e., with at least one exposed sample in a subimage buffer) are read into the global visibility array to determine which primitives are exposed for a frame. The resulting global visibility array reflects all visible primitives for a frame. This array is logically compared to the global visibility array for the previous frame to identify newly invisible primitives. While this method has a higher overhead in zeroing, initializing, and array comparison its cost is relatively independent of the number of newly occluded primitives and can be employed when temporal visibility coherence is very low.

In another implementation of the invention the aforementioned visibility event codec method is optimized to encode the results of a computer animation in a streaming data format for later playback. In this technique the available replay/transmission bandwidth is optimized by preencoding/pretransmitting primitives before they become newly visible along with an activation time that indicates to the decoding unit when the primitives should become active in the destination display list. This allows very efficient use of available replay/transmission bandwidth by preencoding/pretransmitting primitives during periods of low bandwidth utilization (i.e., periods of high temporal visibility coherence). Texture and material data are pretransmitted while keyframe animation data is incrementally transmitted to the display unit along with newly visible and invisible primitive information.

The present invention includes a technique by which the aforementioned visibility event codec provides unprecedented interactivity during the replay of a prerecorded visual datastream. In this technique the visibility of specific potentially visible primitives is encoded for each frame of the encoding. During replay the destination display list is provided with a set of primitives that is sufficient to allow predefined interactive control over viewpoint position and velocity and view direction during replay.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 5A through 5C are schematic illustrations of the cells and objects that are pre-computed as visible from a source cell;

FIGS. 7A through 7C are different views of a spatial subdivision database of hierarchical nested grids implementing hierarchical level-of-detail;

FIG. 19 is a C data structure for storing information about a sample buffer;

FIG. 28 is a C data structure for storing information about primitives;

FIG. 44A contains multiple views of a view frustrum illustrating a method of locating viewport quadrants for the case of the viewpoint motion vector aligning with the view direction vector;

FIG. 46 contains multiple views of a view frustrum illustrating a method of locating viewport quadrants for the case of the viewpoint motion vector not equal to the view direction vector;

FIGS. 47A through 48D are a series of display frames of a scene where the viewpoint motion is the same as described in FIG. 46;

FIG. 48 contains multiple views of a view frustrum illustrating a method of locating viewport quadrants for the case of the viewpoint motion vector not equal to the view direction vector and where the view direction vector does not intersect the image plane within the viewport;

FIG. 50 is a top view illustrating the viewport incursion region for a laterally moving viewport with near and far static objects;

FIG. 51 an illustration of the 2-cycle visibility event client with dual display lists;

DETAILED DESCRIPTION OF THE PREFERRED EMBODIMENTS

Figure 11:
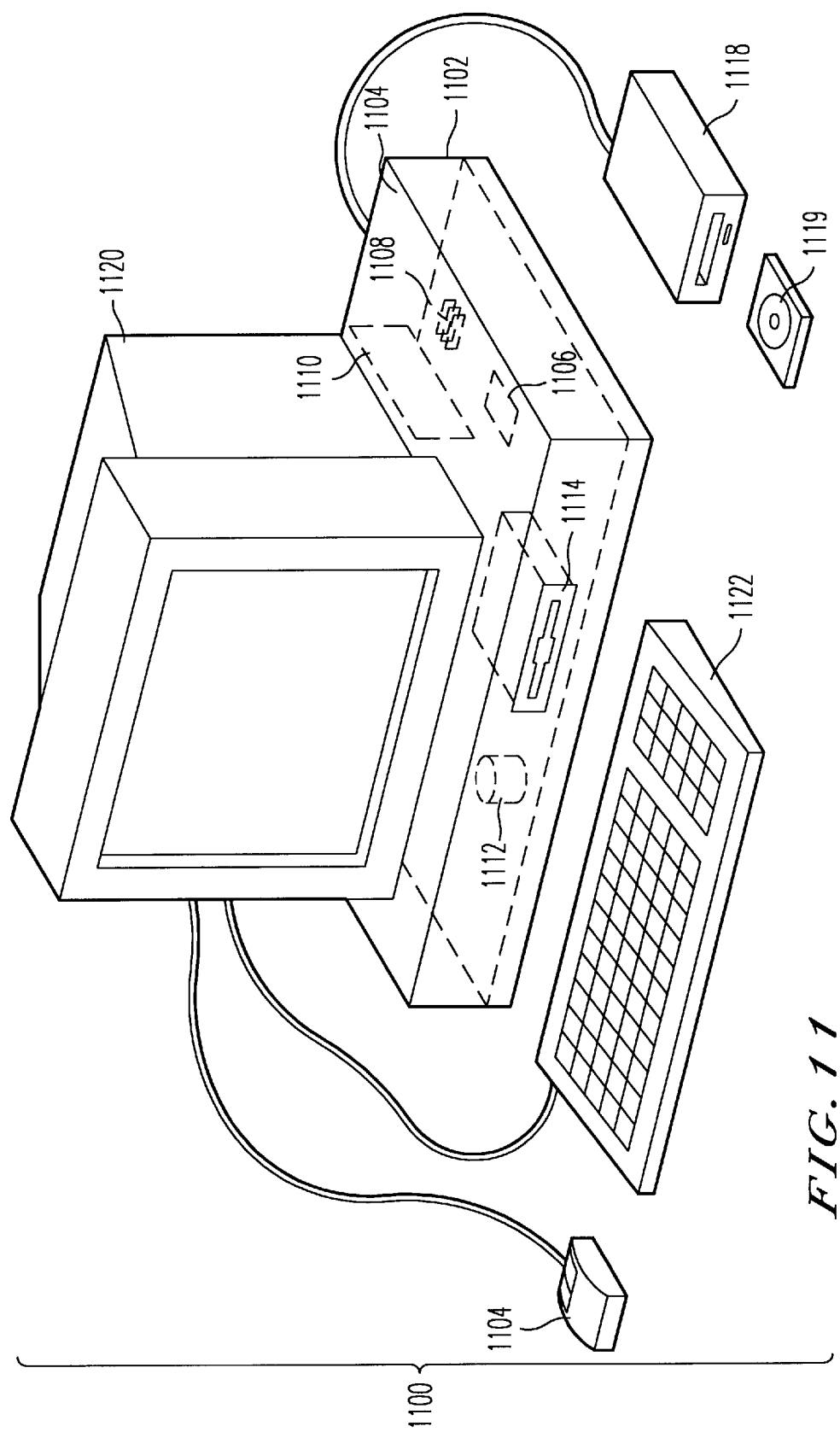
FIG. 11 is a schematic illustration of a uniprocessor computer system for implementing a system and related method for primitive reprojection-based real-time image generation according to the present invention.

Referring now to the drawings, wherein like reference numerals designate identical or corresponding parts throughout the several views, FIG. 11 is a schematic illustration of a uniprocessor computer system for implementing a system and related method for primitive reprojection-based real-time image generation according to the present invention. A computer 1100 implements the method of the present invention, wherein the computer housing 1102 houses a motherboard 1104 which contains a CPU 1106 and memory 1108. The computer 1100 also includes plural input devices, e.g., a keyboard 1122 and mouse 1124, and a display card 1110 for controlling monitor 1120. In addition, the computer system 1100 further includes a floppy disk drive 1114 and other removable media devices (e.g., compact disc 1119, tape, and removable magneto-optical media (not shown)), a hard disk 1112, or other fixed, high density media drives, connected using an appropriate device bus, e.g., a SCSI bus or an Enhanced IDE bus. Although compact disc 1119 is shown in a CD caddy, the compact disc 1119 can be inserted directly into CD-ROM players which do not require caddies. Also connected to the same device bus or another device bus, the computer 1100 may additionally include a compact disc reader/writer 1118 or a compact disc jukebox (not shown). In addition, a printer (not shown) also provides printed lists of image primitives, exposure events, and three-dimensional images.

The system further comprises at least one computer readable media Examples of such computer readable media are compact discs, hard disks, floppy disks, tape, magneto-optical disks, PROMS (EPROMs, EEPROMs, Flash PROMS), DRAM, SRAM, etc. Stored on any one or on a combination of the computer readable media, the present invention includes software for controlling both the hardware of the computer 1100 and for enabling the computer 1100 to interact with a human user. Such software may include, but is not limited to, device drivers, operating systems and user applications, such as software development tools. Such computer readable media further includes the computer program product of the present invention for implementing a system and related method for primitive reprojection-based real-time image generation.

Figure 12:
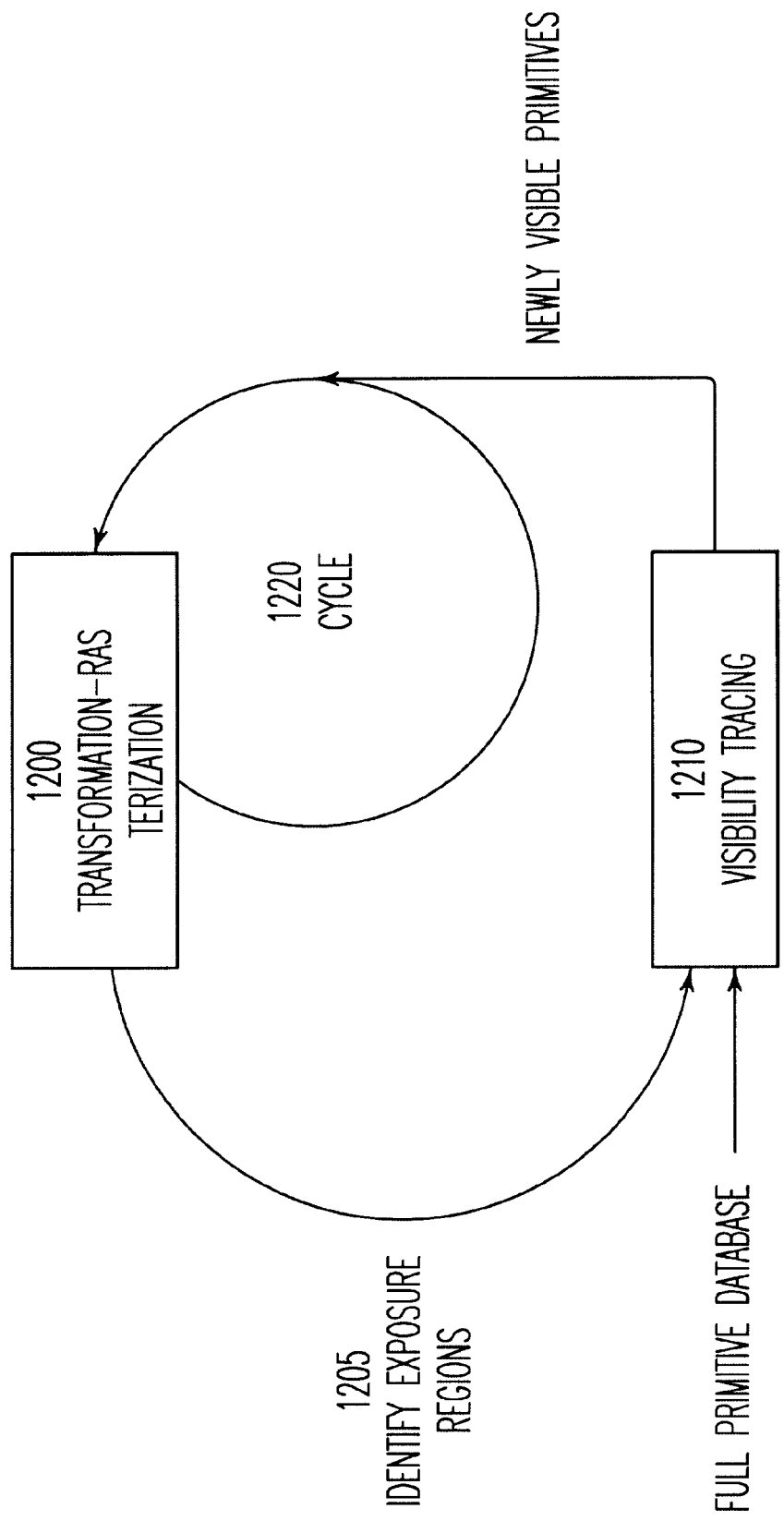
FIG. 12 is a flow diagram of a primitive reprojection cycle for the uniprocessor of FIG. 11.

FIG. 12 shows the primitive reprojection cycle for the uniprocessor of FIG. 11, and the depicted cycle includes a transformation/rasterization step 1200, a step 1205 in which regions of the image containing potentially newly exposed primitives are identified, and a visibility tracing step 1210. In the visibility tracing step 1210 a depth prioritized search is conducted for newly visible primitives in the exposure regions identified by step 1205. The present method of reprojective image generation employs convex primitives as the reprojected elements instead of point samples. The reprojected primitives undergo conventional rasterization which eliminates expansion type holes. Exposure regions are detected as actual holes, occlusion transition regions in the depth buffer, or specific view volume incursion regions produced by view frustrum transformation. Occlusion transition regions are defined as regions of a temporally double buffered depth buffer in which samples from the current frame originate from rasterization of a more distant primitive belonging to a different convex object than the corresponding samples from a previous frame. The method exploits the limited self-occlusion properties of convex objects to greatly reduce the size of occlusion transition regions by limiting such regions to transitions between different convex objects. Visibility tracing is employed in these regions not to generate all newly exposed samples but to identify newly visible primitives. Various methods of visibility tracing other than ray casting can be employed. As defined by Glassner in Principles of Digital Image Synthesis, visibility tracing is a general form of ray tracing in which cones, beams, rays, pencils or other structures may be employed in place of rays. In the present method ray casting (tracing of viewpoint to image rays) and approximate beam tracing (described later in this specification) both using a spatially subdivided database are employed as a demand-driven, depth-prioritized, database search for the newly exposed primitives. The primitives so identified by step 1210 are added to the display list and are effectively injected into the cycle of step 1220.

In another step performed in conjunction with rasterization, 1200, the method identifies completely occluded primitives by reading the depth buffer after all the reprojected primitives have been reprojected and removing primitives from the reprojection list that have no exposed samples in the depth buffer. In this way the display list is limited to only those primitives that are actually visible in the image. The cycle shown as 1220 indicates that the primitives in the display list are repeatedly transformed and rasterized until they become invisible because of occlusion or they fail to reproject into the viewport.

In FIG. 12 the steps 1200 and cycle 1220 represent the conventional object-order rasterization pipeline in which every primitive of the database is, in principle, processed for every frame. No occluded or "off screen" primitives are removed from the display list(s). For the present invention the step 1200 and the cycle 1220 are performed only for primitives known to be visible in a previous frame of an image sequence plus those that become newly visible during the current frame. By effectively limiting transformation and rasterization to visible primitives, the cost of these processes are substantially reduced. By rasterizing only visible primitives and employing a demand-driven, front-to back search method in specific exposure regions, the performance of the present method is less dependant on database size or scene depth complexity than conventional object order transformation-rasterization pipelines.

Figure 13A:
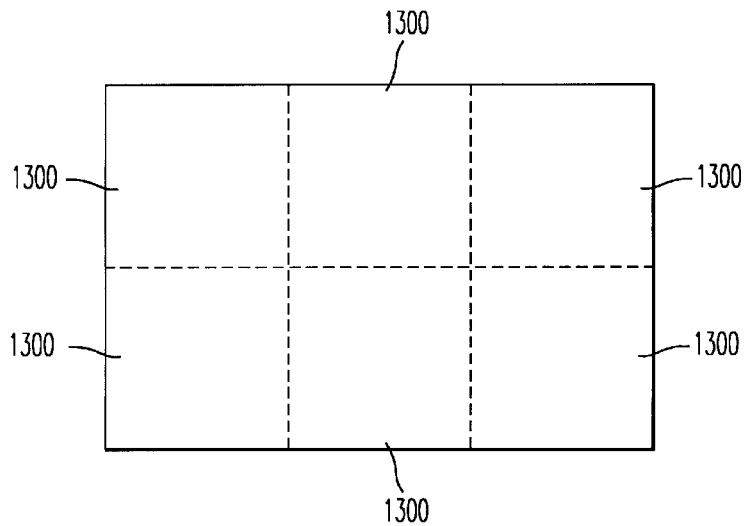
FIG. 13A is view of an image that has been divided into sub-images, each sub-image being handled by one of the sub-image processors.
Figure 13B:
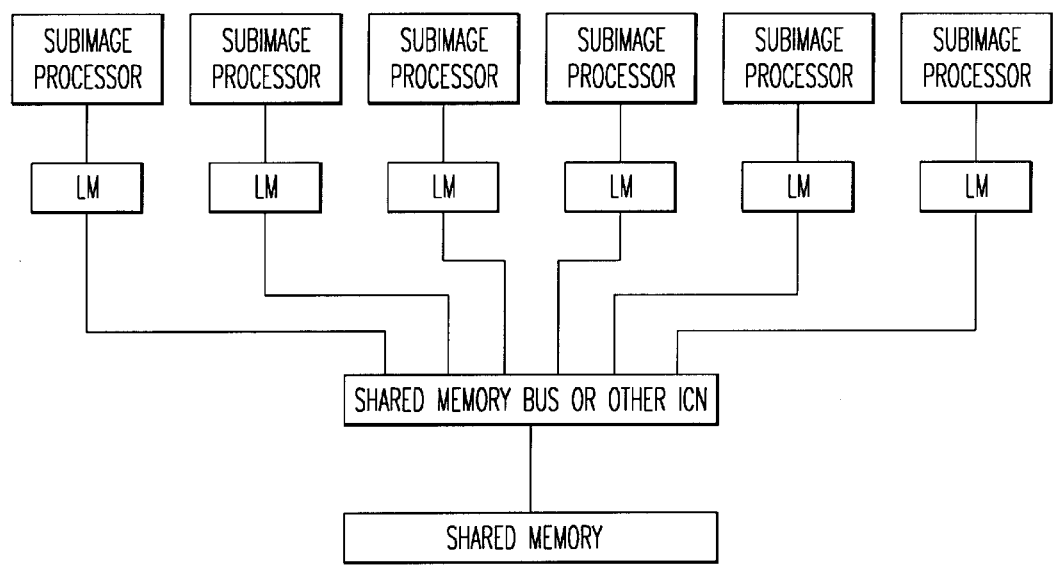
FIG. 13B is a schematic illustration of a multi-processor computer system for implementing a system and related method according to the present invention based on the partitioning of FIG. 13A.

The current specification describes a number of efficient image-parallel multiprocessor implementations of the method which exploit temporal image coherence to actively produce a temporal locality of data reference that results in efficient performance for cached and or NUMA architectures. FIG. 13B illustrates a shared memory multiprocessor implementation in which the interconnection network may be bus or crossbar switch based. Shared memory may be centralized UMA or distributed NUMA. In the preferred embodiment the memory interconnect (ICN) is a scalable crossbar based interconnection fabric employing a scalable, directory-based cache coherency protocol such as Scalable Coherent Interface (SCI). In this implementation each subimage processor is assigned to generate the image information for one or more subimages shown as 1300 in FIG. 13A.

Figure 14:
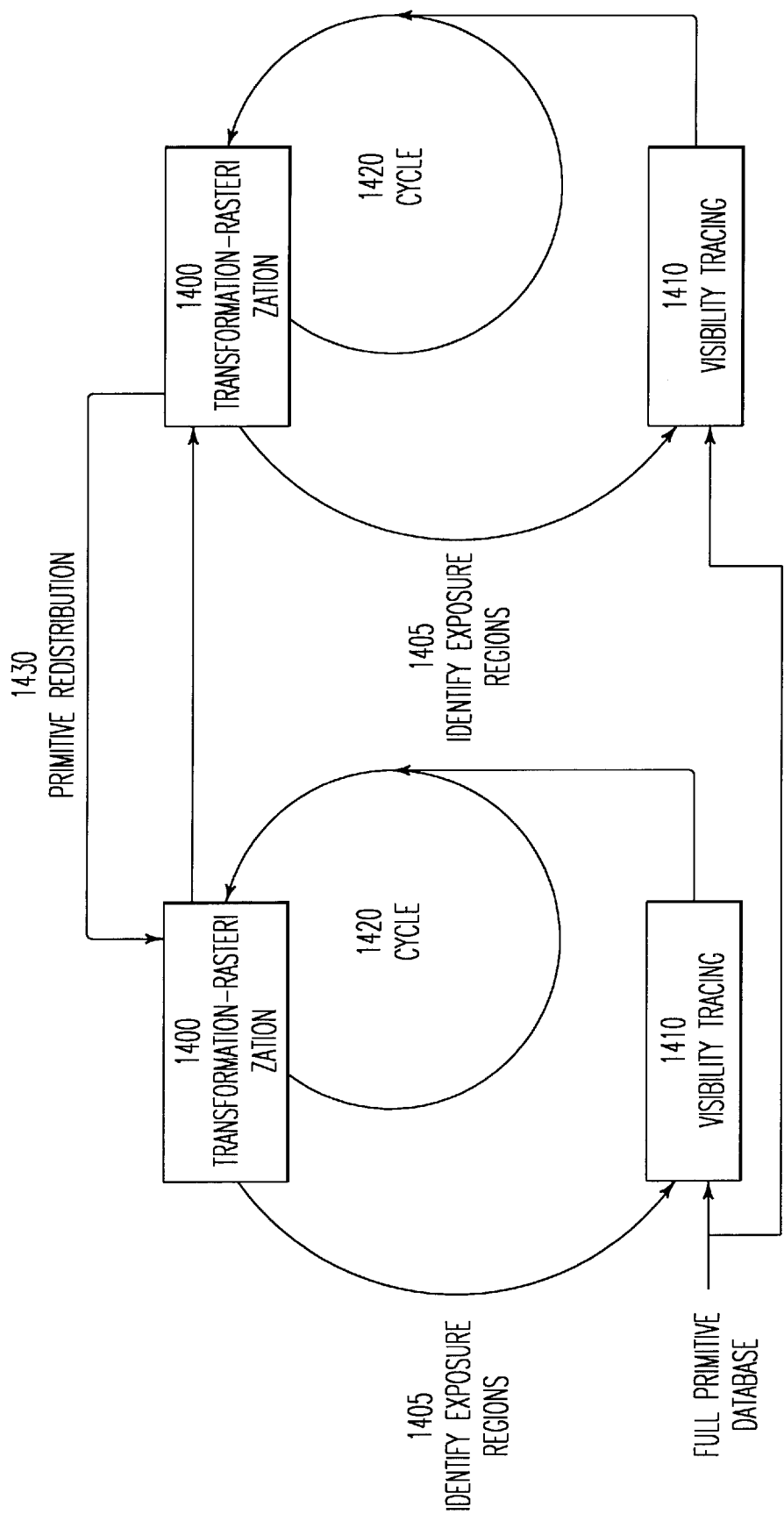
FIG. 14 is a flow diagram for parallel primitive reprojection cycles for the multi-processor of FIG. 13B.

FIG. 14 is a schematic representation of the primitive reprojection cycle in such a parallel implementation. In addition to the transformation-rasterization steps 1400, identification of exposure regions in step 1405, and visibility tracing steps 1410, there is a reprojective redistribution process 1430 in which visible primitives on local subimage display lists undergo reprojective redistribution between subimage processors. Redistribution between subimage processors is determined by classifying each primitive with respect to its originating and neighboring subimages using known viewport clipping methods. An efficient method of classifying primitives based on an incremental version of primitive clipping will be presented later in this specification.

Figure 15:
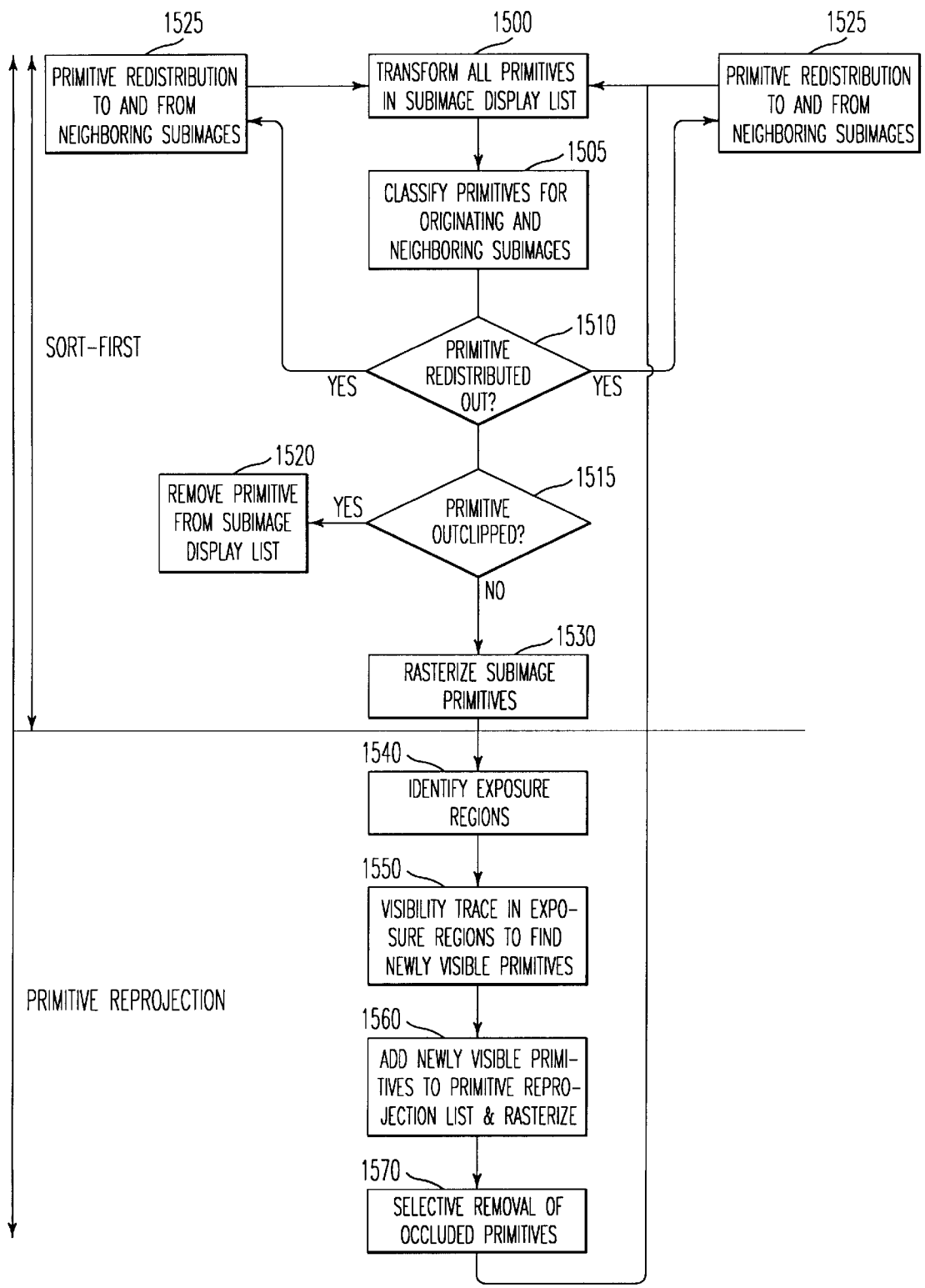
FIG. 15 is an alternate representation of a flow diagram of the primitive reprojection cycle for the multi-processor of FIG. 13B.

FIG. 15 illustrates a more detailed flowchart for the parallel implementation of the primitive reprojection cycle schematically illustrated in FIG. 14. This flow chart illustrates the complete process as executed by a single subimage processor with reprojective redistribution 1525 to and from other subimage processors.

Specifically, FIG. 15 shows a complete primitive reprojection cycle and starts at the transformation step 1500 in which each primitive on the local display list is transformed using the concatenated transformation matrix describing object and camera motion. Control then proceeds to step 1505 which classifies to which sub-images each primitive belongs. Using this classification step 1510 determines if the primitive needs to be redistributed to other processors rendering other subimages. If check of step 1510 determines redistribution is needed, control passes to step 1525 which copies the corresponding primitive to other processors rendering subimages. (Step 1525 is depicted as being on both sides of step 1500 in order to signify that the primitive can be passed in any direction.) Whether the primitive is redistributed or not it is passed to step 1515 which also employs the classification of step 1505 to determine if the primitive is outclipped from the current subimage, and if so, control passes to step 1520 which removes the primitive from the display list of this processor. If step 1515 determines that a particular primitive is not outclipped, control passes to step 1530 which rasterizes the primitive into the depth buffer for the subimage. When all primitives in the subimage display list have been rasterized control passes to step 1540 which locates all exposure regions left in the depth buffer by the reprojection of primitives and the motion of the view frustrum. Once these exposure regions have been located control proceeds to step 1550 which performs visibility tracing in the exposure regions located in step 1540 to identify newly visible primitives. Afterwards, step 1560 adds the newly visible primitives to the local primitive reprojection list and rasterizes the newly visible primitives. The rasterization of step 1560 produces image information for the newly exposed primitives. The synthesis of the subimage data is complete on termination of step 1560 and the subimage image information can be displayed any time after step 1560. Finally, in step 1570, occluded primitives are removed from the local display list. In the present method occluded primitives are determined by a read of the depth buffer following rasterization of all previously visible primitives to identify those primitives with samples in non-occluded levels of an augmented depth buffer.

Having described the method of primitive reprojection and its image-parallel implementation in general terms and in broad overview, the remainder of this specification further describes the specific details of the component processes of the method. In addition, further implementation details will become clear from a detailed presentation of the preferred and other example embodiments. Specification for a client-server implementation of the method employing a technique of visibility event encoding will also be presented together with important techniques for, and ramifications of the visibility event codec.

We begin the detailed description of component processes with step 1540 of FIG. 15, identification of exposure regions. This is a logical beginning for a detailed description of the method because the steps prior to step 1540 essentially describe a sort-first architecture as defined by Molnar et al. The extended lines along the left-hand side of the figure as well as the line dividing step 1530 and 1540 indicate the subset of steps that are similar to a sort-first method. Prior to the identification of exposure regions the primitives are transformed, rasterized and redistributed in the fashion of a sort-first architecture. One difference between the current method and sort-first methods prior to step 1540 is step 1520 in which primitives that outclip the subimage are definitely removed from the subimage display list. While this may occur in a sort-first architecture it is not always possible to remove primitives that outclip a subimage from the subimage display list. This is because the sort-first method is a strictly object-order depth comparison rasterization pipeline in which all primitives in the database must, in principle, at least undergo classification/clipping with respect to the viewport. For the sort first method even primitives that outclip the entire view volume must remain on the local display list of at least one subimage processor in order to be properly displayed at a later time. The distribution of such "off-screen" primitives among subimage processors is known to be a difficult and as yet unsolved problem for sort-first architectures.

In contrast to existing sort-first methods which, in principle, transform all primitives in the database; the present method transforms and rasterizes only previously visible primitives in a first part of the process in order to identify the newly visible primitives in a second part of the process. The transformation of only those previously visible primitives in the first part of the process includes a perspective projection of the primitives which effects a reprojection of these previously visible elements and makes the present method a reprojective one.

In the present method the visibility relationships among previously visible primitives are resolved using conventional depth-comparison rasterization with primitive redistribution in a manner very similar to sort-first image generation. In contrast to the sort-first architecture, however the visibility of newly exposed primitives is explicitly computed using a depth prioritized, demand driven, data-access search of an existing database. This allows both outclipped and occluded primitives to be removed from local display lists because their later reappearance is insured by the depth-prioritized visibility search process. This visibility search process is performed only in specific exposure regions in the image buffer located by step 1540.

The present method distinguishes between two different types of exposure regions: emergence regions, and view volume incursion regions. Emergence regions are produced when an object undergoes image-space motion in a manner that causes it to produce an exposure trail on the image-plane in which previously occluded elements may emerge into view. View volume incursion regions are regions of the image in which newly visible elements may become exposed by penetrating the view volume as a result of view frustrum motion. Methods of locating emergence regions will be described first.

The emergence of static objects is limited to identifiable emergence regions produced by occlusion-exposure transitions of static or moving objects. The emergence of moving objects is not limited to identifiable regions and, in fact, can occur anywhere in the image. For this reason the emergence regions are used only to identify the potential location of newly exposed static objects. In a later section of this specification techniques for determining the visibility of moving objects during primitive reprojection are described.

In existing methods of sample reprojection all emergence regions are represented by "holes" in the reprojected image. Because primitives, unlike samples, are extended in image space, emergence regions may not be represented by holes in the reprojected image. This occurs because primitives may create an exposure trail that includes a more distant primitive(s) that was partially occluded in an earlier frame. If the actual emergence region is comprised of primitives that were partially visible in an earlier frame then the subsequent rasterization of the partially occluded primitives may partially or completely fill the buffer in the region where the "reprojection hole" would be. Therefore for primitive reprojection, emergence regions are identified using a temporally double buffered sample depth buffer to locate occlusion-exposure transitions that develop between frames.

Figure 16:
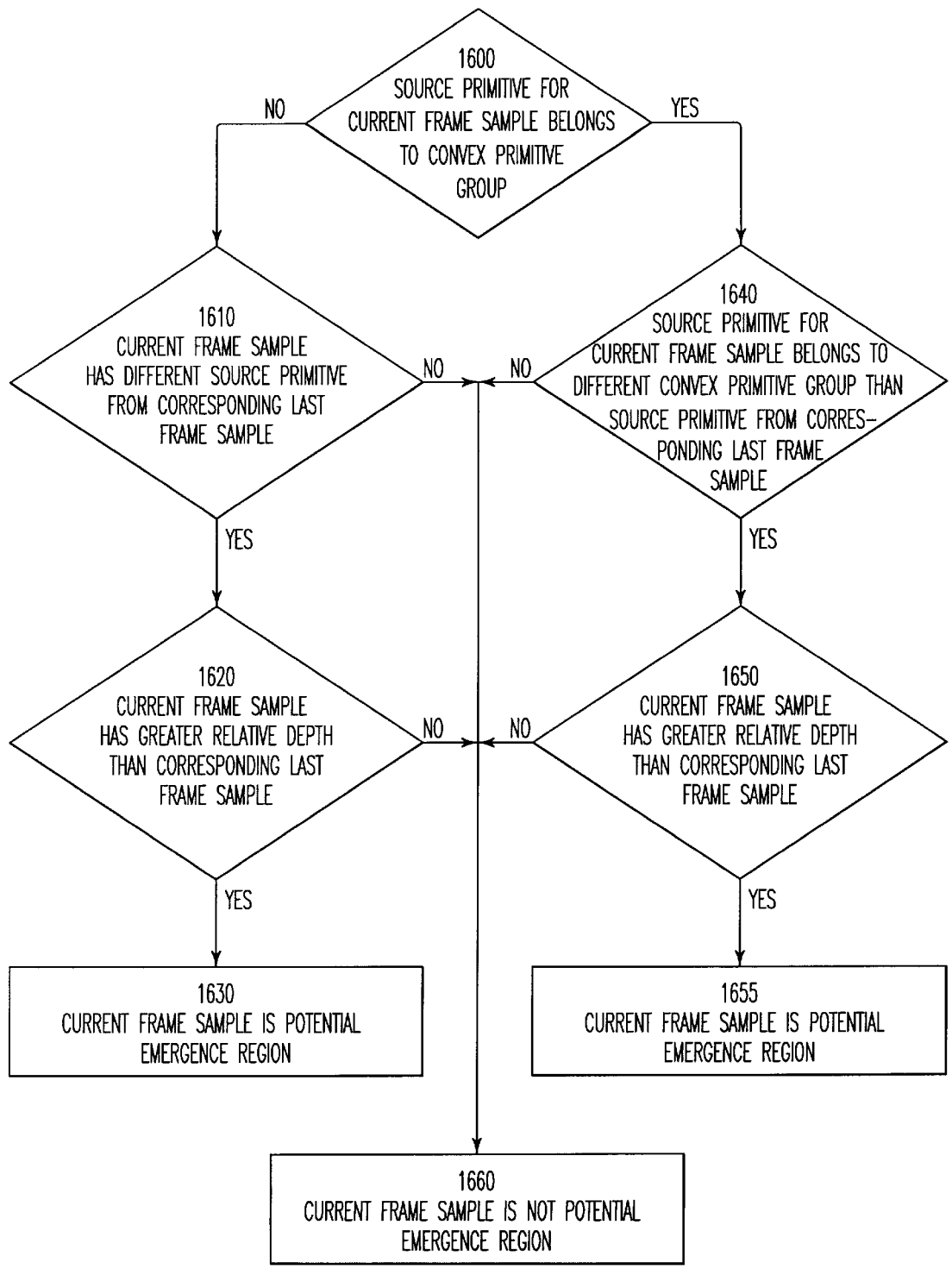
FIG. 16 is a flowchart showing additional detail on the general method of identifying potential exposure regions during primitive reprojection.

FIG. 16 illustrates the process of locating emergence regions for primitive reprojection. In this process the state of the current image is compared to the state of the previous image using a temporally double-buffered image depth buffer in which the source primitive for each image sample is recorded along with the depth information. This comparison is performed by a read operation of the depth buffer that is conducted after all primitives in the current display list have been rasterized into the current-frame level of the double buffered depth buffer (i.e., after step 1530 of FIG. 15). In step 1600 the source primitive for the current flame sample is examined for membership in a group of primitives that together comprise a substantially convex surface in three space. If the source primitive does not belong to such a group then control passes to step 1610. Step 1610 examines the corresponding sample from the representation of the last frame stored in the temporally double buffered depth buffer. If the current frame sample has a different source primitive from the last frame sample control passes to step 1620. Otherwise control passes to step 1660 and the current sample is not considered to be within an emergence region. In step 1620 the relative depth of the current frame sample and the corresponding last-frame sample is determined. If the current frame sample has a greater relative depth than the corresponding last frame sample then control passes to step 1630 and the sample is considered to be within an emergence region. Otherwise control passes to 1660 and the current sample is determined not to be an emergence region. Examining once again step 1600, if the source primitive does belong to a group of primitives that comprise a substantially convex object then control passes to step 1640 for additional processing. In step 1640 it is determined if the source primitive for the current frame sample belongs to a different convex primitive group than the source primitive from the corresponding last-frame sample. If so then control passes to step 1650. If not, it is known that the samples are from the same convex object which cannot occlude itself. In step 1650 the relative depth of the current frame sample is compared to the relative depth of the corresponding last-frame sample. If the current frame sample has a greater relative depth than the last frame sample then control passes to step 1655 in which the current frame sample is considered to be an emergence region. Otherwise control passes to step 1660 where the current frame sample is determined not to be an emergence region.

This process of identifying emergence regions for primitive reprojection exploits a special type of visibility coherence exhibited by convex objects. Because forward facing primitives of convex objects do not self occlude, exposure regions are not generated by primitive transitions in the sample buffer if the primitives belong to the same convex object. By preprocessing objects into substantially convex groups of primitives and storing the convex primitive group membership identifier with each primitive, the present method exploits the temporal visibility coherence of convex objects to significantly reduce the size of these potential exposure regions and thereby reduce the amount of visibility tracing required. Without convex primitive groups every primitive transition produced in the depth buffer in which the new primitive is relatively more distant is a potential emergence region that would require visibility search. For typical objects represented by triangle meshes this would produce a very large number of false emergence regions as image-space motion of the mesh caused new primitive transitions in the buffer. The preclassification of objects into substantially convex primitive groups is easily accomplished for most objects. Even relatively concave surfaces can often be partitioned into a small number of substantially convex component subsurfaces. An archway, for example, is a concave structure in which the surface primitives can be partitioned into 6 or fewer substantially convex primitive groups. The types of vantage points from which an object may be viewed can be employed as criteria for the division of surfaces into substantially convex primitive groups. So, for example, if an archway is present in a model such that it will never be visible from an edge-on view (e.g., archway is embedded in a wall) then the number of ways in which the object can apparently self occlude is reduced and the number of convex primitive groups required for the object is decreased. Note that the logic of FIG. 16 clearly indicates that preclassification of surfaces into substantially convex groups of primitives is not necessary in all cases. Highly concave surfaces or single primitives can be processed without preclassification.

An example embodiment of the temporally double buffered depth buffer used to locate emergence regions is given by the C data structures shown in FIG. 19. Note that the object_class fields and "moving_or_not fields" as well as the multilevel structure of the buffer is employed by an extension of the method that uses object classification based on dynamic occlusive properties. Details of this object classification technique are presented in a later part of this specification. Note that the sample_buffer_sample data structure includes not only the current z value but a reference to the source primitive for the sample. Note also that the depth buffer is temporally double-buffered with the A and B substructures representing consecutive, alternating A and B frames of the image sequence. The present method computes visibility incrementally in the temporal domain in part by comparing the contents of frame A to that of frame B. As previously discussed emergence regions, for example, are detected by comparing the contents of frame A with frame B and identifying occlusion-nonocclusion transitions. In addition this temporal double buffering facilitates the computation of accurate exposure regions by a method of temporal supersampling described later in this specification.

This type of temporal double buffering is distinct from the typical double buffering employed by image generation systems to allow the completed frame to be displayed while the next frame is being rendered. In the present method, data from the completed frame is actively employed in the computation of the subsequent frame. As a result data from the completed frame must be made available to the renderer during display of the frame. This can be achieved by a read-write of the visible image information to a separate display frame buffer or by employing simultaneous access to both rendering and display through dual-ported memory.

In addition to emergence regions, view volume incursion regions are the other exposure regions that are located during execution of step 1540 in FIG. 15. In existing methods of reprojective image synthesis it is generally assumed that all newly visible surfaces belonging to static objects will become exposed in holes created by reprojecting samples from the previous frame. The sources of these reprojection holes include both perspective expansion between samples and emergence of previously occluded surfaces. In addition, motion of the viewpoint or view direction vector produces reprojection holes near the edges of the viewport where surfaces previously outside the field-of-view do not reproject. For known methods of sample reprojection, all newly visible surfaces are identified by ray tracing or ray casting within these reprojection holes.

Unfortunately this approach fails to identify certain surfaces that become newly exposed when they penetrate the view volume. The failure results because newly penetrating surfaces may fail to project to the previously described "viewport edge" reprojection hole regions and are therefore not identified by ray tracing—ray casting visibility search. Surfaces that newly penetrate the view volume will fail to be contained within the "viewport edge" holes when their image plane velocity exceeds the rate of growth of the viewport edge hole. In such a case the newly visible surface will not be confined to the viewport edge hole. This will occur, for example, in the case of lateral viewpoint motion if the newly penetrating surface is substantially closer to the viewpoint than the previously visible surfaces at the corresponding edge of the viewport. This situation is illustrated in FIG. 50. The figure illustrates two consecutive view frustrums displaced in the x dimension. In the figure object F is a far object and N is a near object relative to the viewpoint. Object N is not within the viewport for the view frustrum corresponding to frame 1. In frame 2 object N should become exposed. Unfortunately the reprojected samples from object F undergo only a very small leftward (positive Xi, or image-space X) motion on the image plane between flame 1 and frame 2 because of their great distance from the image plane. The magnitude of the velocity of optical flow of image elements under this situation is:

$$dXi/dX = abs|D/Z|$$

Where D is the viewpoint to viewplane distance, Xi is image-space X, X is object space X, and Z is object-space Z. This causes the penetration of the nearer object (lower z value) to exceed the growth of the viewport edge hole produced by optical flow of the more distant object (greater Z value). In this figure the position of object F and object N are shown in viewport 2. In this viewport the object F is shown as it would appear if its samples are transformed from the previous frame representation in the method of sample reprojection. The small space between the location of the reprojected samples of object F and the right-hand edge of the viewport is the viewport edge reprojection hole left by the movement of samples leftward on the image plane. In known methods of reprojection this is the only region in which ray tracing would be performed to identify samples from newly penetrating objects. In viewport 2 the object N is shown as it actually should appear based on its true incursion into the view volume caused by viewpoint motion. The optical flow of the more distant object produces only a very small viewport edge reprojection hole along the right viewport border which is insufficient in size to contain the nearer object N. The fact that object N penetrates the view volume into regions outside of the viewport edge hole means that ray casting within the viewport edge hole would fail to completely identify all of the newly exposed elements (samples or primitives) of object N.

The previously described situation is just one example in which reprojected elements (samples or primitives) that become newly exposed as a result of view volume transformation cannot be reliably identified by searching in viewport edge holes. Another example is motion of the viewpoint directly "backwards" along the view direction vector. Once again the growth of the viewport edge region is a function of the optical flow of the exposed elements along the viewport edge in the initial frame. Velocity magnitude for optical flow in this situation is:

$$dXi/dZ = abs|-DX/Z^2|$$

In this case if the exposed elements on the edge of the viewport for the initial frame are very distant the viewport edge hole will grow very slowly and closer penetrating objects will extend into regions beyond the viewport edge reprojection hole.

The aforementioned cases are specific examples of the fact that view volume transformation may introduce newly visible elements that cannot be reliably identified by searching reprojection holes. The present method includes a general technique to exactly identify the regions of a viewport into which newly exposed objects may become visible as a result of viewpoint and or view direction vector motion. These regions are called the view volume incursion regions and are computed by determining the non-union of two consecutive view frustrums. In this technique a difference operation is performed between the current view frustrum and the preceding view frustrum. The current view difference frustrum is determined to be that portion of the current view frustrum that is beyond the view plane and that is not within the previous view frustrum. The projection of this current view difference frustrum onto the current viewport identifies the view volume incursion region. If the typical convention is adopted in which objects are not allowed to penetrate the view volume between the viewpoint and viewport then the view volume incursion region specifies the maximal penetration of static objects into the viewport as a result of view volume transformation.

Figure 20A:
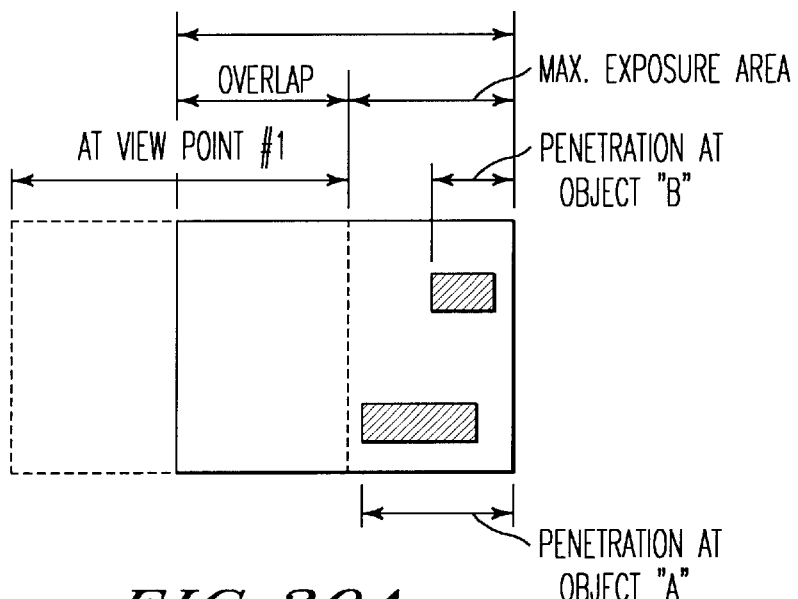
FIGS. 20A and 20B are illustrations showing the viewport exposure region for static objects when viewpoint motion is in one dimension.
Figure 20B:
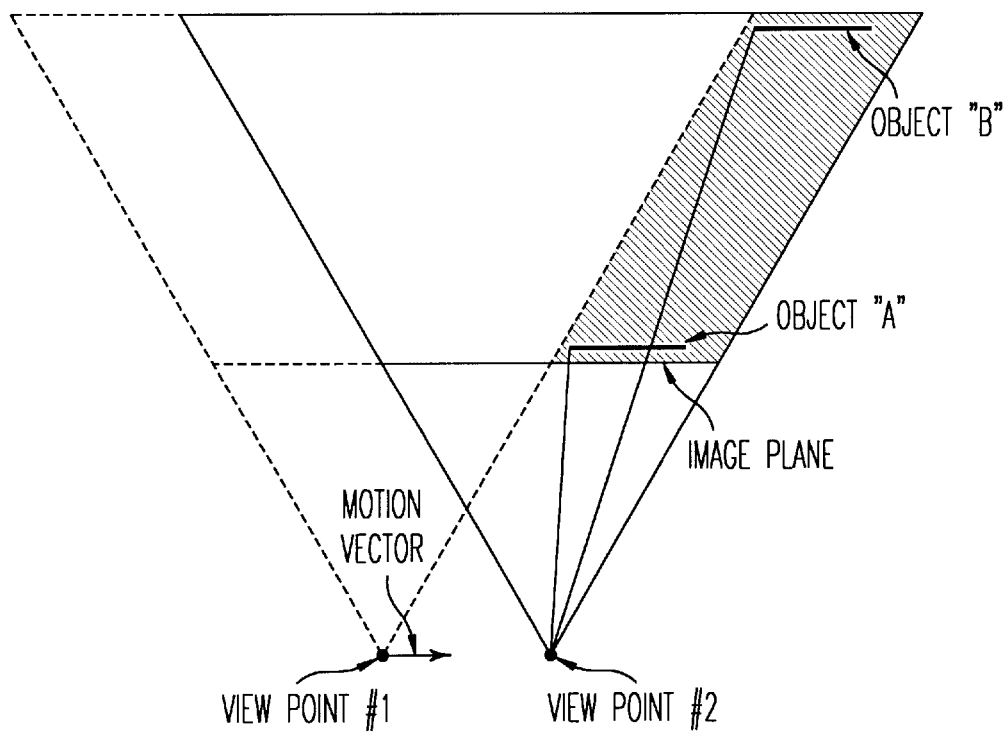
Figure 21:
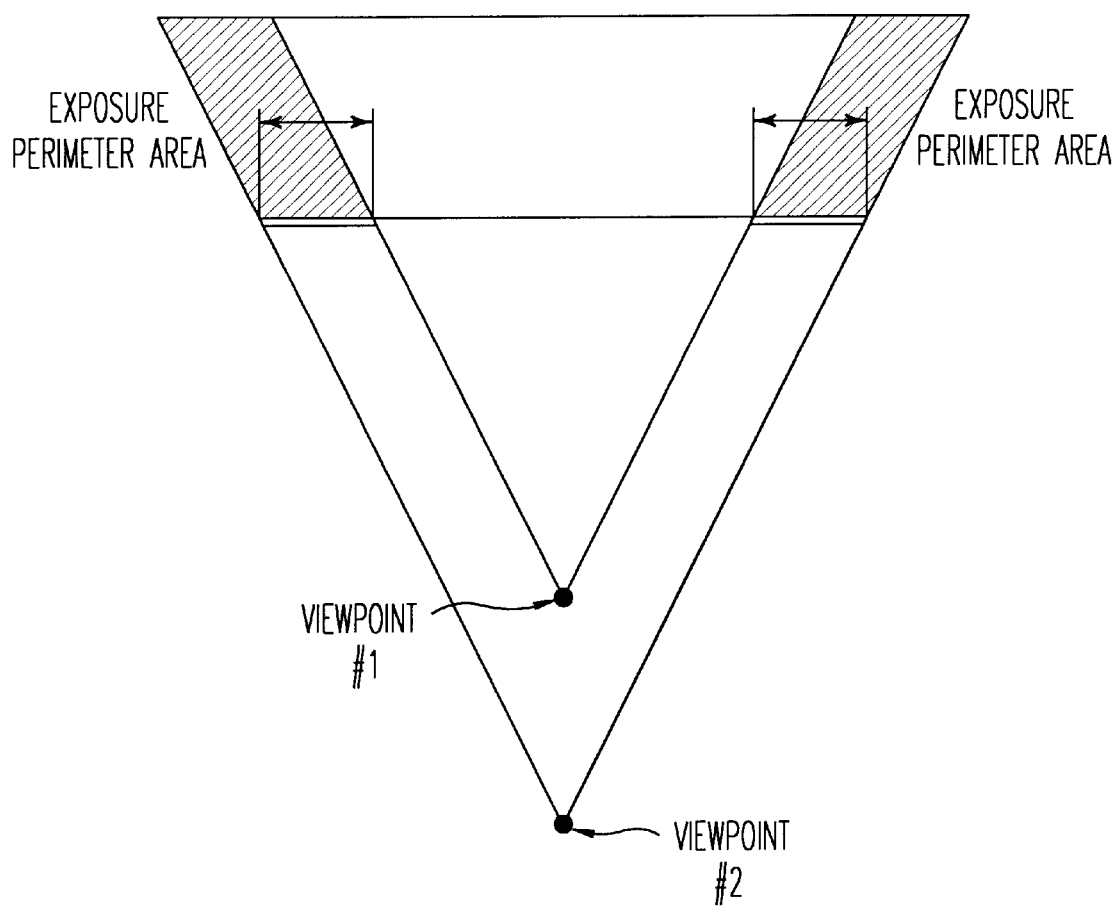
FIG. 21 is a top view showing the viewport exposure region for static objects when viewpoint motion is opposite to the view direction vector.
Figure 22:
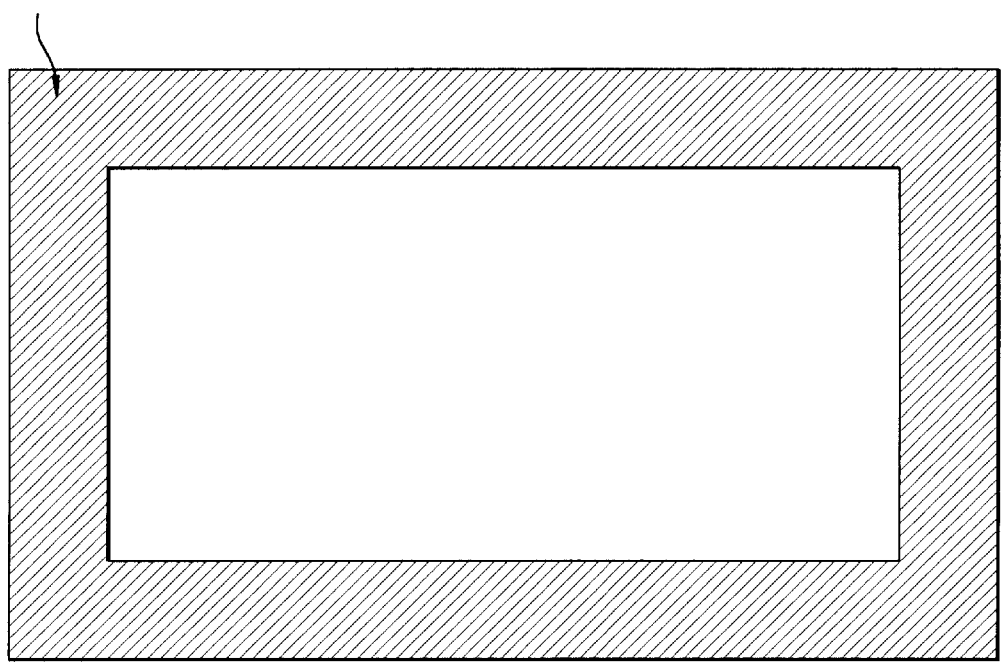
FIG. 22 is the viewport view of the illustration in FIG. 21.
Figure 23:
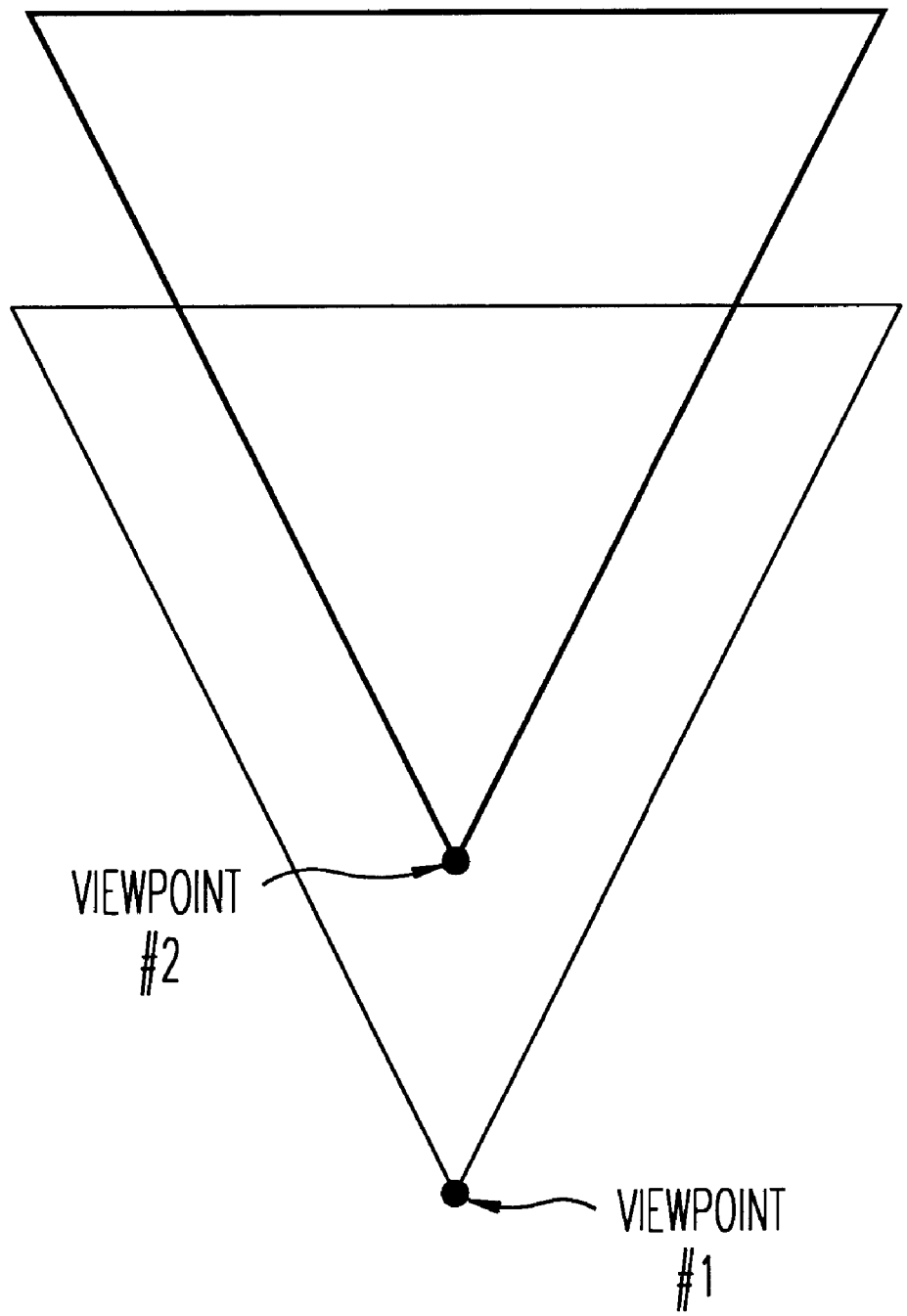
FIG. 23 is a top view showing the viewport exposure region for static objects when viewpoint motion is equal to the view direction vector.

This technique is illustrated in FIG. 20 A and FIG. 20 B for the case of two consecutive view frustrums in which the viewpoint is displaced in one dimension (i.e., lateral motion in the X direction). In this case the current view difference frustrum is shaded. Its projection onto the current viewport defines the view volume incursion region. The object "A" in this figure is very close to the viewplane and its incursion into the view volume is near the maximum incursion defined by the view volume incursion region. A second object "B" is further from the viewplane and undergoes less incursion. Another relatively simple case is illustrated in FIG. 21 for the case of viewpoint motion opposite to view direction vector. In this figure the current view difference frustrum is shaded. The projection of this shaded view volume incursion region onto the current viewport (corresponding to viewpoint 2) is a perimeter of view volume incursion around the entire viewport. This perimeter is shown in FIG. 22. FIG. 23 illustrates the case of viewpoint motion exactly in the view direction. For this common case no view volume incursion region is produced.

Figure 24:
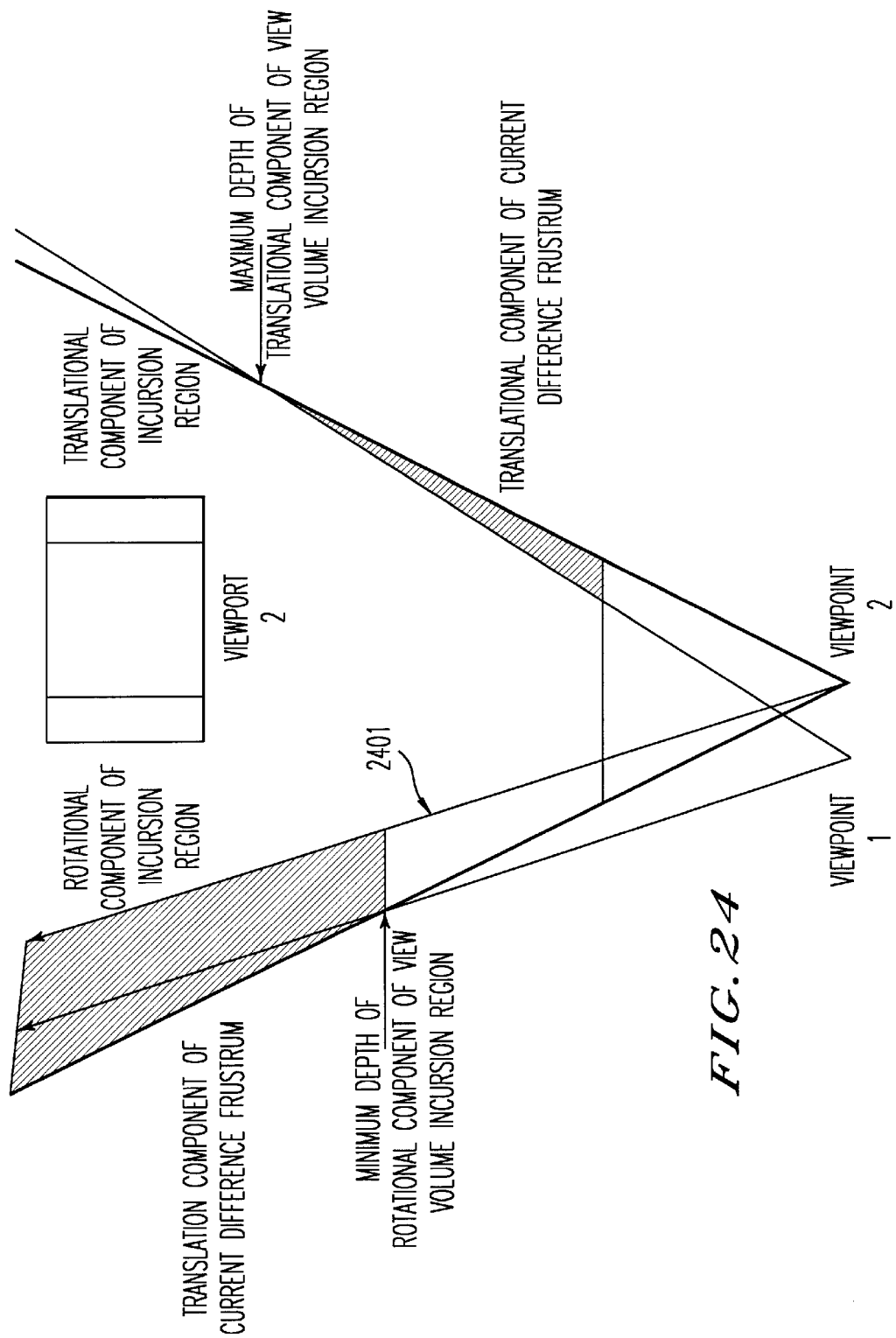
FIGS. 24 and 25 are top views showing the viewport incursion regions resulting from view volume rotation and translation.

The technique can be employed to determine the view volume incursion regions for more complex cases of view frustrum transformation, including rotation and translation in 3 dimensions as well as changes in the viewpoint-viewplane distance which affects the field-of-view. FIG. 24 illustrates a case in which the view frustrum undergoes a small positive rotation about the y (vertical) axis (i.e., toward the "left") and a small positive translation in the x direction (i.e., toward the "right"). In this case a view volume incursion region is created along the right edge of viewport 2 as a result of translation and a second view volume incursion region is created along the left edge of viewport 2 as a result of rotation of the view direction vector. The projection of the translation component of the current view difference frustrum onto the viewport is straightforward. The projection of the left hand rotation component of the view difference frustrum is shown by the dashed arrowed line labeled 2401 emanating from the viewpoint, which represents the projection of this component of the current view difference frustrum at infinity. This particular example illustrates how a rotation of the view frustrum toward the left mitigates the size of the view volume incursion region created by moving the viewpoint to the right. In this case the translation component of the view volume incursion region has a maximum depth indicated in the figure as "maximum depth". In the present method the maximum depth of the view volume incursion region is employed to limit the depth of ray casting within the region. In a similar manner the rotational component of the view volume incursion region on the right side has a minimum depth, labeled in FIG. 24 as "minimum depth". In the present method ray casting is not employed in this region unless the current reprojected elements in the region exceed this minimum depth.

Figure 25:
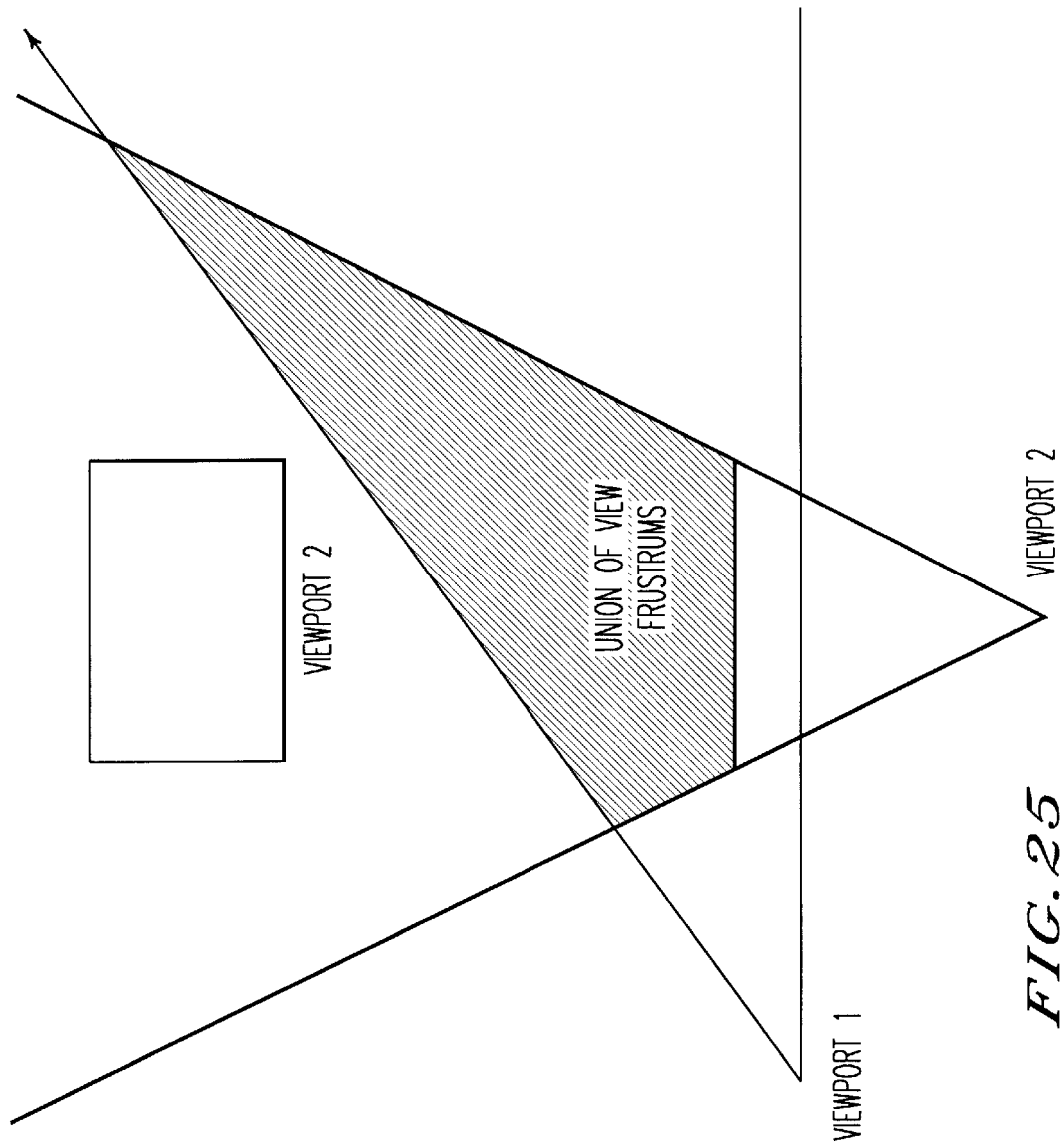

FIG. 25 illustrates a case in which the view direction vector is rotated to the left and the viewpoint is translated to the right and forward. In this case of exaggerated motion between frames the shaded view volume incursion region projects to cover the entire viewport. However if the reprojected elements lie within the union of the two view frustrums, indicated in the shaded region, then ray casting need not be performed to search for incursion elements. In this case the depth value of the minimum extent of the union region can be employed to quickly determine if ray casting is needed to identify incursion elements.

Figure 26:
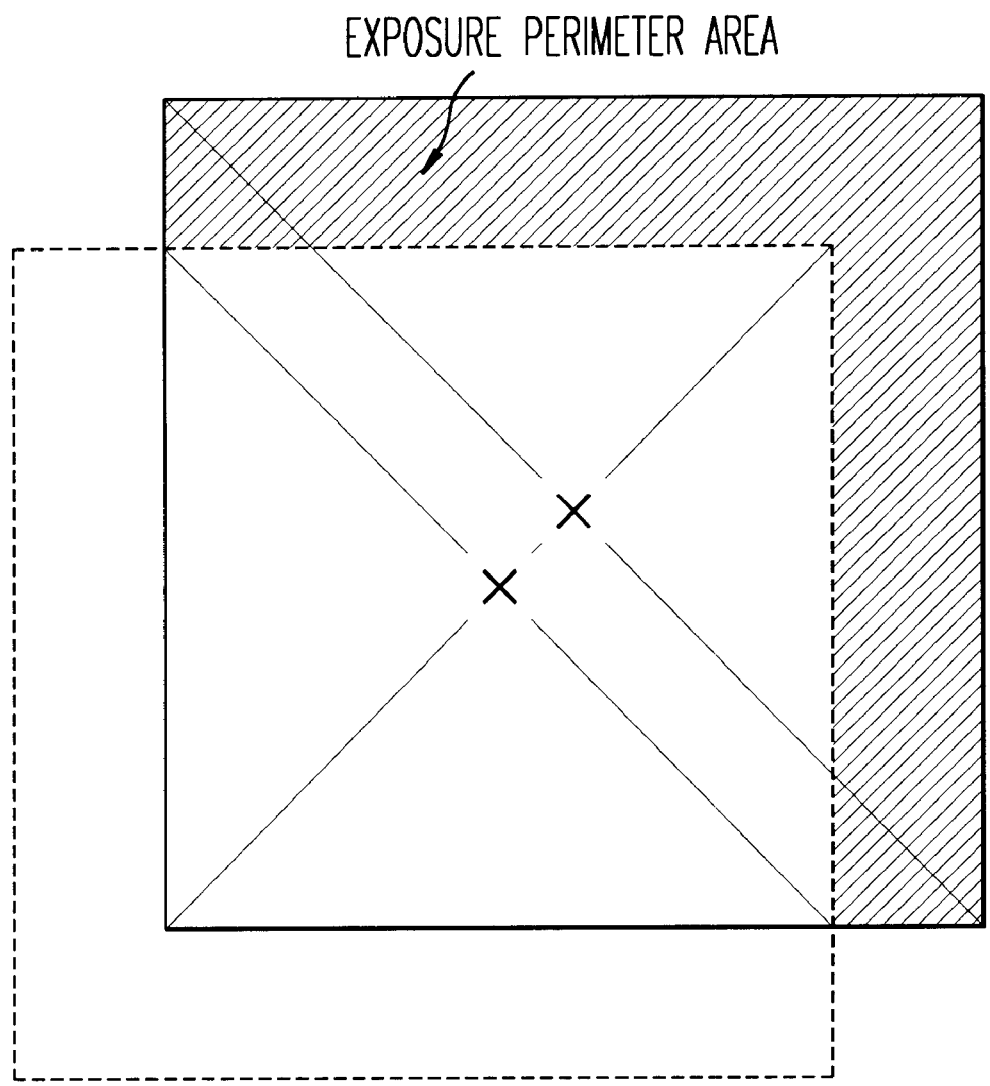
FIG. 26 is an illustration of a viewport exposure perimeter for static objects with viewpoint motion in two dimensions.

In the simple cases presented representing translation in two dimensions and rotation about one axis, computation of the view volume incursion regions is accomplished using simple linear equations and known line clipping methods. In the more complex case of translation in 3 dimensions and rotation in two planes, known methods of view frustrum— plane intersection and clipping techniques are employed. FIG. 26, for example, shows a shaded view volume incursion region caused by viewpoint motion in two directions ("up"+y and to the "right"+x).

The present technique is an exact method of identifying view volume incursion regions and is superior to known methods of identifying view volume incursion elements employed by existing reprojection methods. It generally only needs to be computed once per frame. The resulting view volume incursion region represents the maximum extent of penetration of incursion elements occurring between temporal sampling periods and is guaranteed not to miss incursion elements. For view volume incursion regions caused by viewpoint translation the size of the view volume incursion region can be reduced from the maximally computed size if it is known (or assumed) that incursion elements are not near the viewplane. Additionally the size of the view volume incursion regions can be extended to account for the penetration of moving objects. This technique is described in detail later in this specification. The identification of view volume incursion regions is specified herein in connection with the present method of primitive reprojection but it can also be used to increase the accuracy of sample reprojection and other reprojective methods of image synthesis.

Once exposure regions are located by the previously described processes of step 1540 in FIG. 15, a depth-prioritized search for newly visible elements occurs in these exposure regions. This search process is step 1550 in FIG. 15 and it employs a method of visibility tracing. In the preferred embodiment a specially optimized method of spatial subdivision ray casting is performed as the search method to identify newly visible primitives in exposure regions. Spatial subdivision ray casting is a demand-driven, depth-prioritized, data-access method of visible surface determination in which the cost of the method is determined more by size of image region sampled than by size of primitive database. This relationship is not true for conventional object-order rasterization which, because of its data-driven, data processing character, would be a more expensive method of determining visibility for multiple small exposure regions.

Spatial subdivision ray casting is depth prioritized, and more importantly has intrinsic front-to-back processing order. This is in contrast to conventional unordered depth comparison or back to front depth priority list processing. The ray casting method of visible surface determination exploits the fundamental self-limiting nature of visibility by which the front-to-back processing is terminated when the closest object is identified. It is known that, in contrast to object-order rasterization, the cost of spatial subdivision ray casting becomes independent of the size of the database for large databases (See Fujimoto, Tanaka, Iwata IEEE Computer Graphics and Applications, April 1986, pg 16–20).

The present method of image generation is more scalable in database size and scene depth complexity than conventional rasterization pipelines in large measure because it employs the demand-driven, depth-prioritized technique of spatial subdivision ray casting to identify newly visible primitives.

Figure 1:
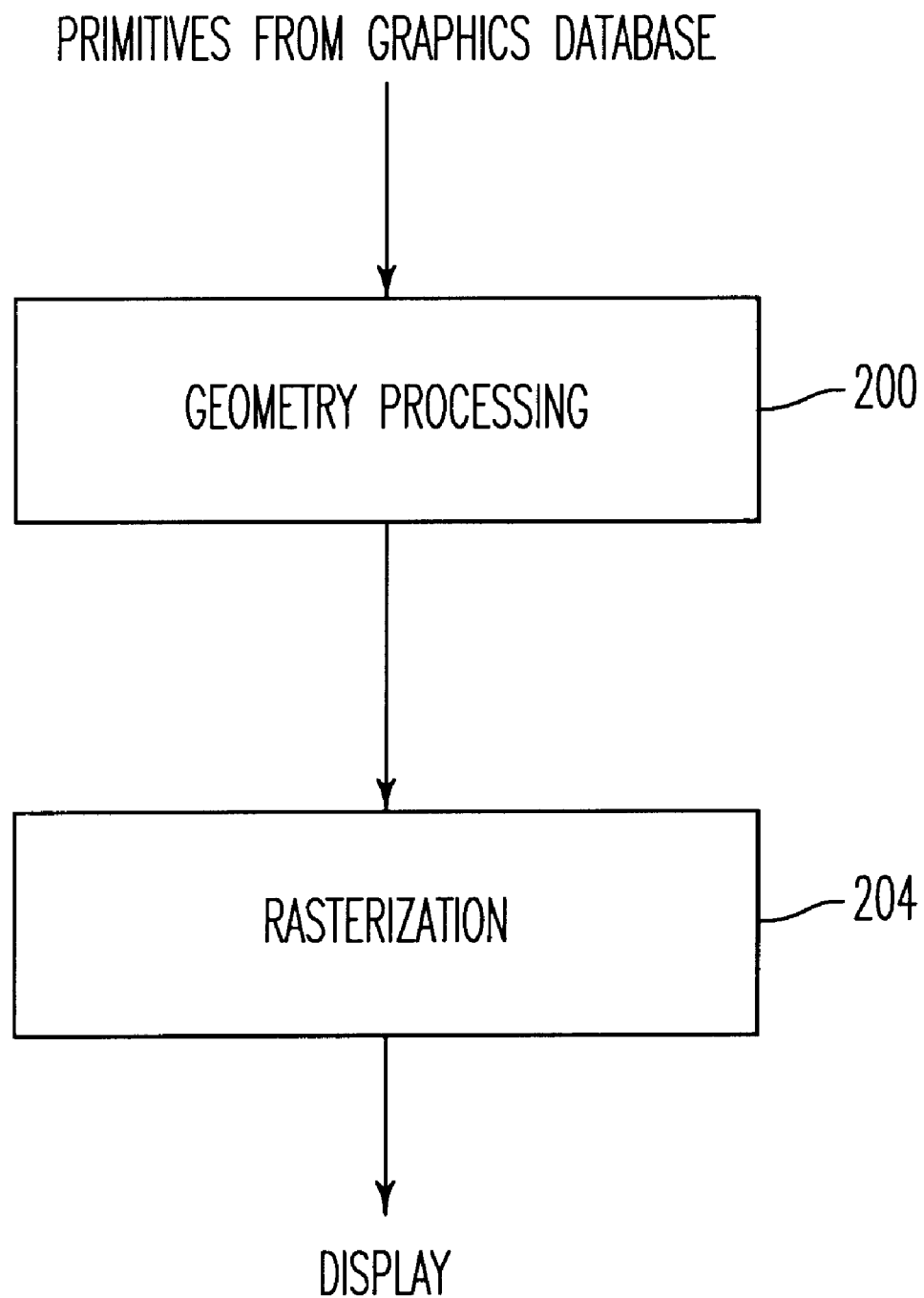
FIG. 1 is a block diagram of a general process for converting image primitives into a rasterized image.
Figure 2:
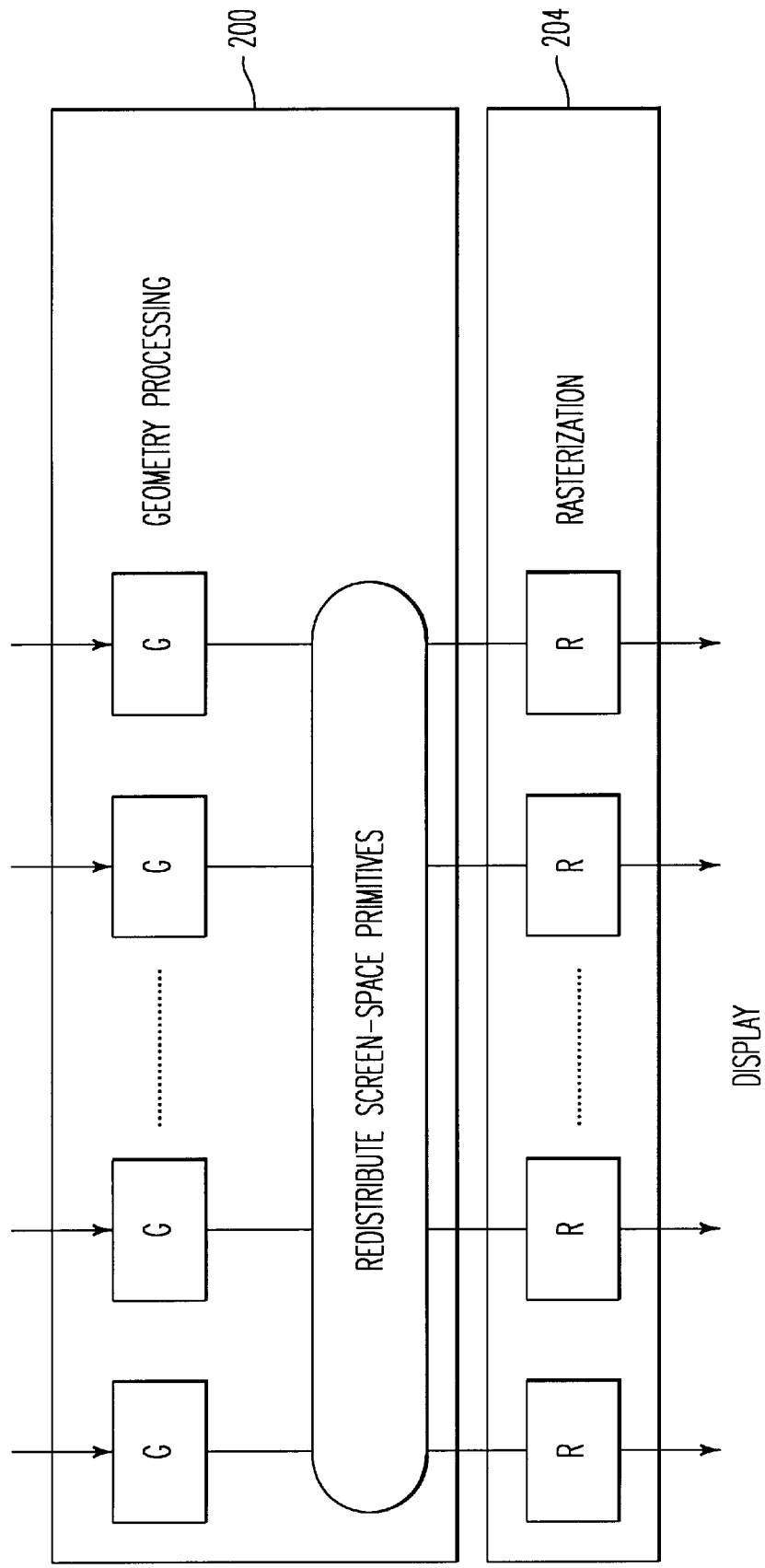
FIG. 2 is a block diagram of parallel implementation of a sort-middle rendering pipeline.
Figure 3:
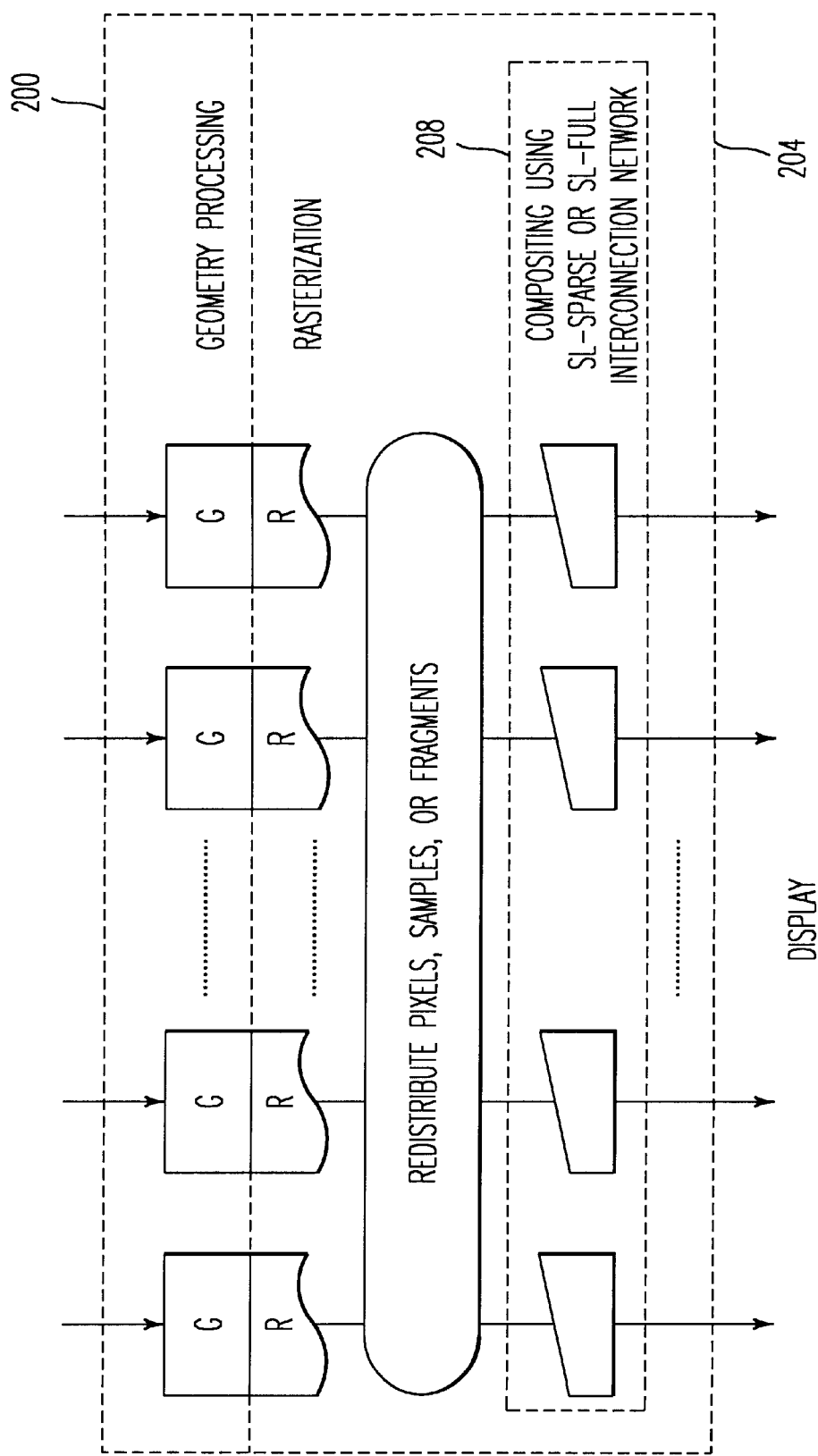
FIG. 3 is a block diagram of parallel implementation of a sort-last rendering pipeline.
Figure 4:
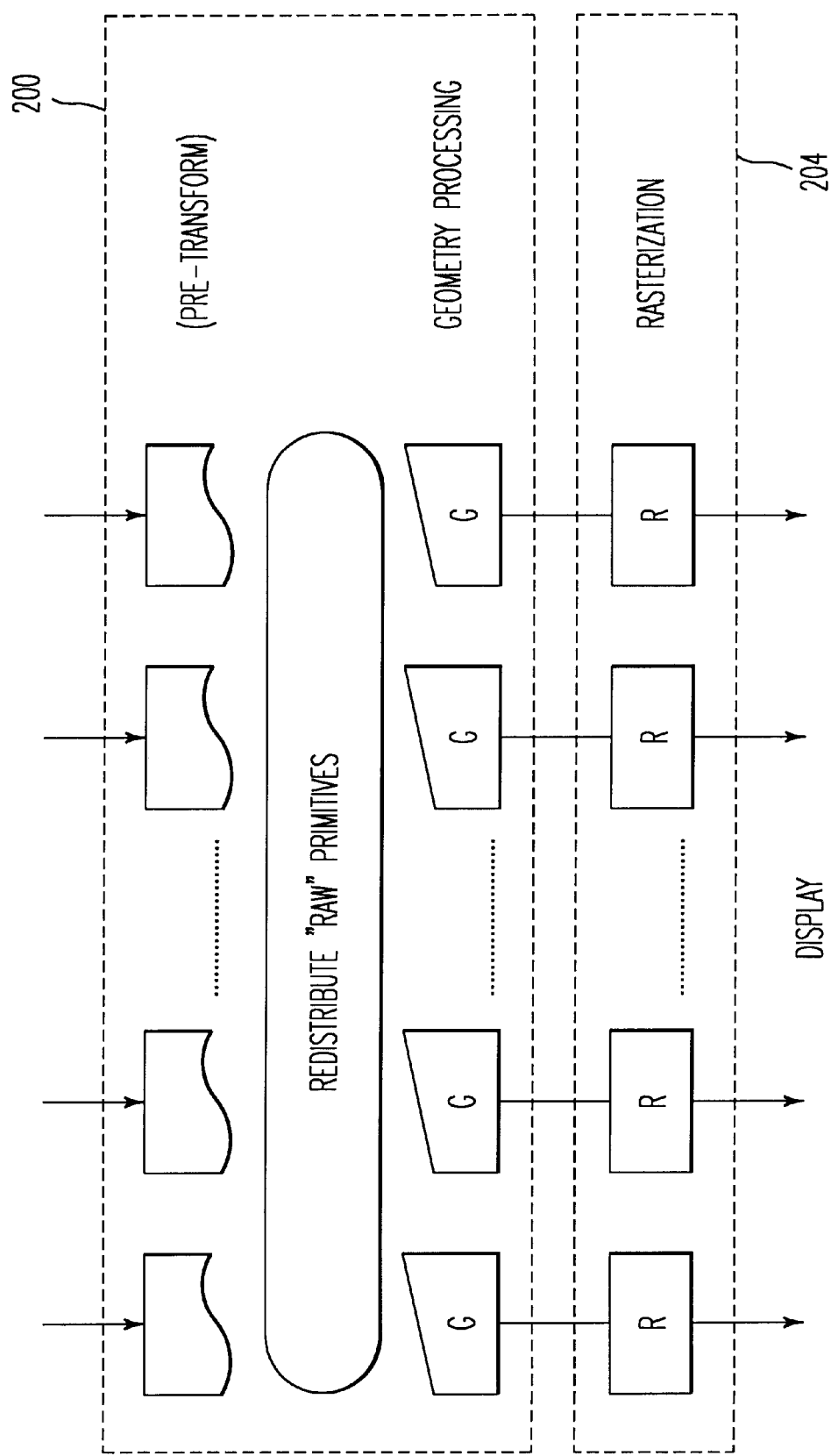
FIG. 4 is a block diagram of parallel implementation of a sort-first rendering pipeline.
Figure 6:
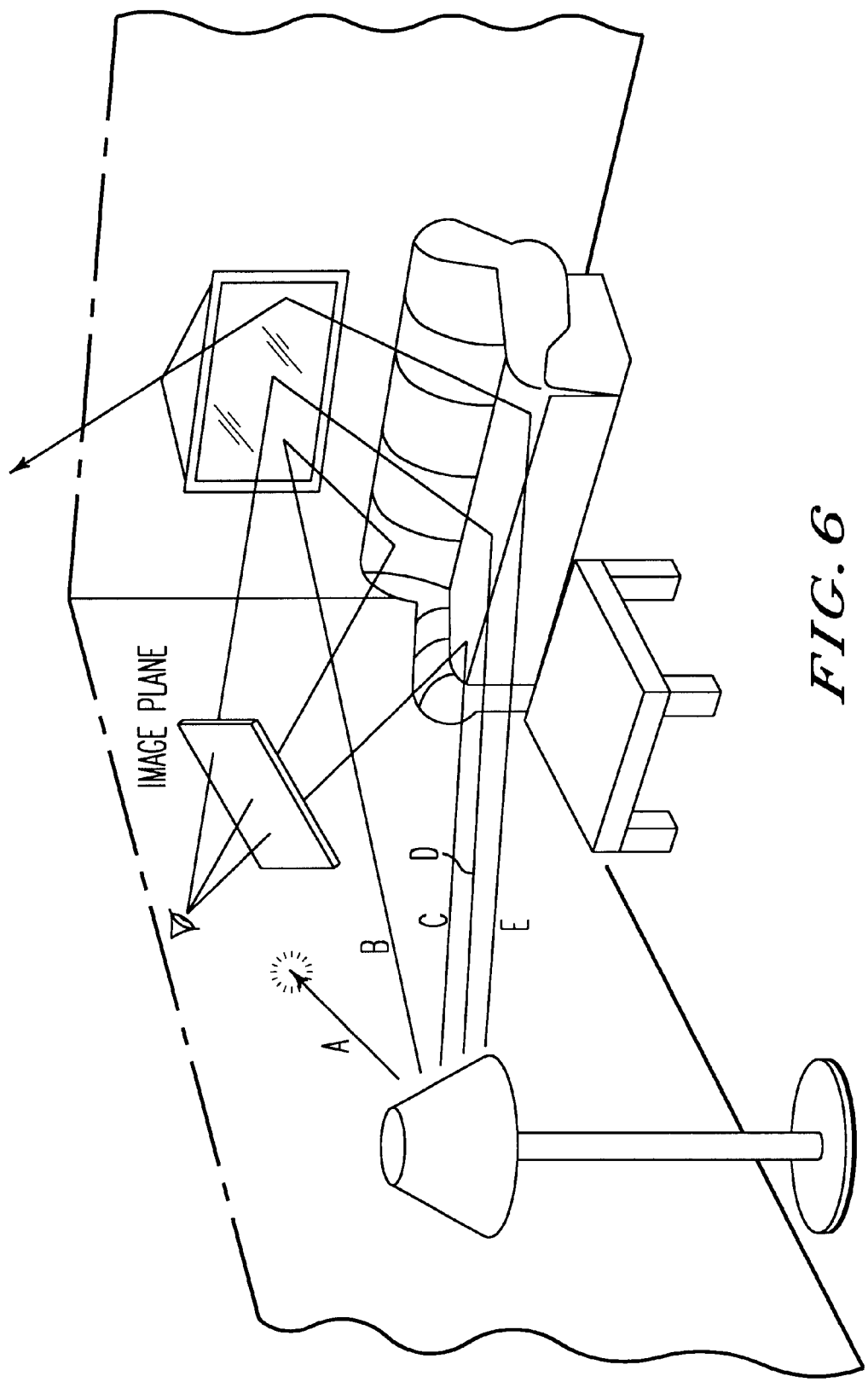
FIG. 6 is an illustration of the use of ray tracing to produce an image viewable from an image plane that includes reflected light.
Figure 8A:
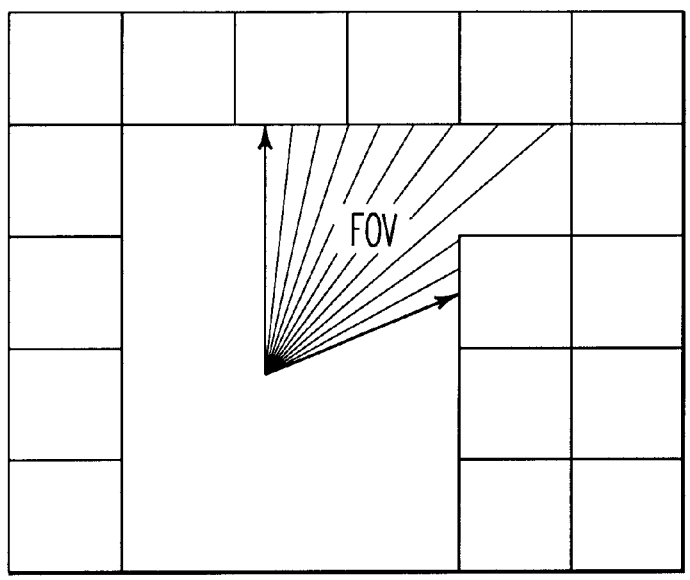
FIG. 8A is an illustration of height-mapped database into which rays are cast from a player's location.
Figure 8B:
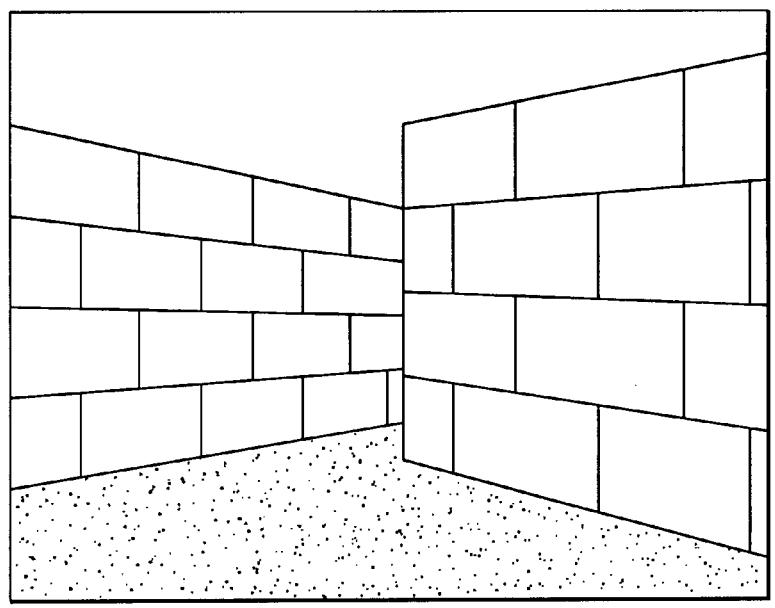
FIG. 8B is an illustration of a resulting three-dimensional textured view of the player based on the rays cast in FIG. 8A.
Figure 9:
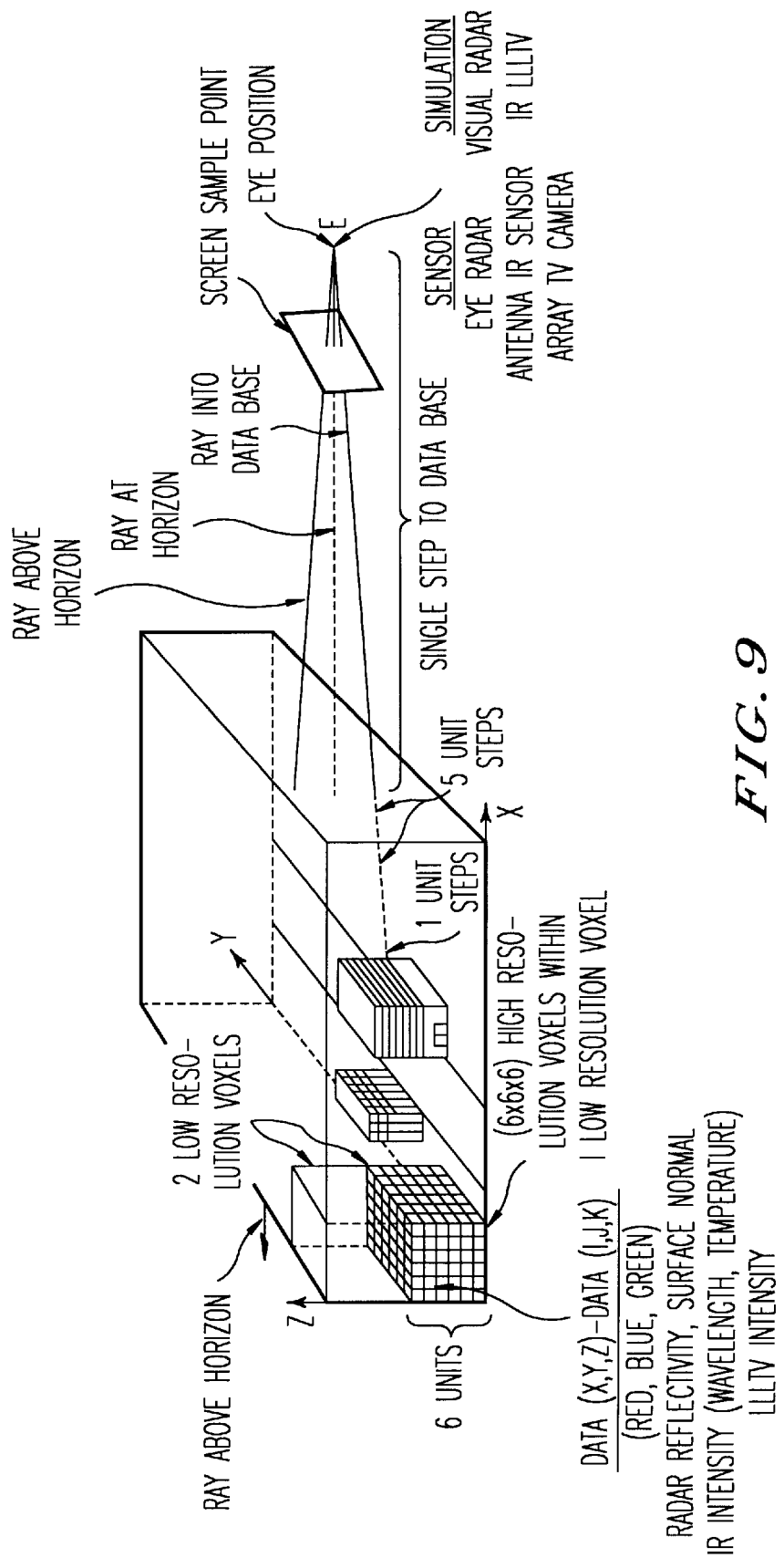
FIG. 9 is an illustration of multi-resolution voxels used in a real-time ray casting system.
Figure 10A:
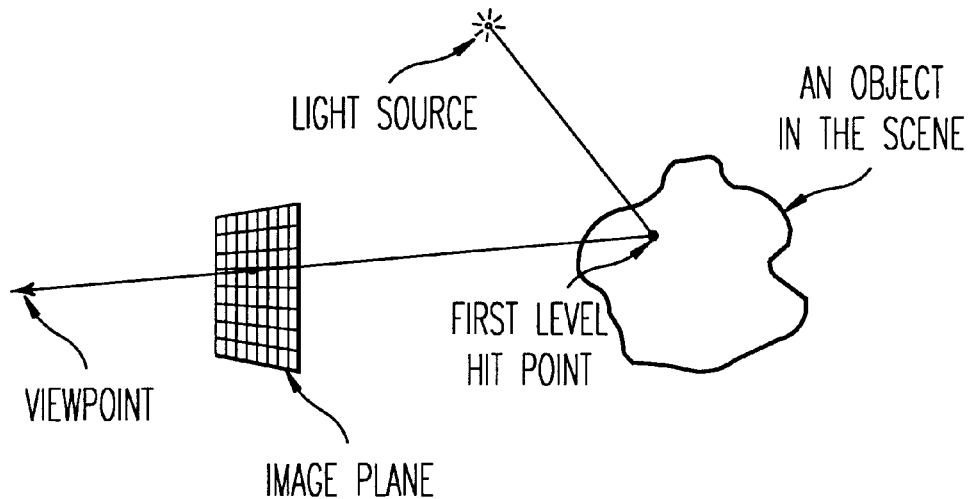
FIG. 10 is an illustration of the process or reprojection in which samples are reprojected.
Figure 10B:
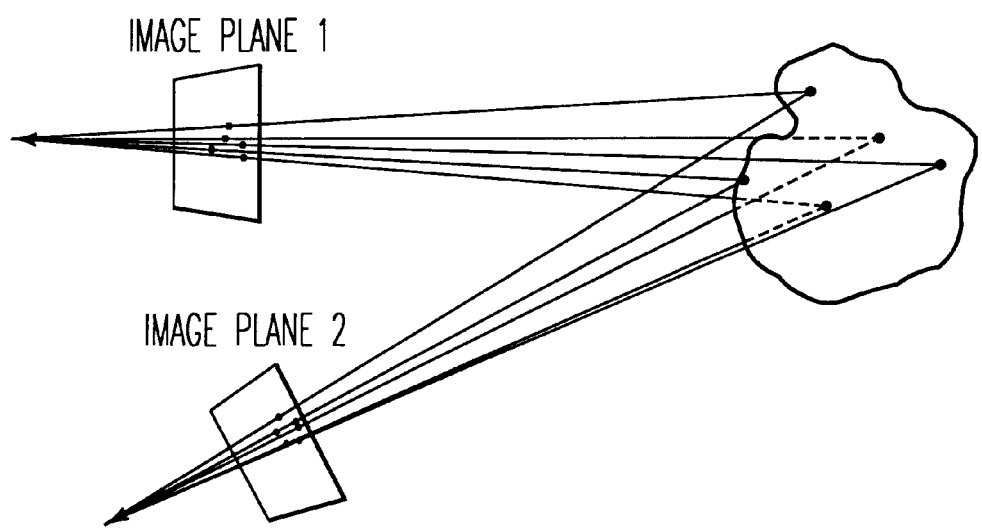

The method of ray casting by walking rays through a hierarchical grid structure that defines an efficient spatial subdivision of the database is a well developed prior art method and is employed in real-time and non-real-time systems previously reviewed in the prior art section of this document. The method has its beginnings in the work of Fujimoto et. al. and Snyder and Barr. The method of stepping rays through grid cells comprising a hierarchical spatial subdivision of a primitive database is described by Snyder and Barr and is illustrated in FIG. 9 as the method of image generation for the real-time implementation described in U.S. Pat. No. 5,317,689.

In the present method, spatial subdivision ray casting is optimized to conduct an efficient search for newly visible primitives in emergence regions and view volume incursion regions. Because ray casting is point sampled on the image plane, the sampling density required to detect a graphic element (e.g., object or primitive) by a ray-element intersection is determined by the smallest exposed image-space extent of any graphic element in the database. The minimum image-space extent of any element in the database is dependent on four factors: 1)minimum object-space extent, 2) distance from viewpoint, 3) orientation with respect to the search ray, 4) degree of occlusion/exposure of the element. Unfortunately the minimum object-space extent of any planar, polygonal graphic primitive is zero. As a result a primitive's minimum image-space extent is heavily influenced by the orientation of the primitive relative to the viewplane. The image-space extent of any primitive becomes vanishingly small as the primitive's normal becomes orthogonal to the view frustrum rays in its vicinity. For this reason alone ray-primitive intersections would seem not to be an efficient or reliable method of detecting newly visible primitives in an exposure region.

However, as the changing orientation of a primitive produces a larger image-space area, the primitive is more likely to be located by point sampled ray casting. Likewise as the exposed portion of a primitive increases during emergence of the primitive in an exposure region the probability of detection increases. Therefore primitives which develop an increasingly large image-space area in an exposure region will eventually be detected with a delay that is inversely proportional to the sampling density of the search. Fortunately the type of transient dropout artifact produced by such delayed detection of visible elements is relatively unnoticeable because the temporal responsiveness of the human visual system limits the perception of newly exposed surfaces (Harwerth 1980). This temporal limit of human visual processing is exploited in the copending patent application in which specific methods are employed to allow the level-of-detail and resolution of graphic elements to reflect their exposure time in the image stream.

Nevertheless reliance on ray-primitive intersections to identify newly visible primitives can, in some circumstances, be inefficient. The present method includes an alternative technique that reduces the requisite sample density and replaces the ray-primitive intersection as the basic search procedure. This technique employs a conservative search criteria for establishing the potential visibility of any primitive in an exposure region. By this criteria any primitive that belongs to a spatial subdivision grid cell encountered by the search ray is considered to be a potentially newly visible primitive. In this case the sampling density required to identify all newly visible primitives in an exposure region is chosen to reflect the minimum image-space projection of any grid cell encountered in the grid hierarchy during the search. Since a grid cell is extended in three spatial dimensions its image-space projection does not vanish because of an "edge-on" orientation possible with planar primitives.

Figure 27B:
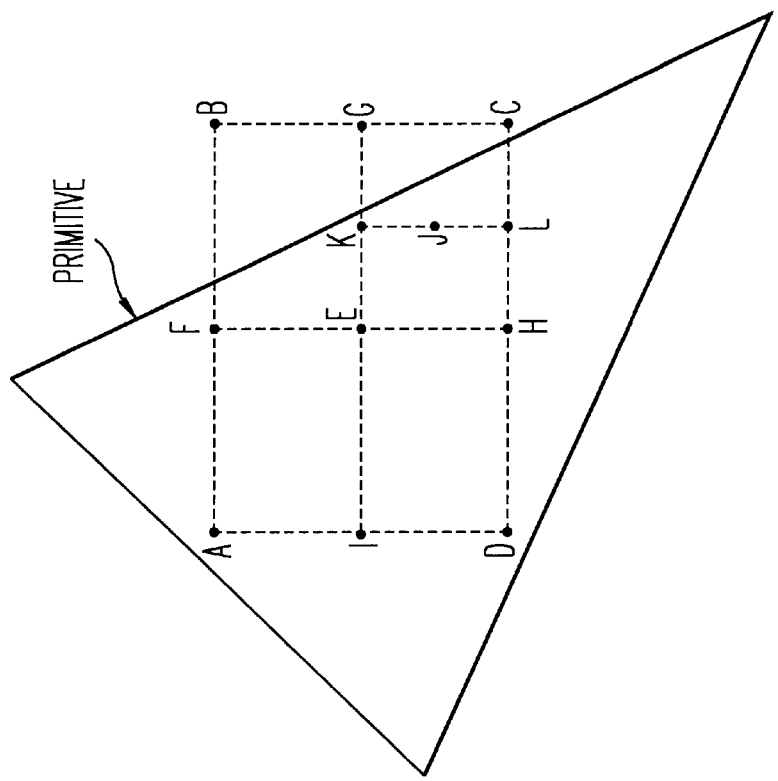
FIGS. 27A and 27B are illustrations of how adaptive supersampling is used to detect occlusion coherence.
Figure 27A:
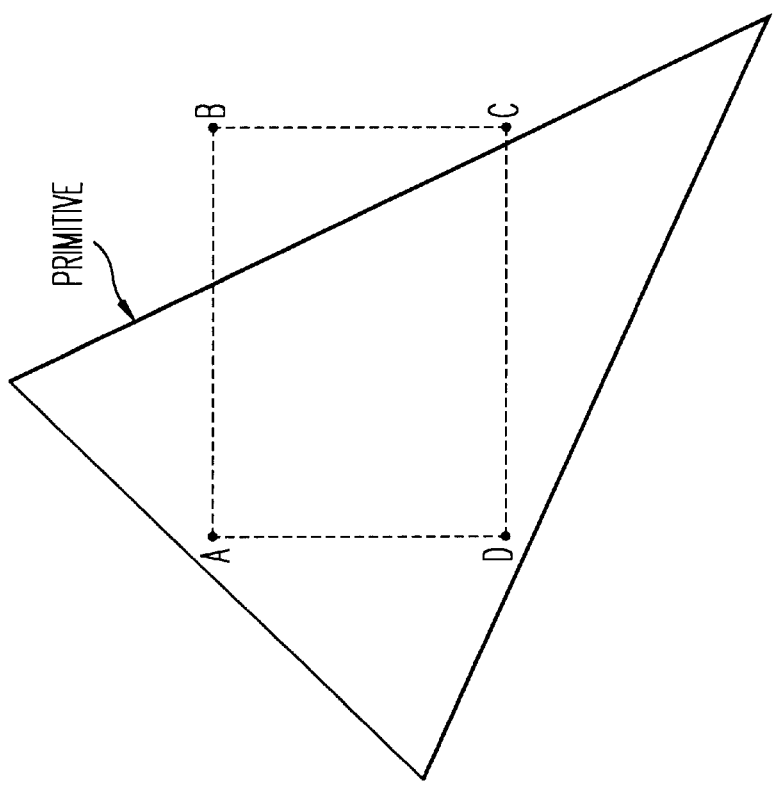

This technique amounts to a type of approximate beam tracing which includes some primitives that are not actually within the exposure regions. The degree of accuracy is a function of the spatial subdivision. The inclusion of primitives that are not actually visible in a region does not produce visibility errors because the actual visibility is computed during rasterization of primitives in the subimage display list. Note that such a search strategy is not depth-limited in the sense that a complete search of the beam requires that all rays must traverse the entire extent of the grid structure. The process is made depth-limited by employing an adaptive sampling strategy to search for a type of image-space visibility coherence called occlusion coherence. In this process the exposure region is adaptively sampled using a pattern that defines convex subregions of the exposure region. The adaptive sampling is directed to identify convex image subregions in which the nearest ray-primitive intersections corresponding to all bordering samples are with primitives that belong to the same occluding convex object. The adaptive sampling for convex object coherence is shown in FIGS. 27A and 27B. FIG. 27A illustrates an initial sparse sampling at the corner points of a convex image region ABCD. In FIG. 27B the region is adaptively supersampled to locate regions in which all samples are within the same convex object (here shown as a single triangle). Such regions of occlusion coherence include AFIE, and IEDH wherein further adaptive sampling is not performed. The membership of primitives in the aforementioned convex primitive groups is used during the adaptive occlusion coherence search to define convex objects. Whereas the method for detecting emergence regions based on the occlusion-exposure of convex objects exploits the temporal visibility coherence of convex objects, the present technique of adaptively searching for occlusion coherence exploits the static image-space coherence of convex objects. The detection of occlusion coherence by this adaptive search establishes a maximum depth for visible surfaces within the convex subimage region and thus establishes a depth limit for ray walking (i.e., the incremental stepping of a ray into a spatial subdivision grid system) within the region. This depth-limit also limits the minimum image-space extent of traversed grid cells within the search region by eliminating distant grid cells from consideration. The minimum image-space size of grid cells within the search region can be determined from the grid database. The search for occlusion coherence by ray-primitive intersection can be made selectively when the ray walking encounters cells that reference primitives from occluding objects (or convex primitive groups) that are likely to cause occlusion (e.g., primitives that made up "walls" etc.). Such visibility hints are easily incorporated into the database during spatial subdivision and other preprocessing.

Another technique employed to limit the sampling density required to identify distant newly primitives employs hierarchical level-of-detail. In this technique the spatial subdivision grid hierarchy shown in FIG. 7 is organized such that each level of the grid hierarchy can contain a separate primitive database wherein high-level grid cells reference primitives from low level-of-detail representations and grid cells lower in the hierarchy reference primitives from a higher level-of-detail database. In conventional organization of hierarchical spatial subdivision grids, only lower level cells of the hierarchy directly reference or "contain" primitives; higher level cells typically directly reference only lower level grids. In the present method higher level cells not only reference lower level grids but can also directly reference a list of primitives contained in the cell that belong to a level-of-detail representation that reflects the level of the cell in the hierarchy wherein large, higher level cells reference primitives from low level-of-detail representations. During walking of the ray through the grid hierarchy the current depth of the ray is used to determine the maximum level of the hierarchy that is processed. When the current depth of the ray exceeds a predetermined value, the lower levels of the hierarchy are not traversed and instead the primitives within the higher level cells of the grid (i.e., from a lower level-of-detail representation) are used as the potentially newly visible primitives.

In this way the ray walking process selects lower level-of-detail representations as ray depth increases. Moreover since this method eliminates the need to encounter very low level grid cells at large distances it naturally restricts the minimum image-space size of encountered grid cells thereby limiting the maximum sampling density required to detect distant newly visible primitives. When primitives from low level-of-detail objects approach to within a predetermined distance from the eyepoint they can be replaced with primitives from the corresponding higher level-of-detail object. This is accomplished by rasterizing the primitives from the low level-of-detail object into the buffer with a special value in the object class field and then removing the primitive from the display list for the subsequent frame. For the subsequent frame all exposed samples with this value (e.g., a value of "LOD=7" in the "object-class" field of the sample-buffer-sample data structure in FIG. 19) in the depth buffer are managed as an exposure trail and are sampled for newly visible primitives. Subsequent ray casting through this matte region left by the removed primitives will encounter the same object but at a closer distance and higher level-of-detail representation deeper in the grid hierarchy.

Thus in the present method actual ray-primitive intersections can be selectively employed primarily to adaptively seek occlusion coherence that establishes a maximum depth for new visibility search. The new visibility search itself proceeds by considering all primitives belonging to each cell encountered in the ray walk to be potentially newly visible. The absence of the primitive on the primitive reprojection list establishes the primitive as newly visible. The test for preestablished presence on the list is accelerated by employing a smaller most recently tested sublist that exploits the image-space/object-space coherence of primitives to reduce the number of traversals of the primitive reprojection list.

The present method includes specific techniques by which the depth limited approximate beam tracing method and the depth limited ray casting method are combined to balance the speed and accuracy of the search. In one such technique potentially newly visible primitive lists from approximate beam walking are rejected if they are too large. Ray casting is then conducted within the beam to further restrict the size of the newly visible primitive list by excluding primitives that are not actually visible.

Thus in the present method spatial subdivision ray casting is optimized as a search engine for newly visible primitives in specified exposure regions. Actual ray-primitive intersections are selectively employed primarily to adaptively seek occlusion coherence that establishes a maximum depth for an efficient approximate beam tracing visibility search. The speed of approximate beam walking is balanced with the accuracy of ray walking. Hierarchical level-of-detail is employed to further reduce the sampling density required to identify newly visible primitives.

Primitives encountered during the depth prioritized visibility search of exposure areas are tested for preexisting presence on the primitive display list for the corresponding image or subimage. This check is made using a unique primitive identifier stored with every primitive in the local primitive reprojection (display) list. Primitives not already present in the searched local display list are considered newly visible and are added to the display list. The test for preestablished presence on the list is accelerated by employing a smaller most-recently-tested sublist that exploits the image-space/object-space coherence of primitives to reduce the number of traversals of the primitive reprojection list. The ray casting is conducted with a spatially coherent sampling pattern that causes most repeat ray-primitive encounters to be identified using the efficient most-recently-tested sublists. This technique exploits the image-space coherence of convex primitives.

Once newly visible primitives have been identified by visibility tracing of step 1550 in FIG. 15 the newly visible primitives can be added to the local primitive display list and rasterized according to step 1560 in FIG. 15. When this step has been performed for all newly visible primitives then the subimage is complete and may be displayed.

In the final step of the cycle, illustrated by step 1570 of FIG. 15, occluded primitives are identified and removed from the local primitive display list. Primitive occlusion is established by a read operation of the exposed elements of the subimage depth buffer after all primitives on the local display list have been rasterized. Primitives in the local display list that are represented as exposed during the subimage buffer read are indicated in the primitive display list by writing the current frame number in the cur-frame field of the C data structure for primitives in the primitive display list shown in FIG. 28. Primitives in the local display list which are not represented by any exposed samples in the subimage depth buffer are considered occluded and are removed (or invalidated) on the local display list. As a result of this earlier write operation at the end of the subimage buffer read/primitive validate operation described for step 1570 all primitives in the subimage primitive display list in which the cur_frame field is equal to the last frame and in which no outclipping (reprojective redistribution) has taken place are newly occluded primitives. (The distinction between outclipping and occlusion becomes important in a client-server implementation that is presented later in this specification).

The removal of occluded primitives makes the current method less dependent on scene depth complexity than conventional image generation methods based on object-order rasterization. Also because primitives that outclip the view volume are removed from display lists and are not processed until they become visible, the performance of the present method tends to be less affected by the overall size of the database than for conventional object-order rasterization methods. This improved scalability with scene depth-complexity and database size is achieved without special-purpose polygon flow minimization or precomputed visibility techniques used by conventional object-order rasterization methods of image generation.

From the preceding analysis and FIG. 15 it can be seen that the present method of image generation improves on the sort-first method of image generation by removing "off-screen" primitives and occluded primitives from the local display lists. This gives the present method greater scalability in both database size and depth complexity than the sort-first method. Like the sort-first method the present method of primitive reprojection exploits temporal image coherence to reduce the amount of primitive redistribution in an image-parallel implementation. Unlike the sort-first method the present method is able to exploit a more significant type of coherence called temporal visibility coherence. Temporal visibility coherence is produced when the optical flow of visible elements limits the rate at which exposure regions develop in the image stream. When temporal visibility coherence is high, the size of exposure regions is limited to such a degree that the cost of searching for newly visible primitives is very low and is more than offset by the computational savings produced by restricting primitive display lists to actually visible primitives. Efficient reprojective image generation requires the temporal visibility coherence of the image stream to be high. Otherwise the cost of searching exposure regions outweighs the computational savings produced by excluding occluded and "off-screen" primitives from display lists.

Existing methods of reprojective image synthesis provide no way to measure or control the temporal visibility coherence of an image stream and consequently can be very inefficient for sequences that have low temporal visibility coherence. Largely because existing methods of reprojective image synthesis do not address this type of inefficiency, their real-time implementation has been limited to special cases such as plenoptic rendering of McMillian and Bishop in which temporal visibility coherence is constrained to be high.

Object Classification Based on Dynamic Occlusion Properties

The present method includes a technique by which the distribution of temporal visibility coherence within the image stream is determined and the use of reprojective techniques limited to regions of the image stream with high temporal visibility coherence. This technique allows selective application of specific reprojective methods to regions of the image stream in which these techniques are both efficient and accurate.

The technique is based on an object classification system in which individual objects are classified by their dynamic occlusive properties. Specifically objects are classified based on their actual or expected dynamic occluding efficiency. The dynamic occluding efficiency of an object is defined as:

$$\text{Dynamic Occluding Efficiency} = \text{Static Occluding Area/Exposure Rate} = \text{Image-Space Area}/E_o X \text{ Image-Plane Velocity}$$

Where $E_o$ is the image-space extent of the object in the direction orthogonal to the object's image plane translation vector. As an object moves on the image plane it produces an exposure trail. The size of the exposure (emergence) region produced by an occluding object during a single temporal sampling period is approximately:

$$\text{Size of Exposure Region} = E_o X \text{ Image-Plane Velocity } XT(\text{temporal sampling interval})$$

Figure 29:
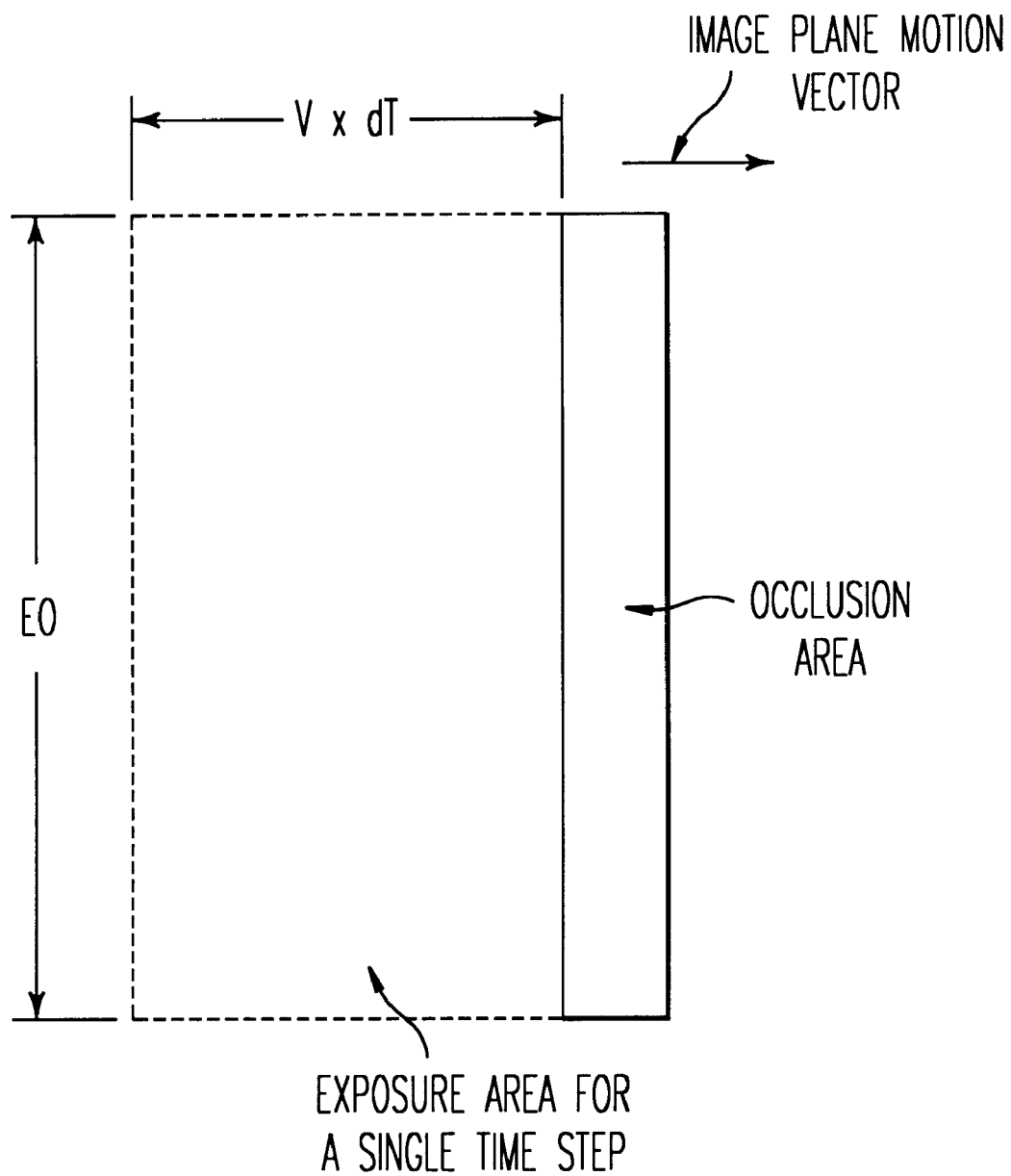
FIG. 29 is an illustration showing the exposure area created by an object with a rectangular image-space projection for a single time step.

In the present method these values are estimated by examining the image-plane representation of the object's bounding box. Image-Plane Velocity is the net image plane velocity of the object and is estimated using a method described later in this specification. FIG. 29 illustrates the exposure area produced by a rectangular object undergoing image-plane translation. In FIG. 29, V is the image-plane velocity and dT is the temporal sampling interval.

Objects which produce a relatively large exposure trail but have a relatively small image-space area have a low dynamic occluding efficiency. The large exposure trail generated by such objects is relatively expensive to process (e.g., by ray cast search) while the small image-space area of the object is ineffective in removing occluded elements from the local display list. Thus objects with low dynamic occluding efficiency result in inefficient reprojective image generation. Such objects decrease the temporal visibility coherence of the image stream. In fact, an object's dynamic occluding efficiency is a measure of the object's contribution to the overall temporal visibility coherence of the image stream.

In the present technique objects with a low dynamic occluding efficiency are classified as non-occluding. In this method objects classified as non-occluding do not produce exposure trails (emergence regions) in the depth buffer. By treating objects with a low dynamic occluding efficiency as non-occluding the overall size of exposure areas is decreased and the cost of visibility search decreased without significantly increasing the number of unoccluded primitives in the display list. Objects can be preclassified as non-occluding based on their shape and relationship to nearby objects. The bars of a jail cell, for example, generally have a low static occluding area from typical vantage points and usually produce relatively large exposure trails from typical view frustrum trajectories. In the present method such objects are preclassified as non-occluding and may be dynamically reclassified as occluding if their dynamic occluding efficiency changes. (As for example if the bars became very close to the viewpoint which would increase their static occluding area and possibly the dynamic occluding efficiency beyond a predetermined value.)

In the present method a multi-level depth buffer technique is employed in which primitives belonging to non-occluding objects are rasterized into the depth buffer in such a way as to not cause the overwriting or removal of ostensibly occluded samples deeper in the depth buffer. Following the rasterization of all primitives the multi-level depth buffer is read and primitives which have samples in the buffer that are actually exposed or in deeper levels of the buffer beneath non-occluding samples are indicated to be non-occluded and not removed from the display list. This is achieved in the present implementation by the aforementioned technique of writing the current frame number to the cur-frame field of the primitive C data structure shown in FIG. 28 during the aforementioned post-rasterization read of all current, non-occluded levels of the (subimage) depth buffer. In this way non-occluding objects are displayed correctly but with respect to the actual removal of occluded elements the non-occluding primitives are effectively "transparent". This increases the effective temporal visibility coherence of the image stream and reduces the cost of reprojective image generation.

An example embodiment of the multilevel depth buffer is given by the C data structures shown in FIG. 19. The "sample_buffer_sample" C data structure represents the information for a single sample on a single level of the buffer. It includes fields for identifying the source primitive. In this example the "element_ID" field identifies the source primitive by giving its index in the local primitive display list. The C data structure "sample_buffer_element" represents data for one position in the multilevel depth buffer for an image or subimage. Each element contains two temporal sub-elements, A and B, with each temporal sub-element containing five possible levels for non-occluding samples. The C data structure Depth_Buffer shown in FIG. 19 is a two dimensional array of these multilevel elements which comprises the entire depth buffer. Note that image information is not included in these data structures but is implemented in a separate data structure representing the top "layer" of both temporal sub-buffers. The depth buffer write and replacement protocols for resolving the visibility of occluding and non-occluding objects in the multilevel depth buffer are described in detail later in this specification.

In the present invention the aforementioned method of object classification and multi-level depth buffering is developed into a general system of reprojective image generation. In this system objects are classified based on their dynamic occlusion properties and the visibility of different classes of objects is resolved in the previously described multi-level depth buffer. In addition to improving the efficiency of reprojective image generation in the manner previously described, this system is used to control exposure errors caused by temporal undersampling and to allow the reprojective rendering of moving objects. Before describing the object classification system and multilevel depth buffer methods in detail the problems posed by temporal undersampling and moving objects will now be described.

Reprojective methods of image synthesis which employ specific emergence regions are subject to exposure errors that result because finite temporal sampling can produce discontinuities or gaps in these exposure regions. Newly visible elements (e.g., primitives) that emerge into these gaps in the emergence region are not detected because a visibility search is not performed in the gaps.

An extreme example of this type of error is produced by an object with a small image-plane extent in the same dimension in which it has a high image-plane velocity. In such a case the reprojected object may not even overlap the original object in the image plane. The region between the object's image-plane location in consecutive frames is actually a potential exposure region that is not identified as such because no reprojection hole or depth transition occurs in the region. Newly exposed surfaces that actually project over this location in the later frame would not be identified because the region is not treated as a potential exposure region.

Figure 30:
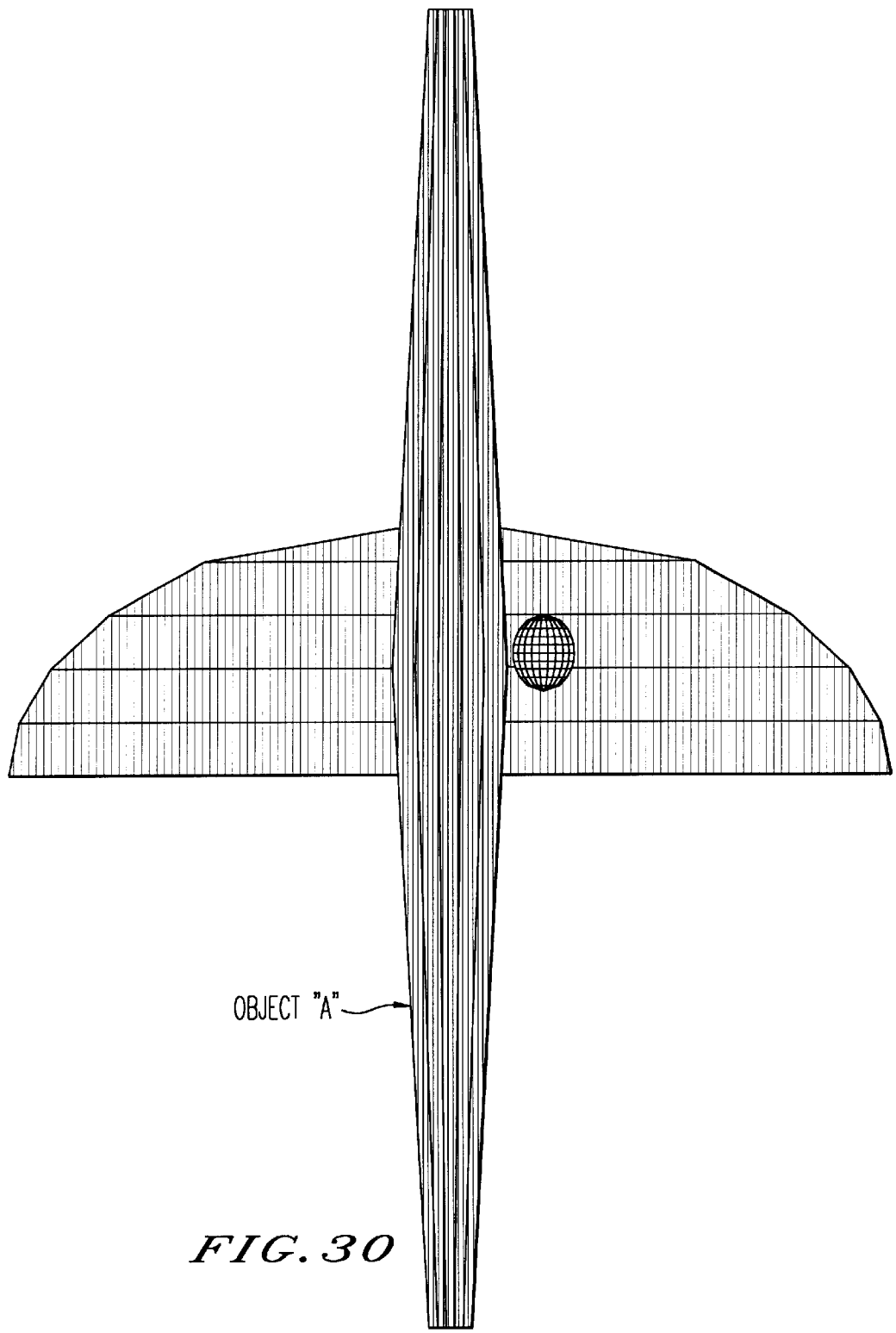
FIGS. 30 and 31 show consecutive frames of a viewport view of a scene which illustrates an exposure gap problem.
Figure 31:
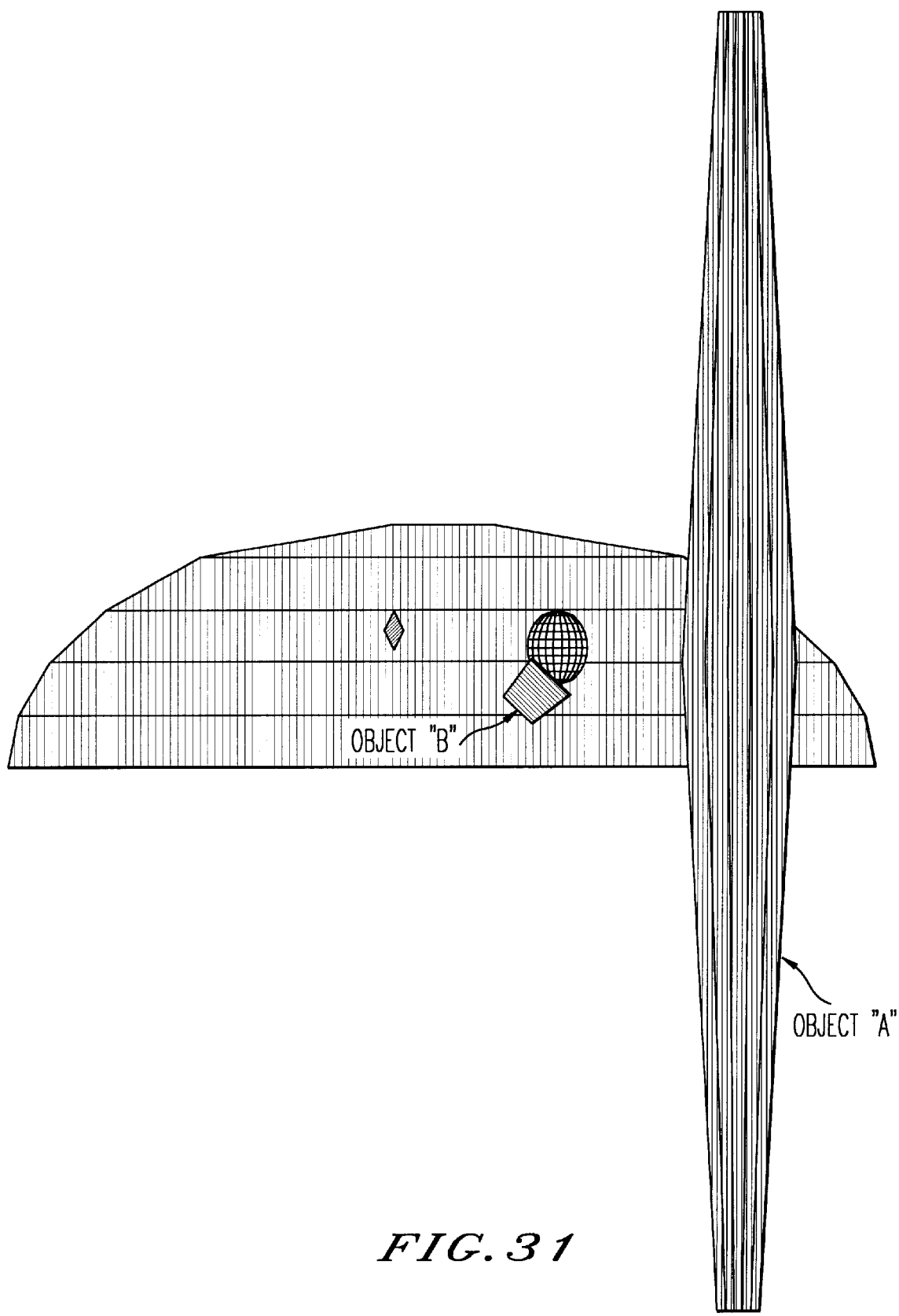
Figure 32:
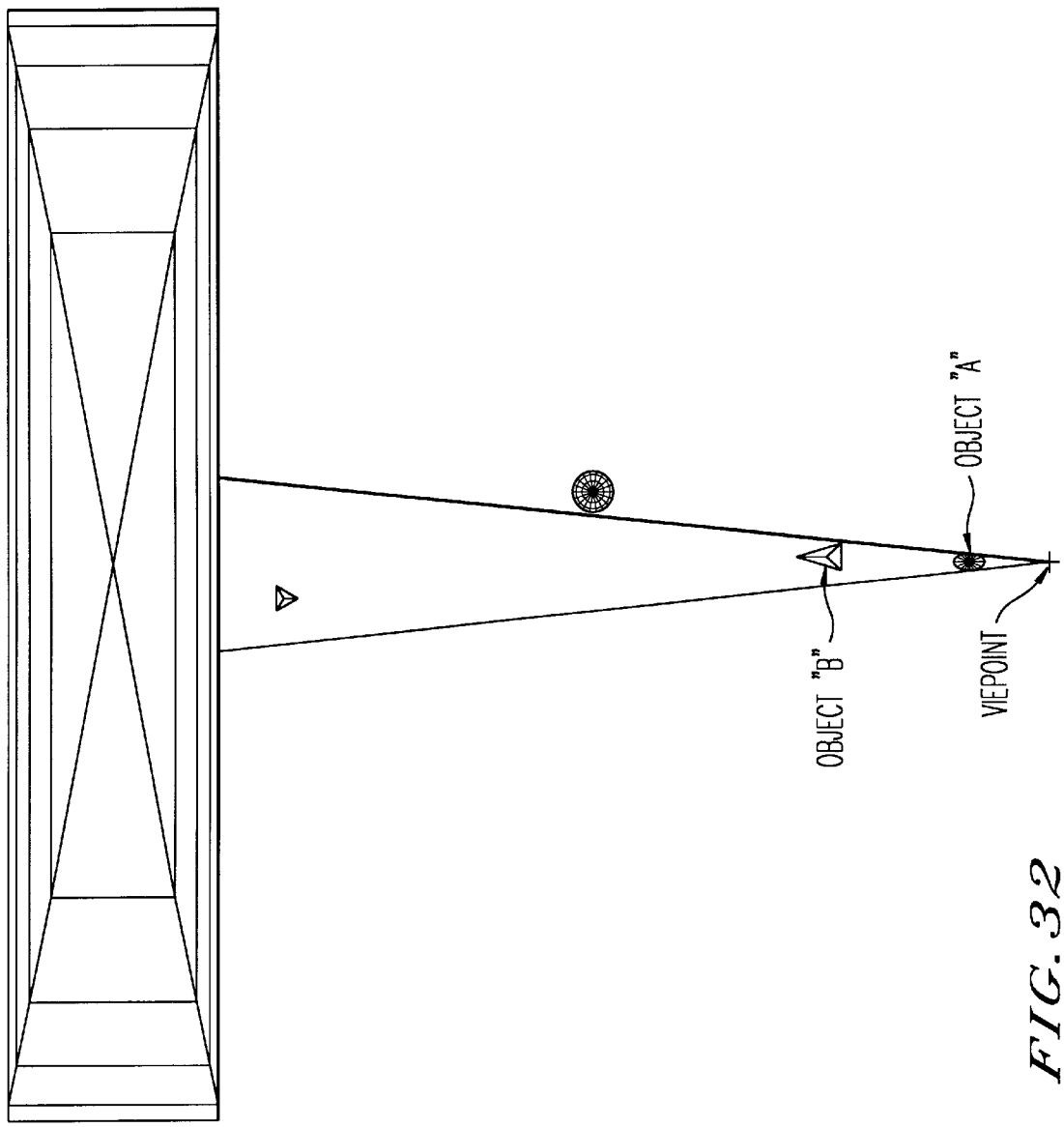
FIGS. 32 and 33 show consecutive frames of a plan view of the same exposure gap problem illustrated in FIGS. 30 and 31.
Figure 33:
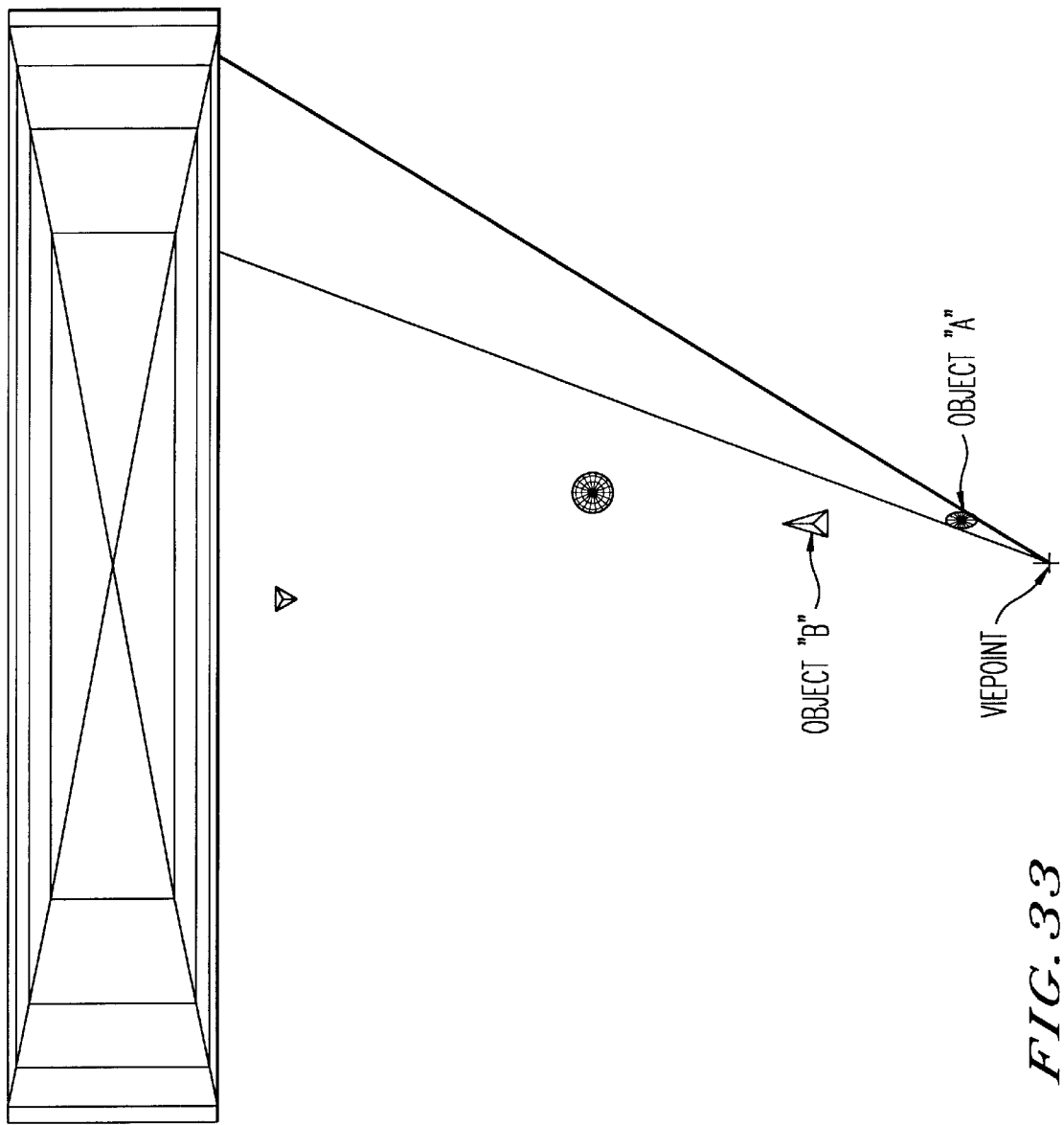
Figure 34:
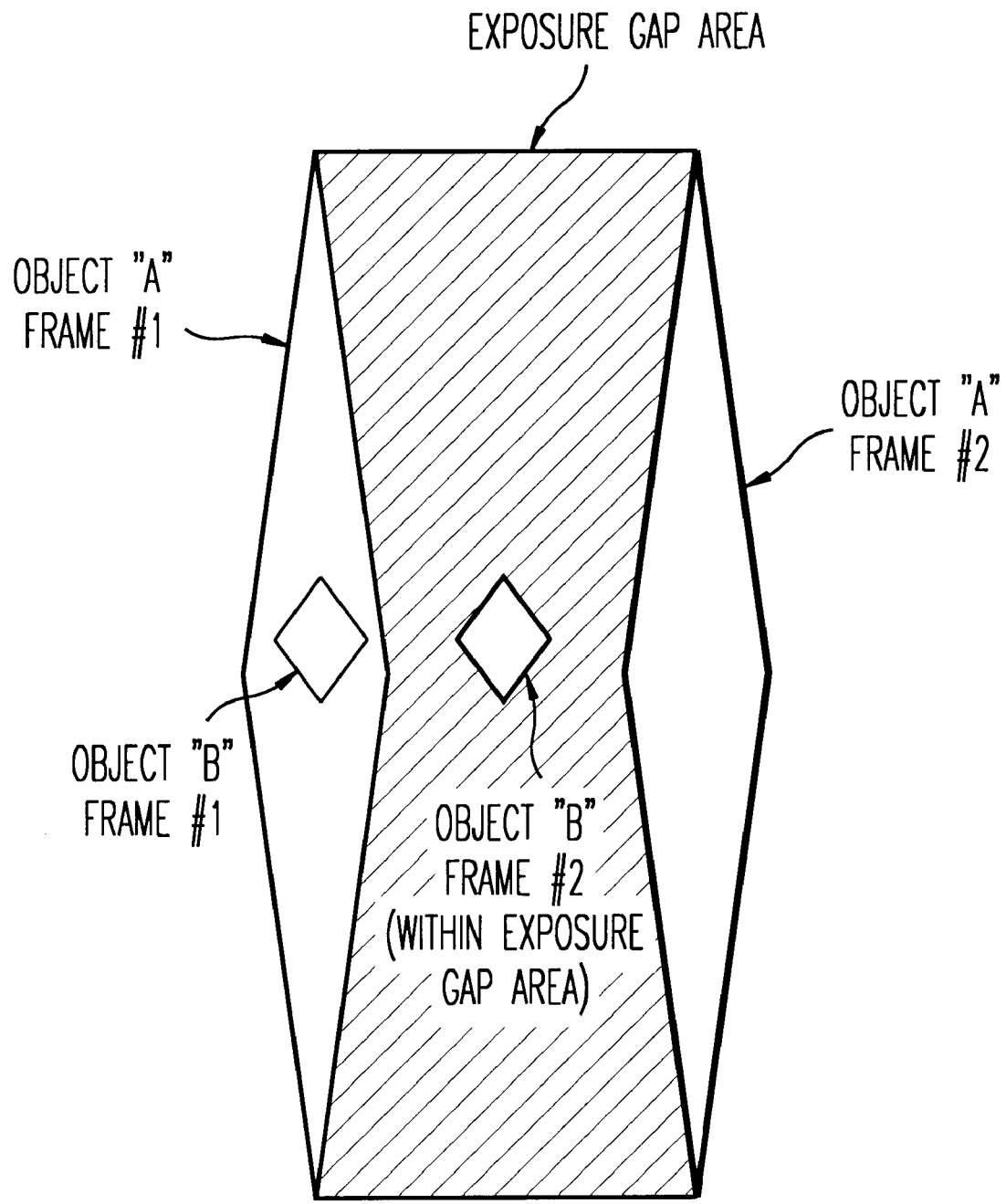
FIG. 34 is a view of the exposure gap problem illustrated in FIGS. 30 through 33 as seen in the double buffered depth buffer.

This type of error is illustrated in FIGS. 30–33. These figures illustrate a foreground object "A" undergoing relatively rapid left-to-right image-plane translation due to right-to-left viewpoint translation between frame 1 and frame 2. All objects are static in object space. From FIGS. 30 and 31 it can be seen that because Object "A" has a relatively small image-space extent in the direction of motion, its image-plane projection in frame 2 does not even overlap its image-plane projection in frame 1. This region of non-overlap represents a gap in the object's occlusion path and exposure trail. Also apparent from FIGS. 30 and 31 is an object "B" that emerges from behind object "A" and emerges into the exposure gap produced by the discontinuous motion of Object "A". In this example the exposure of Object "B" would not be properly detected since it projects over object "A"'s exposure gap. This location of the gap in Object "A"'s exposure trail is evident from FIG. 34. In this figure the location of Object "A" is shown for frame 1 and frame 2 as it would be represented in the previously described temporally double buffered depth buffer. From FIG. 34 it is clear that Object "B" partially emerges into Object "A"'s exposure gap. All visible elements of Object "B" may not be identified by ray casting within the actual emergence region created by Object "A". The exposure gap produced by object "A" is also evident from top views corresponding to frame 1 and frame 2 and shown as FIGS. 32 and 33 respectively. In these figures the occlusion path produced by object "A" is shown by the sets of lines originating at the viewpoint and intersecting the maximum extent of object "A" on the viewplane. By a comparison of FIGS. 32 and 33 it is seen that for consecutive frames the two sets of lines (corresponding to an object "shadow" frustum, as if the viewpoint were a point light source) form a region of non-intersection that corresponds to the exposure gap of object "A". Objects which reproject into this region may not be identified as newly exposed.

The exposure gap created by finite temporal sampling frequency is very pronounced in the aforementioned case of an object with small image-plane extent in the direction of image-plane motion. In fact objects of any shape can produce exposure gaps that result from more subtle discontinuities in the object's occlusion path. This type of exposure gap is best illustrated for the case of objects with a convex projection on the image plane. As temporal sampling frequency increases the occlusion path of a image-space convex object is in the limit convex. A corollary is that for finite temporal sampling frequencies the exposure trail of a image-space convex object generated during a single temporal sampling interval may contain concave regions. These regions, like the exposure gaps previously described, correspond to discontinuities in the occlusion path and exposure trail of the object. This type of exposure gap can occur for any object undergoing transformations with a translational component or an asymmetrical rotational component. It does not occur for pure "expansion" or "contraction" in image-space. The size of such exposure gaps is generally inversely proportional to the temporal sampling frequency for the object and directly proportional to the image-space velocity of the object.

Figure 35:
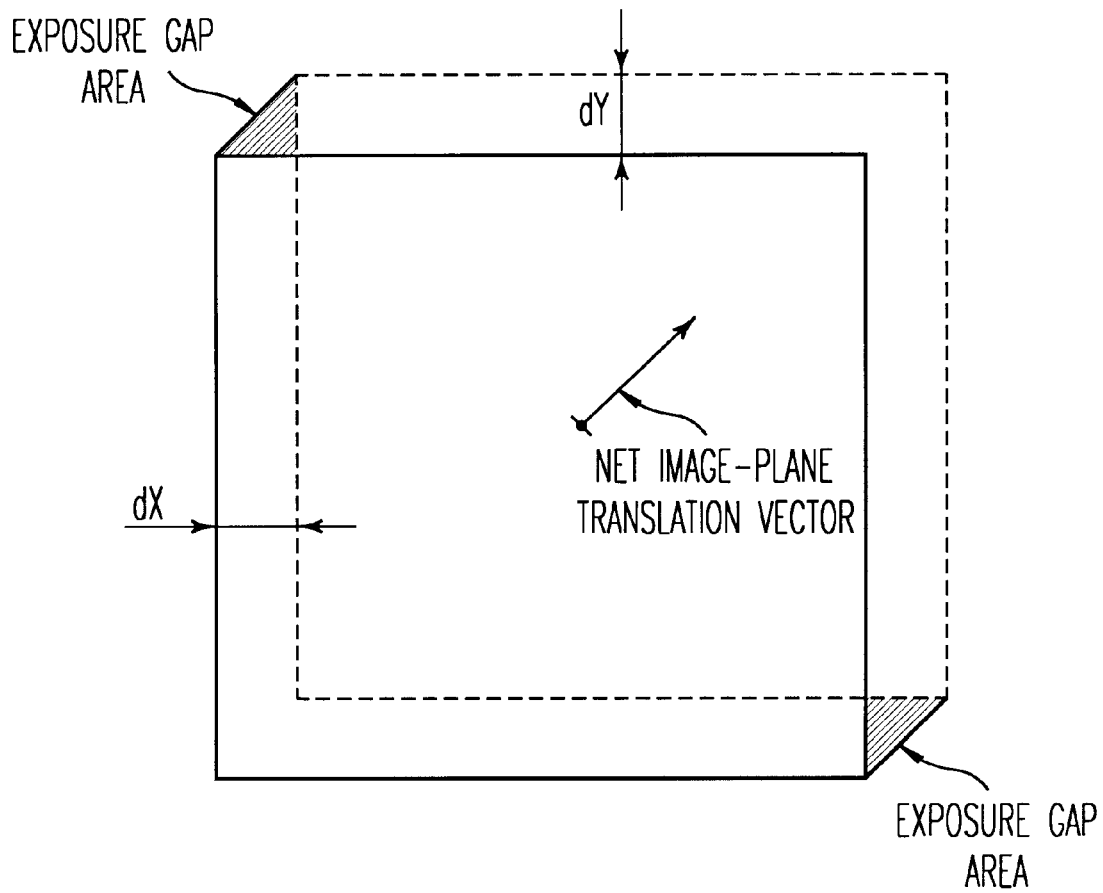
FIG. 35 is an illustration of the exposure gaps caused by finite temporal sampling for an object with rectangular image plane projection.

FIG. 35 illustrates this type of exposure gap. In FIG. 35 two small exposure gaps are created when an image-space rectangular objects undergoes image-space displacement in two directions during a single sampling interval. The size of each exposure gap is: ½dx*dy, where dx and dy are the image-space displacements during one sampling interval. Two such gaps occur for a rectangular object—one for each corner region of the object in which image-plane motion creates an area of missed occlusion. These gaps correspond to concave regions in the object's otherwise convex exposure trail.

Figure 36:
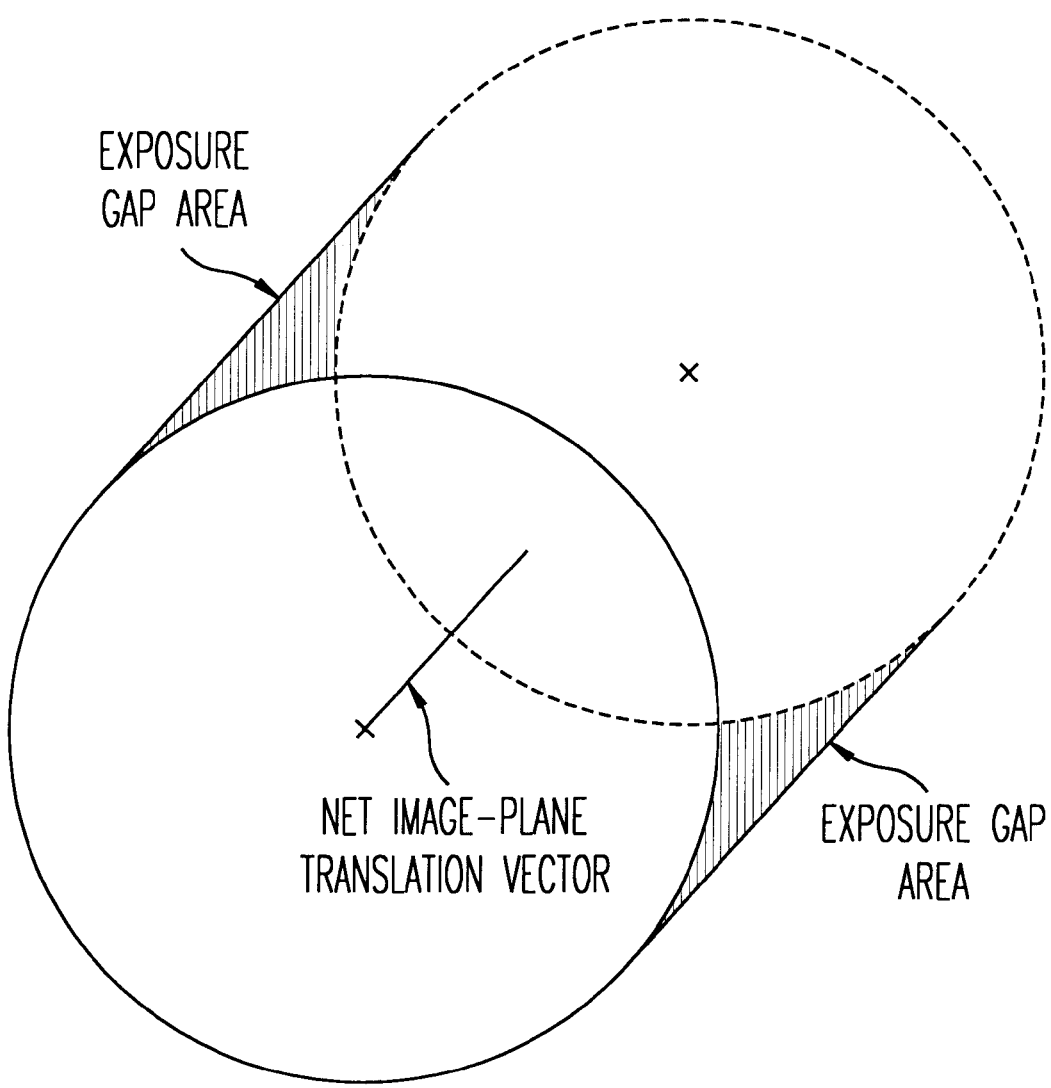
FIG. 36 is an illustration of the exposure gaps caused by finite temporal sampling for an object with circular image plane projection.

FIG. 36 illustrates how such an exposure gap develops for a non-rectangular object. The shaded regions indicate concavities in the exposure trail that correspond to exposure gaps. While such exposure gaps may be produced by objects of any shape these gaps are generally much smaller than in the previously described case in which consecutive temporal representations of the object do not even intersect in image-space. Such pathologic cases are produced when the shadow gap progresses beyond a concavity to become a topological fracture in the exposure trail.

Figure 37:
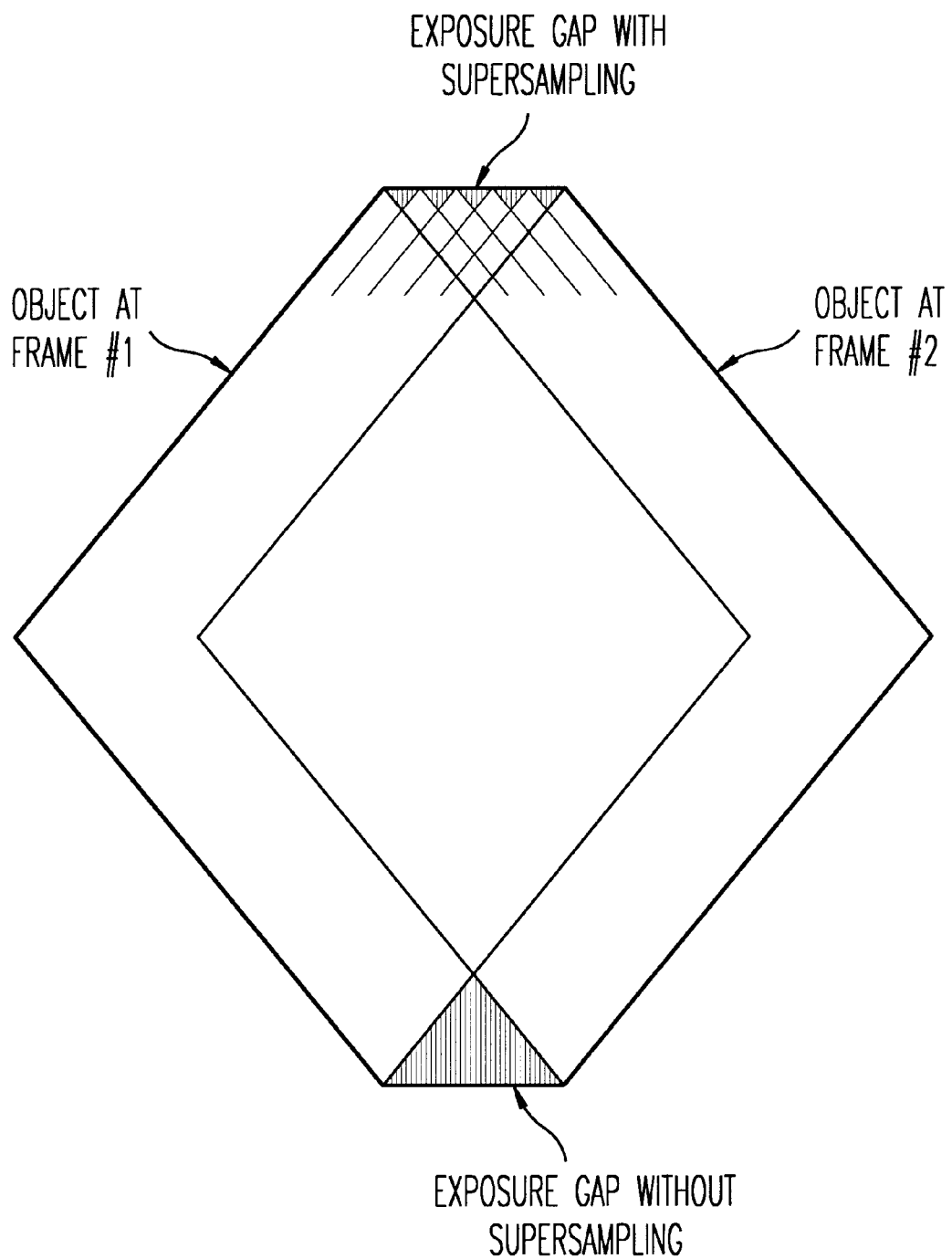
FIG. 37 is an illustration of the use of supersampling to reduce the size of the exposure gap area.

The present method includes three techniques to reduce visibility errors caused by gaps in the image-plane exposure trail of specific objects that result from a finite temporal sampling frequency. The first technique involves adjusting an object's temporal sampling frequency in some predetermined proportion to the image-plane velocity of the object. Discontinuous motion of image elements caused by finite temporal sampling frequency produces exposure gaps as previously described. In the present technique the image-plane motion of an object is estimated and used to control the temporal frequency at which the object is sampled. The method computes an estimate of an object's image plane motion by calculating the image-plane velocity of several vertices belonging to the object or its bounding volume. If the object's estimated mean image-plane velocity exceeds a predetermined value, then the object is sampled with a frequency that is greater than the frame rate and in some proportion to the estimated image-plane velocity of the object. In the case of primitive reprojection this temporal supersampling is performed by transforming and rasterizing primitives into the non-current subframe of the multilevel buffer at the computed supersampling frequency. In the case of sample reprojection, the samples in the sample reprojection list corresponding to the object are reprojected at the supersampling frequency. This supersampling reduces the size of the exposure gaps. FIG. 37 shows how supersampling in the alternate temporal buffer produces a more continuous exposure trail and reduces the size of exposure (emergence) gaps. In this figure a single object with a rectangular projection on the image plane undergoes image-space motion between frame 1 and frame 2. The upper most exposure gap is represented for the case of 5 temporal sampling periods. This is compared to the lower exposure gap produced by a single temporal sampling for the same image-plane displacement. From the figure it is clear that the total shaded area, representing the total exposure gap, is less in the case of higher temporal sampling frequency. Using this technique, reprojective operations are performed at the supersampled rate while visibility tracing within exposure regions is performed at the basic frame rate. Also because temporal supersampling is only being performed to increase the precision of an object's exposure trail, shading need not be computed during temporal supersampling. Shading may be optionally calculated during temporal supersampling to achieve a motion blur effect.

The source of exposure gaps, i.e., successive mapping of image elements to non-contiguous regions of the image, is the same source of certain perceptual aliasing phenomena produced in the human visual system. When the human visual system processes objects with a high image-space velocity (which also tend to have a high retinal image velocity if untracked) that are presented at a relatively low temporal sampling frequency, such as 30 Hz, the motion of the objects appears discontinuous. Under these conditions such objects successively stimulate non-contiguous regions of the retina and later processing elements which produces the appearance of discontinuous motion. Less rapidly moving objects tend to produce successive stimulation of more contiguous image processing elements.

The degree of contiguity required for the perception of smooth motion is a function of the spatiotemporal filtering characteristics of the human visual system. A measure of the temporal sampling frequency required to produce this degree of contiguity for any object is the Critical Temporal Sampling Frequency (CTSF) for the perception of smooth motion. This finding was reported by Watson et al in the Journal Optical Society of America, (1986), 3(3) pg 300–307). The value of the CTSF is proportional to the image-space (retinal) velocity of an object.

In the above-referenced copending application, a method of adjusting the temporal sampling frequency of an object to substantially reflect the CTSF for the object is described. In the present technique the temporal sampling frequency for an object is also selected to be in some predetermined proportion to the object's image-plane velocity. As a result the present technique not only reduces exposure errors but also employs an object-specific temporal sampling frequency that tends to produce the appearance of smooth motion.

A more efficient alternative to actually reprojecting primitives or samples at the supersampled rate is to perform an image-space interpolation of the samples or vertices that comprise the object. In this technique image-space incremental integer operations are substituted for floating point vector-matrix transformations. This alternative provides a good approximation to the exposure trail for objects that have an approximately piecewise-linear motion in the image flow field.

Exposure trails are produced by translational motion in the image flow field. Objects that undergo pure perspective "expansion" do not generally create an exposure trail per se since the earlier temporal representation of the object is contained within the projection of the later representation. In this case the method of computing the average image-plane velocity vector of the object would correctly indicate a low net image-plane velocity for the object indicating no need for temporal supersampling. Objects undergoing pure perspective "contraction" do produce an exposure trail; however, such perspective contraction is less likely to result in exposure gaps since the later temporal representation of the object is generally completely inside the earlier projection of the object regardless of temporal sampling rate. For these cases the technique of approximating object image-plane velocity also yields a low value, correctly indicating that temporal supersampling is not required.

Objects that undergo image-space rotation and skew transformations produce exposure trails and potential exposure gaps that are less dependent on the net image-space velocity of the object. Fortunately, image-space object rotation rarely occurs for static objects under camera motion. One exception is the case of camera roll about the view direction vector. However this is a special plenoptic case in which occlusion paths are not produced. The present method includes a separate technique for managing exposure errors created by independently moving objects which is specified in a later section.

A second method of controlling exposure gaps produced by finite temporal sampling of convex objects involves determining the actual location of a convex object's exposure gap by identifying a concave portion of the occlusion path. For an infinite temporal sampling frequency the occlusion path and exposure trail of a convex object produced between consecutive samples is convex in the limit. A corollary is that for a finite temporal sampling frequency the occlusion path and exposure trail of a convex object may contain concave areas.

These concave regions represent discontinuous reprojection caused by noncontinuous sampling and correspond to potential exposure gaps. These concave regions can be located by examining linear sets of samples in the multilevel depth buffer wherein said linear sets of samples are parallel to the direction vector describing the net image-space displacement of the object during the temporal sampling interval. Exposure gaps are identified by detecting transition segments along such linear sets of samples in which the samples change from being occluded by the object to not being occluded and exposing a more distant object and then change back to being occluded by the object.

Figure 38B:
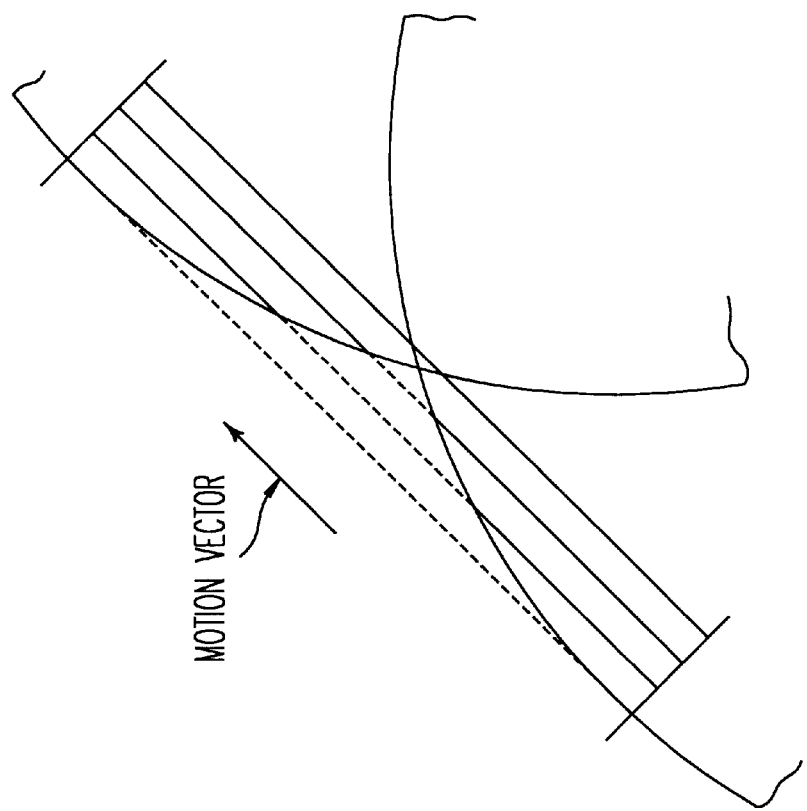
FIGS. 38A and 38B show the location of exposure regions identified by finding the concave area in an occlusion path.
Figure 38A:
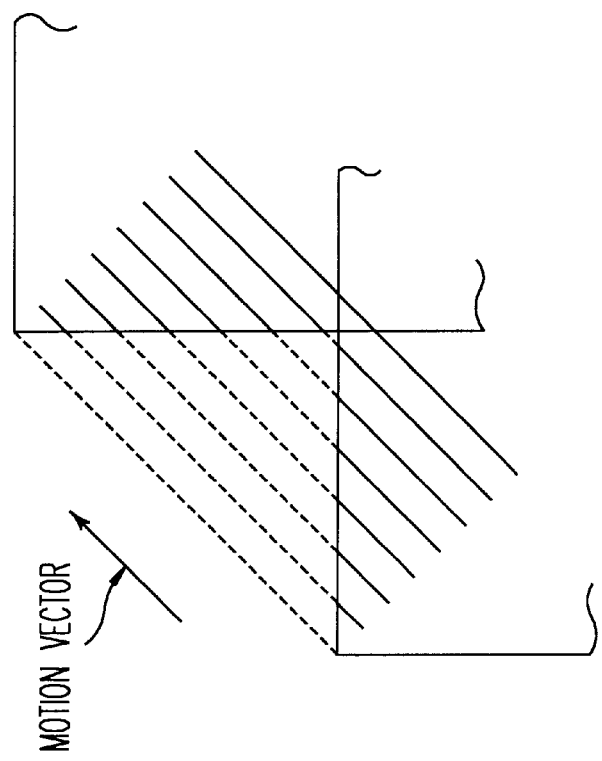

The segment(s) of the linear set that is not occluded by the object but that is bounded by segments which are occluded by the object represents a linear subset of the exposure gap region. The entire exposure gap region can be determined by such a scan line analysis, as is shown in FIGS. 38A and 38B. Initial linear sets should be selected to include the samples in the object's occlusion path that are extrema in an image-space dimension that is not parallel to the object's image-space motion vector. Use of this method, however, is limited to concavities or gaps in an object's occlusion path that are produced by non-continuous temporal sampling. For this reason a concave area must be defined to exclude regions of the buffer in which samples from the object being analyzed have been overwritten by closer occluding samples.

The concavity analysis technique of identifying exposure gaps is more efficient than temporal supersampling for objects that comprise a relatively large number of reprojected elements (samples or primitives) and in which the exposure gap region is generally small. Thus this technique is applied to objects with relatively large image-space areas and modest image-plane velocities. A combination of temporal supersampling and concavity analysis can be applied to large rapidly moving objects.

A third method of controlling exposure gaps is to classify relatively small, rapidly moving objects as non-occluding. Such objects tend to produce large exposure gaps and, as previously discussed, can create large inefficient exposure trails. By classifying these objects as non-occluding the object does not generate an occlusion path or exposure trail. Because no emergence regions are produced by a non-occluding object exposure errors are eliminated. In the present technique an object's dynamic occluding efficiency is determined and used to classify the object as either occluding or non-occluding by the method previously described. Specific depth-comparison protocols for a multilevel depth buffer allow the visibility of both occluding and non-occluding samples to be resolved.

The aforementioned object classification system and multilevel depth comparison protocols can therefore be used not only to increase the efficiency of reprojective methods by managing objects with low dynamic occluding efficiency as non-occluding; it can also increase the accuracy of reprojective rendering by managing objects with discontinuous exposure trails as non-occluding. In addition this object classification system can also be used to allow moving objects to be rendered using reprojection; by managing them as non-occludable. Further details of the complete object classification system and multilevel depth protocols are presented following a consideration of the problems that moving objects pose for reprojective rendering. Graphic elements (primitives or samples) that belong to objects which are moving in three-space can become exposed anywhere in the image stream. Unlike static objects their exposure is not limited to the previously described emergence regions and view volume incursion regions. This inability to efficiently compute the visibility of moving objects is a major limitation of existing methods of reprojective image generation.

The present method includes two techniques by which moving objects can be rendered using a reprojective approach. In a first technique the exposure of moving objects by penetration into the view volume can be detected by extending the size of the view volume incursion regions previously described for the case of static objects. In a second method the problem of computing the emergence of moving objects is solved by classifying them as non-occludable. The first method will now be described.

Figure 42A:
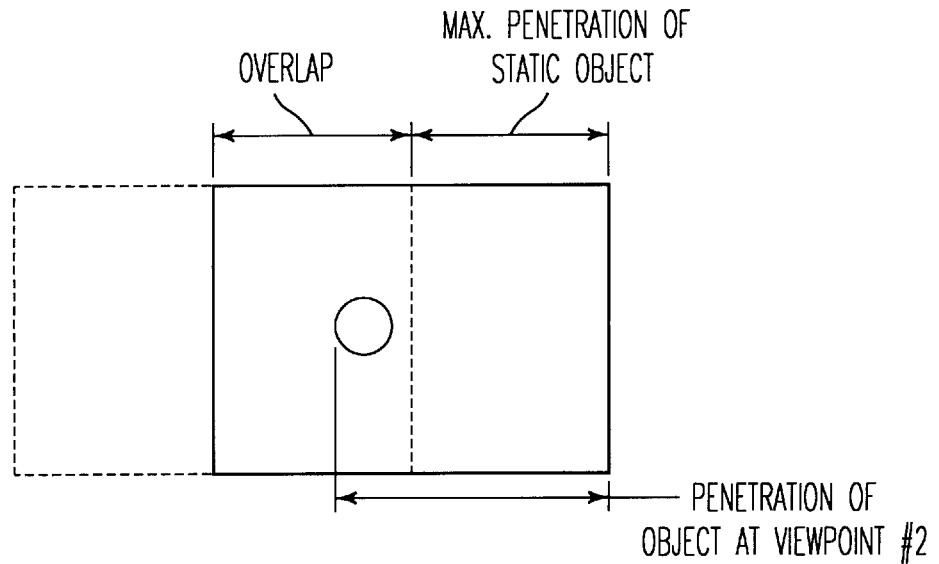
FIGS. 42A and 42B are front and top views, respectively, of a viewpoint exposure perimeter for moving objects with viewport motion in one dimension.
Figure 42B:
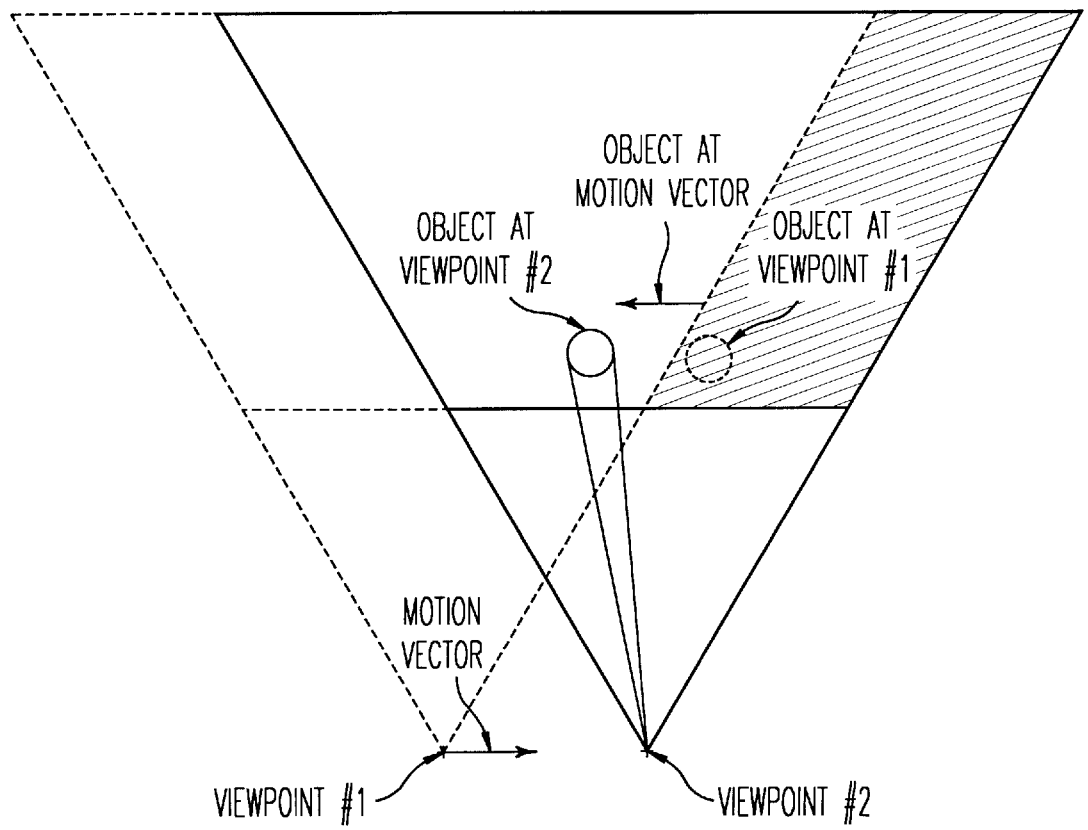

The detection of elements from static objects that become newly visible by incursion into the view volume is accomplished by computing the incursion perimeter by identifying the non-union of view frustrums from successive frames as previously described in connection with FIGS. 50, 24, 25. In the present technique the incursion perimeter is extended to allow the detection of previously invisible moving objects into the view volume by a demand-driven, data-access, depth-prioritized search method such as visibility tracing. This is achieved by extending the dimensions of the incursion regions computed in the static case by an amount equal to the maximum image-plane velocity of all moving objects in the database multiplied by the temporal sampling frequency. This technique uses the velocity vector of each moving object to compute a specific maximum incursion region for each of the four borders of the viewport. The extension of this view volume incursion region to reflect the maximum velocity vectors of moving objects is shown in FIGS. 42A and 42B. This figure shows the maximum degree of view volume incursion for static objects, based only on viewpoint motion, and the maximum incursion for a moving object. In this case the moving object has a object space velocity vector that produces image-plane motion in the same direction of the view volume incursion but with a greater magnitude. In the FIG. 42B the view volume incursion region is the shaded area. The result is a greater view volume penetration for the moving object. Note that the extended view volume incursion region can form an incursion perimeter on all edges of the viewport. The maximum image-plane velocity of each object is estimated using the vertices of the objects bounding box.

For moving objects with relatively high image-plane velocities this can produce a large, inefficient incursion perimeter requiring an expensive data-access visibility search. The present method avoids this inefficiency by setting maximum image-plane velocity for computing the incursion perimeter. Moving objects with an image-plane velocity in excess of this predetermined maximum value must remain on the primitive element reprojection list at all times. (For implementations employing sample reprojection actual primitives for such rapidly moving objects are transformed, clipped to the view volume and rasterized for each frame. Such an implementation combines both sample reprojection and primitive reprojection techniques).

The present method of computing an incursion perimeter for moving objects offloads from the renderer all primitives outside of the view volume until they are identified by a depth-prioritized, data-access visibility search conducted within specific incursion regions. This approach reduces the effect of overall database size on rendering performance and is a highly efficient solution when camera motion is relatively continuous and moving objects have limited image-plane velocities.

A second technique to allow the rendering of moving objects by reprojection deals with the difficult issue of the emergence of moving objects. The emergence of moving objects from behind previously occluding objects is not limited to the previously defined emergence regions that can be identified by occlusion transitions in the depth buffer. These emergence regions are only guaranteed to contain the exposure of static objects from behind other (static or moving) objects. In existing reprojective methods the emergence of moving objects is problematic because their emergence is not confined to reprojection holes. One extreme solution to this problem was offered by the method of Adelson and Hodges (IEEE Computer Graphics and Applications, May 1995, pp 43–52). In this solution the visibility of every closest reprojected sample is actually verified by ray casting. The need to verify every closest sample is a very expensive solution that limits the utility of existing reprojective methods.

In the present technique, to allow the rendering of moving objects, elements (primitives or samples) that belong to moving objects are classified as non-occludable. Unlike occludable elements non-occludable elements are not removed from the local display list when they are completely obscured by overlying elements. By retaining non-occludable elements in the local display list(s) their emergence from behind occluding elements need not be solved using a visibility search method and the problem of uncertain emergence regions for moving objects is eliminated. In the present method moving objects may be classified as both non-occludable and occluding. This classification allows moving objects to occlude occludable elements and cause them to be removed from local display list(s). Thus although elements from moving objects are not removed from the element reprojection list when they become invisible by occlusion, they can cause occludable elements to be removed from the list and thereby function as effective occluding elements. In this manner the present method of image generation allows elements from moving objects to participate in the reprojective process in a partial but substantial way.

The visibility of occluding, non-occluding, occludable, and non-occludable elements is resolved by specific write protocols for the multilevel depth buffer. These protocols are now described in detail. They are described in connection with the present method of primitive reprojection in which primitives are the reprojected elements. These methods can also be employed by reprojective rendering systems in which samples are the reprojected elements.

In accordance with the previously described object classification system based on the dynamic occlusion properties the classification definitions are:

Occluding Object: Capable of occluding other objects.
Non-Occluding Object: Not capable of occluding other objects.
Occludable Object: Object that may be occluded by an occluding object.
Non-occludable Object: Object that may not be occluded by an occluding object.

In the present method objects are classified both by their ability to occlude other objects (i.e. obscure other elements and cause the obscured elements to be removed from the element reprojection list) and by their ability to be occluded (obscured and removed from the element reprojection list). This classification system results in 4 possible object classes:

1. Occluding, Occludable (OcOc)—E.g., static object with high dynamic occluding efficiency.
2. Non-Occluding, Occludable (NoOc)—E.g., static object with low dynamic occluding efficiency.
3. Occluding, Non-occludable (OcNo)—E.g., moving object with high dynamic occluding efficiency.
4. Non-occluding, Non-occludable (NoNo)—E.g., moving object with low dynamic occluding efficiency.

When resolving visibility among samples from OcOc, OcNo, NoOc, and NoNo objects, the previously described multi-level depth buffering is used. In this case the visibility of samples from all classes of objects is computed using a multilevel depth buffer in which the sample write, overwrite, and depth comparison operations depend upon the classification of the source object. For implementations that employ primitive reprojection, samples are rasterized into the multilevel depth buffer from primitives in the primitive reprojection list. For implementations that employ sample reprojection, samples are both reprojected into the buffer (from the sample reprojection list) and written to the buffer by visibility tracing.

The four classes of objects result in 16 possible types of occlusion relationships. The occlusion relationship is determined and the depth buffer is modified for each sample according to the logic of the three flowcharts of FIGS. 39–41. In each case the occlusion relationship is established by first determining the depth order of the tested sample within the corresponding element of the sample buffer. An insertion sort of the current sample is performed with the sort details determined by the object class of the current sample and other samples in non-occluded levels of the buffer.

The depth-comparison operations of the present method serve two functions. The first function is to identify the closest visible sample for display purposes. This is the functional goal of conventional z-buffer methods. A second function of depth comparisons in the multilevel depth buffer is to identify occluded elements which can be removed from the element reprojection list. For implementations that employ sample reprojection, occluded occludable samples may be removed from the sample reprojection list. In the case of primitive reprojection primitives can be removed from the primitive reprojection list (sub-image or image) if the source object is occludable and if no samples from the primitive are exposed in the relevant (sub-image or image) region of the buffer. This is determined by the previously described read operation of the non-occluded levels of the multilevel depth buffer after all primitives have been rasterized. Thus for primitive reprojection overwriting or other removal of a sample in the multilevel depth buffer does not necessarily cause the corresponding primitive be removed from the primitive reprojection list. The depth buffer requires multiple layers so that the non-occluding, occludable objects can be represented as overlapped in the buffer. This is necessary to determine exactly which NoOc elements are occluded by any occluding object. This is determined by writing occluding samples to the buffer using a depth insertion sort such that an occluding sample will occlude samples deeper than it but will not affect non-occluding samples closer than it. The principle motivation of the multilevel depth buffer is to allow the determination of occlusion for occludable elements (e.g., primitives). In any case in which an occluding sample overwrites an occludable sample, the occludable sample, and all deeper non-occluded samples, are considered to be occluded. Subsequent read of the non-occluded levels of the buffer will establish actual occlusion of a primitive by the previously described method. Element occlusion need not be computed for each frame. Instead the frequency of determining element occlusion (e.g., primitive occlusion) can be selected to prevent the accumulation of occluded primitives in the display lists. When primitive occlusion does not need to be computed then the depth buffer write protocols revert to the simple z-buffer case. The multilevel depth buffer write protocols for determining occlusion among the four classes of objects is now described.

Figure 39:
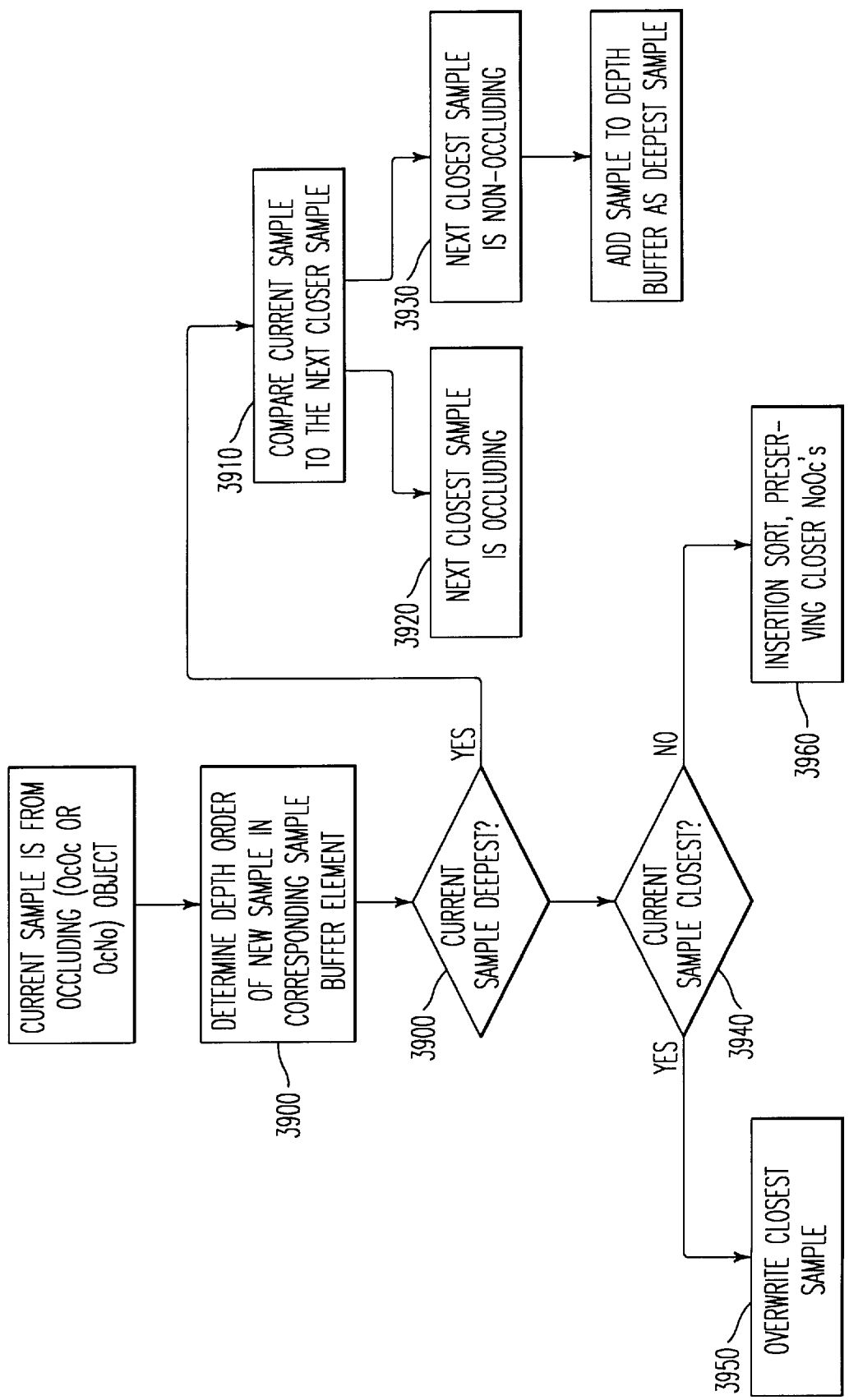
FIG. 39 is a flowchart showing the processing when depth buffering samples from Occluding/Occludable (OcOc) and Occluding/Non-occludable (OcNo) Objects.

The case of writing samples to the multilevel depth buffer from an occluding element is described by the logic of FIG. 39. At any location of the buffer the "deepest" sample of the buffer is considered to be the occluding sample with the greatest world Z value (most distant from viewpoint). Therefore occluding samples are inserted into the corresponding element in the depth buffer in such a way as to, by definition, occlude deeper samples of any type. Occluding samples do not affect overlying (less deep) non-occluding samples at the same location of the buffer. Thus in the logic of FIG. 39, in a first step (3900) the depth order of the current sample is determined relative to other samples that have been written to the same buffer location for the current frame. If the sample is determined to be the deepest (most distant from viewpoint) of all samples at this image-space location in the buffer then control passes to step 3910. In step 3910 the current sample is compared to the next closest (nearer to viewpoint) sample at the same image-space location. If the next closest sample is determined to be from an occluding object then control passes to 3920 and the current sample is not written to the buffer. Determination of the classification of the source object during this process is made by reading the "object_class" field of the equivalent C data structure "sample_buffer_sample" shown in FIG. 19. If, on the other hand, the process of step 3910 determines that the next closer sample is from a non-occluding object then control passes to step 3930 and the current sample is written to the depth buffer at the determined depth level. In this case the sample is not occluded by the closer non-occluding sample. Returning to step 3900, if the current sample is not the deepest sample then control passes to the decision step 3940. In this step the depth of the current sample relative to the closest sample is determined. If it is determined that the current sample is the closest then control shifts to step 3950 and the current sample is written to the closest level of the buffer, overwriting the previous sample. If, on the other hand, it is determined in step 3940 that the current sample is not the closest then control shifts to step 3960 and the current sample is inserted into the list of samples in such a manner that closer non-occluding samples are unaffected. By writing an occluding sample over the non-occluding all deeper non-occluding samples are effectively overwritten. This is because on the read of the depth buffer used to establish primitive occlusion (e.g., step 1570 in FIG. 15) no samples deeper than an occluding sample are read. Note that while non-occludable samples are always overwritten by closer samples; this does not effect the determination of occlusion during the subsequent read of the non-occluded levels of the depth buffer because non-occludable primitives are explicitly exempt from occlusion. This fact makes non-occludable samples in the buffer significant only if they are occluding other (occludable) samples.

The depth sorted organization of the buffer allows rapid determination of which NoOc samples are occluded by OcOc or OcNo samples by inserting the occluding sample in depth order and removing all NoOc deeper than the occluding sample.

As occluding samples cause the invalidation of all occludable samples at deeper levels of the buffer the maximum number of levels required by the buffer is equal to the maximum number of overlapping Non-occluding, Occludable (NoOc) objects at any isotemporal slice (frame) of the image stream. This is generally far fewer levels than is required by the previously described Talisman architecture in which every object is allocated its own "level" in an object-based image composition scheme.

Figure 40:
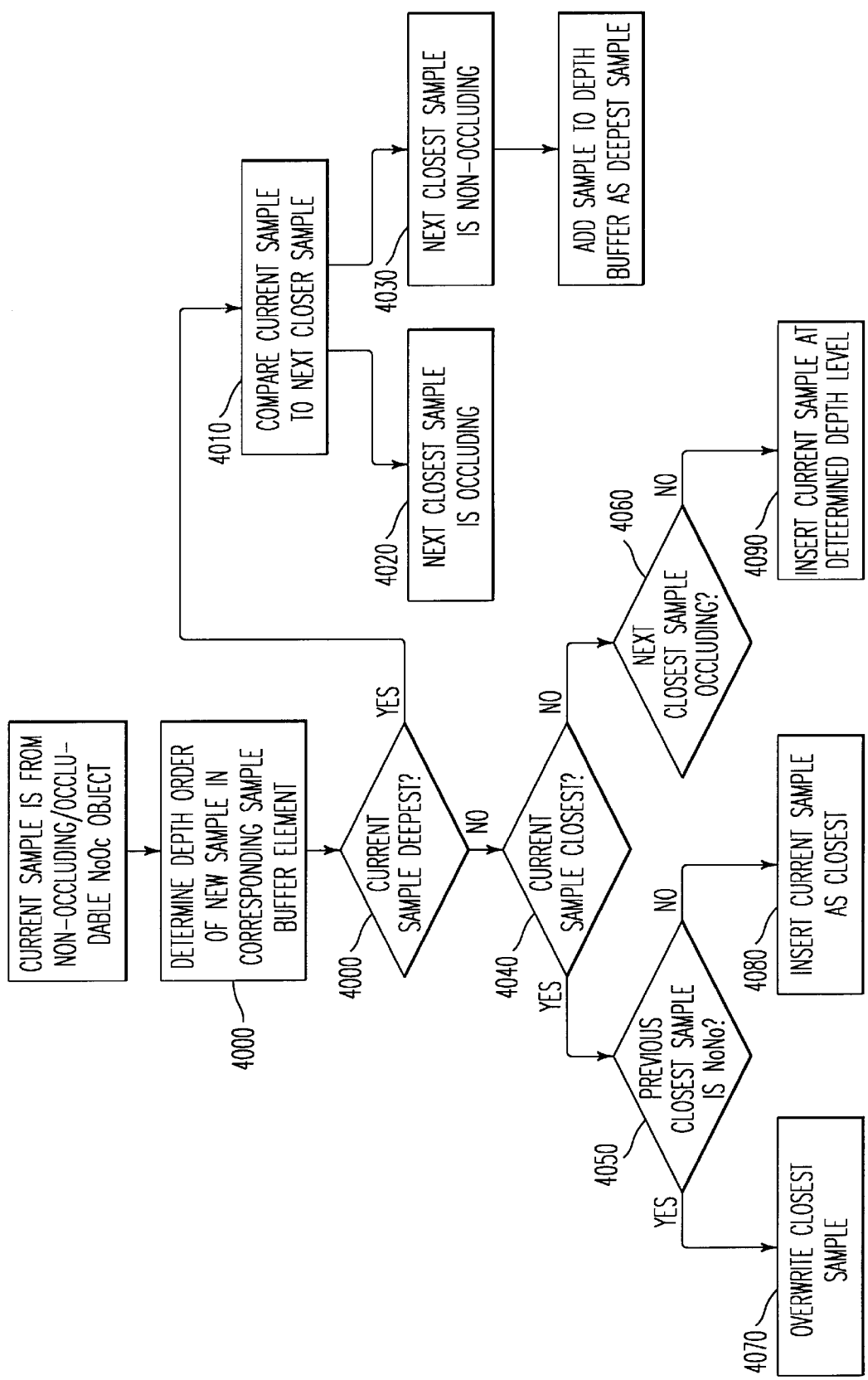
FIG. 40 is a flowchart showing the processing when depth buffering samples from Non-Occluding/Occludable (NoOc) Objects.

Non-Occluding, Occludable samples are written to the buffer according to the logic of FIG. 40. In a first step, 4000 the depth order of the current sample is determined relative to other samples that have been written to the same buffer location for the current frame. If the sample is determined to be the deepest (most distant from viewpoint) of all samples at this image-space location in the buffer then control passes to step 4010. In step 4010 the current sample is compared to the next closest (nearer to viewpoint) sample at the same image-space buffer element. If the next closest sample is determined to be from an occluding object then control passes to 4020 and the current sample is not written to the buffer. If, on the other hand, the process of step 4010 determines that the next closer sample is from a non-occluding object then control passes to step 4030 and the current sample is written to the depth buffer at the determined depth level. In this case the sample is not occluded by the closer non-occluding sample.

Returning to step 4000, if the current sample is not the deepest sample then control passes to the decision step 4040. In this step the depth of the current sample relative to the closest sample is determined. If it is determined that the current sample is the closest then control shifts to step 4050. In the decision step 4050 it is determined if the previous closest sample is a NoNo sample. If so, control passes to step 4070 and the sample is overwritten, otherwise control passes to step 4080 and the current sample is inserted in front of the previously closer (NoOc) sample. Note that because the current sample is non-occluding this step does not redefine the deepest level of the buffer and valid samples deeper in the buffer are unoccluded.

Returning to step 4040, if the current sample is determined not to be the closest sample then control shifts to decision step 4060. In step 4060 it is determined if the next closest sample is from a source object that is occluding. If not then control shifts to step 4090 wherein the sample is inserted into the depth buffer sample position at the determined level of the buffer using an insertion sort. Returning to step 4060, if it is determined that the next closest sample is from a source object that is occluding then the current sample is not written to the multilevel depth buffer.

For implementations which employ primitives as the reprojected elements the preceding logic is adequate to manage the writing of non-occluding samples into the augmented depth buffer by rasterization. For implementations that employ samples as the reprojected elements the logic of FIG. 40 needs to be modified somewhat. The intrinsic image-space to object-space organization of rasterization insures that no more than one sample from each primitive occurs in a single image-space sample position. When samples are used as the reprojected elements instead of primitives, however, samples from the same primitive tend to overlap with a high depth complexity as the primitive approaches an "edge on" orientation. Retaining all of these samples in the depth buffer would require it to have a potentially large number of levels, making storage requirements for the buffer prohibitive. Therefore for implementations of the present technique which employ samples as the reprojected elements, when a non-occluding sample maps to the same location of the depth buffer as another non-occluding sample but with a deeper depth then the deeper sample is NOT written to the depth buffer. Instead the depth buffer is written with a special value in a data field equivalent to the "multiple" field of the C language data structure "sample_buffer_sample" in FIG. 19, indicating that more than one sample from the same Non-occluding, occludable primitive maps to this image-buffer location. Subsequent occlusion of this image-buffer location by an occluding sample would result in the removal of all of the samples that map to this location. This can be determined without an excessive number of depth levels in the buffer by searching the sample reprojection list and removing all samples with the same image-space x and y coordinates as the image buffer element that is occluded. While this is can be a relatively expensive process it often results in the removal of a substantial number of samples if the source primitive is in a near edge-on orientation. The actual search for overlapped samples in the sample reprojection list can be limited to cases when the source primitive is in a substantially "edge-on" orientation. In one implementation of the present method the data structure equivalent to the previously described "multiple" data field for the buffer element is modified to reflect the number of samples that currently map to the corresponding position of the buffer. When this number exceeds a predetermined value, occlusion of the sample position is followed by a search in the sample reprojection list for all samples reprojecting to the same image-space location in the buffer.

Figure 41:
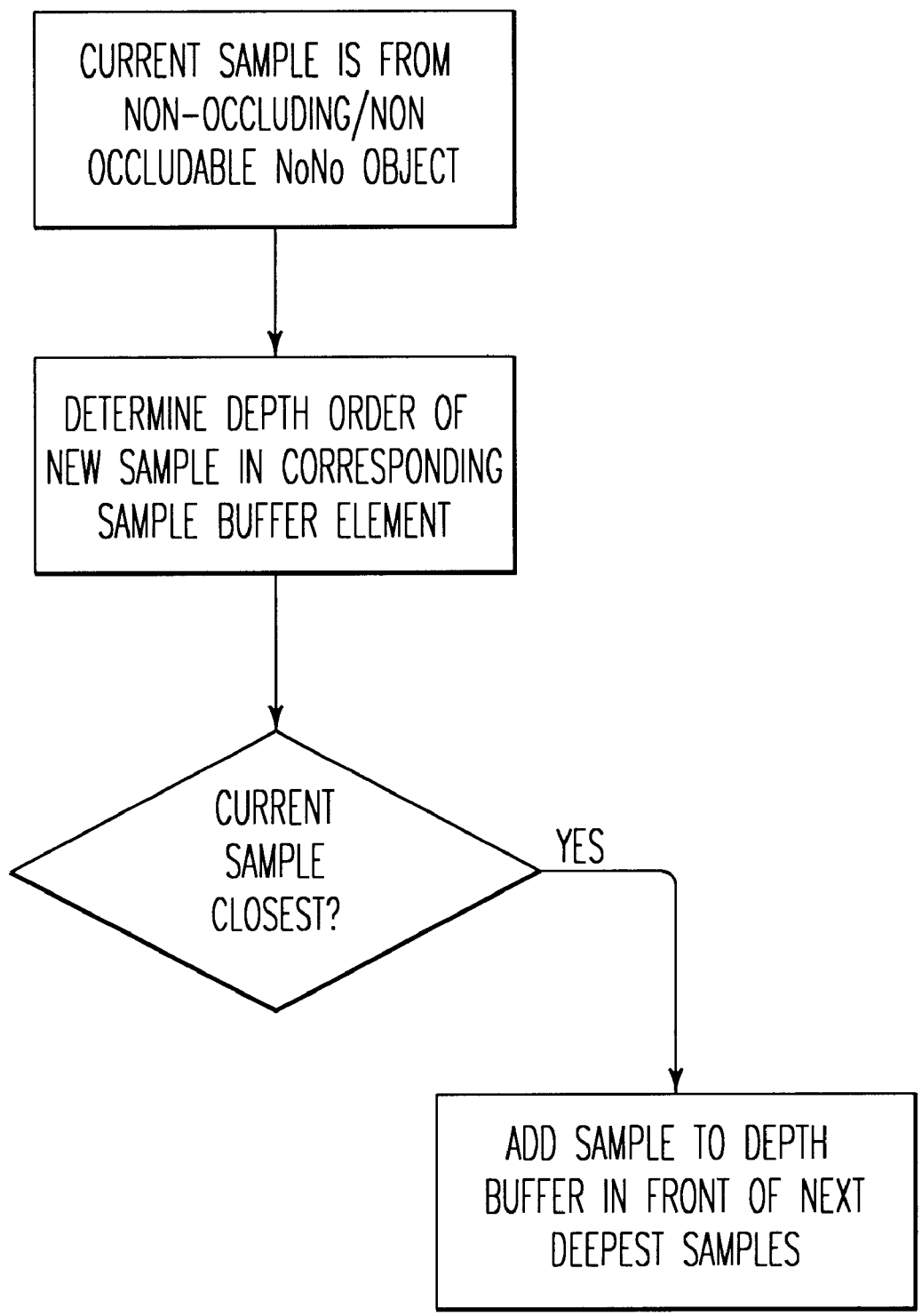
FIG. 41 is a flowchart showing the processing when depth buffering samples from Non-Occluding/Non-Occludable (NoNo) Objects.

A Non-occluding, Non-Occludable (NoNo) sample is written to the multilevel depth buffer only if it is the current closest sample in the corresponding buffer element. Since such samples neither occlude nor can be occluded they effectively do not participate in the reprojective visibility solution. In this respect the multilevel depth buffer functions as a conventional z-buffer for NoNo samples. The logic of writing NoNo samples to the depth buffer is shown in FIG. 41. This fact can be exploited when the number of overlapping NoOc samples exceeds the number of levels in the buffer by reclassifying some of the NoOc objects as NoNo thereby reducing the number of levels required.

NoNo objects include poorly occluding moving objects as well as static objects that are poorly occluding and poorly occludable. An example of the latter case is trees in a forest. As viewed from typical moving viewpoint trajectories (e.g., traveling along a road) trees are objects that have low occluding efficiency. Moreover from the typical viewpoint trajectory of a road, primitives comprising a model of trees in a forest are infrequently occluded by objects other than trees themselves, which generally have a low dynamic occluding efficiency from the roadway vantage point. As viewed from a moving vehicle the roadside forest has a very low temporal visibility coherence, producing a high rate of occlusion and exposure. Therefore by classifying tree primitives as non occluding and non-occludable the requirement for visibility search is dramatically reduced and the depth structure of the multilevel depth buffer is greatly simplified. Because these NoNo primitives belong to static objects (as determined by the data equivalent to the moving_or_not field of the C data structure primitive shown in FIG. 28) these primitives may be removed from local display lists when they outclip the corresponding subimage. This removal with subimage outclipping is possible because for the present method if such primitives actually outclip the entire viewport and are removed from all subimage display lists their subsequent reappearance in the viewport will be computed by the previously described method of visibility search (i.e., ray casting) in view volume incursion regions. Thus while these static NoNo objects do not participate in occlusion/emergence they can still be removed from display list with viewport outclipping, since they are properly identified by ray casting in view volume incursion regions if they later penetrate the view volume. This makes the performance of the present image generation method less affected by the overall size of the database than comparable image-parallel implementations of the object-order rasterization systems such as sort-first. In fact this case illustrates, once again, how the present method effectively solves the off-screen primitive problem encountered by sort-first: remove off screen primitives and find them when they come back into the viewport. In the case of trees in a forest the depth complexity of the model in the view volume incursion region can be quite high and the static occlusion coherence quite low. In this case the present method invokes the previously described technique of approximate beam tracing but without adaptive occlusion coherence search to effect a rapid search and complete search for tree primitives as they penetrate the view volume.

The present methods of class-specific multilevel depth comparison are extended to include a technique that exploits the especially high temporal visibility coherence created by a static camera (static viewpoint and view direction vector). Temporal visibility coherence can become very high when the image stream is dominated by static objects and the viewpoint and view direction vector become stationary. The following technique exploits this special type of temporal visibility coherence to reduce the cost of depth comparison operations.

During periods in which the camera is stationary, elements (primitives or samples) belonging to static objects (as determined by the "moving-or-not" field of the primitive/sample data structure) are not reprojected between temporal sampling intervals. During such periods all samples in the multilevel buffer with static source objects (as determined by the "moving-or-not" field of the "sample-buffer-sample" data structure) are initially copied from the current temporal sub-buffer to the alternate temporal sub-buffer. These stationary samples remain unaltered in both temporal sub-frames of the multilevel buffer until the viewpoint or view-direction vector begins to move.

For the first frame that the camera becomes stationary all moving objects classified as OcNo objects are optionally reclassified as NoNo objects. Any regions of the buffer containing samples from moving objects that are so reclassified undergo depth-prioritized search to identify background stationary objects that were previously occluded by the reclassified moving objects. Samples from such background stationary objects are written to both temporal sub-buffers in the manner previously described.

Subsequently all moving objects can be managed as NoNo's until camera motion begins. If all moving objects are reclassified as NoNo's then no occlusion or exposure occurs during the period when the camera is stationary. This eliminates the need for depth-prioritized search for newly visible elements and also obviates the need to scan the depth buffer for exposure regions and occlusion status.

In addition to depth comparison protocols that are specific to object class, the present method includes object class specific techniques of depth-prioritized visibility search. In the normal execution of visibility search in exposure regions (e.g., by ray casting) the depth search is terminated when an element from an occluding (e.g., OcOc) object is encountered. Alternatively when a ray intersects an element from a non-occluding object (e.g., NoOc) the ray is further walked into the database until an occluding object is encountered or until the ray exits the database. In this way a Non-occluding object does not occlude the search for more distant newly-visible primitives behind it. In the case of visibility tracing through a non-occluding object, backfacing primitives are not excluded from ray-primitive intersections. This prevents a non-occluding object from self-occluding. Non-occluding, occludable (NoOc) and NoNo objects are not allowed to self occlude during visibility tracing because such objects do not subsequently produce an exposure trail during reprojection. This would prevent previously self-occluded elements from later being detected as newly visible in a silhouette exposure region. Because "edge-on" primitives for non-occluding objects can be missed in the initial visibility search, the special depth buffer technique for locating the self-exposure regions of non-occluding objects is employed as previously described. Alternatively the initial detection of "edge-on" primitives can be guaranteed by including all "edge-on" primitives (determined by a surface normal substantially orthogonal to the search ray) present in every cell encountered during the ray walk.

The present method includes a special depth-buffer technique for managing a problem that can occur because non-occluding objects do not result in a self exposure trail in the buffer. In the current method non-occluding objects do produce self occlusion. During a search for newly visible elements in exposure regions, the forward facing primitives of a non-occluding convex object do not prevent the identification of backward facing primitives that would actually be obscured by the object's closer primitives. If newly visible elements (primitives or samples) are actually identified by ray-primitive intersection then "edge-on" primitives along the objects terminator are easily missed. In the present method non-occluding objects do not produce an exposure trail as previously defined by a depth buffer transition from one convex object to a more distant convex object. Without an exposure trail previously undetected "edge-on" terminator primitives would not subsequently be detected.

Figure 43B:
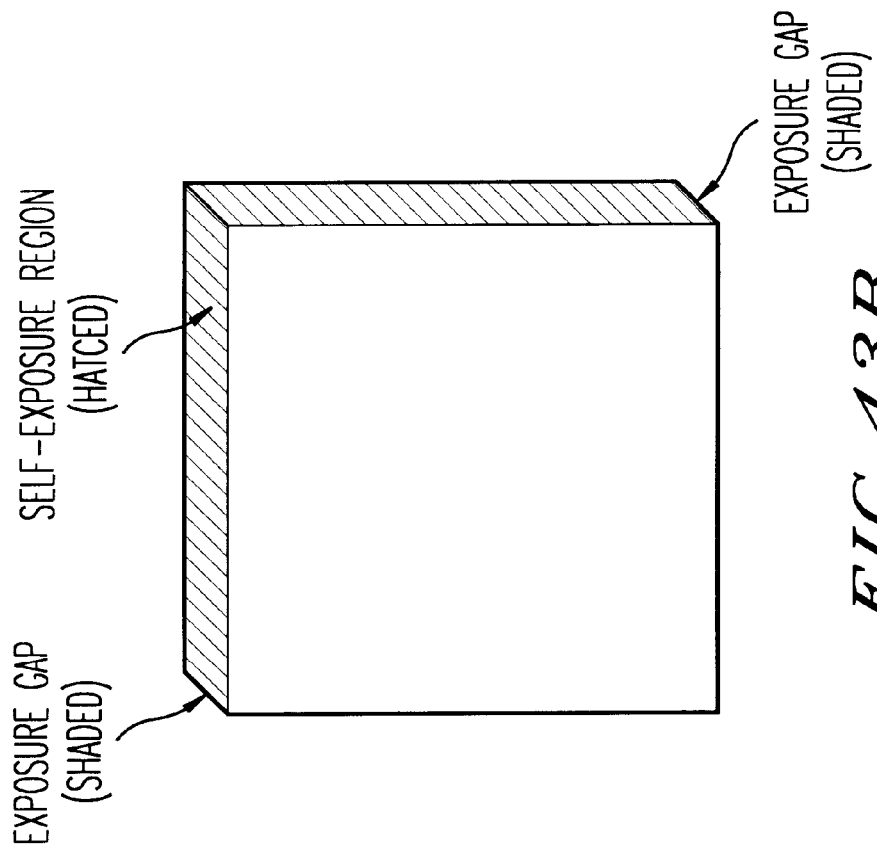
FIGS. 43A and 43B are illustrations showing how self-exposure regions of non-occluding objects are generated.
Figure 43A:
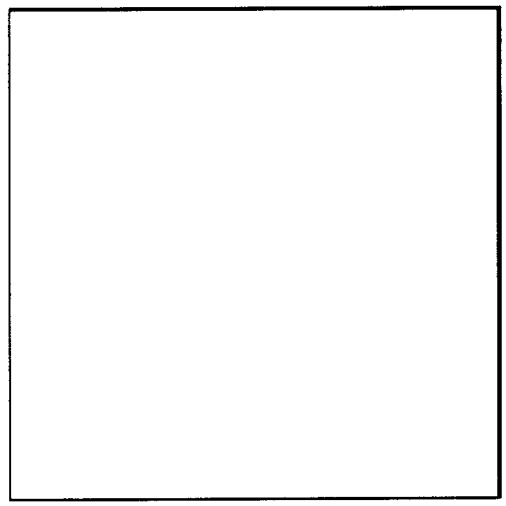

The present method includes a depth buffer technique by which the limited self-exposure trail caused by a non-occluding object's changing terminator can be identified. Such a trail is shown in FIG. 43B. In this technique a self-exposure trail is defined in the depth buffer for regions of the buffer that have backward facing samples from a non-occluding object without overlying forward facing samples from the same object. Such regions in the buffer define a region of potential self-exposure and are searched for previously undetected "edge-on" primitives or samples on the object's terminator. This search is conducted by using one of the depth-prioritized search techniques of the present invention. Like other emergence regions, this object's self-exposure region is susceptible to the previously described exposure errors caused by finite temporal sampling. The previously described techniques of temporal supersampling and concavity analysis can be applied to reduce the size of gaps in the object's self-exposure trail.

As previously described, the object classification system based on dynamic occlusion properties is used to determine how primitives are rasterized into an augmented multilevel depth buffer and how ray-primitive intersections are treated during visibility tracing in exposure search regions. These object classification and associated multilevel depth comparison methods can be employed to increase the accuracy, efficiency and versatility of reprojective image generation. The classification of objects has a low computational cost and can often be precomputed for specific objects based on their expected occluding properties (e.g., jail cell bars: non-occluding, walls: occluding).

The object classification method allows visible surface determination to be computed by an efficient combination of conventional object-order rasterization in which all graphic elements are retained despite visibility; and reprojective rendering in which invisible elements are removed from the display list.

In the extreme case of reclassifying all objects as NoNo and not computing view volume incursion, parallel implementations of the present method (specified in the next section of this disclosure) are equivalent to sort-first image generation systems. While the strictly sort-first approach does not have the scalability and potential performance of the primitive reprojection method it is amenable to immediate-mode operation since it does not require a pre-computed spatial subdivision. Such immediate-mode capability is necessary for modeling and other applications in which the geometry of the graphic database objects is substantially modified, rather than simply moved or visualized. Thus, the multiprocessor architectures specified for primitive reprojection in the present disclosure are capable of supporting both an immediate-mode and a highly optimized non-immediate mode operation by simply reclassifying the database objects and activating additional steps (e.g., 1540–1570) in the image generation process. This allows a single hardware unit, implementing the present method of primitive reprojection, to be used as a conventional immediate-mode graphics systems for such applications as modeling as well as a highly optimized non-immediate mode system for advanced visualization and simulation applications.

The previously described methods of the present invention enhance the accuracy, efficiency, and versatility of the reprojective approach to image synthesis. Together with the implementation architectures described in the next section, these methods allow reprojection to be practically applied to real-time image generation. In so doing they permit the real-time image generation process to exploit a powerful type of temporal visibility coherence that has hitherto not been used in the real-time generation of images.

Image-Parallel Multiprocessor Implementations

Although it is possible to use a uniprocessor embodiment of the present invention, the present method is ideally suited to image-parallel implementations on multiprocessor systems employing cached shared memory architectures. The natural temporal coherence of the image stream limits the rate of primitive redistribution and creates a corresponding temporal locality of data reference that reduces the demand on the shared memory interconnect. Likewise the temporal coherence of the image stream limits the motion of exposure and incursion regions and thereby creates a corresponding temporal locality of data reference for ray casting. This temporal data coherence is enhanced for both processes by the method's dynamic load balancing strategies in which sub-image windows are caused to substantially track local optical flow. These dynamic load balancing techniques are described in greater detail later in this specification. In light of the relatively low communication cost of the method, the method can be implemented on general purpose cached central shared-memory or distributed shared-memory multiprocessor architectures. In such parallel implementations the architecture is effectively image-parallel wherein each processor completely renders an assigned sub-image 1300, as shown in FIG. 13A. In the parallel architecture shown in FIG. 13B, sub-image processors are assigned to one or more rectangular sub-image windows which comprise a tiling of the image viewport. Sub-image primitive display lists representing the visible primitives in each sub-image are initially determined by classifying each primitive in the database to the sub-images 1300, rasterizing and analyzing the final visible sub-image samples. Alternatively the initial redistribution of primitives can be effected by the adaptive visibility tracing (e.g., ray casting) search strategy. In light of the newly available Non-Uniform Memory Access (NUMA) machines that implement Distributed Shared Memory using the Scalable Coherent Interface (SCI), a NUMA SCI-based DSM configuration is the preferred embodiment for a parallel implementation of primitive reprojection according to the present invention. The IEEE Standard for Scalable Coherent Interface (SCI) is IEEE Std 1596–1992 and is incorporated herein by reference. Alternate embodiments include a centralized memory shared memory multi-processor (SMMP) that is bus-based; however, such an architecture does not scale as well as the DSM, SCI implementation. In addition, a pipelined implementation using either hybrid message passing or shared memory is also possible.

Figure 17:
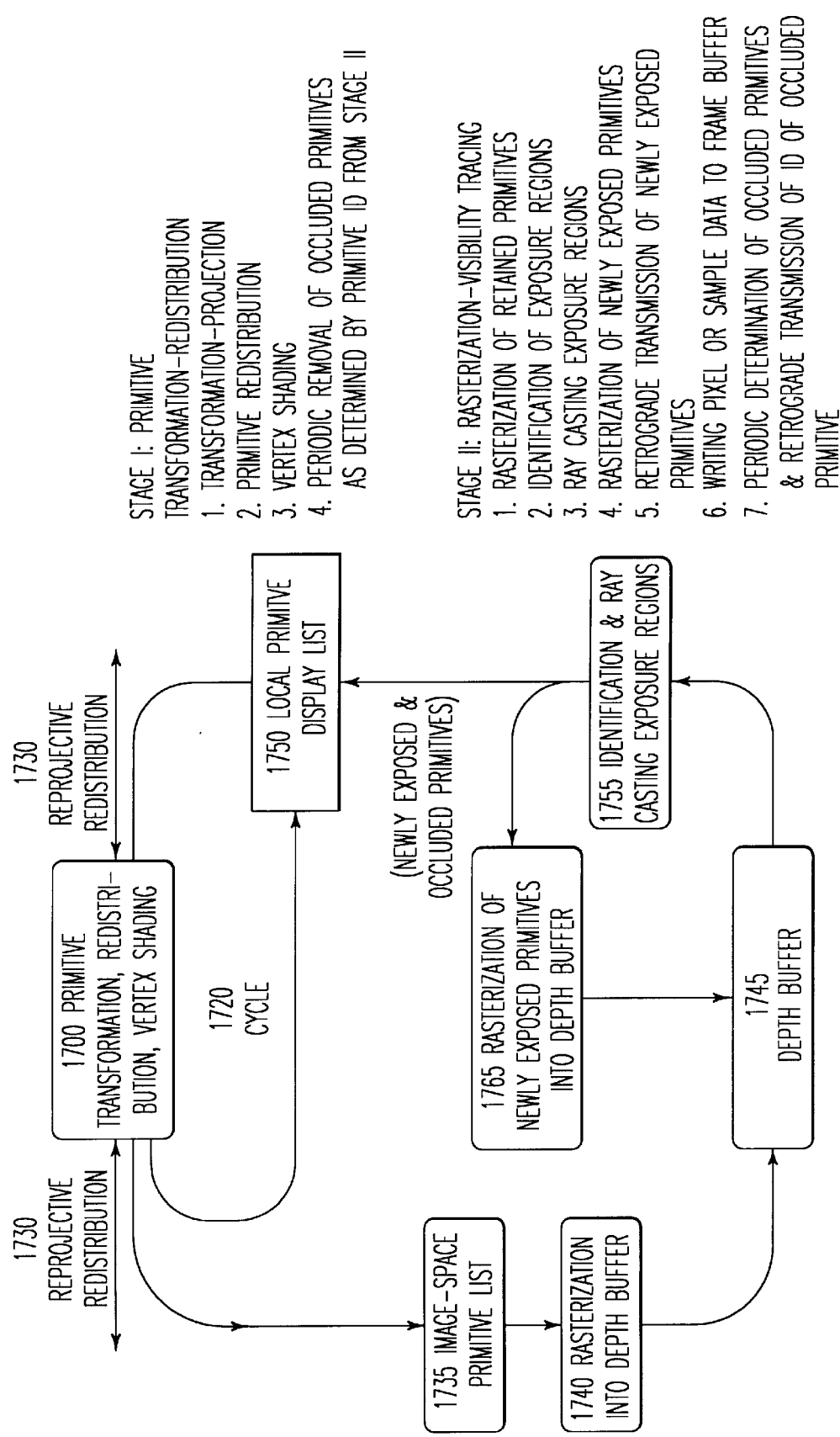
FIG. 17 is a flow diagram showing one embodiment of how the primitive reprojection and visibility tracing are split into two stages.

FIG. 17 is a schematic representation of one embodiment in which the processes of primitive transformation and primitive rasterization are split into two pipeline stages. In the first stage primitives in local display lists (e.g., 1750) are transformed and converted into image-space representations which undergo shading of vertices, all of this occurs in the process represented as step 1700 in FIG. 17. Object-space primitives are redistributed among stage I subimage geometry processors in steps 1730 using efficient techniques of primitive classification and redistribution that will be described in this specification.

These transformed image-space primitives are passed to a second stage where they undergo rasterization in step 1740. Each image-space primitive transmitted to stage II is transmitted along with its corresponding index location in the first-stage local primitive display list, 1750. Primitives transmitted to stage II from stage I processors are stored in an image-space primitive list, 1735. Following rasterization of all primitives, the subimage depth buffer, 1745, is processed in step 1755 to identify exposure regions by the methods previously described. Subsequently ray casting or beam casting is performed in these exposure regions, also shown as part of step 1755, in the second stage to effect the visibility search for newly exposed primitives. This process identifies newly visible primitives which are transformed and rasterized into the subimage depth buffer in step 1765. Following the rasterization of the newly visible primitives the subimage is complete. Primitives identified as newly visible are passed in a retrograde fashion to stage one to be added to the local primitive reprojection list 1750. An additional step is periodically conducted in stage II following step 1765. This step is the previously described read of the depth buffer, here 1745, to identify occluded primitives. This step employs the data structures of 1745 and 1735 which is the local image-space primitive list. In this process primitives in 1735 that are not represented by any samples in non-occluded layers of the buffer are considered to be newly occluded for the subimage. The index of these primitives in the stage I (which were transmitted to stage II along with each primitive) are transmitted in a retrograde fashion to stage I where the corresponding primitives are removed from 1750.

Figure 18:
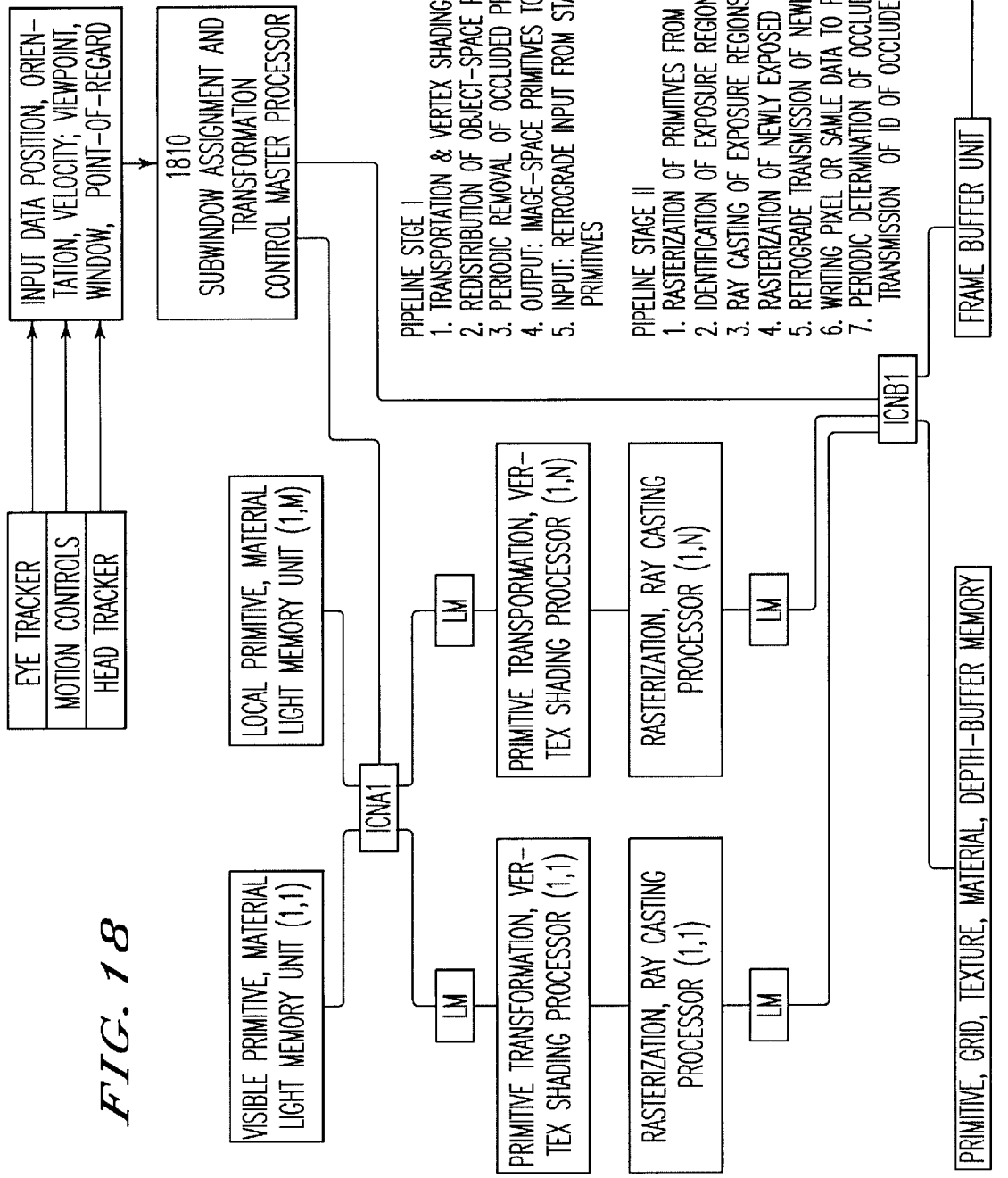
FIG. 18 is a block diagram showing an embodiment of a multi-processor system according to the present invention.

The above two stage primitive reprojection cycle of FIG. 17 is implemented according to one embodiment of the present invention as shown in FIG. 18. The two stage cycle is implemented using a two stage pipeline with separate interconnection networks subserving primitive redistribution in one stage and rasterization—ray casting in a second stage. In common to both pipeline stages are data converted by sampling external sources, e.g. eyetracker, motion controls, and a head tracker. The data is applied to a subwindow assignment and transformation control master processor, 1810. In addition, a first interconnection ICNA1 provides for the distribution of local display list primitives, material, and light parameters stored in a distributed set of shared memory units (1,1) through (1,M). In the first pipeline stage ICNA1 sends this data to local memories assigned to Primitive Transformation and Vertex Shading Processors. Redistribution of local display list primitives among stage I processors occurs through the first-stage ICNA1 interconnect.

With this local primitive, material, and light data, the first pipeline stage performs the steps of: 1)transformation and vertex shading of primitives in the local primitive display list, 2) redistribution of object-space primitives to other stage I processors, 3) periodic removal of occluded primitives from local display list (based on information supplied from stage II) 4) outputting transformed, vertex-lighted image-space primitives, and 5) receiving newly visible primitives from the second pipeline stage. After having received the results of the first pipeline stage, the second pipeline stage performs the following 7 steps: 1) Rasterization of primitives received from stage I, 2) identification of exposure regions, 3) ray casting of exposure regions in the depth buffer to identify newly exposed primitives, 4) rasterization of newly exposed primitives, 5) passing back newly exposed primitives determined by ray casting to stage I processor, 6) writing pixel or sample data to frame buffer unit, 7) periodic determination of occluded primitive and passing back the indices of occluded primitives in the Stage I display list. (The index location of each stage II primitive in the corresponding stage I object-space display list was passed with the image-space representation of the primitive from stage I). Data required for ray casting including primitive, spatial subdivision grid data is accessed using a second interconnection network ICNB1. This interconnection network is also used to supply material and texture data for rasterization. This data is stored in one or more memory units accessible by the second stage processors through the ICNB1 interconnection. Additionally the frame buffer unit is written to using the second interconnection network.

In a two stage pipelined embodiment the connection between stage I and stage II processors is subserved by a dedicated, special communication channel between corresponding stage I and stage II subimage processors. The scheduling of interstage communication is simplified by the described sequencing of the primitive reprojection cycle. This cycle results in specific communication phases in which during a first phase, processed primitives from stage I are communicated to stage II. In a second phase the same communication channel is later used to transmit newly visible primitive information from stage II to stage I. The control of this communication employs a small subset of instructions and services specified by a known interprocessor communication protocol, MPI (message passing interface) implemented as extensions to the processor's instruction set or through auxiliary ASICs.

In one embodiment the second stage processors are connected by a high speed crossbar interconnection fabric (ICNB1) based on distributed shared-memory SCI system for directory based cache coherency. This stage is a general purpose, high performance multiprocessor. In this example embodiment the first stage employs a bus-based interconnection between stage I processors (ICNA1) which are also general purpose microprocessors with instructions supporting fast geometric transformation of vertices as well as a general instruction set and cache-coherency services. In this embodiment the first stage processors and associated bus effectively functions as an auxiliary graphics subsystem supporting transformation, vertex lighting and redistribution of (mostly) visible primitives in the local display lists. In this embodiment the first stage interconnect employs a less expensive, if somewhat less scalable, bus-based interconnect. This type of an interconnect is sufficient to support interprocessor communication within the first stage because non-local memory accesses incurred during primitive redistribution are substantially limited by the natural temporal image coherence of the image stream (and further by optical-flow based load balancing techniques that are described below). This stage I subsystem is connected to the main multiprocessors of the second stage using the aforementioned interstage interconnections. In this embodiment the stage I subsystem serves effectively as an auxiliary primitive reprojection graphics subsystem which augments a more general-purpose multiprocessor architecture of stage II. Overall this implementation is scalable graphics architecture in which the number of processors in the special-purpose graphics subsystem (stage I) are increased to reflect the number of general-purpose multiprocessors on the main interconnection fabric (stage ID. In this embodiment the software implementation of the processes of primitive reprojection and the supporting hardware are optimized for both real-time image generation and non-real-time image generation. When employed for non-real-time image synthesis, for example during rendering of high resolution, photorealistic images for film, the software processes include sophisticated shading, illumination, and antialiasing methods that may not be computed during performance of real-time image generation. Alternatively these advanced rendering methods can be performed in real-time to produce a more limited resolution image suitable for real-time, photorealistic preview of computer animation. Because the graphics database is preprocessed using the technique of spatial subdivision into hierarchical grids which supports moving objects as separate grid structures (as described by Snyder and Barr), the present implementation allows interactive refinement of animation trajectories as well as lighting, material, and texture editing during the real-time display of the image sequence.

The visibility search techniques, exposure location methods, load balancing and other processes specified for the current invention are suitable to both real-time and non-real-time implementation. Consequently, unlike other dedicated real-time graphics systems, hardware embodiments of the present method can be employed to accelerate both real-time image generation and non-real-time photorealistic image synthesis.

In an alternative embodiment, actual ray tracing is performed in stage II for regions of the subimage depth buffer that require shadow determination, reflection, or refraction shading effects. This allows the incorporation of advanced shading and illumination effects that are difficult to achieve during rasterization. Although the present implementation employs busses as the interconnection network for stage I, alternative embodiments may employ crossbar or other types of interconnection networks for both stages.

Dynamic Load Balancing Based on Optical Flow

Load balancing is a critical implementation issue especially for image-parallel architectures that employ a processor-image mapping in which processors are assigned to relatively large contiguous subimages. Such architectures are susceptible to load imbalance as a result of uneven distribution of primitives within the image. Many sort-middle architectures avoid this type of imbalance by employing a rasterizer-to-image mapping in which each rasterizer is assigned to a set of pixels that is widely distributed or interspersed throughout the image buffer. In such systems the rasterizers tend to be naturally load balanced. However these architectures generally incur a very high communication cost to support all-to-all broadcast of primitives from geometry processors to rasterizers. This communication requirement makes such architectures less suitable for implementation on general purpose computer hardware.

A principle motivation of the present method is to reduce communication cost to a level that allows implementation on general purpose multiprocessor systems. A principle advantage of such an implementation is that it allows the incorporation of a number of dynamic load balancing methods that are generally not applicable to special-purpose hardware with hardwired communication channels between geometry processors, rasterization processors, and depth buffer units. Molnar recognizes the problem of load imbalance for sort-first architecture and suggested that a dynamic load balancing is required for an optimal implementation. A subsequent paper by Mueller in the Proceedings of the ACM Symposium on Interactive 3D Graphics 1995 suggested a dynamic load balancing based on adaptive screen decomposition. Recall that a principle motivation of the sort-first architecture is to exploit temporal image coherence to reduce the amount of primitive redistribution between processors. Toward this end, Molnar proposes that dynamic load balancing be constrained "so that each region [of the screen] is assigned to the same processor in successive frames".

The present method includes a somewhat different dynamic load balancing strategy which tends to constrain each processor to process the same set of primitives in successive frames. This is achieved by resizing and repositioning subimage windows in a manner that causes them to substantially track the primitives in their own local display list. This approach produces a greater degree of temporal subimage coherence and results in less primitive redistribution. This would, in principle, cause primitives to remain within the subimage of their origin throughout their lifetime in the image stream. At first glance, this seems to be a somewhat Quixotic adventure given the seemingly heterogenous and unpredictable character of optical flow on the image plane. In general optical flow on the image plane is heterogenous and is heavily influenced by the depth structure of the environment. In fact, however, there is generally more coherence and uniformity in the image-plane flow field of a typical image sequence than is generally realized. For the special, but important, case of viewpoint and view direction vector motion the image flow field contains at most four regions within which the direction of optical flow is relatively uniform for all static objects. The exact location of these quadrants is easily determined from the intersection of the viewpoint motion vector with the viewplane and the relative location of this intersection with respect to the viewport. This process is illustrated for several different viewpoint motion vectors and view frustrums in FIGS. 44–48. In FIG. 44A the case of congruent viewpoint motion vectors and view direction vectors is shown. In this case the viewpoint is moving exactly in the direction of view and the vanishing point is at the center of the viewport. The vanishing point is the intersection of two medians which divide the viewport into 4 equal quadrants. Within each quadrant the general direction of optical flow for static objects is relatively uniform and is indicated approximately by the arrowed vectors originating in the vanishing point. This case, viewpoint motion vector equal to view direction vector, is shown in FIGS. 45A–45D during camera motion in a three dimensional environment. From these series of images taken at regular displacement intervals of the viewpoint in the direction of view the pattern of optical flow is clearly seen. In this case the vanishing point is in the center of the viewport and corresponds approximately to the center of the pyramidal object "A". Within each quadrant defined by the intersection of the optical flow meridians, image elements flow in a uniform direction, generally with increasing velocity at decreasing distance (consistent with $dXi/dZ=-X/Z^2$).

A second case in which the viewpoint motion vector is not equal to the view direction vector is show in FIG. 46. In the case shown in FIG. 46 the view direction vector and the viewpoint motion vector both lie on a plane that is perpendicular to the world y (up) axis (y=0). These vectors are separated by an angle shown as angle "a" caused by a rotation of the view direction vector relative to the viewpoint motion vector. In the present method a simple trigonometric relationship is used to compute the location of the vanishing point within the viewport based on the angle between the viewpoint vector and the view direction vector (angle "a" in the figure). The Xi (image-space) value of the vanishing point in this case is:

$$Xi=D*\text{Tan}(a);$$

A corresponding relationship is applied to the angle formed by the two vectors lying in an orthogonal plane to compute Yi.

In this case the viewpoint still contains four quadrants within which the direction of optical flow is relatively uniform. In this case the position and size of the quadrants has been altered by the new position of the vanishing point. In addition the overall optical flow vectors within these quadrants are different than from the canonical case of FIG. 44. FIGS. 47A–47D show the same case as FIG. 46 for a series of images taken from a camera with viewpoint motion vector and view direction vector at a similar angle to that shown in FIG. 46. In this case the vanishing point is toward the right hand side of the viewport and corresponds, once again, to the center of the small dark pyramid "A". (This object is intersected by the viewpoint motion vector in both cases). In FIGS. 47A–47D the two optical flow quadrants to the left hand side of the vanishing point are large and the leftward (-Xi) optical flow within these two quadrants dominate the overall optical flow of the viewport.

FIG. 48 illustrates a third case in which the angle between the view direction vector and the viewpoint motion vector cause the vanishing point to be outside of the viewport. In this case the vanishing point is outside of the viewport and the viewport contains only two quadrants within which the optical flow of static objects is constrained to be substantially similar to the direction vectors shown emanating from the vanishing point.

In the present method the location of these quadrants is used in the assignment of subimage windows to the viewport and to direct the subsequent translation and scaling of subimage windows. Subimages that are completely within a quadrant will, in general, have a more uniform direction to their optical flow fields than subimages which overlap quadrants. In the present implementation of the method initial subimage window assignments are made based, in part, on the location of these optical flow quadrants. Additional information is used in the assignment of subimage windows and subimage processors to effect a task-adaptive load balance. This information includes information obtained during the generation of earlier frames indicating the computational load for each processor.

In the present implementation of the method the image-plane velocities of a representative set of samples is obtained for each subregion and a univariate optimization favoring the slower samples is applied to determine a subimage translation/scaling that produces a local minimum in relative optical flow within the subimage window. This optimization is based on the weighted net optical flow within the subimage as given by:

weighted net optical flow =

$$(|V1 - Vc|)*N1 + (|V2 - Vc|)*N2 + \ldots (|Vn - Vc|)*Nn,$$

where Vc is the estimated best velocity and Nn is the number of elements in the sampling with velocity approximately Vn (organized as buckets of samples with similar velocities). The value of $V_c$ is initially set to the slowest sample velocity in the subimage and incrementally increased until a local minimum in the weighted net optical flow is obtained. Both image-space dimensions are iterated in separate univariate or a bivariate manner to identify a local minimum. Note that the effect of moving objects is factored in the optimization. The parameter space can be explored beyond the first local minimum for lower minimum values but stopping at the first will preferentially favor tracking slower moving samples. If a subimage window is entirely within one of the optical flow quadrants then translation of the subimage window based on this simple optimization for optical flow of static objects is guaranteed to produce a greater subimage temporal coherence than a static subimage window.

This technique alone does not take into account the changing velocity gradients within the subimage. This effect is accounted for by the following method which provides differential scaling of the window to match the perspective expansion/contraction of the image elements. In this method the relationship between the velocities of representative samples and their location in the subimage is determined. This relationship reflects acceleration of optical flow in a specific direction on the image plane and is used to estimate a scaling of the subimage window that is employed together with translation to more accurately track elements within the window and further reduce the net subimage optical flow. In one implementation of this technique the previously described method of locating a local minima for net subimage optical flow is employed wherein the initial estimate of $V_c$ uses the velocity of samples in the fastest bucket. The locally optimal solution in this case reflects the velocity of the subimage that would substantially track the fastest moving elements in the subimage. This determined velocity is used as the translation velocity for the borders of the subimage closest to the most rapidly moving elements. In this technique the optimization determination using an initial estimate of $V_c$ as the slowest samples is used to determine a translation velocity for the borders of the subimage window nearest the slowest moving elements. The differential translation of subimage window borders by this technique effectively produces a scaling of the subimage window that substantially tracks the expanding elements within the subimage window.

A further technique of the method is to use the optical flow meridians and vanishing point as "anchor points" or anchor edges to which the subimage windows are initially attached. In these regions the velocity of optical flow for static objects is often relatively low for the case of forward motion and the subimages are initially scaled to track the optical flow. As the area of the subimage window increases to a predetermined maximum value (that reflects the computational cost of processing the subimage) the subimage is "detached" from the meridian and translated in the direction of optical flow. As the subimage window intersects the viewport it is clipped to the viewport which decreases its size and the computational load of the corresponding subimage processor. As the size of the subimage decreases the corresponding subimage processor is assigned an additional "attached" subimage window that is undergoing expansion on or near a meridian. For motion in the direction of view this establishes a general pattern of subimage motion and growth from the region of the vanishing point and meridians is established that substantially approximates the optical flow field for forward motion. The reverse pattern is established for reverse motion of the eyepoint.

Figures 1, 2, 3, 4, 44B:
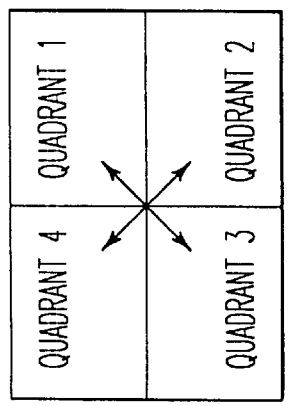
FIG. 44B is an illustration of a dynamic load balancing technique wherein subimage windows are translated and scaled to substantially track the optical flow of elements within the subimage windows for the case described in FIG. 44.
Figure 45A:
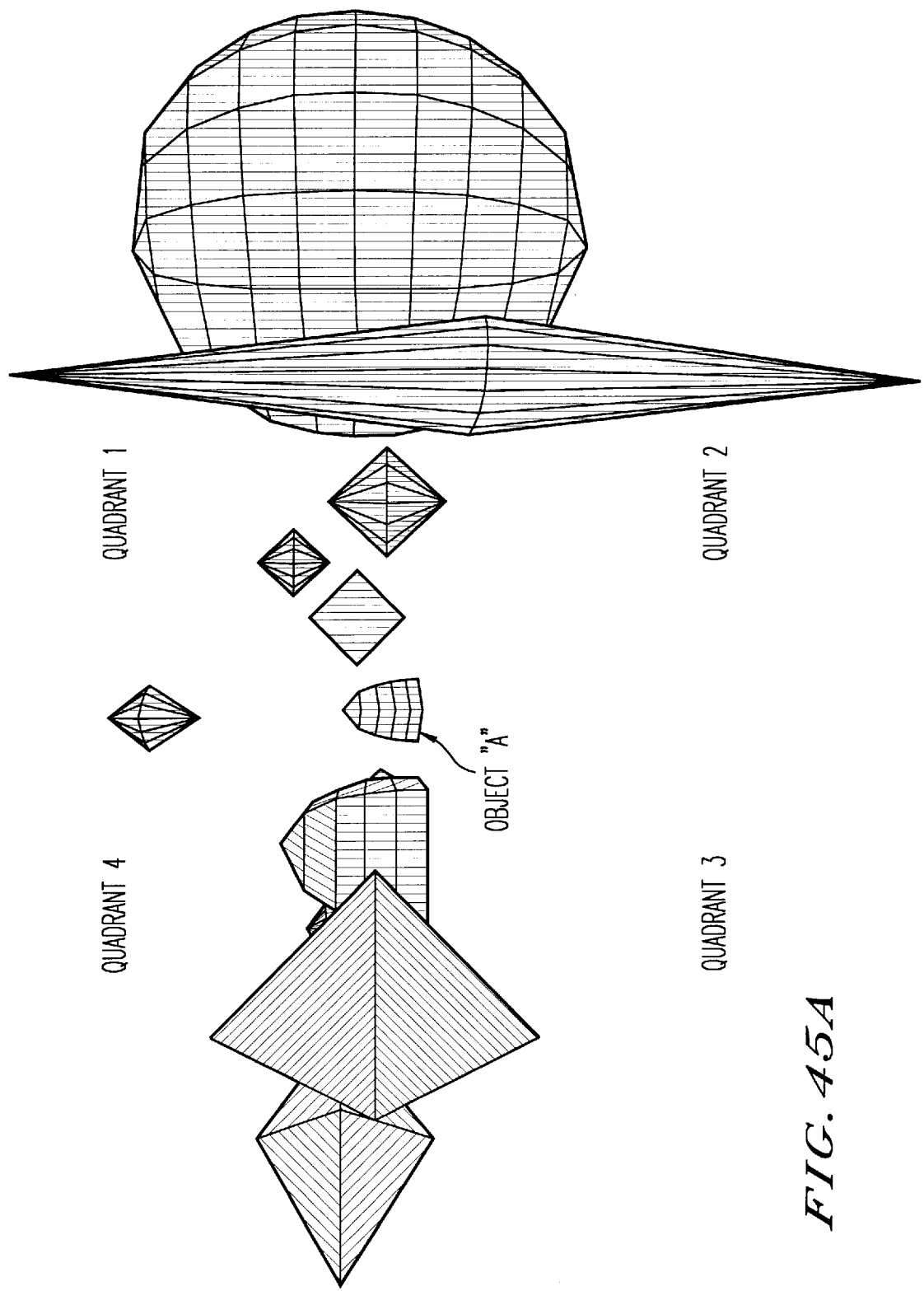
FIGS. 45A through 45D are a series of display frames of a scene where the viewpoint motion is the same as described in FIG. 44.
Figure 45B:
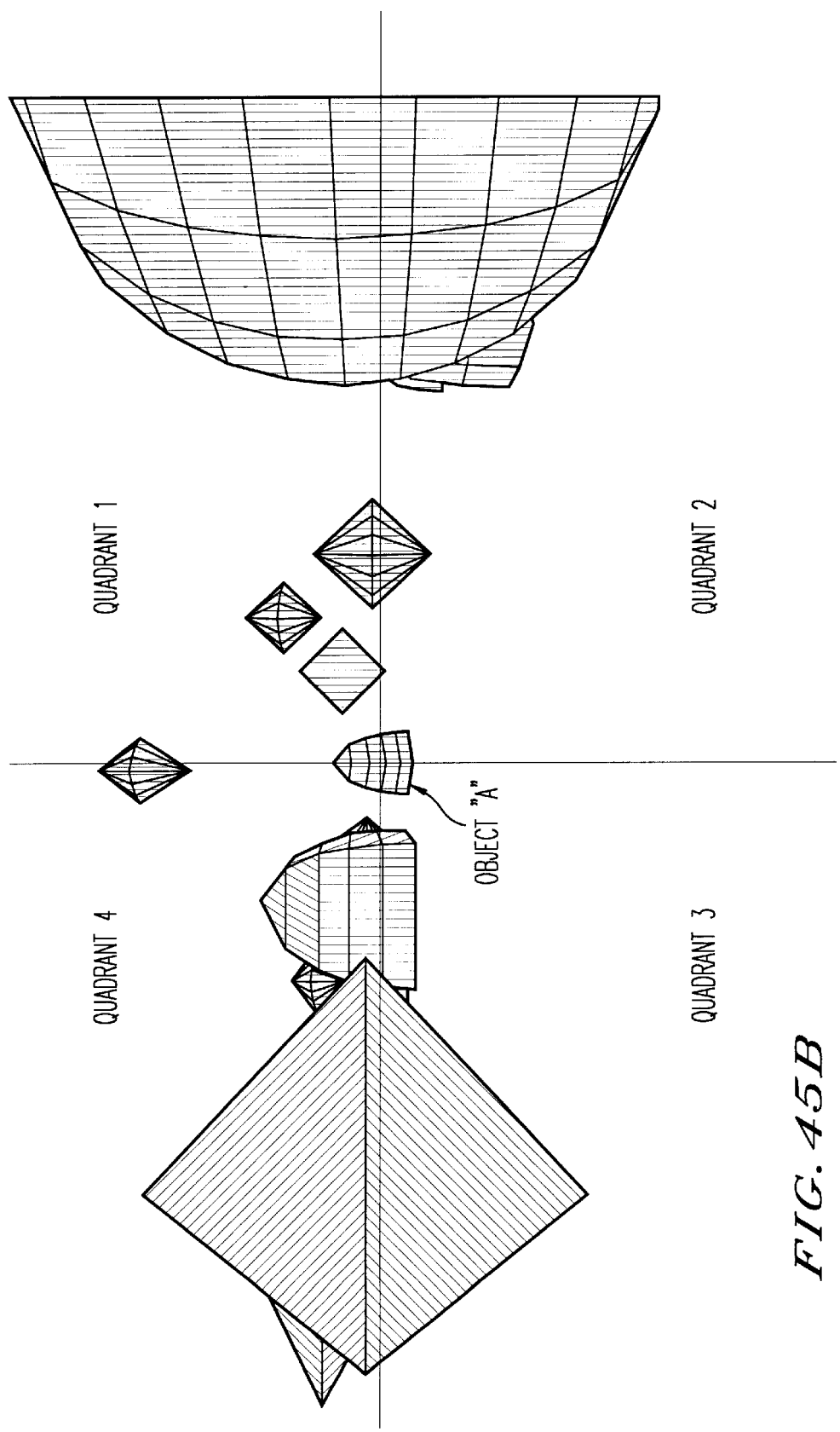
Figure 45C:
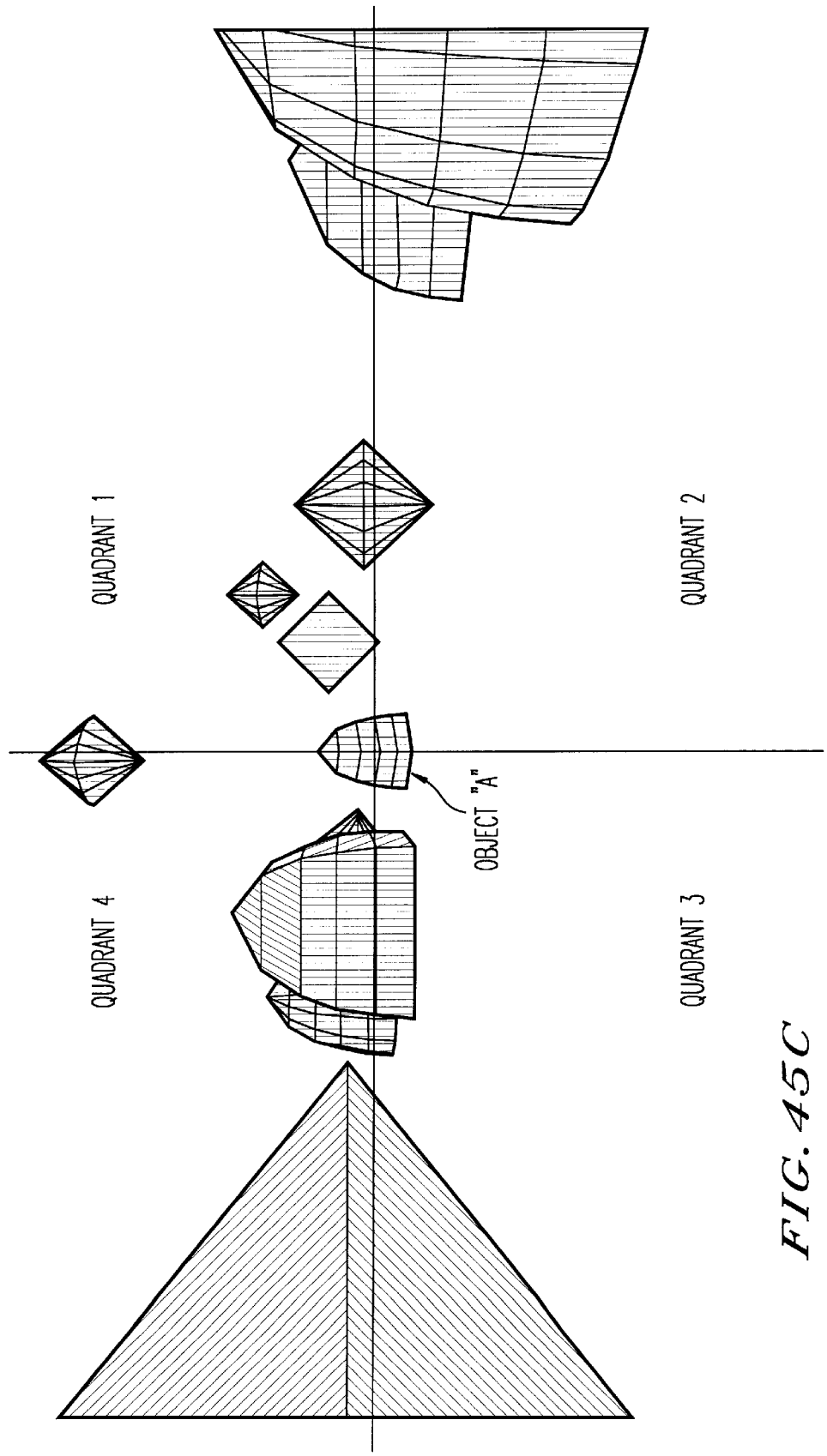
Figure 45D:
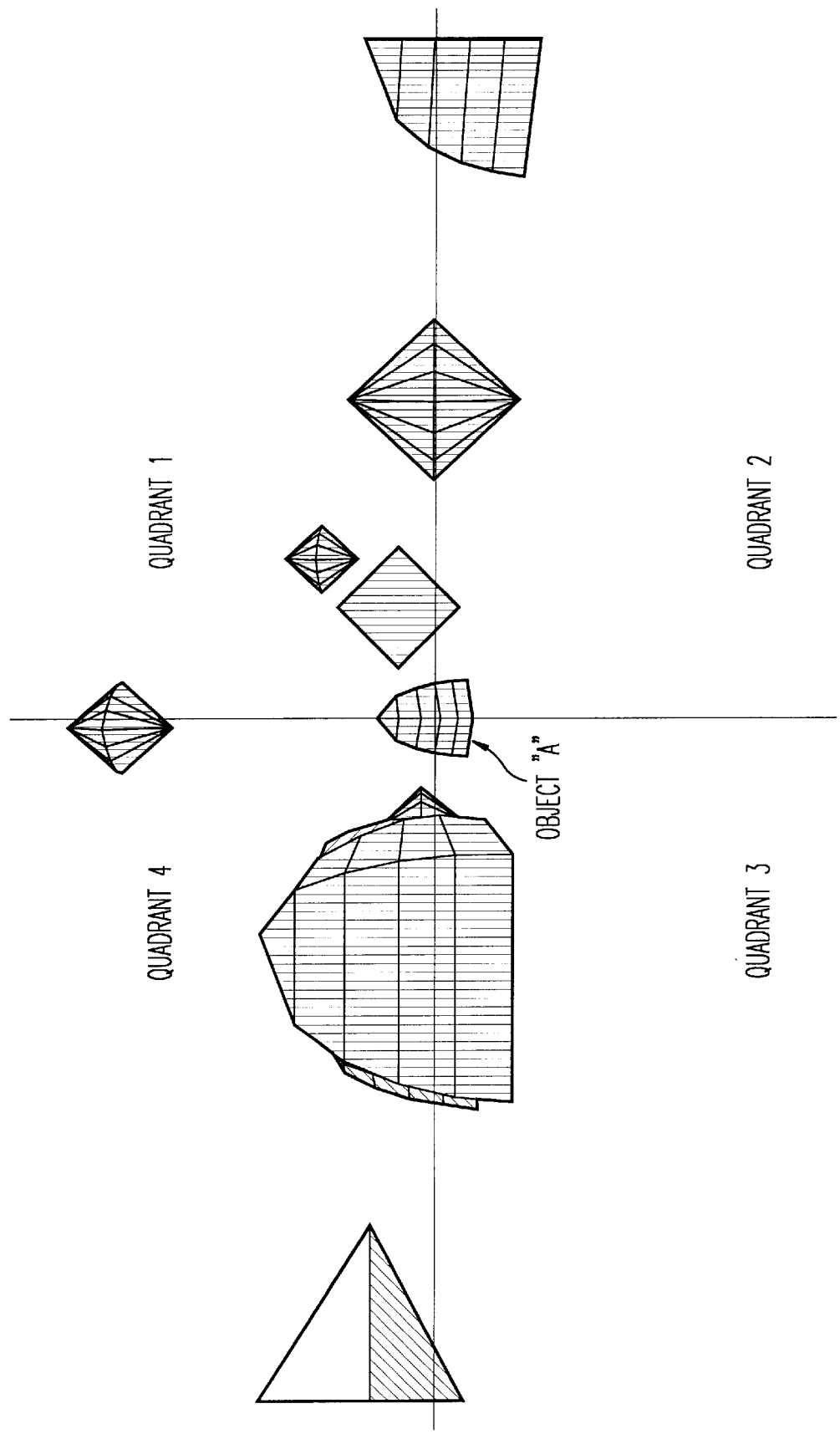
Figure 47A:
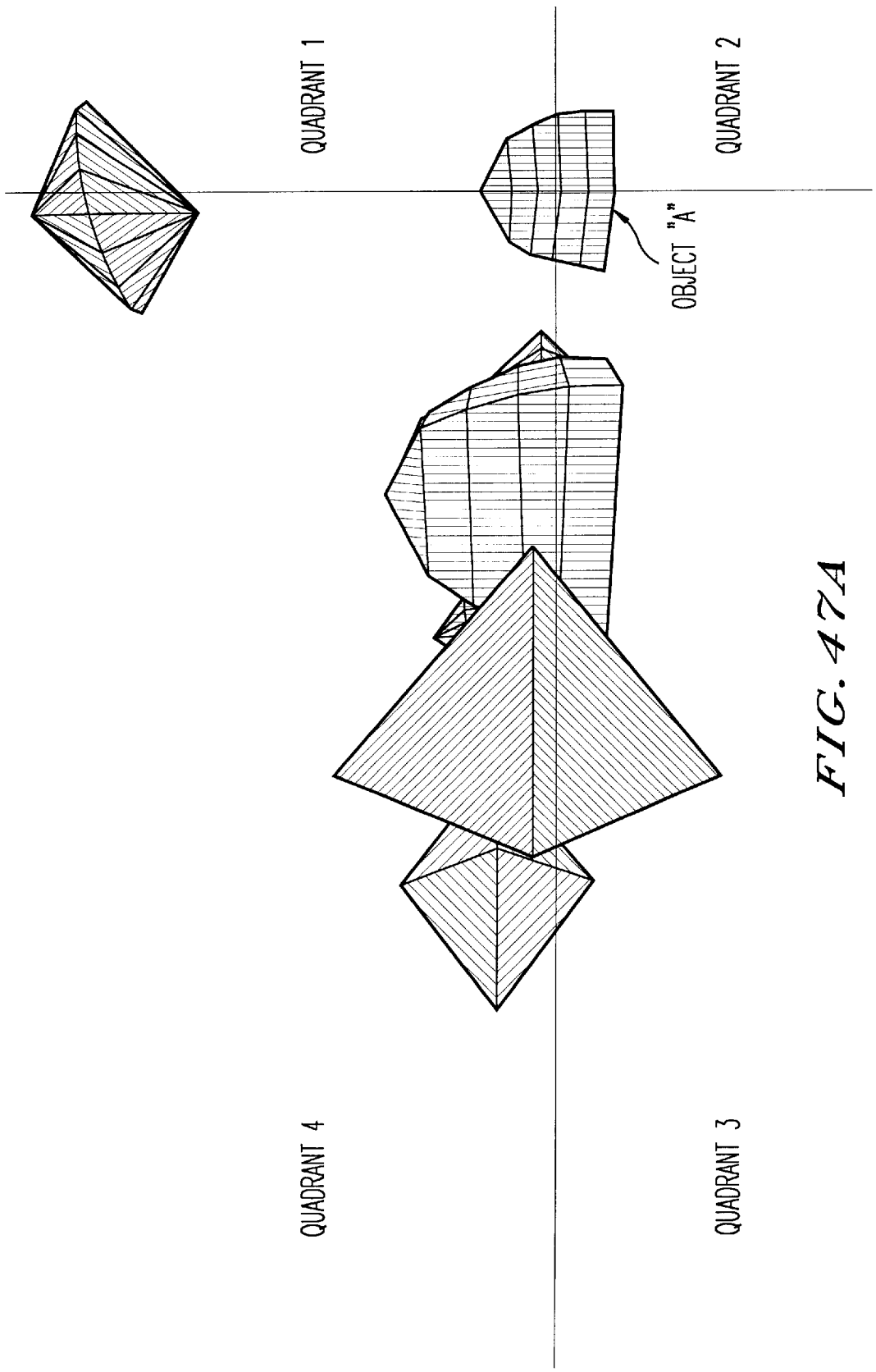
Figure 47B:
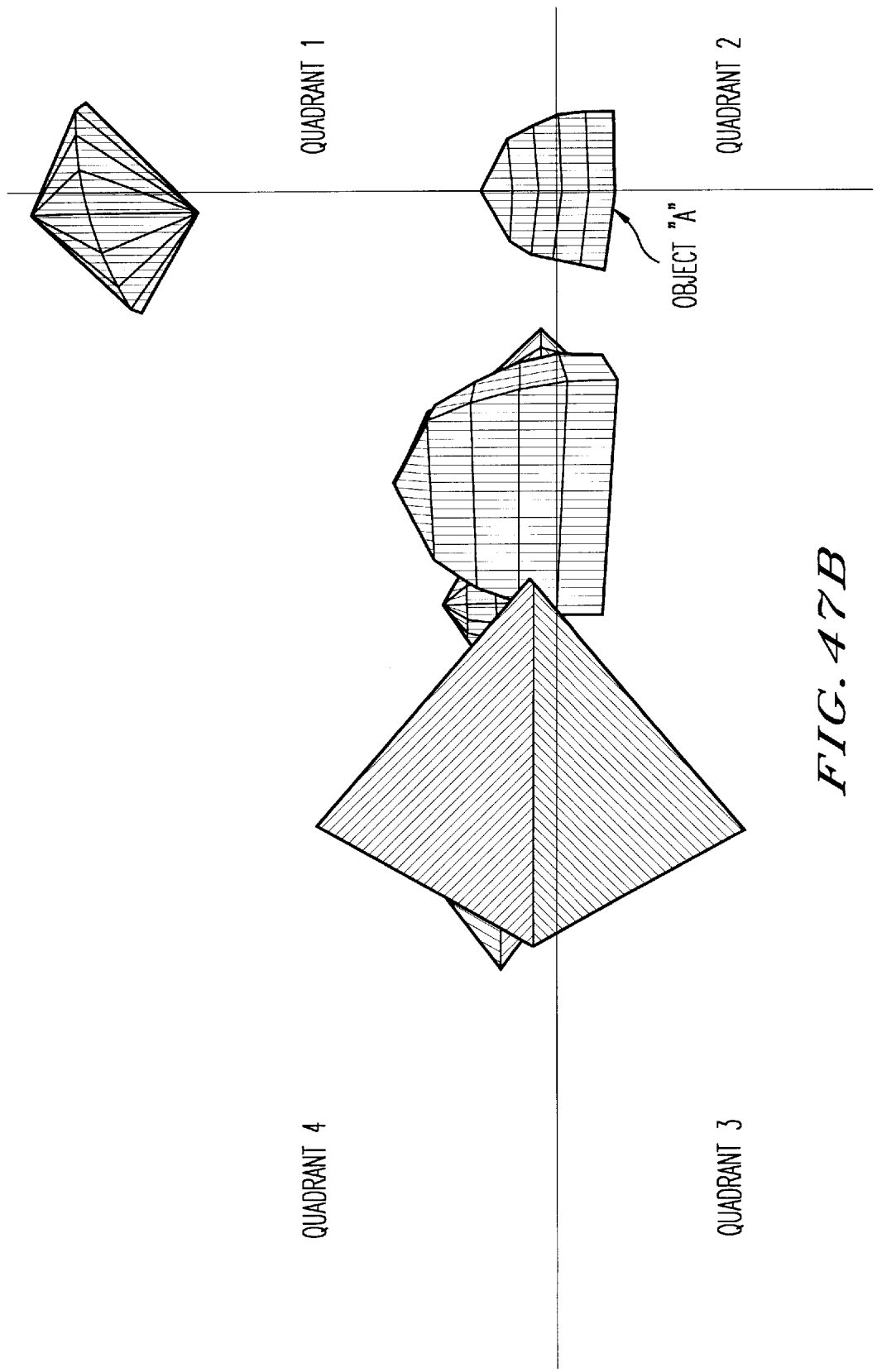
Figure 47C:
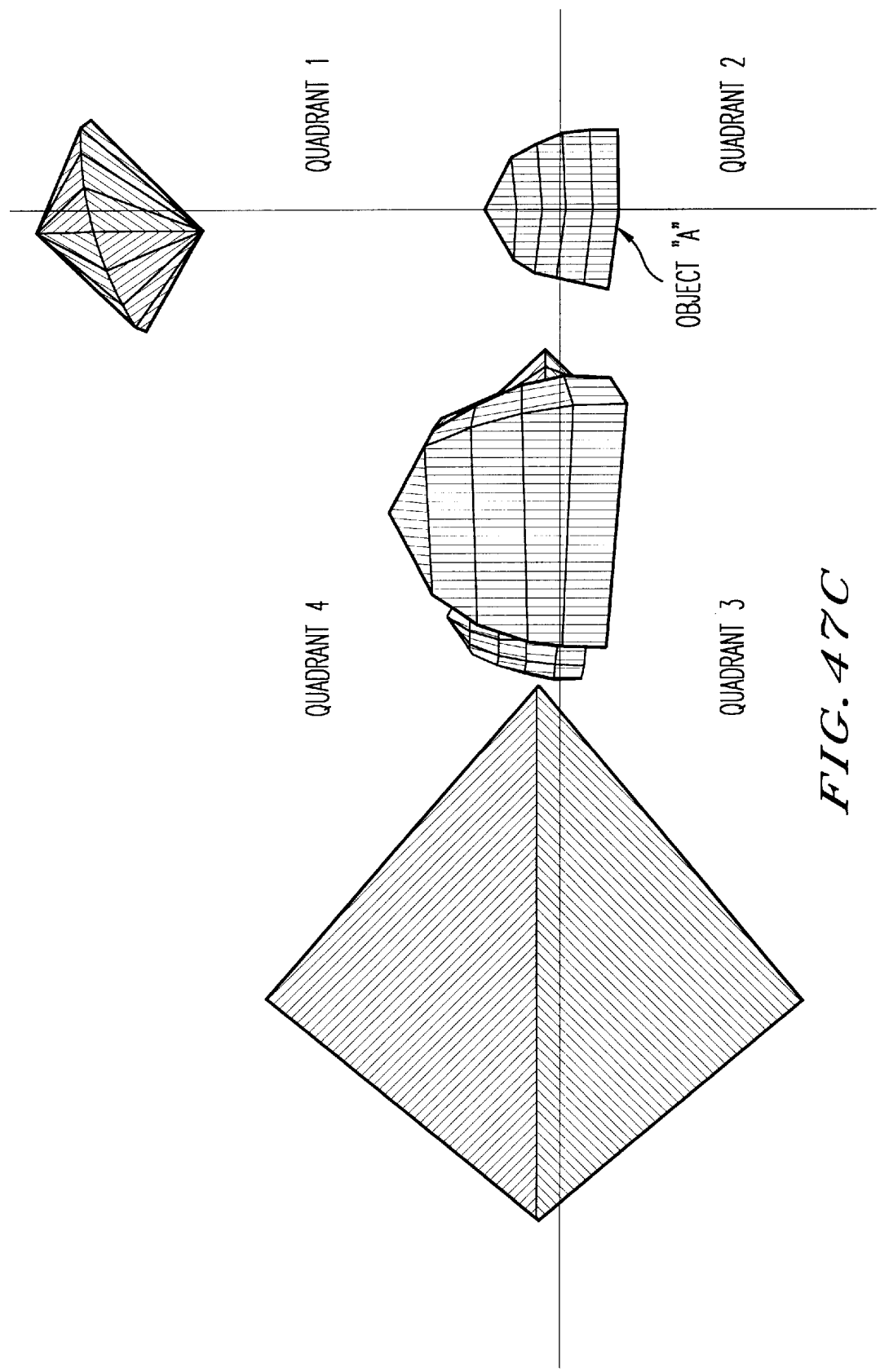
Figure 47D:
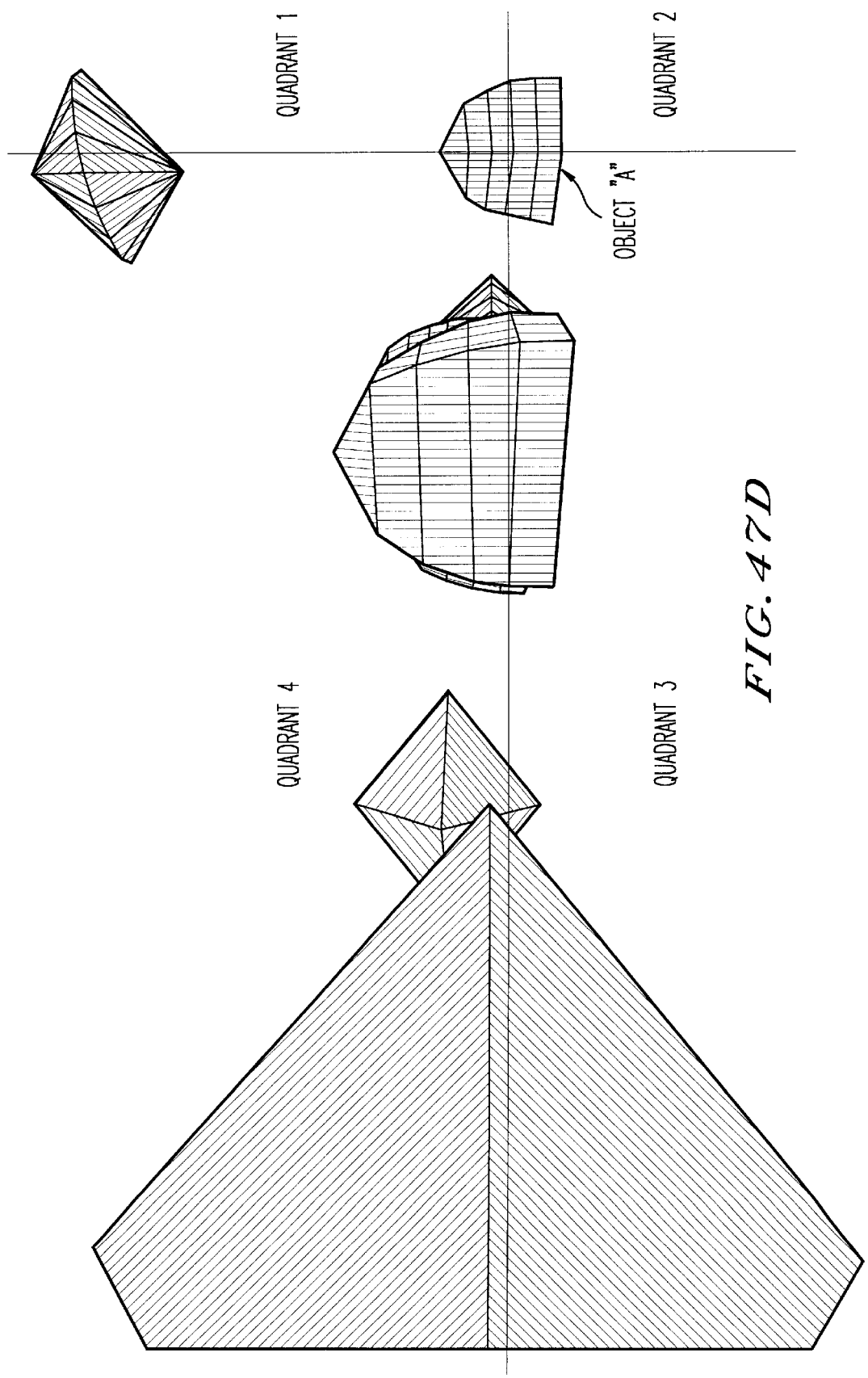
Figures 49A, 49B, 49C:
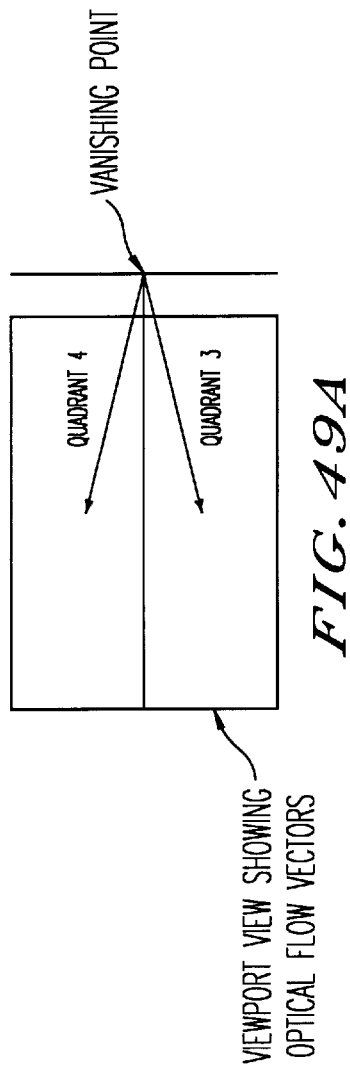
FIG. 49 is an illustration of a dynamic load balancing technique wherein subimage windows are translated and scaled to substantially track the optical flow of elements within the subimage windows for the case described in FIG. 48.

FIG. 44B illustrates a method for controlling subimage transformation (translation and scaling) when the viewpoint is in forward motion as described in FIG. 44. Although this example shows the subimage transformations in only the upper left-hand quadrant(4), a similar pattern of subimage translation and scaling is applied to the remaining three quadrants(1, 2 and 3). In general, the subimages are translated and scaled along the optical flow direction vector which in this case originates at the vanishing point and is directed towards the corner of the viewport. As shown in "time #1" of FIG. 44B, the subimages marked A, B, and C are "anchored" to the meridian lines and are expanding outward. Subimage D has expanded (by scaling) to its maximum size and is translating diagonally while its size remains constant; and subimages E, F, and G are shrinking towards the corner of the viewport (i.e., they are clipped to the viewport while moving towards the corner which causes them to "shrink"). The subimage pattern at "time #2" shows the situation when subimage D has reached the corner and subimages E, F, and G have scaled down to 0 while subimages A, B, and C have scaled to their maximum size. The final viewport at "time #3" shows the completed cycle of the subimage flow pattern where subimage A has been detached from the meridian, having reached maximum size, and translated towards the corner, subimages B and C have also been detached from the meridian lines and are shrinking towards the corner, subimage D has shrunk towards the corner, and new subimages I, J, and K have expanded out from the meridian lines. The velocity of subimage translation and the magnitude of scaling is determined by the aforementioned technique of determining a local minimum velocity for weighted net subimage optical flow. As mentioned above, subimage processors can be dynamically assigned to subimages depending on the size of the subimage and the estimated processing required within the subimage. Also, as a subimage decreases in size (e.g., subimage G in FIG. 44B), the associated subimage processor can also be assigned to a subimage that is increasing in size (e.g., subimage A in FIG. 44B), whereby the processor's average task load would be somewhat constant. Conversely, a subimage can be subdivided into multiple subimages which are assigned to different subimage processors if the estimated compute load becomes greater than the capability of a single processor.

FIG. 48B illustrates the subimage transformation and dynamic tiling pattern for the case of optical image plane flow resulting from viewpoint motion in a direction not equal to the view direction vector and where the vanishing point is not located in the viewport region (see FIG. 48). In this case, there is a view volume incursion region on the right hand side of the viewport. Within this region the intensive visibility search activity (e.g., by ray casting) incurs a relatively large computational cost. This region can be subserved by dedicating processors to a set of narrow subimages along the "leading edge" of the viewport (subimage A in FIG. 48B) corresponding substantially to the view volume incursion regions. As shown in "time #1" of FIG. 48B, the remaining subimages B through E are translating away from the incursion region towards the opposite or "trailing edge" of the viewport which will follow the image flow. Subimages B, C, and D are also scaled as they translate which allows for the expansion which occurs as an image moves farther away from the vanishing point. Subimage E has reached its maximum size and is being clipped out of the viewport. In "time #2" subimage E has entirely clipped out of the viewport. When this happens, a new subimage F will begin to expand and translate from the leading edge side of the viewport next to the incursion subimage A. As mentioned above, the magnitude of the translation and scaling of the subimages, as well as the subimage to processor assignments, are controlled dynamically by the aforementioned techniques to optimize the processor load balancing.

For the case of rotation of the view direction vector about the viewpoint the optical flow is substantially simplified, being reduced to a uniform translational flow direction. In this case, equivalent to the plenoptic case reported by McMillian and Bishop, the velocity of optical flow is independent of the depth of the reprojected element. Also the optical flow velocity tends to be relatively constant throughout the viewport for this case, except for a tendency toward deceleration and acceleration near the leading and trailing borders of the viewport if the angle of view is relatively wide. For the case of view direction vector rotation about the viewpoint the present method employs a dynamic load balancing which effects a relatively uniform translation of existing subimage windows with a velocity determined by the velocity of rotation. In this case subimages on the "leading edge" of the viewport in the direction of rotation will require a high degree of visibility search in regions corresponding to the view volume incursion regions that develop in the direction of rotation. Due to the relatively high cost of visibility search these subimage windows are assigned a small image plane area which may be "attached" to the leading edge of the viewport. Subimages on the "trailing edge" of the viewport (in the direction away from view direction rotation) become truncated by clipping to the viewport and have a decreasing computational demand. Subimage processors subserving such diminishing subimage windows are assigned new subimages near the "leading edge" of the viewport. Specifically, such subimages may be positioned next to the extreme leading edge subimages in which ray casting is being performed. These new subimages increase in area until they are "detached" from the leading edge subwindows. Subimage processors are assigned both expanding and contracting types of subimages in order to naturally balance processor load.

For cases in which optical flow is produced both by viewpoint motion and rotation of the view direction vector the optical flow represents a chaining of the partial derivatives for the respective cases. In this case the magnitude of each component of optical flow is estimated and initial subimage assignment as well as subsequent subimage scaling and translation is selected to reflect the combined optical flow. Relatively low rotational velocities of the view direction vector relative to the viewpoint motion vector produce coherent optical flow with a magnitude that tends to exceed the flow produced by viewpoint translation. In the present method the pattern of optical flow in the viewport is determined periodically and subimage assignments and transformations are changed based on changes in viewport optical flow. Sudden changes in the pattern of optical flow in the viewport can demand significant changes in subimage assignment and transformation patterns that tend to transiently reduce load balance and decrease performance. Such performance decreases can be mitigated by limiting to some degree the allowable accelerations of the viewpoint translation and view direction vector rotation. In this technique the velocity of translation or rotation is not restricted but the accelerations are limited to a degree that results in optical flow changes that can be predicted on the basis of dead-reckoning extrapolation of viewpoint and view direction vector.

It is important to note that the method need not cause subimages to exactly track their corresponding reprojected elements. To reduce communication costs it is only required that the translation and scaling of subimages is performed in such a manner that the overall net optical flow within subimages is decreased compared to a static subimage window assignment. The previously identified optical flow field quadrants allow an initial subimage assignment and subsequent subimage translation and scaling to be selected that tends to reduce the subimage optical flow.

These load balancing methods produce a pattern of subimage window translation and scaling which causes the subimages to substantially track the reprojected elements in their corresponding display lists. This reduces the net subimage optical flow of elements and decreases the amount of primitive redistribution required between subimage processors. This technique increases the effective temporal subimage coherence within subimage windows and augments the natural temporal coherence of the image stream in a way that further decreases the communication costs associated with primitive redistribution between subimage processors. So while load balancing certainly presents some serious implementation challenges, dynamic load balancing based on optical flow offers some previously unrecognized opportunities to reduce the communication costs of image-parallel systems (like the current method and sort-first methods) that employ primitive redistribution among coherent subimages.

In the present method the previously described techniques that produce a load balance based on optical flow are combined with more general techniques of load balancing. One of these general techniques is to minimize the number of subimages thereby increasing the ratio of the area of the subimage to the perimeter. This tends to increase subimage temporal coherence and reduce the amount of primitive redistribution required. Another technique to reduce the communication between subimage processors is to restrict each subimage to be processed using only one subimage processor. Additionally, in the present method each subimage is computed by at most one subimage processor. The compute load of each subimage processor and each subimage is estimated and this information is used to decide the subimage processor-subimage-image mappings using conventional techniques for dynamic, task adaptive load balancing.

Efficient Reprojective Redistribution Using Clipcodes and Separate Vertex Lists

For image-parallel implementations of primitive reprojection, primitives undergo a reprojective redistribution between subimages. In the present multiprocessor implementations this redistribution is effected by the processes of step 1510 and 1525 shown in FIG. 15. This type of primitive redistribution between image-parallel subimage processors is also required for sort-first architectures. In existing descriptions of possible sort-first architectures the techniques for efficiently managing this redistribution of graphics primitives are not provided. The present invention includes two techniques that allow this redistribution to be implemented with a low compute and communication cost. In the first technique a clipcode transition system is used to minimize the cost of classifying primitives with respect to subimages. In a second technique local primitive display lists are represented as separate primitive and shared vertex lists which reduce the storage and processing costs of the method. The clipcode classification system is described first.

In the present multiprocessor embodiment of the method, the movement of primitives into and out of a subimage is efficiently detected by maintaining a clipcode classification for each primitive in the subimage primitive reprojection list. This clipcode indicates which of the four borders of the rectangular subimage are currently intersected by a primitive edge and indicates whether any of the vertices of the primitive are within the subimage. In addition the clipcode indicates which extents of the subimage are intersected by the primitive. An extent of a subimage is defined as the infinite extension of a subimage border. The following implementation assumes that all primitives are triangles, but the method can be extended to other convex polygons. A clipcode is defined in Table II below.

TABLE II

| Bit Definitions of Clipcode |
|---|
| bit 1: left subimage border |
| bit 2: top subimage border |
| bit 3: right subimage border |
| bit 4: bottom subimage border |
| bit 5: left subimage extent |
| bit 6: top subimage extent |
| bit 7: right subimage extent |
| bit 8: bottom subimage extent |
| bit 9: at least one vertex of primitive is enclosed by subimage |

When a primitive is added to a subimage primitive reprojection list (by reprojective redistribution or because of new exposure detected by visibility tracing) the initial clipcode value for the primitive is computed and stored in the clipcode field for that primitive. These codes can be determined during the process of classifying the primitive to the originating subimage. A modified clipping algorithm serves to classify the primitive with respect to the edges of the subimage and does not actually alter the edges of the stored primitive. During the classification process a modification of the Cohen-Sutherland line clipping method is employed to determine which extents and borders of the subimage are intersected by the primitive. The result of this subimage edge classification is stored in the first 9 bits of the clipcode for the primitive. A bit value of 1 in the first 8 bits indicates primitive intersection with the corresponding subimage extent or border.

TABLE III

Pseudo-code fragment using clipcode

```
/* Set all bits to zero */
Pre-zero 9 bit clipcode for primitive;
for(each extent of the subimage window) {
    for(each edge of the primitive) {
        if(edge intersects extent) {
            Set corresponding extent bit in clipcode to 1.
            if(edge intersects actual border) {
                Set corresponding border bit in clipcode to 1.
            }
        }
    }
}
/* Are all four bits zero? */
if (first 4 bits of clipcode == 0) {
    if(first vertex of primitive is within the subimage boundary{
        /* Indicate that the primitive is completely within subimage */
        Set clipcode bit 9 to value 1.
    }
}
```

In the current method the clipcode of each primitive is computed for the current frame and compared to the clipcode that was computed for the last frame. Changes in these consecutive clipcodes are detected by a logical comparison of the corresponding 9 bit data structures. Transitions in the clipcode indicate redistribution events. The pseudo-code fragment in Table III illustrates the computation of the clipcode for a primitive. Primitives with the first four bits equal to 0 are either completely enclosed by the subimage or completely enclose the subimage. This distinction between these two cases is established by the value of the ninth bit in the clipcode. If this is set to 1 then the primitive is completely enclosed by the subimage. If this is set to 0 then the primitive completely encloses the subimage window. Possible reprojective redistribution of a primitive to an adjacent subimage can be identified by a change in the primitive's clipcode that indicates a new penetration of one or more subimage borders. For a completely enclosed primitive (clipcode: 000000001) any change in the first four fields from 0 to 1 indicates a positive redistribution of the primitive to the neighboring subimages that share the corresponding borders. Reprojective out-migration of any primitive that does not completely enclose the subimage is indicated when the first four fields of the clipcode fall to zero and the ninth bitfield is also zero. In this case the primitive is newly invisible for the subimage and can be removed from the subimage primitive reprojection list. Possible reprojective redistribution of a completely enclosed primitive to the four neighboring subimages that share only corners ("corner neighbors") is indicated by bit value changes from 0 to 1 for any border-border or border-extent pair that share a corner. A primitive that undergoes this type of transition during subimage classification is tested for redistribution to these specific corner neighbor subimages.

For primitives that are not completely enclosed by a subimage, many clipcode transitions indicate potential redistribution events instead of actual redistribution events. If a primitive has no vertices on the side of an extent away from the subimage then a clipcode transition from 0 to 1 for the extent indicates a potential redistribution of the primitive into the three neighboring subimages along the extent. In this case a 0 to 1 transition for the corresponding border indicates a definite redistribution of the primitive into the adjacent subimage that shares the border.

By examining clipcode transitions and vertex locations with respect to subimage extents, the method allows primitives to be classified without explicit testing of each primitive against each neighboring subimage. Moreover because the clipcode reflects changes in primitive-subimage penetration status it avoids duplicate reprojective redistribution events. The relatively common case of completely enclosed primitives is especially amenable to efficient reprojective redistribution based on clipcode transitions. Many variations of the clipcode test scheme are possible. This type of classification scheme which detects new penetration events is intrinsically more efficient than classifying all subimage primitives against all potential neighbors for each frame and then checking the subimage neighbor primitive reprojection list for duplication. Note that the method does not depend upon a specific organization of subimages and neighbors. While the 3 by 3 tiling of equal-sized subimages is a simple case, the clipcode method is easily extended to cases in which a subimage has more than eight subimage neighbors. This is achieved through a subimage data structure that includes references to neighbor subimages and categorizes each of the neighbors as a border or corner sharing neighbor. The subimage data structure is given below in Table IV.

TABLE IV

```
Structure definition for type "subimage"
/* subimage object that references neighbors. Allows 3 border neighbors */
/* per border Alternatively, to replace the twelve explicitly named */
/* L, T, R, and B pointers, an array of 3 struct subimage pointers */
/* could be used for each direction, or a two-dimensional array of */
/* struct subimage pointers could be used with a total of 4×3=12 */
pointers struct subimage
{
    struct subimage * L_border_1;
    struct subimage * L_border_2;
    struct subimage * L_border_3;
    struct subimage * T_border_1;
    struct subimage * T_border_2;
    struct subimage * T_border_3;
    struct subimage * R_border_1;
    struct subimage * R_border_2;
    struct subimage * R_border_3;
    struct subimage * B_border_1;
    struct subimage * B_border_2;
    struct subimage * B_border_3;
    struct subimage * LU_corner;
    struct subimage * RU_corner;
    struct subimage * LL_corner;
    struct subimage * RL_corner;
};
```

Note that the clipcode classification scheme can fail for primitives that have a high image-plane velocity to image-plane extent ratio in any dimension. Such small, rapidly moving primitives could potentially jump from one subimage to another without intersecting subimage borders and without creating clipcode transitions. (These same primitives can also produce exposure errors as previously described.) Reprojective redistribution errors for these primitives are prevented by performing a primitive-subimage classification for all bordering subimages if the primitive's image-space velocity to image-space extent ratio is greater than one. Alternatively the previously described classification method can be applied to these primitives more frequently than the frame interval. This reduces the excursion of such primitives between classifications.

The details of how primitives are redistributed between processors depend on how primitives are represented in local display lists. In one type of representation the vertex values for the primitive can actually be stored in the data structure for the primitive. Alternatively, primitives can reference vertex values that are stored in a separate list of vertices. This separate list of vertices is the vertex list for the local display list and contains all vertices for primitives in the local display list. The use of a separate vertex list is more memory efficient than storing vertex values with each primitive because for triangle meshes each vertex is shared by 6 primitives.

A shared vertex representation employing a separate vertex list not only decreases storage requirements but also reduces the cost of primitive transformation-rasterization by eliminating transformation operations on identical vertices. In principle the communication cost associated with reprojective redistribution of primitives can also be decreased by eliminating the repeated redistribution of identical vertex information for shared vertices.

As a result the shared vertex representation employing a separate vertex list for the display list can significantly improve the performance of the present method. Maintenance of a separate vertex list increases the complexity of the implementation since not only primitive information but also vertex information must be managed as it flows to and from local display lists as a result of redistribution, exposure, or occlusion. The present invention includes techniques which allow a shared vertex representation to be used in the method of primitive reprojection.

The following methods can be employed to preserve shared vertex references for the three cases of when: 1) a primitive is reprojected into a subimage as a result of reprojective redistribution, 2) a primitive becomes visible due to exposure, and 3) a primitive migrates out of the subimage by reprojective redistribution or becomes totally obscured.

The present method uses a technique of vertex "welding". In the method of vertex welding, duplicate vertices are removed from a list of primitives and its associated list of vertices. Duplicate vertices are eliminated and all references to vertices in the primitive list are altered to point to the correct vertex in the new, more compact vertex list in which each vertex may be shared by several primitives. In the present method this type of welding is facilitated by supplying an unique integer value for every vertex in the database, a vertex_ID. Vertices with the same vertex_ID value have identical x, y, z and other floating point values, such as texture and radiosity values. This allows duplicate vertices in a list to be "welded" without checking multiple floating point fields.

In the first case, when a primitive is redistributed into a subimage as a result of reprojective redistribution, the vertices that comprise the primitive may actually already exist in the new subimage because they are shared by a primitive that was previously visible in the new subimage. In this case the vertex values do not actually need to be copied to the new subimage, instead the vertex references for the incoming primitive could be set to the vertex index in the new subimage's vertex reprojection list.

A simple, but inefficient, approach to preventing the transmission of a duplicate vertex is to check for the preexisting presence of a vertex with the same vertex-ID value in the destination vertex list before copying it to the destination vertex list. Unfortunately this amounts to a weld operation that is conducted between subimage processors and would incur a considerable amount of expensive non-local memory accesses.

The present method employs a technique to reduce the repeated redistribution and storage of duplicate vertices in which non-local memory accesses are minimized. In this technique the outgoing primitives for a subimage are placed in local out-buckets that are specific to the destination subimage. Prior to transmission of the primitives in an out bucket, a welded list of vertices for all primitives in the bucket is assembled by the previously described technique. The primitives are transmitted to the destination subimage together with the associated welded vertex list. As a result of this process the list of vertices communicated to the destination subimage does not contain duplicates. This process does not insure that vertices transmitted to the destination subimage are not already present in the destination subimage's vertex list. In the present method this type of duplication is eliminated after the transmission by effecting a weld operation between the transmitted vertex list and the destination vertex list. This operation employs the aforementioned vertex-ID field stored with each vertex to identify duplicates. This operation may be performed periodically to reduce the size of vertex lists associated with local primitive display lists.

This process uses a data structure equivalent to the C data structure named "subimage_vertex_element", shown in Table V below, for each element of the subimage vertex reprojection list. During this process the number of newly visible primitives that reference each vertex is recorded in a special field called the "primitivecount." The current value of this field is incremented by the number of newly visible primitives that share the vertex. This allows a count of all primitives that reference each vertex to be maintained. This count can be used to determine when a vertex should be removed from a subimage vertex list as described later.

TABLE V

```
/* Data structure used for subimage vertex list */
struct subimage_vertex_element
    {
    float x, y, z;              /* Vertex values */
    float xn, yn, zn;           /* Normal vector */
    float u, v;                 /* Texture map values */
    int vertex_ID;              /* Unique id number for the vertex */
    short int primitivecount;   /* Number of primitives in -*/
                                /* subimage that reference this vertex-*/
    };
```

In the second case, primitives that become newly visible for a subimage due to exposure (for example, as determined by visibility tracing) must also reference vertices that already exist in the subimage vertex reprojection list. The aforementioned procedures are followed in order to prevent duplication of vertices.

Unlike the addition of vertices in the first two cases, the third case involves the potential removal of vertices from the vertex reprojection list. Any primitive that becomes newly invisible within a subimage can be removed from the primitive reprojection list for the subimage. However, the associated vertices cannot automatically be removed from the subimage vertex reprojection list since they may be referenced by primitives that remain visible in the subimage. The aforementioned technique of maintaining a count of all subimage primitives that reference each vertex provides an efficient solution to this problem. In the present method whenever a primitive is removed from the subimage primitive reprojection list by outclipping (reprojective redistribution) or occlusion, the primitivecount of all associated vertices is decremented by one. When the primitivecount falls to zero then no primitives reference the vertex and it can be inactivated or removed from the subimage vertex reprojection list.

Visibility Event Server Implementation

The present method of real-time image generation is also suited to an efficient client-server implementation. In this implementation the goal of the server is to efficiently compute, for each frame, a list of primitives that become newly visible in the image during the frame interval. This list of newly visible primitives is transmitted to a client unit which adds the primitives to a display list of already visible primitives for conventional depth-buffered rasterization.

The method of primitive reprojection is ideally structured to provide a list of primitives that become newly visible for each frame. In the previously described multiprocessor implementation of primitive reprojection a list of primitives that become newly visible to each subimage is computed for each frame by the process of visibility search. In the present server implementation these subimage lists of newly visible primitives can be used to accelerate the determination of primitives that are newly visible to the entire image.

Figure 60:
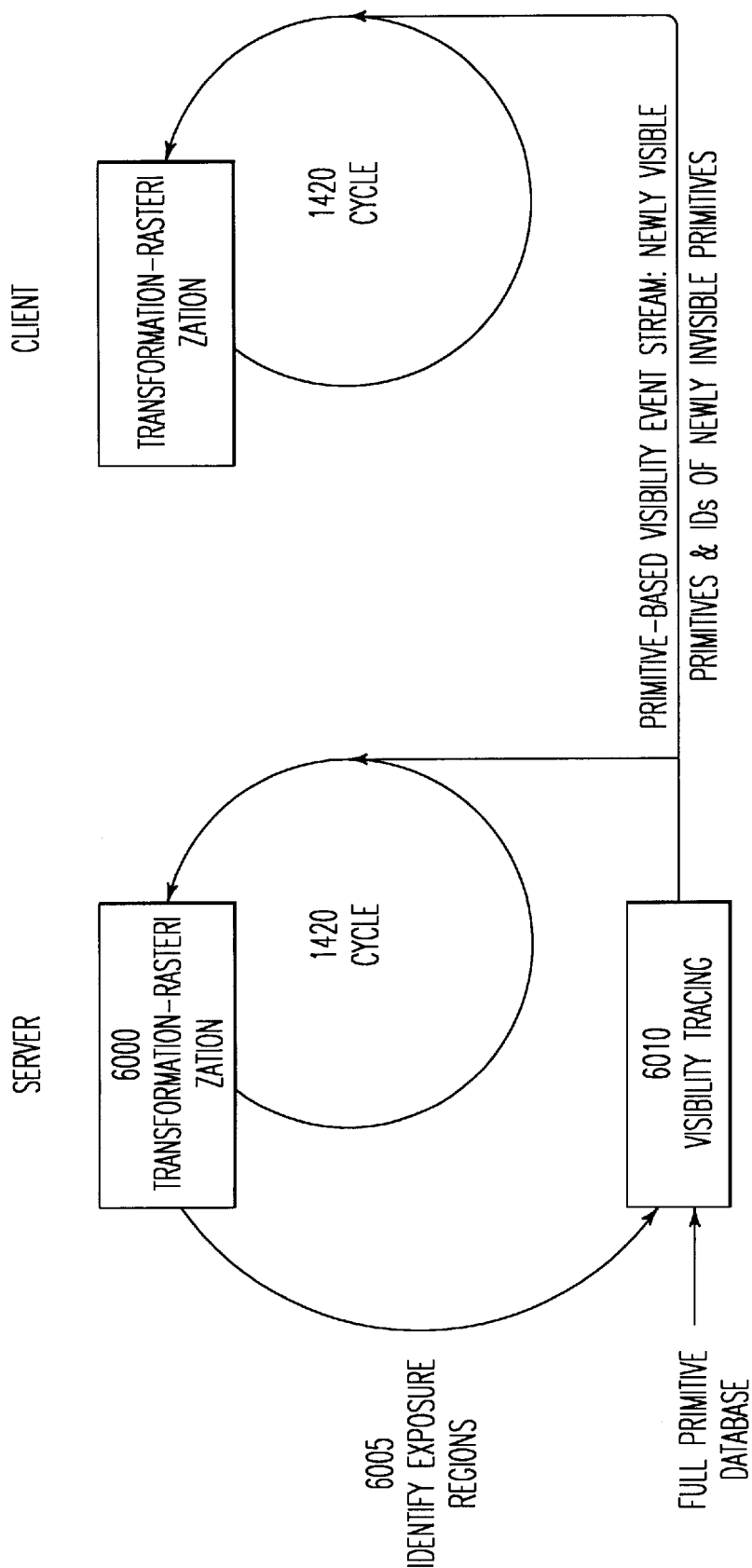
FIG. 60 is a flow diagram of the primitive reprojection cycle for one embodiment of the client-server implementation of the present invention.

FIG. 60 schematically illustrates the primitive reprojection cycle of FIG. 12 partitioned into a client-server configuration. In this implementation the server is optimized to generate a list of newly visible primitives for each frame which are transmitted and added to a client display list for actual display. Additionally, information about the newly invisible primitives for each frame is also transmitted to the client which removes these primitives from the client display list. In this client-server implementation then, the client is connected to a server unit that produces an efficient on-demand, progressive transmission of primitive visibility event information. The result is a client display list that contains only those primitives that are actually visible for each frame. Because the client unit only needs to process actually visible primitives the effective performance of the client hardware (as generally measured in primitives-per-second) is substantially increased when compared to client-server configurations based on data replication (e.g., virtual reality modeling language [VRML]) in which the client image generation unit processes all primitives in the represented database.

In FIG. 60 it is shown that visible primitives undergo transformation-rasterization in step 6000 performed by the server. In step 6005 the server determines exposure regions of each image and performs visibility search of these regions to identify newly visible primitives in step 6010. The newly visible primitives so identified by step 6010 are added to the display list of primitives for server transformation/rasterization. Additionally these newly visible primitives are transmitted to a client unit. In addition the subset of previously visible primitives that become invisible (including primitives that become occluded) for each frame is also determined by the server in conjunction with step 6000. Information describing this subset is also transmitted to the client unit which indicates which primitives on the client display list can be removed from further processing. The client displays primitives from a destination display list of visible primitives in which primitives undergo transformation and rasterization in the process 6020. The present method employs an efficient system of coordinated server (source) and client (destination) display lists (DDL) that simplifies display list maintenance activities by the client. Details of this coordinated display list method are presented later in this specification.

Figure 61:
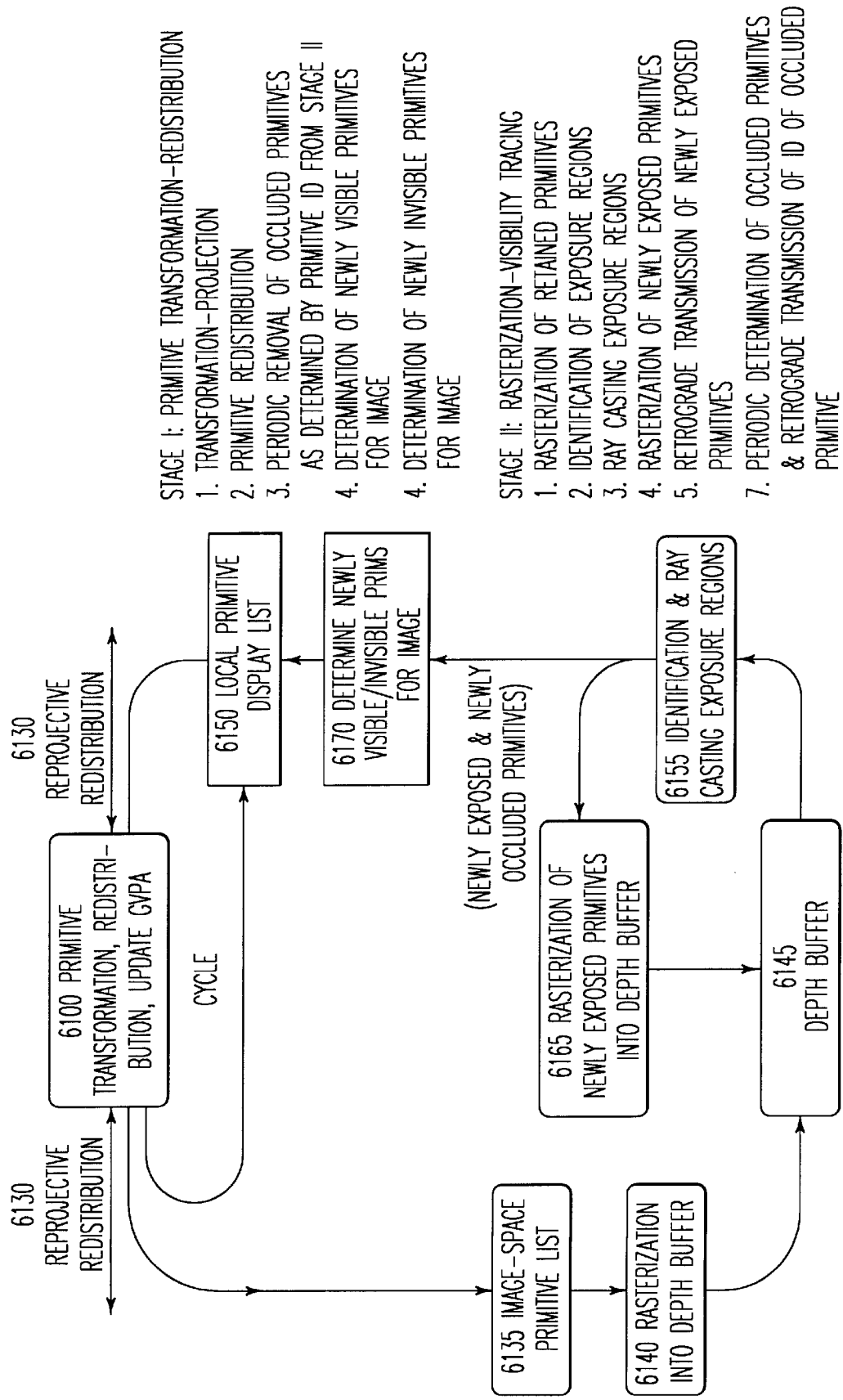
FIG. 61 is a flow diagram showing one embodiment of how the primitive reprojection and visibility tracing are split into two stages for the visibility event server implementation.

FIG. 61 shows a schematic representation of a two stage, multiprocessor, parallel, pipelined implementation of a visibility event server based on primitive reprojection. This is a modification of the two stage pipelined implementation of primitive reprojection which is schematically illustrated in FIG. 17.

As shown in FIG. 61, in the first stage primitives in local display lists (e.g., 6150) are transformed and converted into image-space representations in a step 6100. Additionally during step 6100 primitives that are found to outclip the entire image have their corresponding element in a global visible primitive array (GVPA) modified to reflect the newly invisible status of the primitive caused by viewport outclipping. Details of the GVPA array are presented later in this specification. Object-space primitives are redistributed among stage I subimage processors in steps 6130 using the previously described methods of primitive classification and redistribution.

These transformed image-space primitives are passed to a second stage where they undergo rasterization in step 6140. In this rasterization step shading is not necessarily performed since the function of rasterization in this implementation is only to write to the buffer in a way that allows exposure areas and occluded primitives to be identified in later steps. Each image-space primitive transmitted to stage II is transmitted along with its corresponding index location in the first-stage local primitive display list, 6150. Primitives transmitted to stage II from stage I processors are stored in an image-space primitive list, 6135. Following rasterization of all primitives the subimage depth buffer, 6145, is processed in step 6155 to identify exposure regions by the methods previously described. Subsequently ray casting or approximate beam casting is performed in these exposure regions, also shown as part of step 6155, in the second stage to effect the visibility search for newly exposed primitives. This process identifies newly visible primitives which ate transformed and rasterized into the subimage depth buffer in step 6165. Primitives identified as newly visible are passed in a retrograde fashion to stage one to be added to the local primitive reprojection list 6150. An additional step is periodically conducted in stage II following step 6165. This step is the previously described read of the depth buffer, here 6145, to identify occluded primitives. This step employs the data structures of 6145 and 6135 which is the local image-space primitive list. As previously described, in this process primitives in 6135 that are not represented by any samples in non-occluded layers of the buffer are considered to be newly occluded for the subimage. The index of these primitives in the stage I (which were transmitted to stage II along with each primitive) are transmitted in a retrograde fashion to stage I where the corresponding primitives are removed from 6150.

As described so far the processes performed by the server implementation shown in FIG. 61 are nearly identical to the processes of the image generation implementation shown in FIG. 17 (except that for the server shading is not calculated during vertex transformation or rasterization). A further difference between the image generation implementation and the present server implementation is that whereas the image generation unit only computes the newly exposed primitives for each subimage the server unit must determine which of these primitives are actually newly exposed for the entire image. Additionally the server unit must also determine which of the primitives that are newly occluded for a subimage are actually newly occluded for the entire image. In the present implementation these two processes are performed in stage I after the newly occluded and newly exposed primitives for the subimages have been determined and signaled to stage I. The process of finding the newly visible and newly invisible primitives for the entire image is shown as step 6170. This process employs the global visible primitive array (GVPA) which is updated to reflect changes in a primitive's visibility caused by viewport outclipping, occlusion, and exposure. Details of this process, and the management of the GVPA, are presented in a later part of this specification.

Figure 62:
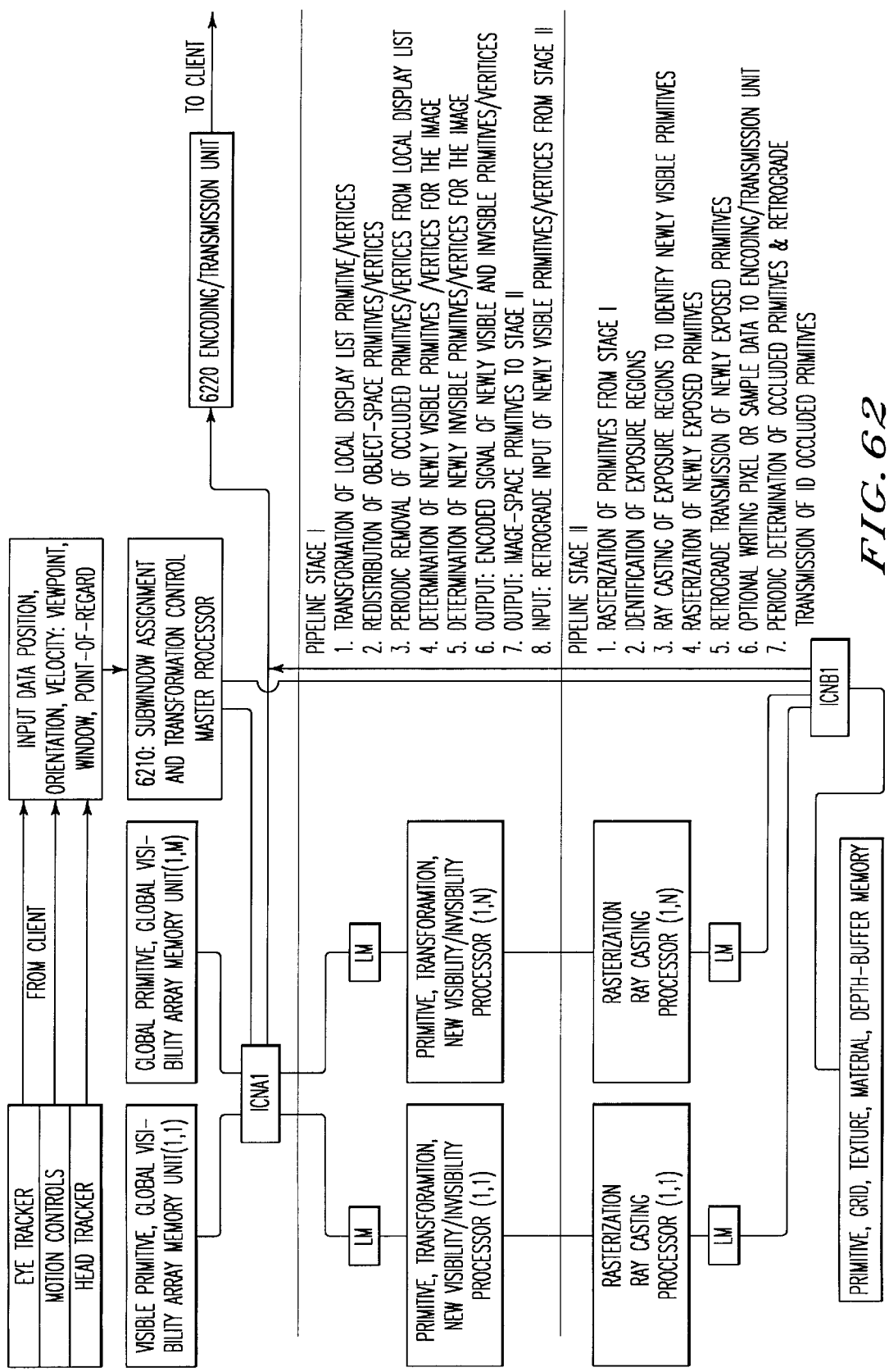
FIG. 62 is a block diagram showing an embodiment of visibility event server system according to the present invention.

FIG. 62 illustrates a pipelined hardware implementation described by the schematic of FIG. 61. This implementation employs exactly the same hardware as the pipelined image generation implementation described earlier in conjunction with FIGS. 17 and 18. In addition to the basic processes of primitive reprojection performed by the image generation implementation, the server implementation performs steps to determine sets representing the newly visible primitives and newly invisible primitives for the entire image. These processes are performed by stage I subimage processors using methods that are described in detail later in this specification.

Exactly as in the image generation implementation (previously described in connection with FIG. 18), the two stage cycle of FIG. 17 is implemented using a two stage pipeline with separate interconnection networks subserving primitive redistribution in one stage and rasterization—ray casting in a second stage. This pipelined architecture is shown in FIG. 62. In common to both pipeline stages are data converted by sampling external sources, e.g. eyetracker, motion controls, and a head tracker. In the case of this server implementation, this data is received from a potentially remote client. The data is applied to a subwindow assignment and transformation control master processor 6210. In addition, a first interconnection ICNA1 provides for the distribution of local display list primitives and special global visibility data structures (described in a later section of this specification) stored in a distributed set of shared memory units (1,1) through (1,M). In the first pipeline stage ICNA1 sends this data to local memories assigned to the first stage Primitive Transformation and Global Visibility Processors. Redistribution of local display list primitives among stage I processors occurs through the first-stage ICNA1 interconnect.

With this local primitive data the first pipeline stage performs the steps including (not in order): 1)transformation of primitives in the local primitive display list, 2) redistribution of object-space primitives to other stage I processors, 3) periodic removal of occluded primitives from local display list (based on information supplied from stage II) 4) determining of newly visible primitives/vertices for the entire image, 5) determining newly invisible primitives/vertices for the entire image, 6) outputting a datastream representing newly visible and newly invisible primitives for the entire image to a decoding unit 6220, 7) outputting transformed image-space primitives to stage two, 8) receiving information from stage II representing newly occluded and newly exposed primitives for the subimage, 9) encoding datastream of newly visible/invisible primitive information and transmitting this information to the client using encoding and transmission unit 6220.

After having received the results of the first pipeline stage, the second pipeline stage performs the following 7 steps: 1) Rasterization of primitives received from stage I (without shading calculations), 2) identification of exposure regions, 3) ray casting of exposure regions in the depth buffer to identify newly exposed primitives, 4) rasterization of newly exposed primitives, 5) passing back newly exposed primitives determined by ray casting to stage I processor, 6) optional step of writing pixel or sample data to encoding/transmission unit, 7) periodic determination of occluded primitives and passing back primitive ID's of occluded primitives to Stage I. Data required for ray casting including primitive, spatial subdivision grid data is accessed using a second interconnection network ICNB1.

The identical hardware is employed for both image generation and visibility event server except that the visibility event server requires the additional signal encoding-transmission hardware 6220. This unit is used to send a binary datastream representing the visibility event stream to the client. Optionally the server can compute actual image information (e.g., for regions of the image requiring advanced shading effects, like reflection) that is encoded and transmitted to the client through unit 6220. In the present visibility event server implementation the rasterization process can be made very efficient since the object of server rasterization is only to determine potential exposure regions. Only depth values are computed during rasterization. Shading and other computations normally associated with rasterization need not be computed. The elimination of vertex shading in stage I also produces computational savings for the stage I processors.

In addition to this two stage parallel-pipelined implementation the visibility event server unit can be implemented using a single stage multiprocessor architecture employing bus or crossbar based interconnection networks such as the image parallel architecture described in connection with FIG. 13.

The connection bandwidth required to support this on-demand, progressive, transmission of visibility events is determined by the instantaneous temporal visibility coherence of the image stream. One metric that reflects the temporal visibility coherence of the image stream is the ratio of the number of newly visible primitives in a frame to the number of visible primitives in the frame. Typical image streams generated in simulator/virtual environment applications are usually the result of relatively coherent, continuous motion of the viewpoint and/or view direction vector. In such cases the number of primitives that become newly visible and invisible is generally between one and three percent of the total number of visible primitives in the frame. For example, assuming uniform primitive density in the image and a 90 degree field-of-view, a 45 degree per second rotation of view direction vector about the viewpoint replaces approximately 1.66% of primitives in a 33 ms frame. In this example the temporal visibility coherence with respect to visible primitives is approximately 98.34%. In the present invention the encoding of a single primitive requires less than 80 bytes on average (employing the shared vertex representation described below). An available transmission bandwidth equivalent to ADSL's (Asymmetric Digital Subscriber Line) 9 megabits per second would support the transmission of approximately 500 newly visible primitives per frame. For a temporal visibility coherence relative to visible primitives of 98.4% the client display list would contain 31,000 visible primitives. Real-time display of this list would require a client performance of approximately 900,000 primitives per second. It is important to note that these are VISIBLE primitives per second. The effective performance of the client unit is determined by multiplying its actual performance (in visible primitives per second) by the ratio of total primitives in the database to the visible primitives in a frame. For an image sequence of a database in which on average only 2% of the primitives are actually in each frame, the effective performance for the previously described client unit displaying 900,000 visible primitives is 45,000,000 primitives per second. This substantial increase in effective client performance reflects the fact that the client only processes visible primitives.

This analysis emphasizes the peak bandwidth, server, and client resources required to support such a client-server connection. The analysis also applies to the general use of visibility event encoding by encoding newly visible and invisible primitives for frames of an image sequence generated in non-real-time. In either real-time or non-real-time implementation of the present method of visibility event encoding the requisite transmission/replay bandwidth varies with the instantaneous temporal visibility coherence of the image stream. The present invention includes a number of methods by which the bandwidth requirement during periods of low temporal visibility coherence can be reduced. These methods are described fully in a later section of this specification and in the copending application.

As will be described below, the explicit determination of newly visible primitives for each subimage computed during primitive reprojection facilitates the computation of newly visible primitives for the entire frame and makes a parallel embodiment of primitive reprojection an ideal system for generating a primitive-based visibility event stream. Also the explicit computation of newly occluded primitives in each subimage facilitates the determination of newly occluded primitives for an entire image. Additionally several other aspects of the previously described image-parallel implementations of the present method of primitive reprojection make this invention especially well organized to compute a visibility event stream as described herein. These aspects, which will be evident from the description of processes for identifying newly visible and invisible primitives for each frame provided, include 1) image-parallel organization with subimage processors having read access to subimage depth buffer, 2) augmented depth buffer storing reference to source primitive for each sample, 3) general read-write interprocessor communication possible between subimage processors, 4) rasterizing processor having read-write access to complete set of visible primitives for the subimage. No previous image generation architecture possesses all of these aspects which are shown, in the present specification, to be useful for the efficient determination of a primitive-based visibility event stream.

A detailed description of the process of determining newly visible and newly invisible primitives for the entire image is now presented. In image-parallel implementations the list of newly visible primitives for each sub-image is checked against an array, called the global visible primitive array (GVPA) to determine whether the primitive is actually newly visible for the entire image. This array, which is accessed by all subimage processors, contains one element for each primitive in the entire database and is indexed by a unique primitive ID value wherein each primitive has a unique integer ID that corresponds to an element in the GVPA. Each entry in the GVPA represents the visibility status of one primitive in the database. There are three fields in each element in the GVPA, one field indicating whether or not the primitive is visible in the current frame, a second field indicating if the primitive has already been checked for occlusion during the current frame, and another field representing the index location of the primitive in mirrored server (source) and client (destination) display lists that are described below. The GVPA element is equivalent to the C data structure of Table VI

TABLE VI

GVPA Data Structure

```
struct GVPA_element
{
    char visibility; /* 0==Not visible in current frame */
    cur_frame; /*Current_frame value written during occlusion */
    int dl_index; /* index of primitive in source & dest dl*/
```

TABLE VI-continued

GVPA Data Structure

```
};
```

If the visibility value in the GVPA is Null then the corresponding database primitive is not visible in the current frame. If the visibility value of a primitive's element in the GVPA is non-null then the primitive is visible for the current frame and the value of the dl_index field is the index of the primitive in both a server (source) and a client (destination) primitive display lists which are described in detail below.

The GVPA is incrementally updated between frames to reflect changes in primitive visibility that result from viewport outclipping, occlusion, and exposure. During (or following) transformation/classification of primitives in the local display list (e.g., step 6100 in FIG. 61) any primitive that outclips the entire view volume is identified and its corresponding element in the GVPA is modified to reflect its newly invisible status. In the present invention a read of the GVPA element is performed prior to modification by subimage processors. Because of primitive overlap in subimages this produces more read than write operations and minimizes cache coherency traffic caused by write-invalidates, insuring efficient parallel access to the shared array. Any subimage primitive that outclips the entire viewport has its status checked against the GVPA and if it is visible then the corresponding GVPA element is modified. Additionally the primitive's location in the source display list is determined from the dl_index field of the primitive's GVPA_element and the corresponding element of the source display list is modified to reflect an inactivated status. Also this dl_index value, representing the primitives location on the source (and destination) display list, is added to the list of primitives that are newly invisible for the entire image. In this way newly invisible primitives are encoded by their actual index in the client/decoder destination display list. As will be shown, this simplifies update and maintenance of the destination DDL. In the pipelined implementation the modification of the GVPA to reflect the invisibility caused by viewport outclipping is performed in stage I as part of step 6100.

Determination of newly exposed primitives for each subimage is determined by the stage II subimage processor using the previously described method of visibility search in exposure regions. However, as previously described, all newly exposed primitives are copied to the corresponding stage I processor in object-space form to be added to the local display list (e.g., 6150). These primitives are transmitted together with their unique primitive_ID which allows the primitive's element in the GVPA to be accessed directly. In step 6170 the visibility status of each newly exposed subimage primitive that is transmitted from stage II is checked against the GVPA to determine whether it is actually newly visible to the entire image. If, on read of the visibility field of the GVPA for the primitive, it is determined that the primitive is not already visible in the image then the GVPA element is modified to reflect new visibility. This process employs the aforementioned technique of read-before-write to minimize cache coherency misses caused by multiple write-invalidates that result when a primitive has become newly exposed in multiple subimage processors simultaneously. Additionally, the new location of the newly visible primitive in the source display list is determined and written to the dl_index field equivalent to the C data structure of Table VI. This index is the location of the newly visible primitive in both the source and destination display list and its inclusion with the transmitted primitive simplifies the display list update activities of the client. The process of identifying newly visible primitives for each frame is illustrated by pseudo-code in Table VII.

TABLE VII

Pseudo-code for Identification of Newly
Visible Primitives for Frame

```
for(each subimage) {
    for(each primitive newly visible to subimage) {
        if (corresponding element in GVPA == 0) {
            Set to 1.
            Add primitive to the source primitive
                display list.
            Record primitive's location in source display
                list in GVPA.
            Add primitive to newly visible primitive list
                for frame.
        }
    }
}
```

In addition to determining the list of newly visible primitives, and the list of primitives that are newly invisible because of viewport outclipping, the server computes a list of primitives that have become occluded in the image stream during the frame interval. The combination of these three sources of visibility transition represents the visibility event information for the frame and is transmitted by the server to the client. The process of determining newly occluded primitives for a frame is periodically performed by the server. This determination need not be performed for every frame. Instead the frequency of this determination is selected to prevent accumulation of occluded primitives on the client (destination) display list. This process is performed on the server by testing all newly occluded primitives for each subimage against the GVPA to determine which of the primitives newly occluded for a subimage are actually newly occluded for the entire image. The process of determining newly occluded primitives for a subimage as previously described is step 1570 of FIG. 15 for primitive reprojection. The newly occluded primitives for each subimage are determined, in the present parallel pipelined implementation, in the stage II subimage processor by the previously described process of reading non-occluded levels of the buffer after rasterization of all subimage primitives. The index of each newly occluded primitive in the stage I display list (previously transmitted with the image-space representation of the primitive) is transmitted to stage I to indicate newly occluded primitives for the subimage.

Unlike newly exposed subimage primitives, which can be verified as newly visible to the entire image by a simple check of the GVPA, newly occluded subimage primitives require additional steps to establish them as newly invisible to the entire image.

There are two fundamentally different approaches to determining which newly occluded primitives are newly invisible to the entire image. In one solution the visibility fields of the entire GVPA are first zeroed and reinitialized by reading all visible subimage primitives (excluding occluded ones) into the GVPA. This initialization produces a GVPA that represents only the visible primitives for the frame. After the GVPA is so initialized then each newly occluded subimage primitive is tested against the initialized GVPA. If it is found that the newly occluded subimage primitive is actually visible in the frame then it is not considered to be newly occluded for the entire image. Otherwise it is considered to be newly occluded for the entire image and its index in source and destination display list is obtained from the GVPA. The cost of the GVPA initialization is O(n) in the total number of visible primitives and O(n) in the primitive-subimage overlap factor. The zeroing part of the initialization of the GVPA is O(n) in the size of the database. Also the initialization incurs a relatively high frequency of non-local memory accesses and bus traffic even if the read-before-write policy is employed. One advantage of this technique is that the actual check of each newly occluded subimage primitive against the GVPA is relatively inexpensive. So, while the technique has a high overhead determined by the number of visible primitives in the image (and to some degree by the number of primitives in the database); when temporal visibility coherence is very low and many primitives are newly occluded in subimages then it becomes a more efficient approach to determining occlusion for the entire image. The determination of occlusion for the entire image using this technique is represented by the pseudo-code of Table VIII.

TABLE VIII

Pseudo-code for Determining Newly Occluded
Primitives for Frame

```
Zero GVPA for frame.
for(each subimage) {
    Add every visible primitive in display list to GVPA.
    for(each newly occluded primitive in subimage) {
        if(GVPA[Prim_ID].visiblity == 0) {
            /* primitive is newly occluded for */
            /* entire frame */
            Determine source_dl index from dl_index
                field of GVPA.
            Add this index to list of newly invisible
                primitives.
        }
    }
}
```

For these reasons an alternative technique of determining newly occluded status for an entire image is normally employed by the present invention when temporal visibility coherence is moderate or high. This technique is accomplished in a series of steps shown in the pseudo-code of table IX. In this technique each newly occluded subimage primitive is processed to determine which other subimage windows the primitive overlaps. If the primitive only projects to the current subimage window then it is newly occluded for the entire image. Otherwise the display lists of the other subimages in which the primitive overlaps are tested for the presence of the primitive. If the primitive is found to be visible in any of these other display lists of overlapping subimages then it is not newly invisible to the entire image. On the other hand, if the primitive is found not to be visible on any of the other subimages then it is newly invisible to the entire image. In either case the corresponding GVPA element is written with the value of the current frame in the "cur_frame" field to prevent duplicate tests of the same primitive by different subimage processors. The cost of this process is O(n) in the number of newly occluded subimage primitives and is heavily affected by the primitive overlap factor of occluded subimage primitives. If there is no overlap then the test need not be performed. If there is overlap then the cost of determining occlusion in the entire image is directly related to the number of primitives in the display list(s) of other overlapped subimages. The cost of determining which subimages are overlapped by a primitive is reduced by employing the previously described clipcode that has already been computed and stored for the primitive.

When a primitive is determined to be newly occluded for an entire image by either of the previously described processes, the primitive's index in the source/destination display list is determined from the dl_index field of its corresponding element in the GVPA. In this field, equivalent to the dl_index in the C data structure of Table VI, the data is unchanged from the previous frame. This value is transmitted to the client (as the newly occluded primitive list) which removes the primitive in this position from the DDL (destination display list) during update phase. The logic of determining newly occluded primitives for an entire image by this method is illustrated by the pseudo-code of Table IX.

TABLE IX

Pseudo-code for Determining Newly Occluded Primitives for Frame

```
for(each subimage) {
    for(each newly occluded primitive in subimage) {
        if(GVPA[Prim_ID].cur_frame != Current_frame) {
            /*Primitve not yet examined for image occlusion */
            Determine all other subimages in which primitve projects.
            if(primitive not present in any other subimage display list)
            {
                Set GVPA[Prim_ID].visibility = 0.
                Determine index in source and DDL lists via GVPA.
                Inactivate primitive in source display list.
                Add primitive DDL index to list of newly
                    invisible primitives.
                Record value of Current_frame in
                    GVPA[Prim_ID].cur_frame.
            }
        }
    }
}
```

In the preceding technique newly occluded primitives are determined separately from those primitives that become newly invisible because of viewport outclipping. This allows two different techniques to be used in signaling newly invisible primitives to the client. In a first technique only the newly occluded primitives are transmitted to the client. In this technique the client unit assumes responsibility for removing/inactivating outclipped primitives on the DDL. Outclipping of the viewport is computationally inexpensive and is generally determined as part of the primitive transformation process normally performed by the client image generation unit. By signaling only newly occluded primitives the required transmission bandwidth is reduced. Because determination of occluded primitives, on the other hand, cannot generally be performed by an object order rasterization pipeline, these primitives are always transmitted from the server as part of the visibility event stream. Alternatively, both the newly outclipped and newly occluded primitives can be included in the list of newly invisible primitives for each frame. This completely unloads the client unit from the cost of removing outclipped or occluded primitives. For client implementations in which the processors that perform primitive transformation and clipping do not have general write access to the DDL (e.g., many graphics cards) removal of outclipped primitives by the client unit is impractical. In this case transmission of all newly invisible primitives is employed.

Thus in the present implementation, information normally produced during the conduct of primitive reprojection: newly visible and newly invisible subimage primitives, is used to accelerate the process of determining new visibility and invisibility for an entire frame by testing these specific visibility transition candidates against a global primitive visibility array, the GVPA.

An alternate method of determining new visibility and invisibility for each frame is to logically compare global visibility information, e.g. the GVPA, initialized and computed for consecutive frames. In this method new visibility is established by identifying all primitives not visible in a previous GVPA but present in the current GVPA. This logical comparison is performed on an element-by-element basis for every element in the GVPAs for consecutive frames. A similar logical comparison of both arrays establishes those primitives represented as visible in the GVPA of the earlier frame, but not in the GVPA of the current frame, as newly invisible primitives. In principle this is a simple method of determining the primitive-based visibility event transitions. In actual implementation the cost of this process is O(n) in the size of the database and involves considerable non-local communication. The amount of non-local memory access can be reduced somewhat by partitioning the array among processors as previously described for the case of pre-zeroing the GVPA. Nevertheless this technique is generally more costly, because of its O(n) dependency on database size, than the previously described techniques in which only newly visible/invisible subimage primitives are tested for complete-image visibility transition. In that previously described technique the cost of identifying newly visible and invisible elements is relatively independent of database size and inversely related to the degree of temporal image and temporal visibility coherence of the image stream (i.e., the cost decreases when the rate at which primitives become newly visible/invisible decreases). Despite the higher cost of the consecutive GVPA comparison technique it can be employed to produce a visibility event stream from more conventional image synthesis systems in which newly visible and newly invisible subimage primitives are not explicitly identified.

As described, the list of newly visible and newly invisible primitives are very efficiently communicated to the client by maintaining an image of the client's display list on the server. In this method a partial image of the client's display list is stored on the server. It is called the source display list. The client display list is called the destination display list. The client display list is an actual display list. In this technique data for all newly visible primitives are added to the source display list by the server. During this process the server computes an appropriate insertion location for each newly visible primitive. This insertion location on the server source display list reflects the available locations on the source display list and employs a known insertion-replacement protocol designed to keep the source display list compact and easily traversed. The insertion index of each primitive added to the source display list is transmitted to the client with the primitive. This index is used by the client as the location of the transmitted primitive in the client (destination) display list. In this way the cost of determining an efficient location on the display list for each newly visible primitive is paid by the server and not the client. This arrangement of mirrored source and destination display lists allows elements (e.g., primitives or vertices) that become newly invisible to be efficiently removed from the destination display list. In this technique the index of the newly occluded (or invisible) primitives is determined on the source display list by the server (using the previously described GVPA linked list). The value of these indices are transmitted to the client and primitives in the corresponding locations of the destination display list are labeled as inactive. Using the aforementioned techniques the computational expense of all additions to and deletions from the client's display list is principally incurred by the server. The use of these mirrored, cooperating arrays shifts the computational cost of display list replacement and compaction from the client to the server.

In the present method the source display list does not actually contain complete information for visible primitives. The source display list is actually not a display list at all. Primitives that are actually transmitted to the client come from the list of newly visible primitives produced by the previously described process for each frame. The source display list itself does not need to contain all the information required to display the primitives since primitives are not actually rasterized by the server from the source display list. The server source display list needs only contain sufficient information to describe the exact state of the destination display list (DDL) in terms of the numbers and exact location of all specific primitives. In the source display list this is represented using fields expressing the unique primitive_ID and the state of activation of the source display list element. Additional information describing vertex references is included in the source display list for an efficient implementation using a destination display list (DDL) represented as separate primitive and vertex lists. This implementation is described below.

Separate Vertex Encoding for Visibility Event Encoding

The efficiency of the client-server implementation is increased in the present method by employing source and destination display lists comprised of separate primitive and vertex arrays. As previously described this representation can significantly reduce the storage and processing requirements for databases such as triangle meshes in which vertices are heavily shared. In the present implementation this reduced storage requirement is translated into a significant reduction in the bandwidth required to support the server-client connection. In addition it results in fewer vertices (by eliminating duplication of shared vertices) for the client unit to transform and shade.

In this technique the source display list is comprised of separate primitive and vertex lists. Elements of the source primitive list are equivalent to the C data structure shown in Table X. In the present implementation graphics primitives are limited to triangles, though the techniques can be applied to any convex primitives.

TABLE X

Data Structures for Source Display List

```
struct source_prim_dl
    {
    int prim_ID;      /* Unique identifier for primitve, 0 == inactive*/
    int vertex1;      /* Index in source vertex list for vertex 1 */
    int vertex2;      /* Index in source vertex list for vertex 2 */
    int vertex3;      /* Index in source vertex list for vertex 3 */
    };
struct source_vertex_dl
{
int vertex_ID;    /* Unique identifier for vertex, 0 == inactive */
int prim_count;   /* Number of primitives in source dl sharing*/
                    vertex
};
```

When a primitive is added to the source primitive list because it has become newly visible in the stream, its vertices are checked for preexisting presence in the source vertex list. If a vertex belonging to the primitive is already present in the source vertex list (as determined by efficiently accessing the source vertex list using a linked list described below) then the vertex is not added to the source vertex list and the primitive's reference to the vertex is directed to the corresponding identical vertex in the source display list. Additionally a field indicating the number of visible primitives sharing the vertex is incremented by one in the corresponding vertex in the source display list. If, on the other hand, the vertex of a newly visible primitive is not already present in the source vertex list then it is added to the source vertex list. It's index of insertion into the source vertex list is recorded along with the vertex information which is stored in a list of newly visible vertices for the frame. This list is transmitted to the client. In this way every newly visible vertex is transmitted together with its destination location in the destination vertex display list.

Primitives that become newly invisible to the image are processed against the source vertex list by decrementing the field indicating the number of visible primitives sharing the vertex (equivalent to the "prim_count" field of the C data structure "source_vertex_dl" shown in Table X) for every visible vertex in the primitive. Vertices are inactivated or otherwise removed from the source display list when the number of visible primitives sharing the vertex is zero. The indices of all vertices removed in this way are stored and transmitted to the client which inactivates the corresponding vertices in the destination vertex display list.

Note that the process of establishing new visibility of a vertex by the previously described method is intrinsically O(n) in the number of previously visible vertices if the source vertex list is searched for matching vertices. In the present method the cost of determining presence on the source vertex list is substantially reduced by employing a linked list array which stores the index of each vertex in the source vertex list. This array is called the global visible vertex array (GVVA). The GVVA stores for each vertex in the database the actual location of the vertex in the source vertex list, by array index. There is one element in the GVVA for every vertex in the database. The element in the GVVA representing a particular vertex is that element with an index corresponding to the vertex's unique ID (e.g., vertex_ID field). If the vertex is not represented in the source vertex list then it's value in the corresponding GVVA is null. For each newly visible primitive added to the source primitive list the primitive's vertices are checked for presence on the source vertex list through the GVVA. Newly visible vertices are added to the source vertex list and the insertion index is recorded in the vertice's element in the GVVA. The vertices of newly invisible primitives are decremented in the source vertex list using the index location supplied by the GVVA. If the number of primitives sharing a vertex in the source vertex list falls to zero then its entry in the source vertex list is set to zero and its corresponding element in the GVVA is set to null.

The GVVA is implemented as an array of 32 bit words in which each element gives the index location of the corresponding vertex in the source vertex display list. Vertices not represented in the source vertex display list have a value of NULL in the corresponding GVVA element. Since the GVVA is read more than written (because of vertex sharing) efficient parallel access to the array is achieved without incurring excessive cache coherency traffic generated by write invalidates. Pseudo-code for the process of updating the source vertex list with the addition of newly visible primitives is shown in Table XI. In this table Source_vertex_dl and Source_primitive_dl are the arrays for the source vertex and primitive lists. Pseudo-code for the process of updating the source vertex list based on newly invisible primitives is shown in Table XII.

TABLE XI

Pseudo-code for Updating Source
Vertex List with Newly Visible Primitives

```
for(each newly visible primitive added to Source_primitive_dl) {
    for(each vertex of newly visible primitve) {
        if(corresponding element in GVVA == 0) {
            /* Vertex is newly visible */
            Add newly visible vertex to Source_vertex_dl.
            Record vertex_dl location in primitive_dl and GVVA
        }
        else { /* vertex already visible */
            Index = GVVA[vertex_id].
            Record value of Index in current source_primi-
                tive_dl.vertex
            Source_vertex_dl[Index].prim_count++/*increment
                prim_count*/
        }
    }
}
```

TABLE XII

Pseudo-code for Updating Source
Vertex List with Newly Invisible Primitives

```
for(each newly visible primitive) {
    for(each vertex of newly visible primitve) {
        Index = GVVA[vertex_id] /*find location in Source_vertex_dl */
        Source_vertex_dl[Index].prim_count--/*decrement */
        prim_count if (Source_vertex_dl[Index].prim_count==0) {
            /*inactivate and remove vertex if no longer referenced */
            Set GVVA[vertex_ID]=0.
            Set Source_vertex_dl[Index].prim_ID = 0.
        }
    }
}
```

These techniques allow the server and client to maintain a shared vertex representation of the display list that minimizes the required connection bandwidth and reduces the storage and processing costs of the client unit.

In addition to the use of separate vertex encoding to decrease the required connection bandwidth between the visibility event encoding (server) and decoding (client) unit the present method employs known techniques of geometry compression to further reduce the requisite bandwidth. Such techniques are described by Deering (1995).

Decoding/Client Units

Client units receiving the previously described on-demand visibility event stream produced by the server can employ depth comparison rasterization to render the incrementally transmitted display lists. Texture information can be pre-transmitted from the server to the client or transmitted at other scheduled times. Transmitted texture information includes conventional maps as well as parameters for procedural methods of texture synthesis which are then generated by the client. Alternatively, transmitted primitives can refer to materials and textures from prestored libraries of textures maintained by the client. The use of procedural textures and prestored texture libraries reduces the required client-server connection bandwidth. The use of prestored texture libraries allows the user to modify the appearance of the model by selecting texture preferences.

Alternative embodiments of the method include implementations in which both geometric and image information is transmitted to the client. In such implementations the server actually computes pixel information for specific parts of the image that contain lighting or shading effects that cannot be rendered by the client unit. For example ray tracing, a process for which the server is already optimized, can be selectively invoked to compute reflection, refraction and shadow effects that exceed the rendering capabilities of the client. The server transmits this pixel information to the client which composites it atop the client-rendered image. Because these effects can be limited to relatively small regions of the image, existing image codec technology can provide sufficient compression to allow advanced photorealistic effects to be displayed using inexpensive client units. In this implementation the client unit is a basic image generation pipeline that is modified to decompress the encoded image information and display it with priority over the corresponding region of the image rendered by the client.

Additional details of the client implementation are now presented. As previously described the client unit employs a conventional rasterization pipeline in which the display list of primitives is the destination display list. In addition to display capabilities the client unit has basic compute resources necessary to receive and parse the visibility event stream of newly visible and newly invisible primitives. Client decoding includes modification of the destination display list to include newly visible primitives and inactivate newly invisible primitives in the destination display list in a manner that reflects the incoming visibility event information for each frame. The computational cost of modifying the destination display list is substantially minimized because the insertion indexes of all newly visible primitives are provided. As a result the client unit need not search for a suitable location in the destination display list for each newly visible primitive. Moreover the index in the destination display list (DDL) of each newly invisible primitive is provided, making inactivation very inexpensive. Explicit inactivation is avoided by overwriting newly invisible primitives with data representing newly visible primitives. In the present method if this type of overwrite is determined by the server then connection bandwidth is reduced somewhat by not encoding newly invisible primitive indices explicitly.

In one implementation of the client/decoding unit, parsing of the visibility event stream and execution of the previously described destination display list maintenance activities (insertion, inactivation), are performed by a general purpose computer (e.g., such as a personal computer or the computer shown in FIG. 11). In this implementation the destination display list is actually displayed by a separate graphics system (e.g., graphics card) that performs transformation-rasterization of active primitives in the destination display list. The visibility event parsing and display list maintenance activities are implemented as a software process executed by the CPU-main memory system of the computer. The bidirectional physical connection from server to client is provided through a cable modem or other high speed interface executing a known transmission control and communication protocol.

In the present implementation the display of previously visible primitives, already present in the client DDL, can begin before the visibility event information for the current frame is received by the client. While this display is being performed, newly visible and newly invisible primitives are parsed from the stream for the current frame and this data is stored in a temporary buffer. On completion of the display of the existing DDL (destination display list) the newly visible primitives (and associated vertices) are displayed from the buffered list. Subsequently newly visible primitives are copied from the temporary buffer into their predetermined locations in the client DDL. Primitives in the DDL corresponding to newly invisible primitives for the frame (as determined from the buffered visibility event data for the frame) are inactivated in the DDL. In the present implementation this sequence of display—update allows previously visible primitives to be displayed immediately after display of the last frame. The initiation of the display phase of the cycle is not delayed waiting for incoming visibility event information. This sequencing will cause a delay in the removal of newly invisible primitives by one frame. This does not result in render errors. In the case that the client unit finishes the display of previously visible primitives and the frame interval is expired before the arrival of all newly visible primitives for the frame the client unit transforms and displays the current DDL primitives (and vertices) using the transformation data for the new (current) frame. This technique allows frame rate to be maintained despite incomplete visibility event information produced by transient performance degradation of the server or transient overloads of available connection bandwidth. Newly visible primitives that arrive late are transformed by the current transformation matrix for the frame and inserted into the DDL (and the client image stream) late. This late insertion of newly visible primitives is relatively invisible to human observers if it occurs within a few hundred milliseconds (several tens of frames) of its scheduled time. This relative invisibility results because the human visual system requires, in general, several hundred milliseconds to completely resolve newly exposed image information. This temporal limit of human visual integration is exploited by specific methods of spatio-temporal sampling described in the copending application. Further details of maintaining synchronization between a visibility event stream and a decoding unit are presented in a later part of this specification.

In one technique to reduce the degree of visibility error caused by late transmission of primitives; newly visible primitives with a relatively large exposed area are transmitted before newly visible primitives with a relatively low exposure area. Late transmission of newly visible primitives that have a high exposure area produces a relatively large exposure error during decoding and display. Conversely newly exposed primitives with a small exposure area produce a relatively small exposure error if transmitted late. In this technique the exposure area of a newly exposed primitive is estimated from the number of samples belonging to the primitive in the encoder depth buffer. This is determined during the read of the depth buffer to establish newly occluded primitives as previously described. Newly visible primitives with a large exposure area are given priority during transmission to the client/decoder.

In the previously described client/decoder implementation the DDL is displayed for the current frame, newly visible primitives are displayed from a temporary list, and then the DDL is updated with the information from the current frame of the visibility event data stream. This update is the insertion of newly visible primitives and inactivation of newly invisible primitives. In this sequence the display of the current frame DDL awaits insertion of newly visible primitives from the current or earlier visibility event frames.

While the insertion indices and inactivation indices provided by the previously described method of encoding a visibility event stream do reduce the computational cost of updating the DDL; they do not completely eliminate these costs. In the preceding sequence of display-update the client delays the display of the DDL while performing inactivations and insertions encoded by the visibility event information from an earlier frame.

In an alternative client/decoder implementation this delay is eliminated by employing two representations of the DDL to hide the cost of display list management activities. In this implementation each of these representations of the DDL is associated with a dedicated processor capable of performing DDL update and display functions. In this implementation one DDL undergoes update (using visibility event data from an earlier frame or frames) while the second DDL undergoes display. In the method each of two DDL representations alternatively undergoes update and display cycles. While one DDL is being displayed the second DDL is being updated with the visibility event information from the last frame. In this way display of the DDL for the current frame is not delayed by a DDL update process.

FIG. 51 schematically illustrates two DDL's in alternating display and update phases for five consecutive frames. Newly visible primitives that are parsed from the visibility event stream are made available to both display-phase and update-phase processors by copying the visibility event information for the incoming frame to temporary buffers accessible by each processor. When a DDL is in display phase the corresponding processor effects the display of the primitives present in the DDL from the previous frame. Newly visible primitives from the current visibility event frame are displayed by the display-phase processor by reading them from the aforementioned temporary buffer. In this way the display phase buffer can immediately display primitives visible in the previous frames (on the DDL) and can display newly visible primitives when they are available. The processor in display-phase does not update the DDL to reflect the new visibility event frame information. While the display-phase processor displays the display-phase DDL the update-phase processor updates the other DDL by effecting insertions and inactivations from earlier visibility event frames. At the end of the update phase the update-phase DDL reflects the current DDL except for the information in the current visibility event frame, which may have been received too late to completely process during the update phase. Any newly visible primitives left unprocessed into the DDL remain in the update-phase's temporary buffer for later display/update. Therefore at the completion of the cycle for a single frame the update-phase DDL is updated (except for possible current information in the temporary buffer); and the display phase DDL has been displayed (as a DDL plus the buffered current-frame newly visible primitives). For the next frame the updated update-phase DDL becomes the display-phase DDL. In the FIG. 51 two DDL's are shown in alternating update and display phases for five consecutive frames. In frame 1 the DDL in both buffers reflects earlier information indicated as 0. In each frame the two DDLs are shown at some time during the corresponding frame. Smaller boxes represent temporary buffers to hold recent visibility event frame information that has not yet been integrated into the DLL by the update process. Although frame 1 information is shown in the temporary buffers during frame 1 it may not be completely integrated into the DDL during frame 1 and so is still shown in the temporary buffer for frame 2. Additionally, because the left hand DDL is in display phase during frame 2, frame 1 information is not integrated into the left hand DDL until frame 2 and is shown completed in frame 3. In this way newly incoming visibility event information may not be fully integrated into the DDL for 2–3 frames. This does not result in display errors however since the newly visible primitives from the buffered visibility event information are displayed during display phase directly from the buffer.

By double buffering the DDL in this way, update activities execute in parallel with display activities. This allows more effective DDL compaction activities to be performed during the update phase. One such activity performed during the update cycle in the current implementation is to virtually "compact" the DDL by maintaining a linked list that gives all active elements in the DDL. This linked list is rebuilt for each frame by reading the DDL during update phase and recording the indices of all active elements in the DDL in said linked list. When the DDL is relatively sparse and fragmented the linked list is used to access the DDL during display phase and substantially reduces list processing time. Alternatively, if time is available, an actual compaction of the DDL may be performed.

Figure 58:
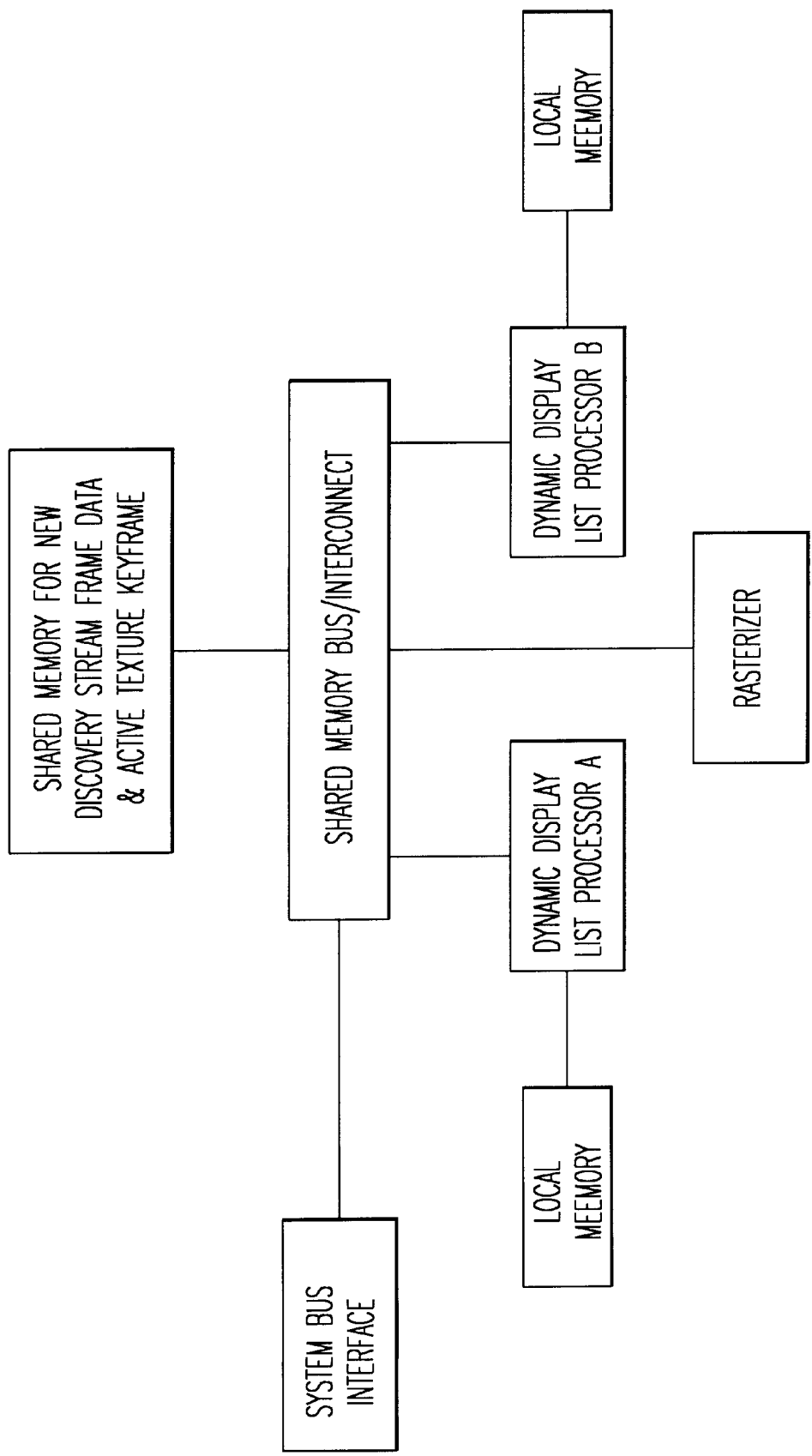
FIG. 58 a diagram showing a visibility event decoder unit employing a two cycle dynamic display list.

An example embodiment of this two cycle client image generation method is illustrated in FIG. 58. In this implementation the dual display lists are implemented as local or cache memories for two display list processors. These processors are connected to a shared memory through a shared memory interconnect/bus. The shared memory is used to store texture, material, keyframe and other graphics information that is needed by both display processors. Also connected to the shared memory bus is one or more rasterizer processors responsible for rasterizing transformed primitives.

DDLs are stored in local memory. The update phase is a process that incurs exclusively local memory accesses. This allows the update process to proceed without contenting for the shared memory interconnect that is heavily used by both the alternate display processor and rasterizer during the simultaneous display phase. This alternating cycle of local memory and shared memory accesses allows efficient use of the interconnect. This implementation employs general purpose microprocessors as the display list and geometry processors. The system can be implemented as a graphics card connected to a computer through a standard bus interface such as PCI. In such an implementation the computer CPU functions to parse the visibility event datastream and sends the parsed information to the graphics card using the system bus.

Visibility Event Codec Optimized for Non-real-time

As previously described a server implementation of the present method produces a datastream that efficiently encodes a representation of differential geometric visibility and invisibility that evolves during a computer generated image sequence. This type of a visibility event datastream can be employed to encode the results of a computer animation produced in non-real-time and provides several advantages over image-based codecs.

Generation of the encoded signal is achieved using the previously described method of producing a list of newly visible and newly invisible primitives for each frame. Texture, material, and lighting information undergoes pretransmission or scheduled transmission as previously described. In addition to this information, animation data is transmitted and used by the client to effect the transformations of visible display list primitives and display the animation in real-time. Animation data is efficiently encoded as incremental keyframe data which is converted to transformation matrices for each frame during decoding performed on the previously described decoding unit.

In this method visibility event information comprising a precomputed animation sequence is encoded as a digital streaming format and stored on a digital recordable medium (e.g., CDROM, DVD) for later playback. Unlike the visibility event encoding for the real-time client server implementation the present encoding does not have to be performed in real time. Moreover, since the visibility event information is known for every frame of the sequence, newly visible primitives can be encoded using a technique that optimizes the use of the available transmission bandwidth. In this technique primitives from frames with a large amount of visibility event information are "preencoded" by encoding them in the visibility event information for earlier frames with few newly visible primitives (i.e., frames with high temporal visibility coherence). Such pretransmitted primitives include an "activation frame" data field that indicates when the primitive should become active in the client destination display list. By pre-encoding primitives during periods of low temporal visibility coherence the method makes optimal use of available transmission/replay bandwidth.

When used to encode computer animation the visibility event stream includes incremental transmission of keyframe data describing prescripted object motion. This is transmitted to the client which maintains the current keyframe data that defines the active segment for each animation channel. This information is sufficient to allow the client to interpolate between keyframes. Obsolete keyframe data from earlier segments is discarded by the client preventing accumulation of animation data and optimizing the use of client (decoding unit) storage resources. By encoding keyframe data (which is later interpolated on the decoder unit to compute actual transformation data for several frames) rather than per-frame transformation data the present method more efficiently utilizes transmission/replay bandwidth.

The Table XIII is a specification for a frame-based binary bytestream implementation of a visibility event stream. In this example implementation, specific information for the visibility event stream is organized into chunks of binary encoded data delimited by known binary tokens which indicate the type of information contained in the associated chunk.

TABLE XIII

| Token Name | Token Value | Size in bytes | Description |
| --- | --- | --- | --- |
| 1. FRAME | 0 × 01 | | |
| int framenumber; | | 2 | Visibility Event Frame # |
| int size; | | 4 | Size of frame information |
| | | 6 | Total |
| 2. CURRENTOBJECT | 0 × 02 | | Sets current object as state variable, index reference |
| int objectindex; | | 4 | Index of object in the object DDL |
| 3. CURRENTMATERIAL | 0 × 03 | | Sets current material as state variable, index reference |
| int currentmaterial; | | 4 | index of the material in the material DDL |
| 4. ACTIVEPRIMITIVE | 0 × 04 | | Primitive transmitted in active state |
| int v1, v2, v3; | | 12 | Reference to vertices in vertex DDL |

TABLE XIII-continued

| Token Name | Token Value | Size in bytes | Description |
|---|---|---|---|
| int insertionpoint; | | 4 | Location of insertion index in DDL |
| char checksum; | | 1 | |
| | | 17 | Total |
| 5. INACTIVEPRIMITIVE | 0 × 05 | | Primitive pretransmitted in the inactive state |
| int v1, v2, v3; | | 12 | Reference to vertices in vertex DDL |
| int insertionpoint; | | 4 | location of insertion index in DDL |
| int frame_activation_no; | | 4 | Frame # when primitive becomes active |
| char checksum; | | 1 | |
| | | 21 | Total |
| 6. VERTEX_PHONG_TEXTURED_ACTIVE | 0 × 06 | | List of vertices with vertex normals |
| int count; | | 4 | Number of vertices in list |
| int insertionpoint; | | 4 | Location of insertion point in DDL |
| float x, y, z; | | 12 | Vertex values |
| float xn, yn, zn; | | 12 | Vertex normal values |
| float u, v; | | 8 | Texture map values |
| char checksum; | | 1 | |
| | | 41 | Total |
| 7. VERTEXLIST_PHONG_TEXTURED_ACTIVE | 0 × 07 | | List of vertices with vertex normals |
| int count; | | 4 | Number of vertices in list |
| int insertionpoint; | | 4 | Repeated Location of insertion point in DDL |
| float x, y, z; | | 12 | Repeated Vertex values |
| float xn, yn, zn; | | 12 | Repeated Vertex normal values |
| float u, v; | | 8n | Repeated Texture map indices |
| char checksum; | | 1 | |
| | | 36n + 9 | Total |
| 8. PRIMITIVE_REMOVAL_LIST | 0 × 09 | | List of primitives to inactivate |
| int count; | | 4 | Number of indices in the list |
| int primitiveindex; | | 4n | Index in primitive DDL of primitive to be inactivated |
| char checksum; | | 1 | |
| | | 4n + 5 | Total |
| 9. PRIMITIVE_ACTIVATION_LIST | 0 × 0A | | List of primitives to activate |
| int count; | | 4 | Number of indices in the list |
| int primitiveindex; | | 4n | Indexs in primitive DDL of primitive to be inactivated |
| char checksum; | | 1 | |
| | | 4n + 5 | Total |
| 10. VERTEX_REMOVAL_LIST | 0 × 0B | | List of vertices to inactivate |
| int count; | | 4 | Number of indices in the list |
| int primitiveindex; | | 4n | Index in vertex DDL of vertex to be inactivated |
| char checksum; | | 1 | |
| | | 4n + 5 | Total |
| 11. VERTEX_ACTIVATION_LIST | 0 × 0C | | List of vertices to activate |
| int count; | | 4 | Number of indices in the list |
| int primitiveindex; | | 4n | Index in vertex DDL of vertices to be inactivated |
| char checksum; | | 1 | |
| | | 4n + 5 | Total |
| 12. KEYFRAME_LIST | 0 × 0D | | Keyframe data for a specific object. Used to generate transformation matrices for object. Stored in the FIFO buffer for each object. |
| int count; | | 4 | Number of keyframes in this list. |
| short int frame; | | 2n | Repeated. Frame number of the keyframe. |
| int object; | | 4n | Repeated. Referenced object. |
| int splineflags; | | 4n | Repeated. Bitflags for spline basis function. |
| float splinecoeffs [4]; | | 16n | Repeated. Coefficients for spline. |
| float pos [3]; | | 12n | Repeated. Position. |
| float rot [3]; | | 12n | Repeated. Rotation. |
| char checksum; | | 1 | |
| | | 50n + 5 | Total (more for additional parameters) |
| 13. OBJECT | 0 × 0F | | Gives rotational center and axes of object. After transmission to client each object references a specific array of transformation matrices generated from associated keyframe data. |
| int object; | | 4 | Index in the object list for insertion. |
| float pivot [3]; | | 12 | xyz value of object's rotational center. |
| char checksum; | | 1 | |
| | | 17 | Total |
| 14. MATERIAL | 0 × 13 | | Material specification. |
| int insertionpoint; | | 4 | Index in the material DDL where material will be written. |
| char materialname[10]; | | 10 | Name of the material. |
| char materialtype[10]; | | 10 | Material type allows client substitution by class. |
| float ka[3]; | | 12 | tristimulus ambient reflection components. |
| float kd[3]; | | 12 | tristimulus diffuse reflection components. |
| float ks[3]; | | 12 | tristimulus specular reflection components. |
| float sninyness; | | 4 | phong exponent. |

TABLE XIII-continued

| Token Name | Token Value | Size in bytes | Description |
|---|---|---|---|
| float shinyness_strength; | | 4 | shinyness coefficient. |
| float transparency; | | 4 | transmission coefficient. |
| float texmapstrength; | | 4 | texture map application strength. |
| int texmap; | | 4 | index in texture map DDL map. |
| char checksum; | | 1 | |
| | | 81 | Total (more for additional parameters) |
| 15. TEXTUREMAP | 0 × 14 | | Conventional texture map. |
| short int columncount; | | 2 | |
| short int rowcount; | | 2 | |
| int insertionpoint; | | 4 | Index in the texture DDL where map is inserted. |
| char texturename[10]; | | 10 | Material name. |
| char texturetype[10]; | | 10 | Material type allows client substitution by class. |
| char pixel_data; | | 3*rowcount *columncount | |
| | | Variable | Total |
| 16. PROCEDURAL_TEXTURE | 0 × 21 | | Procedural texture. |
| int generation_model; | | 4 | Indicates a specific procedural texture fxn stored on client. |
| float parameters[10]; | | 40 | Parameters controlling procedural function. |
| | | 44 | Total |
| 17. CREATE_PRIM_DDSL_ACTIVE | 0 × 16 | | Creates a primitive dynamic display sublist that is active. Requires the primitives to be in the corresponding region of DDL. |
| int insertionpoint; | | 4 | Index in the primitive DDL where the DDSL begins. |
| int count; | | 4 | Number of primitives in the new DDSL. |
| short int DDL_map_index; | | 2 | Index in the DDL map where this information is stored. |
| | | 10 | Total |
| 18. ACTIVATE_PRIM_DDSL | 0 × 18 | | Activates a primitive DDSL by setting the DDL map element to active. |
| int activationpoint; | | 2 | Index in the DDL map to activate DDSL. |
| 19. INACTIVATE_PRIM_DDSL | 0 × 20 | | Inactivates a primitive dynamic display sublist by setting corresponding index in the primitive DDL map to inactive. |
| int inactivationpoint; | | 2 | |
| 20. TRUNCATE_PRIM_DDSL | 0 × 23 | | Truncates a primitive DDSL for more efficient display traversal. |
| short int ddl_map_index; | | 2 | |
| int new_length; | | 4 | |
| | | 6 | Total |
| 21. CREATE_VERT_DDSL_ACTIVE | 0 × 24 | | Creates a vertex dynamic display sublist that is active. Requires the vertices to be in the corresponding region of DDL. |
| int insertionpoint; | | 4 | Index in the vertex DDL where the DDSL begins. |
| int count; | | 4 | Number of vertices in the new DDSL. |
| short int DDL_map_index; | | 2 | Index in the DDL map where this information is stored. |
| | | 10 | Total |
| 22. ACTIVATE_VERT_DDSL | 0 × 25 | | Activates a vertx DDSL by setting the DDL map element to active. |
| int activationpoint; | | 2 | Index in the DDL map to activate DDSL. |
| 23. INACTIVATE_VERT_DDSL | 0 × 26 | | Inactivates a vertex dynamic display sublist by setting corresponding index in the vertex DDL map to inactive. |
| int inactivationpoint; | | 2 | |
| 24. TRUNCATE_VERT_DDSL | 0 × 27 | | Truncates a vertex DDSL for more efficient display traversal. |
| short int ddl_map_index; | | 2 | |
| int new_length; | | 4 | |
| | | 6 | Total |
| 25. PRIM_MAPPED_TRAVERSAL | 0 × 28 | | Signals client to use mapped access of primitives through DDL map during display. |
| 26. PRIM_STRAIGHT_TRAVERSAL | 0 × 29 | | Signals client to ignore DDL map and process primitive DDL directly during display. |
| 27. PRIM_DDL_COMPACT | 0 × 30 | | Signals client to perform a predetermined compaction scheme on entire primitive DDL. |
| 28. PRIM_DDSL_COMPACT | 0 × 31 | | Signals client to perform a predetermined compaction scheme on DDSL described in primitive DDL map at given index. |
| short int map_index; | | 2 | |
| 29. VERT_MAPPED_TRAVERSAL | 0 × 32 | | Signals client to use mapped access of vertices through DDL map during display. |
| 30. VERT_STRAIGHT_TRAVERSAL | 0 × 33 | | Signals client to ignore DDL map and process vertex DDL directly during display. |

TABLE XIII-continued

| Token Name | Token Value | Size in bytes | Description |
|---|---|---|---|
| 31. VERT_DDL_COMPACT | 0 × 34 | | Signals client to perform a predetermined compaction scheme on entire vertex DDL. |
| 32. VERT_DDSL_COMPACT | 0 × 35 | | Signals client to perform a predetermined compaction scheme on DDSL described in vertex DDL map at given index. |
| short int map_index; | | 2 | |
| 33. SYNCORONIZATION_BARRIER | | | Byte token scanned for by visibility event parser following phase error. Allows parser to reestablish phase synchronization with stream. |
| 0 × FF 0 × FF 0 × FF 0 × FF 0 × FF | | 5 | |
| 34. NUMBER_OF_FRAMES_TIL_COMPLETE_SET | 0 × 36 | | Number of visibility event frames until a complete visible set develops is determined for every visibility event frame during encoding. |

The present primitive-based visibility event encoding may contain graphic primitive/vertex, keyframe animation, material, texture, lighting and other information required by the decoding unit to generate the image sequence. Encoded visibility events are organized into packets called frames. Each frame packet encodes visibility events that occur during a single visibility event encoding interval. These events include exposure (new primitive and vertex information) and invisibility events that are encoded as primitive and vertex removal instructions. In addition when the visibility event stream is implemented to encode prerecorded computer generated sequences (and not real-time visibility events) each frame can contain future visibility event information (e.g., the previously described "pre-encoded" primitives from later visibility event frames with low temporal visibility coherence). The encoded frame packets, including the pre-encoded primitives from future frames, are assembled sequentially in such a manner that allows streaming of the encoded data to a decoding unit at an average rate of n frame packets per second where n is the desired visibility event parsing rate. The variable relationship between the visibility event encoding rate and the display rate will be described later in this specification in connection with FIG. 52.

In the example implementation of Table XIII, byte order is big endian. Delimiter tokens include the "SYNCHRONIZATION_BARRIER" token that is a unique multi-byte token which can be scanned by a parser to reestablish phase following a phase error caused by data loss. Optional checksum values may also be included (as in the example "MATERIAL" chunk #14 in Table XIII) to allow the parser to detect transmission errors. Data loss errors can be mitigated in the case of implementations which employ a direct client server connection (for either real-time image generation client-server, or on- demand streaming playback client-server) because a reliable transmission protocol (e.g., TCP/IP) can be used.

In addition to this graphic database information, each packet may also contain bytecodes that represent display list management instructions for the client. These instructions effect the primitive and vertex destination display lists as well as other lists including material, texture, light, object, etc.

Note that for material and texture chunks (e.g., tokens 14 and 15 in Table XIII), names and class types are supplied. This allows the user of the decoding unit to substitute specific materials and textures from prestored class libraries.

In addition to the main primitive and vertex DDL maintained by the decoding unit, auxiliary lists of geometric, keyframe, material, texture and other information are maintained. These lists are generally less dynamic than the main primitive and vertex DDL and may change only periodically to reflect the need for different materials, textures, etc., in the evolving image stream. Various instructions (encoded as tokens and associated chunk data) issued from the encoded bytesteam direct the management of these auxiliary lists, herein called destination display sublists (DDSL). The modification of dynamic display lists (DDL) or dynamic display sublists (DDSL) and other lists are made to optimize the use of available display list memory and to improve the efficiency of display list traversal.

For graphics primitives there is generally one main DDL and potentially several DDSLs that are accessed through a DDL map. The DDL map specifies the location of DDSLs in client display list memory. The DDL map allows efficient traversal of a sparse DDL by skipping large unused sections of the DDL without the need for a linked list traversal. Moreover all the elements in a DDSL can be activated or inactivated by changing the activation status of the DDSL in the DDL map. Separate DDSLs are useful for maintaining special objects such as avatars or vehicles that represent completely replicated objects that may be under user control and could be visible at any time during replay of a prerecorded visibility event stream. These activities are executed by the client/decoder unit on parsing of specifically encoded instructions shown as tokens 17–25 in Table XIII. Additionally, encoded instructions that indicate the activation or suspension of the display activities of specific DDL's and DDSL's.

Organizations of the DDLs which optimize storage and traversal are determined at the time of encoding. During generation of the newly visible primitive lists and primitive removal list the encoding unit determines optimal locations for DDSLs and optimal insertion sites for primitives or vertices in the DDLS and DDSLs that are progressively assembled on the visibility event client/decoder unit. The organization of these DDLs and DDSLs reflect the optimally organized display lists that were used during the encoding process.

Additionally by employing a source display list during encoding the encoding process can monitor the current size of the display list required to display the current frame. This allows the decoder to control the size of the display list to match the storage and display capabilities of the decoding unit. In this method primitives from a reduced level-of-detail representation are encoded if the size of the source display list, and therefore the destination display list, exceeds a predetermined value.

This encoding method provides significant advantages over conventional storage of computer animation as a sequence of images. One advantage is that it provides a highly efficient codec that allows display of the image sequence with a resolution that is essentially independent of transmission bandwidth. A more significant advantage is that because the decoding unit is an image generation system the method is amenable to implementations which allow an unprecedented degree of user interactivity during the display of a prerecorded visual datastream. These implementations are described below.

Extensions to Visibility Event Codec that Allow Defined User Interactivity During Replay The present invention includes several techniques by which various degrees of user interactivity can be enabled during replay of a prerecorded computer animation. In the previously described visibility event encoding method substantially only those primitives that are actually visible in an image stream are progressively encoded for a computer animation. In this method the 3-D graphic primitive is the basic unit of encoding and an encoding which contains only those primitives that become visible in a specific sequence contains the optimally encoded set of primitives. The present invention includes a number of techniques by which the optimally encoded set of primitives is extended in precisely defined ways to enable defined degrees of user interactivity during replay of the encoded event sequence. These types of interactivity include the ability to control the velocity, view direction vector, and viewpoint position within a predetermined region surrounding a central viewpoint trajectory. This interactivity is provided by encoding precisely defined supersets of the minimal set of newly visible primitives that comprise the previously described visibility event stream.

In one simple technique a collection of primitives that represents a complete, explorable subset of the virtual environment being displayed in the animation can be incrementally pre-transmitted during low bandwidth utilization periods. This set of primitives is activated at the appropriate time in the animation to allow the user to fully interact with that part of the model/environment represented by the pretransmitted primitives. In this way the datastream allows a seamless transition between passive animation (e.g., viewing of a predetermined "cutscene" sequence) and interactive exploration of a virtual environment. In this technique visibility event encoding is effectively combined with a data replication approach (e.g., VRML) in seamless way. In this case the type of interactivity is unlimited but the size of the explorable subset of the database is limited by the number of encoded primitives and more importantly by the decoder graphics performance since all primitives in the explorable database must effectively be processed for each frame. In a related technique certain objects that may be visible at any time during the decoding of the visibility event stream and which can be interactively controlled during replay are pretransmitted to the destination display list (DDL) of the receiver and retained on the DDL throughout decoding despite visibility. This allows special objects such as vehicles, avatars, etc. to be controlled interactively throughout the visibility event decoding. Like the previous technique this technique effectively combines a conventional database replication approach (used by VRML and many computer games) with the progressive visibility event transmission approach to effect a hybrid approach that enjoys the interactivity of replication methods and the effective performance of visibility event encoding.

Figure 53B:
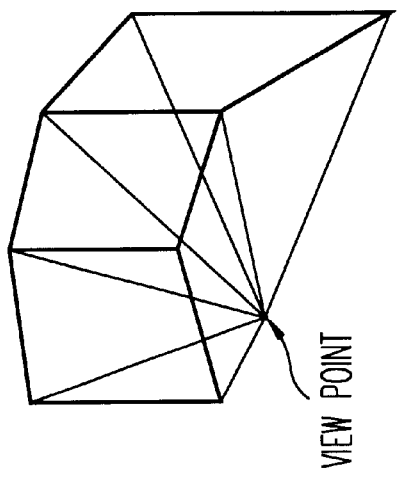
FIGS. 53A through 53C are different views showing adjacent viewports to be used with the visibility event codec.
Figure 53A:
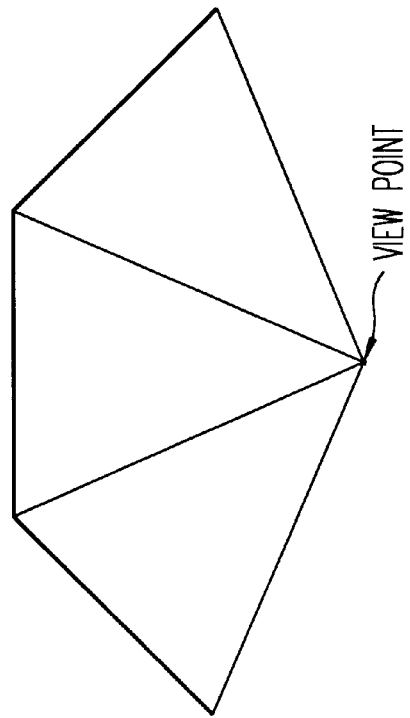
Figure 53C:
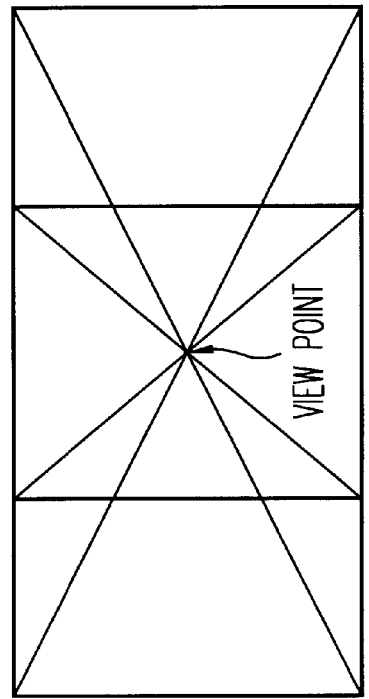
Figure 54:
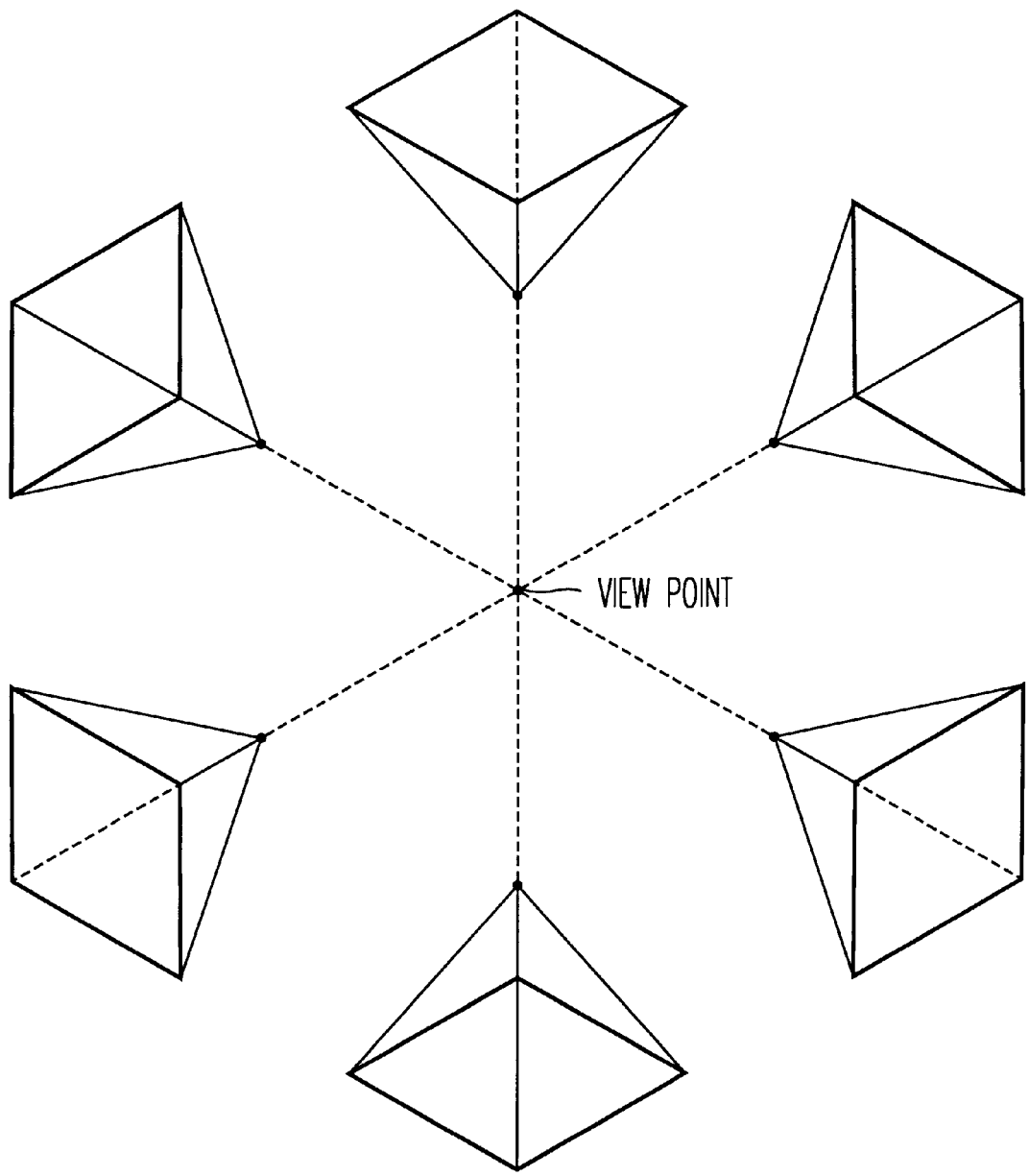
FIG. 54 is an exploded view of a cubical arrangement of viewports about a single viewpoint.

In another technique the subset of encoded primitives is increased in a more restricted way to allow interactive control of view direction vector (camera direction) during decoding/replay. In this technique encoding is conducted using a collection of viewports that define a panoramic field-of-view that is larger than the field-of-view displayed during decoding. FIG. 53 represents a set of adjacent viewports in which newly visible and newly invisible primitives are determined for each frame of the encoding. In this technique primitives are encoded as newly visible if they become newly visible in any of the viewports and were not visible in any of the viewports in the previous frame. Likewise primitives are encoded as newly invisible if they become invisible in all of the viewports but were previously visible in any of the viewports. This determination is made by employing a unified version of the previously described Global Visible Primitive Array (GVPA) that is shared by all viewports. Because rotation of the view direction vector about the viewpoint does not produce occlusion events among visible primitives, the use of adjacent viewports is sufficient to encode a set of primitives visible in a panoramic view from a specific viewpoint. In the example implementation illustrated in the FIG. 54 a cubic viewport arrangement is employed to provide an encoding of primitives visible within a 360 degree field of view from a specific viewpoint. The source and destination display lists produced by application of the present visibility encoding method to this set of viewports will contain all primitives visible from this panoramic perspective. This type of panoramic encoding enables the user of the decoding unit to exercise a real-time interactive view direction vector rotation during decoding/display of the encoded signal. This type of "look around" capability is also provided by plenoptic-based panoramic image codec schemes such as Apple's QuickTimeVR and is based on the principle that rotation of the view direction vector about the viewpoint does not produce occlusion/exposure events within the viewport.

In another extension of the method a unique type of interactivity is provided. This type of interactivity allows the user to control the location of the viewpoint within a predetermined region surrounding a nominal viewpoint trajectory defining the encoded event sequence. In this technique the list of primitives that become newly visible/invisible for each temporal frame of the encoding is determined not from a single viewpoint but from a set of isotemporal viewpoints arranged in a line wherein the containing line is perpendicular to the axis of a predetermined space-time curve. In this method these sets of isotemporal viewpoints define a region or surface in three space containing the predefined trajectory curve. Encoding of primitives newly visible from a sufficient number of isotemporal viewpoints so arranged results in a cumulative destination display list containing, at any time, all primitives visible from anywhere on the line containing the isotemporal viewpoints. This list of primitives is sufficient to allow the viewpoint to be interactively moved along the isotemporal viewpoint line without causing visibility errors. When the visibility event stream is decoded in real-time this allows the user to interactively move the viewpoint along a road-like surface in three space defined by the trajectory curve and the perpendicular isotemporal lines.

Figure 55B:
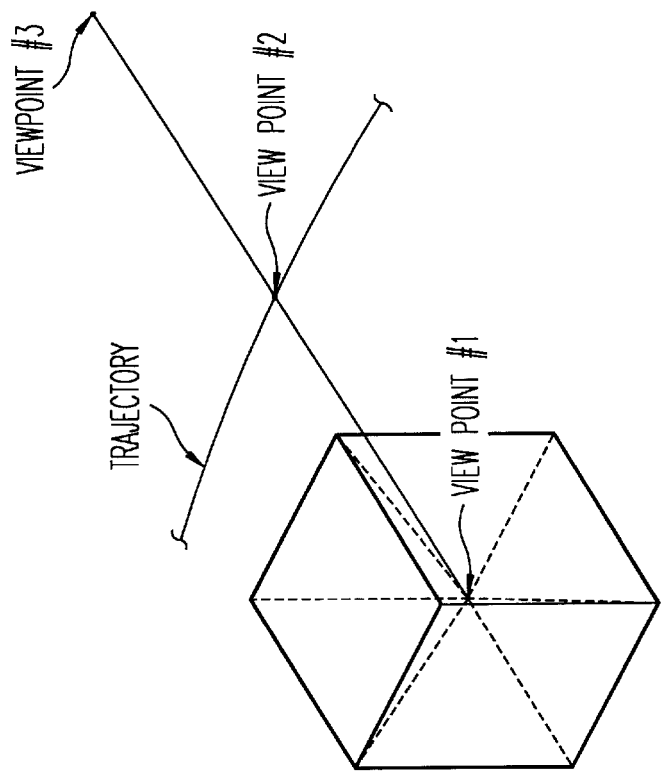
FIGS. 55A and 55B are view illustrating an implementation of the visibility event codec using cubic viewports and multiple co-linear isotemporal viewpoints along a predetermined trajectory.
Figure 55A:
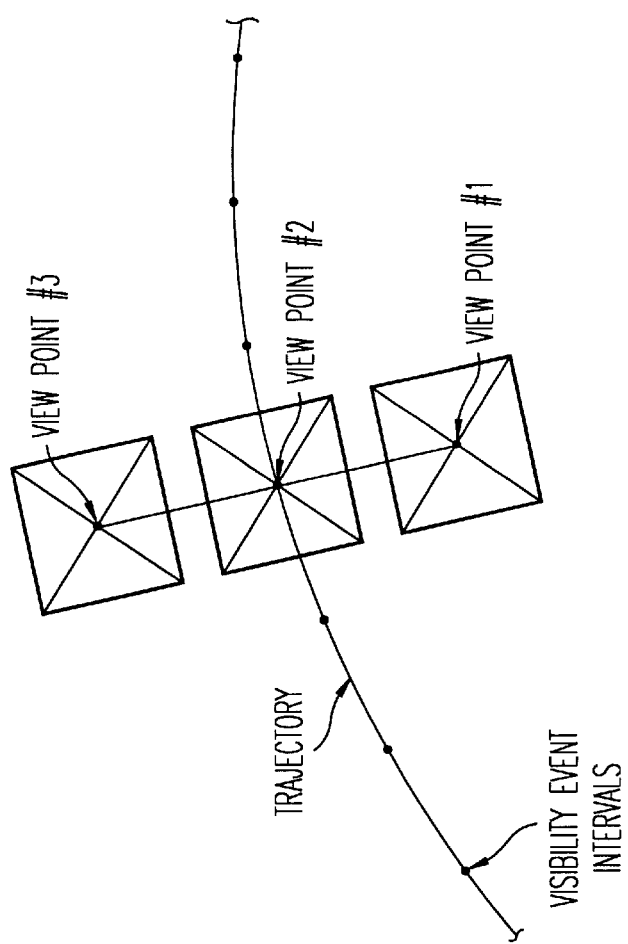

FIGS. 55A and 55B illustrate a set of three collinear isotemporal viewpoints and associated cubic viewports used for encoding visibility from a "road-like" surface described in three-space by a central trajectory and intersecting isotemporal lines. In this case three isotemporal viewpoints are employed for each visibility event frame. A single visibility event frame represents a step from one isotemporal line to another. In the illustrated implementation a cubic viewport arrangement is employed. Other possible implementations include the use of a more restricted arrangement of panoramic viewports. In addition, while the current implementation employs a linear arrangement of isotemporal viewpoints, the method is easily extended to a curvilinear arrangement of isotemporal viewpoints that create a more complex surface in three space. For example, by arranging isotemporal viewpoint locations along curves that intersect a central viewpoint trajectory the visibility from the surface of a smoothly curving banked road can be encoded.

For each visibility sampling interval the complete set of newly visible primitives is determined to be the union of the newly visible primitive sets for each viewpoint. This is determined by employing a version of the previously described global visible primitive array (GVPA) that represents the visibility from each of the isotemporal viewpoints. The set of newly invisible primitives is similarly determined through the use of a unified primitive global visible primitive array for the set of isotemporal viewpoints which is compared to the GVPA for the last set of isotemporal viewpoints. Primitives not represented as visible on the current unified masterlist but represented as visible on the previous primitive masterlist are considered to be newly invisible for the current visibility event interval.

The number of separate isotemporal viewpoints required to determine the set of all primitives visible any where along the including line is a function of the depth structure of the database being encoded. The number of viewpoints actually required can be approximated using a viewpoint placement scheme based on a progressive subdivision of the isotemporal line. In this method the list of newly visible/invisible primitives for adjacent viewpoints is compared. When the lists for adjacent viewpoints become sufficiently similar, no further viewpoints are placed between the adjacent viewpoints. In another implementation the set of primitives for the isotemporal line can be determined by actually using the visibility event encoding method to produce a visibility event stream defining motion of a viewpoint along the isotemporal line. In this implementation a viewpoint is moved in relatively small steps along the isotemporal line and the list of newly visible/invisible primitives for each step is computed using the method of incremental visibility event encoding previously described. Any primitive that is visible in from the initial viewpoint or becomes visible as the viewpoint is translated is added to the newly visible primitive list. Newly invisible primitives are determined for the visibility event period by comparing the current and past unified GVPA masterlists.

In another extension of the method the list of primitives that become newly visible/invisible for each visibility event encoding period is determined not from a single viewpoint or from a set of viewpoints along an isotemporal curve but from a set of isotemporal viewpoints arranged substantially in a plane wherein the containing plane intersects the axis of a predetermined viewpoint trajectory space-time curve. If the intersecting isotemporal planes are arranged to be perpendicular to the nominal viewpoint trajectory space-time curve the implementation is simplified. In this method these sets of isotemporal viewpoints define a region or envelope in three space containing the predefined trajectory curve. Encoding of primitives newly visible from a sufficient number of isotemporal viewpoints so arranged results in a cumulative destination display list containing, at any time, all primitives visible from anywhere on the planar region containing the isotemporal viewpoints. This list of primitives is sufficient to allow the viewpoint to be interactively moved along the isotemporal viewpoint planar region without causing visibility errors. When the visibility event stream is decoded in real-time this allows the user to interactively move the viewpoint within a duct-like envelope in three space defined by the trajectory curve and the perpendicular isotemporal lines.

Figure 56B:
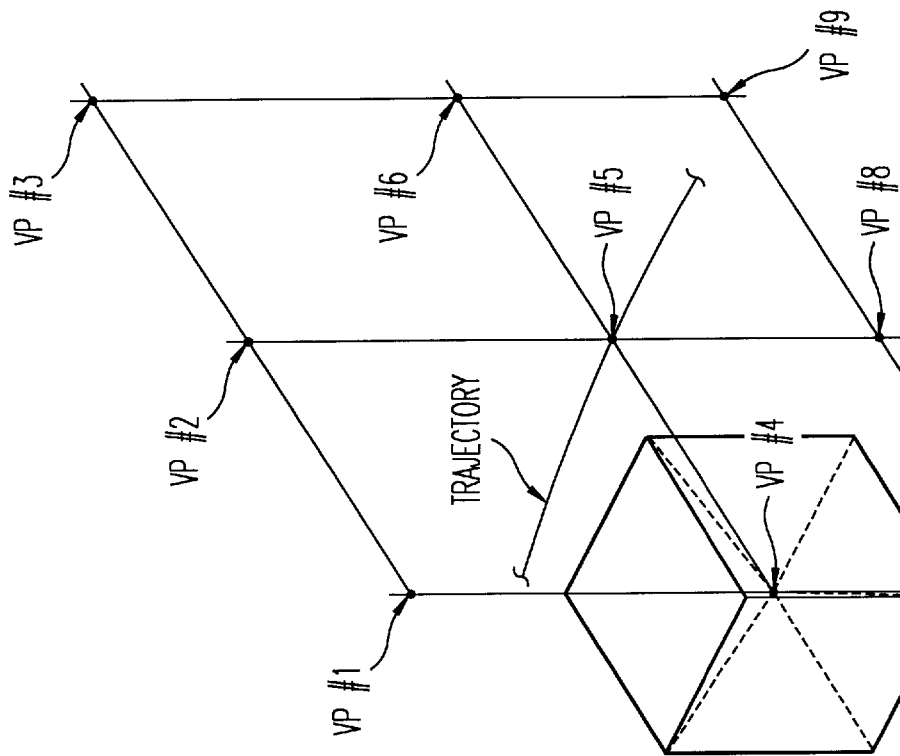
FIGS. 56A and 56B are views illustrating an implementation of the visibility event codec using cubic viewports and multiple coplanar isotemporal viewpoints along a predetermined trajectory.
Figure 56A:
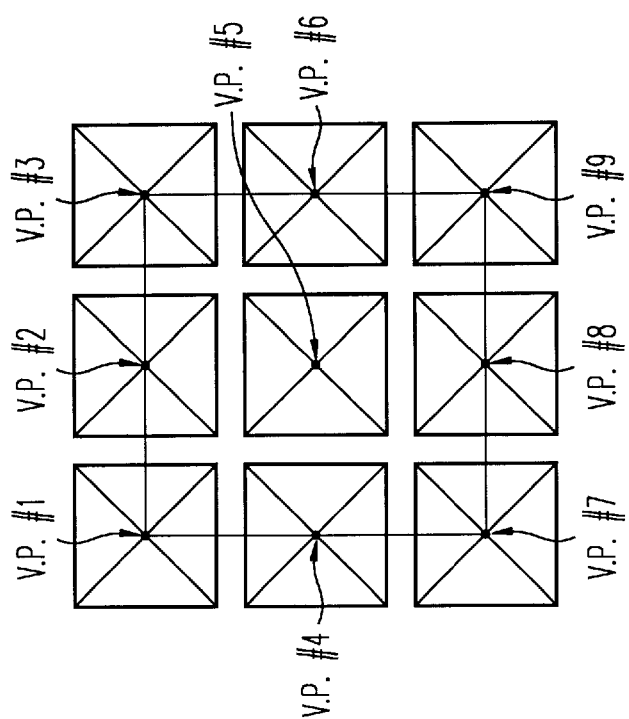

FIGS. 56A and 56B illustrate visibility event encoding along a fixed trajectory in which the visibility is determined from multiple coplanar isotemporal viewpoints and associated cubic viewports. In the illustrated implementation a cubic viewport arrangement is employed. Other possible implementations include the use of a more restricted arrangement of panoramic viewports. The number of individual viewpoints required to encode the set of visible primitives for any visibility event encoding interval can be estimated by placement of viewpoints using an adaptive subdivision of each rectangular isotemporal region using the technique previously described for collinear viewpoints.

In addition to allowing user interactivity during the decoding of a prerecorded visibility event stream, these methods of encoding a superset of the visible primitives are used to reduce the occurrence of missed primitives in a client-server implementation caused by latency in the client-server process. Latency in the client-server process includes the latency of visibility event encoding plus the latency of the bidirectional connection. If the temporal visibility coherence of the image stream is high, the latency of client rendering is largely hidden because encoding occurs in parallel with the rendering of previously visible primitives by the client/decoder. Nevertheless these effective latencies can combine to delay the determination and delivery of visibility event frames. If these visibility event frames represent periods of low temporal visibility coherence then a large number of missing primitives will be evident in a delayed frame. The previously described method of reducing a level-of-detail under the condition of high bandwidth demand will improve throughput and tend to reduce latency by accelerating the encoding process. In the present method the previously described techniques of encoding a precisely defined superset of visible primitives is used to reduce the incidence of missing primitives caused by process latency. In one such technique the encoding viewport is made slightly larger than the display viewport. This guarantees that primitives near the edge of the viewport will not be missed when view direction vector rotation is accompanied by delay in the delivery of the visibility event frame to the client. No missed primitives will occur because the slightly larger window used during encoding insures that the newly visible primitives are actually present.

The present method of encoding those primitives that are actually visible from a set of viewports including a cubic viewport arrangement is more efficient than the client-server method of Schmalstieg et al. in which a spherical inclusion volume is used to determine the list of potentially visible primitives from a viewpoint. In the client-server graphics system of Schmalstieg et. al. a sphere centered about the viewpoint forms an inclusion volume that is used to determine the set of potentially visible primitives. These potentially visible sets from consecutive frames are differenced to determine newly potentially visible primitives that are transmitted to the client. By employing a spherical inclusion volume the method includes many primitives that are actually not visible from the viewpoint because they are occluded by other primitives or because they are well outside the current field-of-view. Moreover by employing the sphere as an inclusion volume actually visible primitives that are outside the sphere are not included in the potentially visible set. Used in this way the spherical construct acts as a far clipping surface as well as an inclusion volume. In contrast, the present method employs a cubic arrangement of viewports in a manner that approximates a spherical visibility SURFACE rather than a spherical inclusion volume. Because the present method effectively determines the actual visible set of primitives on the spherical surface (by the techniques of determining occlusion and viewport out-clipping specified herein) it produces newly visible primitive lists that are more efficient and more accurate than primitive lists based on an inclusion volume. Like the spherical inclusion volume method the present method achieves a type of visibility buffering that reduces the occurrence of missed primitives due to system latency. By employing a method of visibility event encoding that determines the exact set of primitives visible from a viewpoint the present method achieves such visibility buffering with newly visible primitive lists that are smaller and more accurate than the spherical inclusion volume method. This allows the visibility event encoding to occur with a lower connection bandwidth than the Schmalstieg method. Moreover the reduced size of the potentially visible primitive set decreases the computational cost of display list replacement on the client. This, combined with the method of partially mirrored source and destination display lists, allows the present method of client-server image generation to operate with lower client processing and storage capabilities than those required by the Schmalstieg method.

Additionally for the purposes of visibility buffering during client-server image generation, the present method does not necessarily encode from a set of viewports that form a complete cubic viewport arrangement. In the present client-server method the size of the encoded viewport(s) relative to the display viewport is determined by the maximum allowable rotational velocity of the view direction vector and the known latencies of the system.

Another extension of the visibility event encoding/decoding method provides interactive control over the speed at which the viewpoint traverses the precomputed trajectory envelope. This velocity control is achieved by effectively uncoupling the rate of image display from the rate of visibility event encoding. This is allowed in the present method because the decoder is actually an image generation system.

For an image sequence portraying a moving viewpoint a decrease in the rate at which the images are displayed will result in a decrease in the apparent velocity of viewpoint motion but will also produce unacceptable display quality if the frame rate decreases below a value of 20–30 fps. Control of the apparent camera velocity for an image sequence could be provided by encoding visibility events at a relatively high number of visibility event frames per unit distance along the viewpoint trajectory and decoding the frames at a rate that reflects the desired velocity. Assuming a constant velocity encoding (same distance/frame for each frame) then the number of visibility event frames that musts be decoded per unit time is given by the relationships:

Distance/Frame (basic encoding rate)×Frames/Second=Desired VelocityRequired Frames/Second=Encoded Velocity/Desired Velocity For a fixed display rate an increase in apparent velocity over the encoded velocity can be achieved by displaying on average every Nth frame where:

N=Desired Velocity/Encoded Velocity

Alternatively, an image sequence could be encoded at a basic rate and image interpolation could, in principle, be employed to produce frames representing a lower velocity while preserving the displayed frame rate. This approach is taken by the view interpolation method of Chen et al (1993). This technique essentially employs a method of sample reprojection wherein a depth value is stored for each pixel of the image.

Because the decoding unit for the visibility event encoding method is actually an image generation system the present invention is ideally suited to compute images that temporally occur "in-between" encoded frames. In the present method visibility event encoding is conducted at a sampling rate that represents a nominally maximum velocity of the viewpoint along the space-time curve representing an axis of a trajectory envelope. Display of the encoded camera trajectory at a rate lower than the nominally encoded rate is achieved by computing frames that fall in between the encoded frames. In this case the Visibility Event/Display Event ratio (VEDER) is <1.0. In this case the value of the VE:DE ratio is recomputed for each displayed frame based on the current viewpoint velocity specified interactively during decoding.

$$VEDER = \frac{\text{Desired Velocity}}{\text{Encoded Velocity}}$$

The current value of the VEDER is used to determine when a visibility event frame needs to be decoded before an image is generated. When the VEDER is less than 1.0 the generation of "in-between" displayed frame is always preceded by the decoding of the visibility event frame representing the visibility status at the end of the temporally interpolated interval. The corresponding newly invisible primitive list is not processed until after the interpolation for the epoch is completed. As the viewpoint advances along the trajectory it will eventually encounter the location along the trajectory curve from which the next visibility event sampling took place. When this location is encountered the corresponding visibility event frame is decoded and further interpolated display frames are computed. The current VEDER is used to effectively compute the current position of the viewpoint relative to the visibility events.

Figure 52:
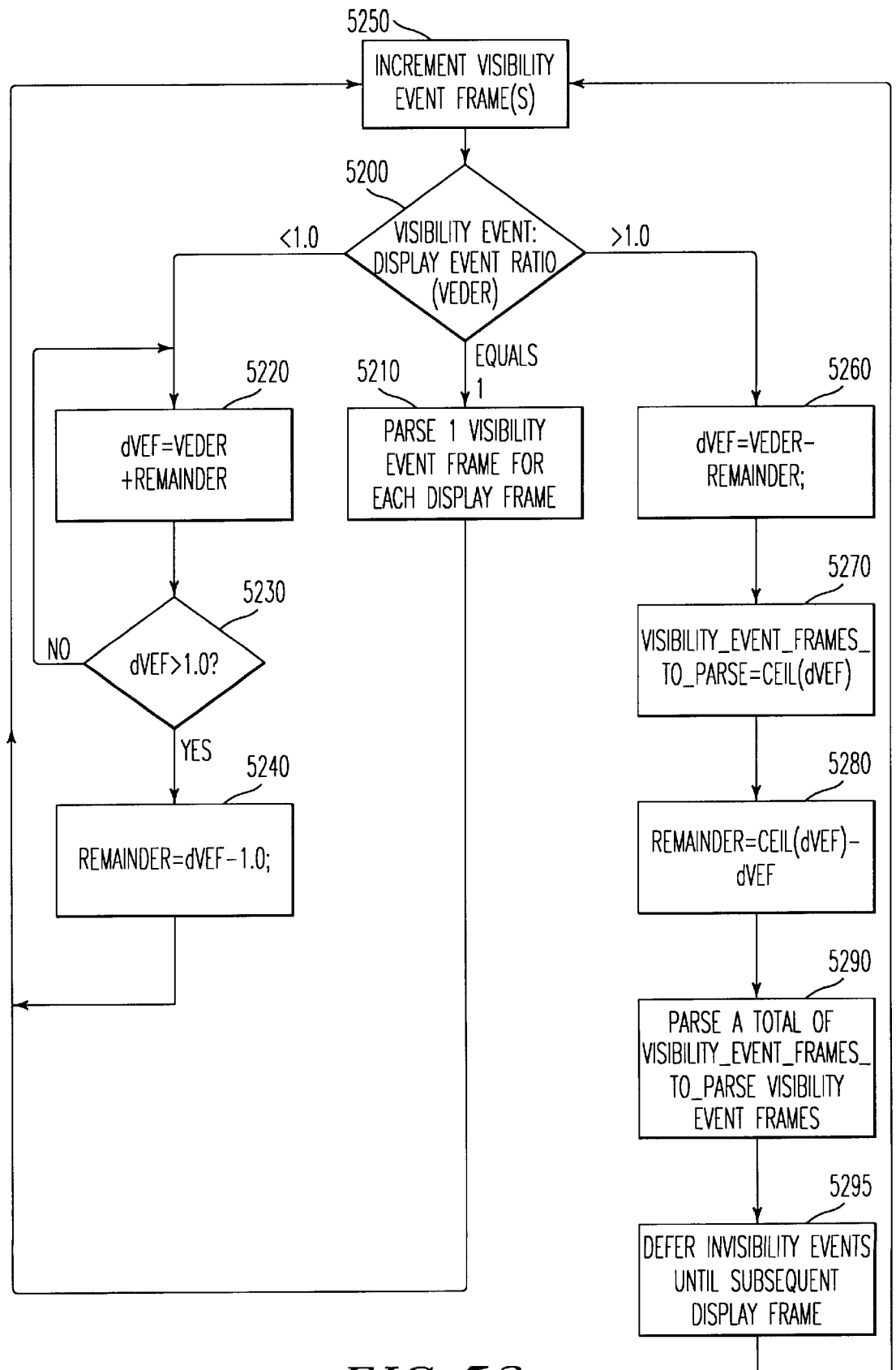
FIG. 52 is a flow chart detailing a method for synchronizing a prerecorded visibility event stream.

The flowchart of FIG. 52 illustrates how the VEDER is used to regulate the parsing of visibility event frames to produce a desired viewpoint velocity based on a visibility event sequence encoded at a predetermined visibility event "rate" (as specified by number of visibility event frames per unit distance on trajectory). This visibility event rate is the inverse of the nominally encoded velocity. In FIG. 52 the decoding is presumed to start at the beginning of a visibility event frame. FIG. 52 shows a step 5200 in which the VEDER is measured based on the known nominally encoded visibility event velocity and the desired velocity which is interactively controlled during decoding. If it is determined that the desired velocity during decoding is the same as the nominally encoded velocity then control shifts to step 5210 in which one visibility event frame is parsed and processed for each displayed frame. If, in step 5200 it determined that the visibility event to display event ratio is less than one then control shifts to step 5220. In step 5220 a value "dVEF" representing the fractional time-distance to the next visibility event frame is incremented for each frame rendered. For example if the VEDER is 0.1 then the value of dVEF would equal one after 10 displayed frames. A remainder term "remainder" is required because the initiation of step 5220 does not generally occur on a visibility event frame boundary. Following incremental increase of the dVEF for a frame control shifts to decision step 5230 in which the value of dVEF is examined. If the value exceeds 1.0 then a remainder is calculated in step 5340 and control subsequently shifts to step 5350 in which the next visibility event frame is parsed. If in step 5200 it is determined that the VEDER is greater than 1.0 then control shifts to step 5260 in which a remainder is calculated. Subsequently control shifts to step 5270 which determines how many visibility event frames to parse for the current displayed frame. In a subsequent step 5280 a new remainder is calculated. In step 5290 the total number of visibility event frames to parse is sent to step 5220 to parse the desired number of visibility event frames. Step 5295 indicates that the effect of all invisibility information in the parsed frames (e.g., newly invisible primitives and or vertices) is delayed until the frame is actually displayed.

When the display rate exceeds the visibility event encoding rate then the frames are interpolated and the position of the viewpoint along the spacetime axis of the viewpoint envelope is recomputed to determine at which display frame the next visibility event is decoded. Visibility errors can occur in interpolated frames as a result of primitives that would actually become newly visible and subsequently newly invisible between the two interpolated visibility event frames. These "visibility transients" would produce transient dropout for some interpolated frames. One technique to prevent visibility errors caused by visibility transients is to search for such transients during visibility event encoding. This search can be conducted by sampling at a higher temporal frequency (i.e. lower viewpoint velocity along the trajectory) to specifically search for primitives that become visible and invisible within the span of time representing the nominal encoding rate. Such transients can be added to the newly visible primitive list for the corresponding visibility event frame at the end of the epoch. This would allow the primitive to be exposed during interpolation even though it would not actually be visible when display occurs at the nominally encoded rate. Such visibility transients are added to the newly invisible primitive list for the corresponding visibility event frame. Alternatively such transients can be placed in special temporal subframes of the stream that are decoded only during interpolation.

Figure 57:
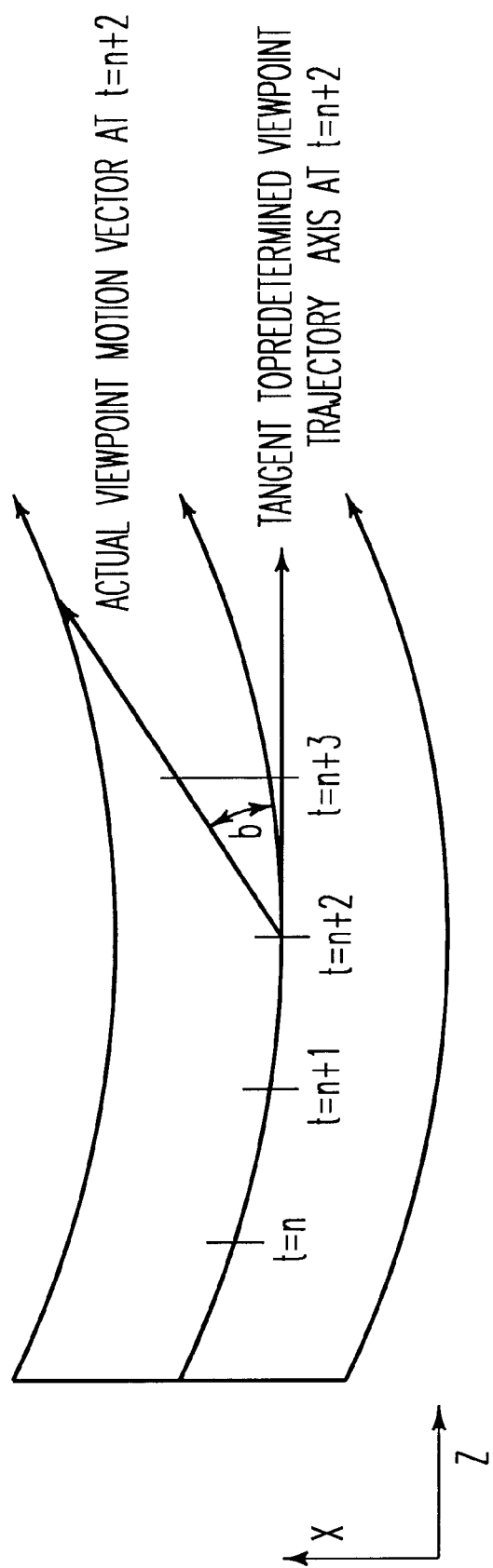
FIG. 57 is the top view illustrating diagonal viewpoint motion within a trajectory envelope.

In the present method interactive control of the viewpoint position within the predefined region about the viewpoint trajectory affects the velocity of visibility event decoding. The rate of visibility event decoding is adjusted to match the forward motion of the viewpoint in a direction substantially parallel to the axis of the viewpoint trajectory. When the viewpoint is moved in a direction substantially parallel to this axis then image generation proceeds at one frame per visibility event frame. When the viewpoint moves in a "diagonal" fashion within the predefined envelope then the rate at which isotemporal visibility event planes are crossed is equal to the velocity of motion of the viewpoint times the cosine of the angle between the predefined trajectory axis and the actual viewpoint direction vector. Such a case is illustrated in FIG. 57 wherein the angle b represents the angle between the instantaneous viewpoint motion vector and the tangent to the trajectory envelope axis for the same isotemporal time-distance along the envelope. Isotemporal distance-time lines (or planes) are indicated by the line segments labeled t+n . . . perpendicular to the axis of the envelope. The rate at which new visibility event frames are used to update the DDL is determined by the cosine of the angle. For implementations of the present method in which the decoding unit directly controls the rate at which the visibility event stream is actually read from a recordable media (e.g., CDROM), the cosine of the aforementioned angle together with the viewpoint velocity vector determine the actual read-rate of the prerecorded visibility event stream.

For implementations of the current method in which the user does not control the read-rate (e.g., for reception of a broadcast visibility event stream) viewpoint motions not parallel to the envelope axis will result in an effective decrease in the rate of visibility event transitions as produced by crossing the isotemporal lines/planes defining the trajectory envelope. In these implementations the visibility event information is received at a fixed, predetermined rate representing the nominally encoded viewpoint velocity. In this case visibility event frames are buffered in the receiver unit and parsed at the rate equal to the isotemporal line/plane crossing rate computed using the cosine method previously described. By buffering incoming broadcast visibility event frames in this way the image generation rate (in terms of frames per distance) can be properly regulated to maintain a constant viewpoint velocity during "diagonal" viewpoint motion within the envelope. For a streaming broadcast visibility event stream the user has no control of the streaming rate of the transmission. In this case the viewpoint motion is somewhat constrained by the encoded nominal visibility event rate which represents a nominal forward velocity of the viewpoint within the envelope. During replay "diagonal" motion of the viewpoint without a change in the actual absolute viewpoint velocity (i.e., still at nominally encoded velocity but not moving completely "forward" in the envelope) will result in a decrease in the isotemporal line/plane crossing rate compared to the nominal velocity. The reduced forward velocity and visibility event crossing rate is equal to:

Visibility Event Decoding frequency=[cos(theta)]* Nominal Rate.

Where theta is the angle between the actual viewpoint motion and the axis of the trajectory envelope in the region of the viewpoint. This situation is illustrated in the FIG. 57 in which b represents the angle between the viewpoint motion vector and the tangent to the axis of the trajectory envelope.

In a broadcast implementation in which the client does not control the transmission rate of the visibility event stream, incoming visibility event frames are buffered whenever the visibility event decoding frequency required to produce a user selected velocity is less than the rate of transmission of visibility event frames. This technique can be used to allow the viewpoint to move at a forward (relative to the trajectory envelope axis) that is less than the nominally encoded forward rate. Such a decrease would be produced by the previously described "diagonal" trajectory within the stream or simply by purposely slowing forward velocity below the nominally encoded rate. The degree to which the forward motion of the viewpoint is allowed to fall behind the nominally encoded viewpoint motion is limited by the size of the visibility event buffer. This buffer holds the isotemporal visibility event frames that comprise the visible information corresponding to the future isotemporal planes of the trajectory envelope. When this buffer is full the forward velocity of the viewpoint (parallel to the trajectory envelope axis) is increased to equal at least the nominally encoded forward velocity. At this velocity the number of buffered visibility event frames remains constant. For a forward velocity greater than the nominally encoded rate the size of the buffer is decreased. In this way buffering of incoming broadcast visibility event frames allows the user to control, to a substantial degree, the velocity of viewpoint motion within the trajectory envelope during decoding of a telecast visibility event stream.

A broadcast implementation of the current method of visibility event encoding/decoding provides a form of interactive television in which the user has unprecedented ability to interact with the broadcast signal in real-time. When combined with the aforementioned technique of using prestored material and texture class libraries, the present method allows the user to substantially determine both the appearance of a telecast signal and the vantage points and camera angles from which the encoded environment is dynamically visualized. In another implementation of the present visibility event codec a remote server stores the prerecorded visibility event bytestream data. Client units connect to the server and are enabled to control the read rate of the visibility event data to effect interactive changes in camera velocity and direction within the trajectory envelope using the methods described herein. A single client/decoder unit can function in three different capacities: 1) as a receiver of telecast visibility event data, 2) as a client having control over the streaming transmission of precomputed visibility event data stored on a server, 3) as a fully connected client to a real-time visibility event server implementation previously described. In each case the required connection bandwidth is relatively independent of displayed resolution, making the visibility event encoding method an efficient and versatile codec for multimedia, Internet, and interactive television applications.

Implementations of the current visibility event encoding method in which the decoding client controls the read rate of the visibility event stream (such as in on-demand broadcast configuration similar to on-demand video servers, or as in computer CDROM game/multimedia applications) allow full control of velocity within the predetermined envelope by adjusting the visibility event parsing rate to the frame display rate as shown in the logic of FIG. 52. Such implementations even support changing direction and moving opposite to the nominally encoded direction through the use of an alternative visibility event datastream encoding "backward" motion along the trajectory. For encodings that employ panoramic viewports during encoding (such as shown in FIG. 53) reverse motion within the trajectory is supported by supplying an visibility event encoding that is pallindromic to the encoding made in the forward direction. In the reverse case, for each frame, the newly visible primitives are the newly invisible primitives of the forward encoding and the newly invisible primitives are the newly visible primitives of the forward encoding. The visibility event datastream encoding reverse motion when cubic or panoramic viewports are employed is simply the same as the datastream for the forward case except that the newly visible and newly invisible primitives are interchanged.

The present invention provides additional interactive control over the display of a prerecorded visibility event stream by pre-encoding a plurality of visibility event streams in which different visibility event sequences share common visibility event frames. In one implementation of this method a single visibility event sequence represents a "main" viewpoint trajectory envelope and other visibility event sequences that "intersect" the main sequence by sharing visibility event frames of the "main" sequence function as diverging or converging tributary or branch trajectories. This implementation of the visibility event stream functions in a manner analogous to the method of branching from an initial animation sequence to alternate animation sequences during replay of an "interactive" video stream typically implemented on a recordable medium such as CDROM. Applications employing a plurality of visibility event sequences related in this way allow the user to interactively select alternative trajectories including the previously described special case of the reverse-oriented or pallindromic visibility trajectory.

The flowchart of FIG. 52 also illustrates the process of increasing the displayed viewpoint velocity above the nominally encoded velocity. In this technique the streaming rate of the nominally encoded visibility event stream is increased to match the current viewpoint velocity. This implementation requires that an additional bandwidth be available to accommodate the increased speed of the datastream. An alternative more efficient method is to provide an alternate high velocity visibility event stream that is produced by a temporal undersampling relative to the nominal rate. The advantage of such a stream is that all temporal transients have been removed.

The current visibility event encoding method is a progressive encoding technique. Like other progressively encoded signals (e.g., MPEG) the decoding of the visibility event datastream is likely to initially produce an incomplete image if it is initiated at an arbitrary visibility event frame packet. A complete image stream is only produced once the decoding unit has the complete set of visible primitives for a single frame. Subsequent modification of the destination display list by incoming visibility event frames will insure that the complete set of visible primitives is maintained. The rate at which a complete set of primitives will be produced after the initiation of decoding at an arbitrary visibility event frame is actually inversely proportional to the temporal visibility coherence of the image stream. When temporal visibility coherence is low, primitives tend to become added to and deleted from the destination display list at a relatively rapid rate, insuring a relatively rapid development of a complete visibility list. Until the visible list is complete the decoded image stream will contain arbitrarily missing primitives that results in undesirable image quality.

The present invention includes a number of methods for reducing the number of missing primitives at the initiation of decoding. Additional methods for mitigating the effects of these missing primitives are also described. These methods are particularly important in broadcast applications of visibility event encoding because users frequently initiate decoding of a broadcast signal at arbitrary times during the transmission. In a first method for reducing the amount of time necessary to develop a complete set of primitives, unused transmission/replay bandwidth is used to re-encode primitives that were already encoded earlier in the stream. By repeatedly resending previously encoded primitives during low-bandwidth periods the number of missing primitives in the early stages of the decoding is reduced and the time to develop a complete destination display list is reduced. Primitives that are retransmitted to a decoding unit that has already received the primitive are simply parsed by the decoder and either overwrite their earlier manifestation in the destination display list or identify it at the same location in the list (e.g., by a unique primitiveID reference) and not overwrite. The duration of missing primitives during initiation of encoding tends to be long for scenes with high temporal visibility coherence because the destination display list undergoes little replacement under these conditions. Fortunately the required transmission/replay bandwidth also tends to be low during these conditions. The available bandwidth created by high temporal visibility coherence can be used for primitive re-encoding to decrease the otherwise extended periods of missing primitives that would be produced by high temporal visibility coherence. In one variation of this method the re-encoded primitives are placed in a separate sub-packet for each of the frame packets. In this variation the separate sub-packets containing re-encoded primitives are parsed by the decoder only when the decoder is in the initiation phase of the decoding and does not have a full set of the visible primitives for the current frame. Otherwise the sub-packets containing re-encoded primitives are not parsed by the decoder.

In one variation of this method the re-encoded primitives are encoded in a completely separate, but coordinated, encoding. In this method a decoder unit initially accesses data from this separate encoding when the decoder initiates the decoding process. Subsequently when a complete list of visible primitives is received the decoder unit accesses a datastream comprising a visibility event stream that does not contain re-encoded primitives. This two-channel arrangement eliminates the need for the decoder unit to manage re-transmitted primitives except during initiation of the decoding.

These methods can be used in conjunction with a technique for mitigating the effect of missing primitives. In this technique the decoding unit does not render the destination display list until it is complete or substantially complete. In this technique the number of visibility event frames until a complete visible set develops is determined for every visibility event frame during encoding. This number equivalent to the "NUMBER_OF_FRAMES_TIL_COMPLETE_SET" in the visibility event bytestream specification in Table XIII. On decoding of the first visibility event frame the decoding unit stores this value and optionally delays display until the indicated number of visibility event frames has been received and parsed.

Another technique to mitigate delays between the initiation of decoding and the development of a complete destination display list is to include compressed, relatively low resolution still images as part of the encoded signal. The encoding of these images is distributed between frames and employs available bandwidth in such a way that a complete image is guaranteed to be transmitted at a predetermined frequency (e.g., every 10 seconds). This image may be a pre-rendered image that is representative of a scene from the visibility event encoding period. This single image is displayed until a complete destination display list is developed.

In another mitigation technique the placement of "cut-scenes" in a visibility event encoding is made so as to reduce the maximum time to develop a completely visible set. In this context a cutscene is a sequence of undisplayed event frames which encode a complete set of visible primitives that are required for a new or "cut" scene. In this way when a sequence of visibility event frames representing a cutscene is encountered, a complete visible set of primitives will soon be produced in the destination display list.

Finally, a definitive technique for minimizing the number of missing primitives that occur with initiation of decoding of a broadcast visibility event signal at an arbitrary frame packet is described. In this technique the decoder signals to a special dedicated initiation server at the initiation of decoding. The signal sent by the decoder to the initiation server indicates the frame number at which the decoder requests to begin decoding. This special initiation server receives the requested frame number and sends the complete set of visible primitives for a frame that is later than the requested frame number by a determined latency value. The latency value includes the predetermined time to assemble the complete set of visible primitives for the frame and may also include the transmission time "from" the receiving decoder unit (optionally determined by a synchronized time stamp on the decoder's request) as well as an estimated transmission time back to the receiving unit. The special server unit contains prestored datasets representing the complete set of visible primitives for every frame of the visibility event sequence or for a substantial number of frames of the sequence.

In one implementation this server is a compute server in which the complete set of visible primitives for the frames is stored as reference numbers to a complete set of primitives for the database which is resident in rapidly accessible memory. In this implementation the requested frame number plus the known latencies are used to determine an actual frame number for which the completely visible set can be transmitted to the decoder unit in time to allow the decoder unit to synchronize to an ongoing transmission of the visibility event stream that is being broadcast from a different streaming visibility event playback unit using a different transmission channel. When the actual synchronization frame is determined then the list of references to the complete set of visible primitives is read by the server and each corresponding vertex and/or primitives are transmitted to the requesting decoder unit using a transmission channel that is distinct from the ongoing streaming broadcast transmission channel. The channel carrying the requested initiation signal is, at least temporarily, a functionally dedicated channel between the initiation server and the requesting decoder. Following this transmission the connection between the decoder and the special server may be broken. At the end of this special transmission the decoder unit contains the complete set of primitives for a visibility event frame that is currently being broadcast or soon will be broadcast by a streaming broadcast unit using a different transmission channel carrying a simulcast visibility event signal. When this frame of the broadcast is encountered by the decoder, decoding begins without subsequent lost primitives.

This system makes efficient use of available connection bandwidth by requiring a dedicated transmission channel between server and decoder for only a relatively brief period during the initiation of reception. Additionally a special server can function as a shared resource that services initiation requests for many decoders. Because the requesting signal requires low bandwidth the bidirectional connection can be subserved by asymmetric interconnections such as ADSL (Asymmetric Digital Subscriber Line).

Figure 59:
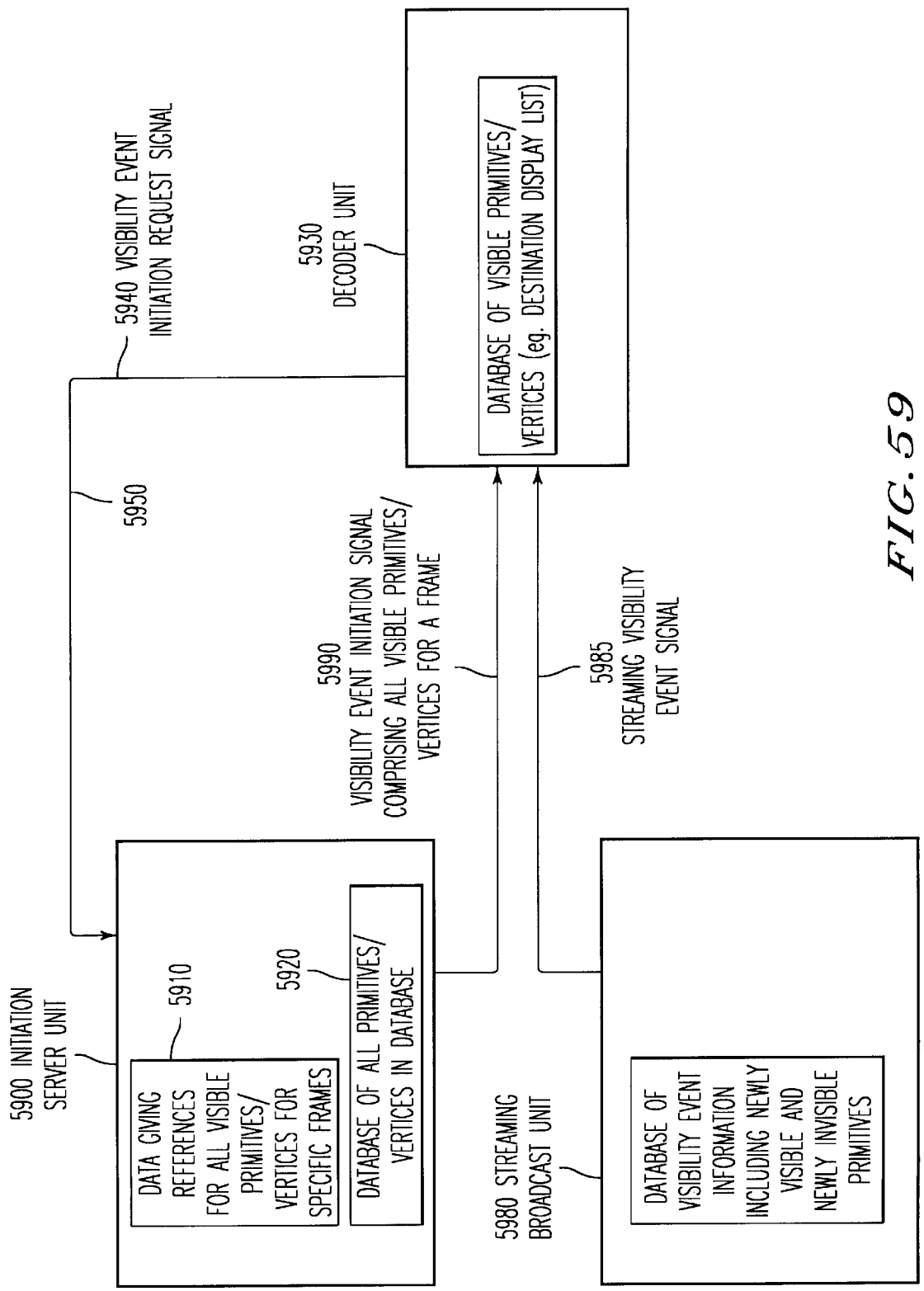
FIG. 59 is a block diagram showing a broadcast implementation of the visibility event codec that employs a special dedicated server that is contacted by the decoder to rapidly supply a set of visible primitives that allows rapid synchronization with a broadcast signal.

FIG. 59 illustrates such a system employing a server unit that fulfills requests by decoder units for complete visible sets of primitives that allow rapid synchronization with a separate broadcast visibility event stream. Unit 5900 is the initiation server unit. In this implementation the data represented by 5910 is a list of all visible primitives for specific initiation frames of the sequence. The initiation frames are interspersed frequently throughout the sequence and can even be organized so that every frame is an initiation frame depending on the storage requirements of the server. The data 5910 is stored in primary or secondary memory storage units of the initiation server. A second data source, 5920 is also stored in the memory storage unit of the initiation server. The data of 5920 represents all of the primitives (and vertices) of the database. A decoder unit 5930 sends a visibility event initiation request signal 5940 over a dedicated upstream transmission line, 5950, that has a relatively low bandwidth requirement. The initiation request signal contains data indicating the sequence requested, frame at initiation and the precise time of the request using a clock that is substantially synchronized to a clock resident in the initiation server unit. The frame at initiation request is determined in the decoder by the reception of a simultaneous visibility event signal 5985 from a streaming broadcast unit 5980. This streaming broadcast unit transmits a frame-based visibility event signal which includes the frame number for each transmitted frame. The decoder unit receives the broadcast visibility event signal and initially processes only the transmitted frame number which is subsequently transmitted as part of the visibility event initiation request signal, 5940. Alternatively, if the decoder unit and initiation server unit clocks are synchronized, then the frame number at the time of initiation request can be entirely determined by the initiation server unit using a predetermined ping latency between encoder and decoder units. Upon reception of the visibility event initiation request signal the initiation server unit 5900 determines the elapsed time, together with the known time to assemble the visible set of primitives for a frame and estimates the downstream latency. The total latency represents the time required until a complete visible set of primitives can be assembled and transmitted to a decoder unit plus the time elapsed since the request for synchronization. A frame equal to or, more typically, later than the current frame at the time of visibility event initiation request is selected (based on the known assembly and transmission times). The information describing the complete set of visible primitives (and vertices) for the frame 5910, stored as index values to a second database, the set of all primitives (and vertices) for the database (5920) is used to select specific primitives and vertices from 5920 for subsequent transmission to the decoder unit 5930. This transmission is the visibility event initiation signal 5990. The complete set of visible primitives for this frame is received by the decoder 5930. Subsequently the decoder unit receives a streaming visibility event signal with a frame number that corresponds to the frame number of the previously transmitted visibility event initiation signal. Upon reception of this frame in the streaming visibility event signal the decoder unit can subsequently display the streaming visibility event signal without primitive loss because the completely visible set has been sent to the decoder by the initiation server unit 5900.

The methods of visibility event encoding specified earlier in this specification provide particularly efficient methods of determining the set of newly visible and newly visible primitives that employs a reprojective approach in which the newly visible primitives are known to be within specific regions of the image stream. Additionally the image-parallel multiprocessor implementations specified earlier in this specification provide an efficient method of determining the newly occluded primitives wherein the newly occluded primitives in each subimage are determined in parallel using a locally accessed subimage buffer and a locally accessed subimage display list. In this method only the primitives occluded in a subimage are tested for occlusion in the entire image.

In addition to these efficient reprojective methods of determining the set of newly visible and newly invisible primitives the present invention includes other methods of determining a visibility event encoding which are simpler to implement though less efficient. In one simple method a frame of a sequence of images is rendered, using a non-reprojective method of rendering, an using an depth buffer that records the closest primitive for each of the sample locations of the buffer. The contents of this buffer is examined to develop a list of all primitives exposed in the buffer. This process is repeated for a subsequent frame to determine the corresponding list of primitives visible in the subsequent frame. The lists of visible primitives for the earlier and later frames are compared to determine the newly visible primitives over the interval (i.e., those primitives not visible in the earlier frame but visible in the later frame). Additionally the lists are compared to determine the newly invisible primitives (i.e., those primitives visible in an earlier frame but not visible in a later frame). In this method the rendering can employ any method of rendering images from a database of graphic elements representing the rendered environment wherein the closest primitive at each image-space position of a frame is determined. This includes rendering methods based on almost any method of visible surface determination. Additionally the specified methods of: encoding the information for each frame as separate frame packets, limiting the size of individual packets by presending or reducing level-of-detail, encoding from a plurality of viewpoints or viewports, can all be used with the method of visibility event encoding wherein newly visible and newly invisible primitives for the encoding are determined by any means. Additionally, the methods that employ adjusting of packet sizes based on encoding newly visible primitives in earlier packets can be performed after the initial encoding as a post-processing step.

In addition the entire process of determining a visibility event encoding can be conducted by analyzing data representing the augmented depth buffers for a sequence of frames that have been previously rendered by an earlier rendering process in which the rendering process has recorded primitive references in the locations of the data representing the augmented depth buffers. In this way, by accessing these augmented depth buffer data as well as the primitive database used in the earlier rendering a process can determine a visibility event encoding as a post-processing step.

The general method of visibility event encoding, specified herein, provides an efficient method of encoding a computer animation wherein the visibility events may be computed in non-real-time and the encoding includes information (e.g., keyframe data) describing the motion of viewpoint, view direction sector, and other graphics objects during the course of the animation. In this general method the decoder unit uses the encoded visibility event information to maintain a display list of visible primitives and uses the encoded motion data in the transformation of the visible primitives. The method of visibility event encoding can also be employed in real-time client-server image generation systems in which the server performs a real-time visibility event encoding and the client uses the visibility event information to maintain a display list of visible primitives. The efficiency of the visibility event encoding method results because a primitive needs to be encoded, or transmitted, or read from an encoding, only once during a period when the primitive is visible in the image stream. The natural temporal visibility coherence of typical image sequences generally limits the number of primitives that become newly visible during each frame interval, thereby limiting the requisite transmission/playback bandwidth. The present invention includes the methods of limiting frame packet size by pre-encoding and reducing geometric level-of-detail which limits the peak bandwidth requirements and tends to create a more uniform bandwidth streaming signal. The method of pre-encoding can be applied only for non-real time encoding of computer animation while the method of reducing geometric level-of-detail to decrease the size of visibility event packets can be applied to both non-real-time and real-time encoding. Thus the efficiency and versatility of the visibility event encoding method makes it a useful codec for a variety of broadcast applications including simulcast, on-demand, and unique simulcast/interactive applications that employ Internet, ADSL, Cable Modem, or other high-band channels such as the proposed HDTV broadcast infrastructure. Additionally the method of visibility event encoding is applicable to computer games and distributed client-server simulation.

The decrease in temporal visibility coherence that accompanies an increase in viewpoint velocity or rotational velocity of the view direction vector during encoding or transmission of a visibility event sequence can cause bandwidth and processing requirements to increase sharply and potentially overwhelm the stream-decoder connection or the decoding processes itself. Low temporal visibility coherence (e.g., the sudden exposure of a relatively large number of primitives by any cause) produces a similar problem during real-time primitive reprojection and during encoding or transmission of a visibility event sequence in a client-server or non-real-time implementation.

The problem of high peak computational and bandwidth requirements during periods of low temporal visibility coherence can be mitigated by employing a low level-of-detail database representation when encoding primitives during periods of low temporal visibility coherence. For visibility event encoding this technique is implemented by using a low level-of-detail object representation to encode newly visible primitives if the packet size of a visibility event packet for a frame exceeds a known size that would allow it to be transmitted during a frame interval. Because of specific spatio-temporal limits of the human visual system described in the copending patent application, the use of a low-level of detail representation in this circumstance is relatively unnoticeable to the viewer.

In the copending patent application the method of primitive reprojection is used as a preferred image generation method for the implementation of the novel perception-based spatiotemporal sampling and load balancing techniques that are the subject of the copending patent application. The method of primitive reprojection and its related visibility event encoding method is shown to be an ideal system in which to implement these perception-based rendering techniques for several reasons. One factor that makes primitive reprojection well suited to the implementation of perception-based spatiotemporal sampling techniques is that the performance of both primitive reprojection and visual perception decreases in regions of the image stream with low temporal image coherence and/or low temporal visibility coherence. This fact is exploited in methods of the copending application which cause the resolution and or level-of-detail to be decreased in regions of the image stream with low temporal image coherence or low temporal visibility coherence. This results in a decrease in spatial image information while maintaining frame rate in a manner that reflects the intrinsic spatiotemporal limits of the human visual system. By producing an image stream with a spatiotemporal structure that is substantially matched to specific spatiotemporal limits of human vision the methods of the copending application realize an unprecedented computational efficiency in the generation of a perceptually lossless image stream. Another important advantage of the present method of primitive reprojection is that it can be implemented using a hardware architecture that employs general purpose microprocessors and memory subsystems. Such an implementation allows the subimage processors to perform the requisite adaptive sampling processes of the copending application that cannot be implemented in ASIC rasterizers that have limited, read-only access to the depth buffer. Primitive reprojection is also ideally suited to the methods of perception based spatio-temporal sampling described in the copending application because during primitive reprojection the time at which each primitive becomes visible in the image stream is determined. This time, (or frame) can be used by the methods of the copending application to select a level-of-detail and resolution for individual objects that reflects the object's or primitive's exposure duration in the image stream in a manner that reflects specific temporal limits of the human visual system (in which the spatial resolving ability is a function of exposure time). These methods can be applied to the present visibility event codec method by encoding newly visible primitives from low level-of-detail database representations during periods when low temporal visibility coherence produces a bandwidth requirement that exceeds the available replay/transmission bandwidth. These low level-of-detail primitives are subsequently replaced by primitives from higher level-of-detail representations of the same object. In this method, if the replacement is scheduled substantially before the time required by the visual system to fully spatially resolve the initial primitives (e.g., on the order of 1000 ms) then the initial low level-of-detail encoding and subsequent replacement is relatively invisible to the viewer.

Additionally, in the present method primitives belonging to objects having a high image-plane velocity or acceleration can be encoded using low level-of-detail representations. This technique exploits the fact that elements with high image-plane velocity or acceleration tend to have a high retinal image velocity which reduces the viewer's ability to resolve the element. In the method of the copending application, the actual retinal image velocity of graphics elements is estimated (or measured) for elements and an appropriate level-of-detail selected to reflect known spatiotemporal performance limits of human vision. Because high overall image-plane velocity (i.e., low temporal image coherence) can accompany low temporal visibility coherence the method of encoding primitives with high image plane velocity using low level-of-detail representations can be used to reduce the compute and bandwidth requirements during periods of low temporal visibility coherence.

For these and other reasons taught by the copending application the organization of primitive reprojection and the related implementation of visibility event encoding as described herein is ideally suited to support the adaptive, perception-based sampling and load balancing techniques of the copending application.

Obviously, numerous modifications and variations of the present invention are possible in light of the above teachings. It is therefore to be understood that within the scope of the appended claims, the invention may be practiced otherwise than as specifically described herein.

Further, the present application incorporates by reference the following papers, reports and technical disclosures:

Abrash, M. (1996). Zen of Graphics Programming. The Coriolis Group, Inc.

Ackeley, K. (1993). RealityEngine Graphics. Silicon Graphics Computer Systems. SIGGRAPH 93 Conference Proceedings, pp. 109–116.

Adelson, E. H. and Bergen, J. R. (1991) The Plenoptic Function and the Elements of Early Vision. Computational Models of Visual Processing, MIT Press, Chapter 1, pp. 3–22.

Adelson, S. J. and Hodges, L. F. (1995) Generating Exact Ray-traced Animation Frames by Reprojection. IEEE Computer Graphics and Applications, pp. 43–51.

Adelson, S. J. and Hodges, L. F. (1995) Stereoscopic ray-tracing. The Visual Computer (1995)10, pp. 127–144.

Akimoto, T., et. al. (1991). Pixel-Selected Ray Tracing. IEEE Computer Graphics & Applications, July '91, pp.14–21.

Barbour, C. G. and Meyer, G. W. (1992) Visual cues and pictorial limitations for computer generated photorealistic images. The Visual Computer (1992) 9, pp. 151–165.

Becker, W. (1991) Saccades. Vision and Visual Dysfunction: Eye Movements, chapter 5, pp. 95–135. CRC Press, Inc.

Bex, P. J., et. al. (1995). Sharpening of Drifting, Blurred Images. Vision Research Vol. 35, No. 18 pp. 2539–2546. Elsevier Science Ltd.

Bishop, G., et. al (1994). Frameless Rendering: Double Buffering considered Harmful. Department of Computer Science, University of North Carolina at Chapel Hill. SIGGRAPH 94 Conference Proceedings, pp. 175–176.

Bizzi, E.(1981) Eye-head coordination. Handbook of Physiology—The Nervous System II, Chapter 29, p. 1321.

Bolin, M. R. and Meyer, G. W.. (1995). A Frequency Based Ray Tracer. Univ. of Oregon. SIGGRAPH 95 Conference Proceedings, pp. 409–418.

Bradick, O., et. al. (1978). Channels in Vision: Basic Aspects. Handbook of Sensory Physiology, Vol. VIII: Perception, pp. 24–33. Held, R., Leibowitz, H. W. and Teuber, H-L. (Eds.), Springer-Verlag Berlin Heidelberg.

Bradt, S. (1988) Two algorithms for taking advantage of temporal coherence in ray tracing. The Visual Computer (1988) 4, pp. 123–132.

Brown, B. (1972) Resolution Thresholds for moving targets at the Fovea and in the Peripheral Retina. Vision Res. Vol. 12, pp. 293–304. Pergamon Press 1972.

Brown, B. (1972) Dynamic Visual Acuity, Eye Movements and Peripheral Acuity for moving targets.. Vision Res. Vol. 12, pp. 305–321. Pergamon Press 1972.

Bundensen, C. and Shibuya, H. (1995). Visual Selective Attention, Lawrence Erlbaum Assoc., Publishers.

Burbidge, D. and P. M. Murray (1989). Hardware Improvements to the Helmet Mounted Projector on the Visual Display Research Tool (VDRT) at the Naval Training Systems Center. GM Hughes Electronics Co. SPIE Vol. 1116 Helmet Mounsted Displays (1989).

Carpenter, R. H. S. (1991). The Visual Origins of Ocular Motility. Vision and Visual Dysfunction: Eye Movements, Vol. 8, pp. 1–10. CRC Press.

Chapman, J., et. al. (1991). Spatio-Temporal Coherence in Ray Tracing. Simon Fraser Univ. Graphics Interface '91.

Charney, M. J. and Scherson, I. D. (1990) Efficient Traversal of Well-behaved Hierarchical Trees of Extents for Ray-tracing complex Scenes. The Visual Computer (1990) 6, pp. 167–178.

Chen, S. E. (1995). QuickTime VR—An Image-Based Approach to Virtual Environment Navigation. Apple Computer, Inc. SIGGRAPH 95 Conference Proceedings, pp. 29–37.

Chen, S. E. and Williams, L. (1993). View Interpolation for Image Synthesis. Apple Computer, Inc. SIGGRAPH 93 Conference Proceedings, pp. 279–288.

Clapp, R. E. (1985). The Rastered Eye; Vision in Television. Boeing Military Airplane Co. In: SPIE Vol. 526, Advances in Display Tech. V (1985).

Cleary, J. G. and Wyvill, G. (1988) Analysis of an algorithm for last ray tracing using uniform space subdivision. The Visual Computer (1988) 4, pp. 65–83.

Collewijn, H., et.al. (1974). Precise Recording of Human Eye Movements. Vision Research, Vol. 15, pp. 447–450. Pergamon Press.

Collewijn, H. (1991). The Optokinetic Contribution. Vision and Visual Dysfunction: Eye Movements, Vol. 8, pp.45–70. CRC Press.

Davson, H. (1990). Physiology of the Eye. Pergamon Press.

Ditchburn, R. W.(1973). Eye-movements and visual perception. Claredon Press—Oxford.

Deering, M. (1995). Geometry Compression. Sun Microsystems. SIGGRAPH 95 Conference Proceedings, pp. 13–19.

Deering, M. (1992). High Resolution Virtual Reality. Sun Microsystems. SIGGRAPH 92 Conference Proceedings, pp. 195–201.

Durlach, N. et. al. (1995). Virtual Reality—Scientific and Technological Challenges, National Research Council, National Academy Press.

Eckert, M. P. and Buchsbaum, G. (1993). The Significance of Eye Movements and Image Acceleration for Coding Television Image Sequences. In Digital Images and Human Vision, Watson, A. B. (Ed.), MIT Press, chapter 8, pp. 89–98.

Eizenman, M., et.al. (1984). Precise Non-contacting Measurement of Eye Movements using the Corneal Reflex. Vision Research, Vol. 24, No. 2, pp. 167–174. Pergamon Press.

Farrell, J. E. (1991) Fitting Physical Screen Parameters to the Human Eye. Vision and Visual Dysfunction: The Man-Machine Interface (Vol 15), chapter 2, pp. 7–23. CRC Press, Inc.

Fano, A. and Cooper, P. (1994). Maintaining Visual Models of a Scene Using Change Primitives. Proceeding: Vision Interface '94. Canadian Image Processing and Pattern Recognition Society.

Ferwerda, J. A., and Greenberg, D. P. (1988). A Psychophysical approach to Assessing the Quality of Antialiased Images. IEEE Computer Graphics & Applications, Nov. '88, pp.85–95.

Ferwerda, J. A., et.al. (1996). A Model of Visual Adaptation for Realistic Image Synthesis. Program of Computer Graphics, Cornell Univ. SIGGRAPH 96 Conference Proceedings, pp. 249–258.

Fisher, R. W. (1984) A Variable Acuity Display for Simulator Applications. McDonnell Aircraft Co. SID 84 Digest.

Fisher, R. W. (1984) Psychophysical Problems and Solutions in Variable Acuity Displays. McDonnell Aircraft Co. SID 84 Digest.

Formella, A. and Gill, C. (1995) Ray tracing: a quantitative analysis and a new practical algorithm. The Visual Computer (1995)11, pp. 465–476.

Fu, S., et. al. (1996). An Accelerated Rendering Algorithm for Stereoscopic Display. Computer & Graphics, Vol. 20, No. 2, pp. 223–229. Elsevier Science Ltd.

Fuchs, H., et.al. (1989). Pixel-Planes 5: A Heterogeneous Multiprocessor Graphics System Using Processor-Enhanced Memories. Department of Computer Science, University of North Carolina at Chapel Hill. SIGGRAPH 89 Conference Proceedings, pp. 79–88.

Funkhouser, T. A. and Sequin, C. H. (1993). Adaptive Display Algorithm for Interactive Frame Rates During Visualization of Complex Virtual Environments. University of California at Berkeley. SIGGRAPH 93 Conference Proceedings, pp. 247–254.

Funkhouser, T. A. (1995). Database Management for Models Larger than Main Memory. AT&T Bell Laboratories. 1995 Symposium on Interactive 3D Graphics, Monterey, Calif.

Funkhouser, T. A. (1995). RING: A Client-Server System for Multi-User Virtual Environments. AT&T Bell Laboratories. SIGGRAPH 95 Lecture E.

Ganz, L. (1975). Temporal Factors in Visual Perception. In: Handbook of Perception, Vol. V, Seeing. Carterette, E. C. and Friedman, M. P. (Eds.), Academic Press, ch. 6, pp. 169–229.

Gaudet, S., et. al. (1988). Multiprocessor Experiments for High-speed Ray Tracing. ACM Transactions on Graphics, Vol. 7, No. 3, July '88, pp. 151–179.

Gegenfurtner, K. R. and Hawken, M. J. (1995). Temporal and Chromatic Properties of Motion Mechanisms. Vision Research Vol. 35, No. 11, pp. 1547–1563. Elsevier Science Ltd.

Gigante, M. A. (1993). Virtual Reality: Enabling Technologies. In Virtual Reality Systems, Earshaw, R. A., et. al. (Ed.), Academic Press, Chapter 2, pp. 15–25.

Girod, B (1993). What's Wrong with Mean-squared Error. In Digital Images and Human Vision, Watson, A. B. (Ed.), MIT Press, Chapter 15, pp. 207–220.

Glassner, A. S. (1988). Spacetime Ray Tracing for Animation. IEEE Computer Graphics & Applications, March '88, pp.60–70.

Glassner, A. S. (Eds.) (1989). An introduction to ray tracing. Academic Press, Inc.

Glassner, A. S. (1995). Principles of Digital Image Synthesis. Volumes I and II, Morgan Kaufmann Publishers, Inc., ISBN 1-55860-276-3.

Glenn, W. E. (1993). Digital Image Compression Based on Visual Perception. In Digital Images and Human Vision, Watson, A. B. (Ed.), MIT Press, Chapter 6, pp. 63–71.

Goldsmith, J. and Salmon, J. (1987). Automatic Creation of Object Hierarchies for Ray Tracing. IEEE Computer Graphics & Applications, May '87, pp.14–20.

Grzywacz, N. M. and Yuille, A. L. (1991) Theories for the Visual Perception of Local Velocity and Coherent Motion. Computational Models of Visual Processing, MIT Press, Chapter 16231–252, pp. 231–252.

Green, S. A. and Paddon, D. J. (1989). Exploiting Coherence for Multiprocessor Ray Tracing. IEEE Computer Graphics & Applications, November '89, pp. 12–26.

Green, S. A. and Paddon, D. J. (1990). A Highly flexible Multiprocessor solution for Ray Tracing. The Visual Computer (1990) 5, pp.62–73.

Grob, M. (1994). Visual Computing, Springer-Verlag.

Guenter, B. K., et. al. (1993). Motion Compensated Compression of Computer Animation Frames. SIGGRAPH 93 Conference Proceedings, pp. 279–304.

Hahn, L. W., and W. S. Geisler (1994). Adaptation Mechanisms in Spatial Vision—I: Bleaches and Backgrounds. Vision Res. Vol. 35, No. 11, pp. 1585–1594. Elsevier Science Ltd.

Haines, R. F. (1975). A Review of Peripheral Vision Capabilities for Display Layout Designers. Proceedings of the S. I. D., Vol. 16/4 Fourth Quarter '75.

Hallet, P. E. (1991). Some Limitations to Human Peripheral Vision. Vision and Visual Dysfunction: Limits of Vision, Vol. 5, ch. 6, p.44. CRC Press, Inc.

Harrell, C. and Fouladi, F. (1993). Graphics Rendering Architecture for High Performance Desktop Workstation. Silicon Graphics Computer Systems. SIGGRAPH 93 Conference Proceedings, pp.93–100.

Hart, W. M. Jr.(1987). Visual adaptation. Chapter 16, Adler's physiology of the eye. The C. V. Mosby Co.

Hart, W. M. Jr. (1987). The temporal responsiveness of vision. Chapter 18, Adler's physiology of the eye. The C. V. Mosby Co.

Harwerth, R. S., et. al. (1980). Sustained and transient channels in the monkey. Vision Research. Vol. 20, pp. 15–22. Pergamon Press.

Hearty, P. J. (1993). Achieving and Confirming Potimum Image Quality. In Digital Images and Human Vision, Watson, A. B. (Ed.), MIT Press, chapter 12, pp. 149162.

Hebert, M-P., et. al. (1992). MARTI—A Multiprocessor Architecture for Ray Tracing Images. In: Advances in Computer Graphics Hardware V—Rendering, Ray Tracing and Visualization Systems. Grimspace, R. L. and Kaufman, A. (Eds.). Springer-Verlag publishers.

Heinrich, J. (1993). MIPS R4000 Microprocessor User's Manual, PTR Prentice Hall.

Helman, J. (1995). Graphics Techniques for Walkthrough Applications. Silicon Graphics Inc. SIGGRAPH 95 Lecture B, Course#32, Interactive Walkthrough of Large Geometric Databases, Course Organizer: E. L. Brechner.

Hennessy, J. L. and Patterson, D. A. (1990). Computer Architecture—A Quantitative Approach, Morgan Kaufmann Publishers.

Hess, R. F. and Snowden, R. J. (1992). Temporal Properties of Human Visual Filters: Number, Shapes and Spatial Covariation. Vision Research, Vol. 32, No. 1, pp. 47–59. Pergamon Press.

Hess, R. F. and Snowden, R. J. (1992). Temporal Frequency Filters in the Human Peripheral Visual Field. Vision Research, Vol. 32, No. 1, pp. 61–72. Pergamon Press.

Horiguchi, S., et. al. (1993) Parallel processing of Incremental Ray Tracing on a Shared Memory Multiprocessor. The Visual Computer (1993) 9, pp. 371–380.

Hsiung, P-K. (1992) Accelerating Arts. The Visual Computer (1992) 8, pp. 181–190.

Jacob, R. J. K. (1995). Eye Tracking in Advance Interface Design. Virtual Environments and Advanced Interface Design, Oxford Univ. Press, Chapter 7, pp. 258–290.

Jevans, D. A. (1992). Object Space Temporal Coherence for Ray Tracing. Apple Computer, Inc., Graphics Interface '91.

Joch, A. (1996). What Pupils Teach Computers. Byte Magazine, July '96, pp. 99–100.

Kalawsky, R. S. (1993). The Science of Virtual Reality and Virtual Environments. Addison-Wesley Publishing Co.

Kalawsky, R. S. (1993). Critical Aspects of Visually Coupled Systems. In Virtual Reality Systems, Earshaw, R. A., et. al. (Ed.), Academic Press, chapter 14, pp. 203–212.

Kirk, D. and Voorhies, D. (1990). The Rendering Architecture of the DN10000VS. Apollo Systems Division of Hewlett-Packard, California Institute of Technology. SIGGRAPH 90 Conference Proceedings, pp. 299–307.

Kobayashi, H., et. al. (1988). Load balancing strategies for a parallel ray tracing system based on constant subdivision. The Visual Computer (1988) 4, pp.197–209.

Kocian D. F. and Task H. L. (1995). Visually Coupled Systems Hardware and the Human Interface. Virtual Environments and Advanced Interface Design, Oxford Univ. Press, Chapter 6, pp. 175–257.

Kortum, P. T., and W. S. Geisler(1994). Adaptation Mechanisms in Spatial Vision—I: Flash Thresholds and Background Adaptation. Vision Research Vol. 35, No. 11, pp. 1595–1609. Elsevier Science Ltd.

Kowler, E. (1991). The Stability of Gaze and its Implications for Vision. Vision and Visual Dysfunction: Eye Movements, Chapter 4, pp. 71–92. CRC Press, Inc.

Kowler, E., et. al. (1995). The Role of Attention in the Programming of Saccades. Vision Research Vol. 35, No. 13, pp. 1897–1916. Elsevier Science Ltd.

Kumar, V., et. al. (1994). Introduction to Parallel Computing—Design and analysis of algorithms, The Benjamin/Cummings Publishing Co., Inc.

Lampton, C. (1994). Gardens of Imagination: Programming 3D Maze Games in C/C++. Waite Group Press.

LaMothe, A. (1995). Black Art of 3D Game Programming. Waite Group Press.

Landy, M. S., et. al. (1996). Exploratory vision—The Active Eye, Springer-Verlag New York, Inc.

Lappe, M. and Rauschefcker, J. P. (1995). An Illusory Transformation in a Model of Optical Flow Processing. Vision Research Vol. 35, No. 11, pp. 1619–1631. Elsevier Science Ltd.

Lee, M. K.,et.al. (1985). Statistically Optimized Sampling for Distributed Ray Tracing. Univ. of Tulsa. SIGGRAPH 85 Conference Proceedings, pp. 61–67.

Leighh, J. R., M.D. and Zee, D. S. (1991). The Neurology of Eye Movements, edition 2. F. A. Davis Co., Phila.

Levoy, M. (1995). Polygon-Assisted JPEG and MPEG Compression of Synthetic Images. Stanford University. SIGGRAPH 95 Conference Proceedings, pp. 21–27.

Levoy, M. and Hanrahan, P. (1996). Light Field Rendering. Stanford University. SIGGRAPH 96 Conference Proceedings, pp. 31–42.

Lin, T. and Barron, J. L. (1994). Image Reconstruction Error for Optical Flow. Proceeding: Vision Interface '94. Canadian Image Processing and Pattern Recognition Society.

Luntinen, O., et. al. (1995). Modeling the Increase of Contrast Sensitivity with Gating Area and Exposure time. Vision Res. Vol. 35, No. 16, pp. 2339–2346. Elsevier Science Ltd.

MacDonald, J. D. and Booth, K. S. (1990) Heuristics for ray tracing using space subdivision. The Visual Computer (1990) 6, pp. 153–166.

Marciel, P. W. C. and Shirley, P. (1995). Visual Navigation of Large Environments Using Textured Clusters. 1995 Symposium on Interactive 3D Graphics, Monterey, Calif.

Marr, D. (1982). Vision, W. H. Freeman and Co.

Masuishi, T., et. al.(1992). 6,000×2,000 Display Prototype. Visual Language Workshop, The Media Laboratory, MIT. SPIE Vol. 1664 High-Resolution Displays and Projection Systems (1992).

Matin, E. (1974). Saccadic Suppression: A review and an analysis. Psychological Bulletin, The American Psychological Assoc. (Dec. 1974), vol. 81, no. 12, pp. 889–917.

McMillan, L. and Bishop, G. (1995). Plenoptic Modeling: An Image-Based Rendering System. Department of Computer Science, University of North Carolina at Chapel Hill. SIGGRAPH 95 Conference Proceedings, pp. 39–46.

Mitchell, D. P. (1987). Generating Antialiased Images at Low Sampling Densities. AT&T Bell Laboratories. SIGGRAPH 87 Conference Proceedings, pp. 65–69.

Mitchell, D. P. (1996). Consequences of Stratified Sampling in Graphics. Microsoft Corporation. SIGGRAPH 96 Conference Proceedings, pp. 277–280.

Molnar, S., et.al. (1992). PixelFlow: High-Speed Rendering Using Image Composition. Department of Computer Science, University of North Carolina at Chapel Hill. SIGGRAPH 92 Conference Proceedings, pp. 231–240.

Mueller, C. (1995). The Sort-First Rendering Architecture for High-Performance Graphics. Univ. of Carolina at Chapel Hill. 1995 Symposium on Interactive 3D Graphics, Monterey, Calif.

Nakamura, H., et.al. (1991). A Design of Eye Movement Monitoring System for Practical Environment. SPIE, Vol. 1456 Large-screen-projection, Avionic and Helmet-mounted Displays, pp. 226–228.

Narayanaswami, C. (1996) Superscalar RISC machines, straight-line programs, and graphics. The Visual Computer (1996)12, pp. 117–131.

Olano, M., et. al. (1995). Combating Rendering Latency. Univ. of Carolina at Chapel Hill. 1995 Symposium on Interactive 3D Graphics, Monterey, Calif.

Painter, J. and Sloan, K. (1989). Antialiased Ray Tracing by Adaptive Progressive Refinement. University of Washington. SIGGRAPH 89 Conference Proceedings, pp. 281–288.

Parke, F. I. (1991). Perception-based Animation Rendering. N.Y. Institute of Technology. Computers and Graphics '91, 1049-8907/91/020044-08. John Wiley & Sons, Ltd.

Pola, J., and H. J. Wyatt (1991). Smooth Pursuit: Response Characteristics, Stimuli and Mechanisms. Vision and Visual Dysfunction: Eye Movements, chapter 6, pp. 138–149. CRC Press, Inc.

Potmesil, M. and Hoffert, E. M. (1989). The Pixel Machine: A Parallel Image Computer. AT&T Bell Laboratories. SIGGRAPH 89 Conference Proceedings, pp. 69–78.

Reddy, M. (1996). SCROOGE: Perceptually-Driven Polygon Reduction. Univ. of Edinburgh. Computer Graphics Forum (1996), Vol. 15, No. 4, pp. 191–203.

Regan, M. and Pose, R. (1994). Priority Rendering with a Virtual Reality Address Recalculation Pipeline. Monash University. SIGGRAPH 94 Conference Proceedings, pp. 155–162.

Robinson, D. A. (1981) Control of Eye Movements. Handbook of Physiology - The Nervous System II, chapter 28, pp. 1275–1319.

Robinson, D. A. (1991) Overview. Vision and Visual Dysfunction: Eye Movements, chapter 14, pp. 320–331. CRC Press, Inc.

Robinson, R. M., Capt., USAF, M. L. Thomas, M. S., and P. A. Wetzel, Ph. D. (19?). Eye Tracker Development on the Fiber Optic Helmet Mounted Display. SPIE Vol. 1116 Helmet Mounted Displays (1986).

Roufs, J. A. J. and Bouma, H. (1980). Towards Linking Perception Research and Image Quality. Proceedings of the S. I. D., Vol. 21/3 1980.

Roufs, J. A. J. and Boschman, M. C. (1991). Visual Comfort and Performance. Vision and Visual Dysfunction: The Man-Machine Interface (Vol 15), chapter 3, pp. 24–40. CRC Press, Inc.

Ruelen, J. P. H., et. al. (1988). Precise recording of Eye Movement: the IRIS Technique Part 1. Medical & Biological Engineering & Computing, January '88, pp. 20–29.

Rubin G. S. and Turano, K. (1992). Reading Without Saccadic Movement. Vision Research, Vol. 32, No. 3, pp. 895–902. Pergamon Press.

Rushmeier, H. E. and Ward, G. J. (1994). Energy Preserving Non-linear Filters. National Institute of Standards and Technology. SIGGRAPH 94 Conference Proceedings, pp. 131–138.

Scherson, I. D. and Caspary, E. (1988) Multiprocessing for ray tracing: a hierarchical self-balancing approach. The Visual Computer (1988) 4, pp. 188–196.

Schmalstieg, D., and Gervautz, M. (1996). Demand-Driven Geometry Transmission for Distributed Virtual Environments. Vienna Univ. of Technology. Eurographics '96.

Schneider, B-O.(1991). Towards a Tacomomy for Display Processors. In: Advances in Computer Graphics Hardware IV, Grimsdale, R. L. and Straber, W. (Eds.), EurographicSeminars, Springer-Verlag, pp. 3–36.

Segal, M., et.al. (1992). Fast Shadows and Lighting Effects Using Texture Mapping. Silicon Graphics Computer Systems. SIGGRAPH 92 Conference Proceedings, pp. 249–252.

Seitz, S. M. and Dyer, C. R. (1996). View Morphing. Univ. of Wisconsin-Madison. SIGGRAPH 96 Conference Proceedings, pp. 21–30.

Shinya, M., et. al (1987). Principles and Applications of Pencil Tracing. NTT Electrical Communications Laboratories, Tokyo, Japan. SIGGRAPH 87 Conference Proceedings, pp. 45–54.

Shinya, M. (1993). Spatial Anti-aliasing for Animation Sequences with Spatio-temporal Filtering. NTT Human Interface Laboratories, Tokyo, Japan. SIGGRAPH 93 Conference Proceedings, pp. 289–296.

Shirley, P. (1991). Discrepancy as a Quality Measure for Sample distributions. Indiana University. Eurographics '91.

Siderov, J., et. al. (1995). The Role of Attention in the Programming of Saccades. Vision Research Vol. 35, No. 13, pp. 1897–1916. Elsevier Science Ltd.

Siderov, J. and Harwerth, R. S. (1995). Stereopsis, Spatial Frequency and Retinal Eccentricity. Vision Research Vol. 35, No. 16, pp. 2329–2337. Elsevier Science Ltd.

Sistare, S. and Friedell, M. (1989). A Distributed system for Near-Real-Time Display of Shaded Three-dimensional graphics. Harvard Univ. Graphics Interface '89.

Smets, G. J. F., and Overbeeke, K. J. (1995). Trade-off Between Resolution and Interactivity in Spatial Task Performance. IEEE Computer Graphics & Applications, Sept. '95, pp.46–51.

Snyder and Barr, ACM Proceedings SIGGRAPH Vol 21, No. 4, Jul. 1987, pp 119–128.

Steinman, B. A. et. al. (1995). Visual Attention Mechanisms Show Center-Surround Organization. Vision Research Vol. 35, No. 13, pp.1859–1869. Elsevier Science Ltd.

Stone, H. S. (1993). High-Performance Computer Architecture, Addison-Wesley Publishing Co.

Sung, K. and Kubitz, W. J. (1995) Tracing rays with the Area Sampling Machine. The Visual Computer (1995)11, pp. 477–496.

Thomas, J. P. (1975). Spatial Resolution and Spatial Interation. In: Handbook of Perception, Vol. V, Seeing. Carterette, E. C. and Friedman, M. P. (Eds.), Academic Press, ch. 7, pp. 233–259.

Thomas, D., et. al. (1989) Anti-aliased Ray Tracing with Covers. AT&T Bell laboratories. Computer Graphics Forum 8 (1989) pp. 325–336.

Torborg, J. and Kajiya, J. T. (1996). Talisman: Commodity Realtime 3d Graphics for the PC. Microsoft Corporation. SIGGRAPH 96 Conference Proceedings, pp. 353–363.

Tost, D. (1991). An Algorithm of Hidden Surface Removal Based on Frame-to-frame coherence. Eurographics '91.

Tyler, C. W. (1978). Hyper-Resolution in Human Perception of movement in Visual Displays. Proceedings of the S. I. D., Vol. 19/3 Third Quarter '78.

Vince, J. (1995). Virtual Reality Systems, Addison-Wesley Publishing Co.

Wallach, D. S., et. al. (1994). Accelerated MPEG Compression of Dynamic Polygonal Scenes. Department of Computer Science, Princeton University. SIGGRAPH 94 Conference Proceedings, pp. 193–196.

Walsum, T., et. al. (1991). Refinement criteria for adaptive stochastic ray tracing of textures. Delft University of Technology. Eurographics '91.

Wilson, H. R. (1991) Pattern Discrimination, Visual Filters, and Spatial Sampling Irregularity. Computational Models of Visual Processing, MIT Press, Chapter 12, pp. 153–168.

Yagel, R., et. al. (1992). Discrete Ray Tracing. IEEE Computer Graphics & Applications, September, pp.19–28.

Yellott, J. I. Jr., B. A. Wandell, and T. N. Cornsweet (1984). The beginnings of visual perception: the retinal image and its initial encoding. Handbook of Physiology, sect. 1, vol. III. American Physiological Society.

Yoshida, M., et. al. (1991). A Dedicated Graphics Processor SIGHT-2. In: Advances in Computer Graphics Hardware IV, Grimsdale, R. L. and Straber, W. (Eds.), Eurographic Seminars, Springer-Verlag, pp. 151–169.

Yoshida, A., Rolland, J. P., and Reif, J. H. (1995) Design and Applications of a High-Resolution Insert Head-Mounted-Display. IEEE 1995 Conference on Virtual Reality, Orlando, Fla. 0-8186-7084-3/95

Young L. R., AND D. Sheena (1975) Methods & Designs—Survey of eye movement recording methods. Behavior Research Methods & Instruments, vol. 7, 397–429.

Yuan, Y., et. al. (1988) GemstoneFire: adaptive dispersive ray tracing of polyhedrons. The Visual Computer (1988) 4, pp. 259–270.

IEEE Standard for Scalable Coherent Interface (SCI), (1992). IEEE Std. 1596-1992. Recognized as an American National Standard (ANSI). The Institute of Electrical and Electronics Engineers, Inc.

What is claimed as new and desired to be secured by letters patent of the United States is:

1. A method, performed on an encoder including a first database of graphics primitives, of encoding graphics information for generating a computer generated image sequence to be displayed, the method comprising the steps of:

a) determining graphics primitives that actually become newly visible for substantially each frame of the image sequence; and b) adding encoded visibility event information describing the newly visible primitives to a second database for substantially each frame of the sequence.

2. The method according to claim 1, wherein the step of determining graphics primitives that become newly visible for a frame comprises the step of determining a set of all graphics primitives that become newly visible for the frame.

3. The method according to claim 1, wherein the step of determining graphics primitives that become newly visible for a frame comprises the step of determining a set of only the graphics primitives that become newly visible for the frame.

4. The method according to claim 1, wherein the step of determining graphics primitives that become newly visible for a frame comprises the step of determining a set of all of and only the graphics primitives that become newly visible for the frame.

5. The method according to claim 1, further comprising the steps of:

c) determining primitives that become newly invisible for substantially each of said frames, and d) adding, for substantially each frame, graphics information describing said newly invisible primitives to the second database.

6. The method according to claim 5, wherein the step c) of determining comprises the step of determining primitives that become completely occluded for substantially each of said frames.

7. The method according to claim 5, wherein the step b) of adding information describing said newly visible primitives comprises the substeps of:

b1) determining, for each of the newly visible primitives, an insertion location, by array index, in an unused position of a list of visible primitives comprising a source display list of primitives, and b2) adding information to the second database representing the newly visible primitives together with the array index in the source display list of visible primitives for the frame whereby the process of adding newly visible primitives to a destination display list, having a sequence equivalent to the source display list, during decoding is simplified because the addition location is predetermined.

8. The method according to claim 7, wherein the step d) of adding information describing said newly invisible primitives comprises the substeps of d1) determining the existing location, by array index, of substantially each newly invisible primitive in the source display list for the frame, and d2) adding, for the frame, the array index values of the newly invisible primitives into the second database, whereby the process of removing or inactivating newly invisible primitives in a destination display list, having a sequence equivalent to the source display list, during subsequent decoding is simplified because the removal location is predetermined.

9. The method according to claim 7, further comprising the step of adding information indicating that the encoded information for newly visible and newly invisible primitives applies to a specific destination display list in a plurality of destination display lists maintained by a decoding unit.

10. The method according to claim 9, further comprising the step of adding information indicating that a specific destination display list should be flushed.

11. The method according to claim 9, further comprising the step of adding information indicating that display of a specific destination display list should be suspended.

12. The method according to claim 7, further comprising the steps of:
   c) determining, for substantially each frame of the sequence, the size of said source display list of primitives; and
   d) decreasing the size of the source and destination display list if the size of the size exceeds a predetermined size, the method of decreasing comprising the step of: subsequently encoding newly visible primitives using a reduced level-of-detail representation;
   whereby the size of the destination display list is limited to a predetermined size commensurate with the storage and display capabilities of a decoding unit.

13. The method according to claim 5, wherein the step c) of determining comprises the sub-steps of:
   c1) determining primitives that become newly invisible for substantially each of said frames, and
   c2) determining vertices belonging to the newly invisible primitives that are not shared by currently visible primitives; and
   wherein the step d) of adding comprises the substeps of:
   d1) adding graphics information describing the newly invisible primitives for the frames to said second database, and
   d2) adding information describing the vertices, determined in step c2) to said second database whereby the second database represents the encoded visibility event information including the newly invisible primitives and the corresponding vertices that are not shared by currently visible primitives.

14. The method according to claim 13, wherein the step d2) of adding information describing said vertices, determined in step c2) comprises the substeps of:
   d2a) determining the existing location, by array index, of each of the determined vertices in said source display list of vertices for the frame, and
   d2b) adding information to said second database representing said determined vertices wherein said information comprises the array index value of the vertex in said source display list of vertices whereby the process of removing or inactivating vertices in a destination display list, having a sequence equivalent to the source display list, during subsequent decoding is simplified because the removal location is predetermined.

15. The method according to claim 5, in which the step a) of determining comprises the sub-steps of:
   a1) assigning each of plural subimage processors a respective subimage of a tiling of an overall image, wherein the each of the plural subimage processors is connected to both a data storage device that is shared with other of the plural subimage processors, and at one of a local storage device and a cache data storage device;
   a2) maintaining, by each of the plural subimage processors, a corresponding list of visible primitives for each corresponding subimage using a corresponding subimage depth-buffer, the step of maintaining comprising the sub-steps of:
      a2a) transforming the previously visible primitives in the corresponding subimage list of primitives,
      a2b) classifying, by subimage, primitives in the corresponding subimage list of primitives which redistribute to other subimages,
      a2c) redistributing to other subimages the primitives in the corresponding list of primitives which redistribute to the other subimages,
      a2d) adding to the corresponding list of primitives the primitives redistributed from other subimages,
      a2e) rasterizing, using a subimage augmented depth buffer, the primitives in the current subimage list of visible primitives,
      a2f) storing both depth and primitive references for samples written to said subimage augmented depth buffer for the current frame and an earlier frame,
      a2g) determining, after the step a2f) of storing, and using the subimage augmented depth buffer, locations in the current frame where previously invisible primitives may be newly exposed,
      a2h) visibility tracing in the locations of the current frame where the invisible primitives may be newly exposed to find newly exposed primitives for the corresponding subimages, and
      a2i) subsequently rasterizing newly exposed primitives using depth-comparison rasterization; and
   a3) testing, for each subimage, corresponding primitives determined to be newly visible to the subimage in step 6 against a global visibility array wherein said global visibility array indicates the primitives that were visible in the entire image during the earlier frame,
   wherein the adding the step c) of adding comprising adding those primitives found to be newly visible to a subimage and not previously visible in the image as determined by absence of the primitive on said global visibility array to said information describing newly visible primitives for the frame.

16. The method according to claim 15, wherein the step c) of determining newly invisible primitives comprises the substeps of:
   c1) reading said augmented depth buffer corresponding to said subimage following the rasterization of all primitives in the reprojection list of primitives for the corresponding subimage;
   c2) determining, during the step of reading, those primitives in said reprojection list of visible primitives for the subimage those primitives that are not represented by at least one sample in a visible level of said augmented depth buffer corresponding to the subimage;
   c3) removing those primitives determined in step c2) from said reprojection list of visible primitives corresponding to said subimage;
   c4) testing each of said newly occluded graphics primitives for each of the subimages to determine which other subimages the each said graphics primitive projects to; and
   c5) determining, by read of appropriate subimage visible primitive lists, any of said primitives newly occluded to a subimage that are not visible in any other subimage to which they project to be newly occluded to the entire image, wherein the step d) of adding comprises adding information describing said newly invisible primitives determined in the determining step c) to said second database whereby this database represents the encoded visibility event information including the newly visible and newly invisible primitives for substantially each frame of the encoded sequence.

17. The method according to claim 5, wherein the step a) of determining comprises the sub-steps of:

a1) assigning each of plural subimage geometry processors a respective subimage of a tiling of an overall image, wherein the each of the plural subimage is connected to both a data storage device that is shared with other of the plural subimage processors, and at one of a local storage device and a cache data storage device;

a2) maintaining, by each of the plural subimage geometry processors, a corresponding list of visible primitives, in object-space representation, for each corresponding subimage, the substep a2) of maintaining comprising the sub-substeps of:

a2a) transforming the previously visible primitives in the corresponding subimage list of primitives, a2b) classifying, by subimage, primitives in the corresponding subimage list of primitives which redistribute to other subimages, a2c) redistributing to other subimage lists the primitives in the corresponding list of primitives which redistribute to the other subimages, and a2d) adding to the corresponding list of primitives the primitives redistributed from other subimages;

a3) assigning each of plural subimage rasterization-visibility tracing processors a respective subimage of a tiling of an overall image, wherein the each of the plural subimage rasterization-visibility tracing processors is connected to both a data storage device that is shared with other of the plural subimage rasterization-visibility tracing processors and to a corresponding subimage geometry processor and at one of a local storage device and a cache data storage device;

a4) rasterizing, by subimage rasterization-visibility tracing processor, using a subimage augmented depth buffer, the primitives in the current subimage list of visible primitives;

a5) storing both depth and primitive references for samples written to said subimage augmented depth buffer for the current frame and an earlier frame;

a6) determining, after the step b4) of storing, and using the subimage augmented depth buffer, locations in the current frame where previously invisible primitives may be newly exposed;

a7) visibility tracing in the locations of the current frame where the invisible primitives may be newly exposed to find newly exposed primitives for the corresponding subimages;

a8) subsequently rasterizing newly exposed primitives using depth-comparison rasterization;

a9) transmitting, to the corresponding subimage geometry processor, data representing the newly visible subimage primitives determined in the visibility tracing step a7); and a10) testing, for each subimage by corresponding geometry processor, those primitives determined to be newly exposed in a subimage, as determined by the visibility tracing step b7), against a global visibility array wherein said global visibility array indicates the primitives that were visible in the entire image during the earlier frame, wherein the adding the step b) of adding comprising adding those primitives found to be newly visible to a subimage and not previously visible in the image as determined by absence of the primitive on said global visibility array to said information describing newly visible primitives for the frame.

18. The method according to claim 1, wherein the step b) of adding information comprises adding separate data packets which represent newly visible primitive information for each of the corresponding frames.

19. The method according to claim 18, wherein the step b) of adding information further comprises the steps of;

adding separate data packets which represent newly visible primitive information for each of the corresponding frames; and adding separate data packets which represent newly invisible primitive information for each of the corresponding frames.

20. The method according to claim 19, wherein the step b) of adding information as separate data packets for each of said frames comprises the substeps of:

b1) determining a size of each of said data packets, b2) comparing each of said sizes to a threshold value to determine if the size of each of said data packets exceeds said threshold value, b3) modifying the data packets which have a size larger than said threshold value to have a size less than said threshold value, whereby the sequence comprises a predetermined minimum number of packets to be transmitted and decoded per unit time corresponding to a desired frame rate.

21. The method according to claim 20, wherein the step b3) of modifying comprises the step of redetermining said newly visible primitives for the corresponding frame data packets wherein the redetermining employs a database of graphics primitives containing represented objects having a lower level of geometric detail.

22. The method according to claim 20, wherein the step b3) of modifying comprises adding information describing newly visible primitives for said frames having corresponding datapackets larger than said threshold value to datapackets corresponding to earlier frames in said sequence wherein said earlier frames have corresponding datapackets that are smaller than said threshold value, and removing the information added in the adding step from the data packets to which the primitives were originally assigned.

23. The method according to claim 22, wherein the information describing newly visible primitives for said frames having corresponding datapackets larger than said threshold value that is moved to data packets corresponding to said earlier frames contains information for each primitive indicating the frame number of the sequence of frames when each of said primitives actually becomes visible in said sequence whereby the pretransmitted primitives are not actively displayed during decoding until said frame number is encountered.

24. The method according to claim 19, wherein the step b) of adding information as separate data packets for each of said frames comprises the substeps of:

b1) determining the size of each of said data packets;

b2) comparing each of said sizes to a predetermined minimum value to determine if the size of each of said data packets is less than said threshold value; and b3) modifying the data packets which have a size smaller than said minimum value to have a size equal to said minimum value by adding information describing primitives that became visible in an earlier frame than the corresponding data packet and which are still visible in the image sequence, whereby the unused replay/transmission bandwidth produced by frame packets that have a size below said minimum value is used to repeatedly resend visible primitives thereby reducing the time between initiation of reception of a datastream comprising the encoded information and the reception of a full set of visible primitives for a frame.

25. The method according to claim 24, wherein said added information representing previously encoded visible primitives is added to said datapacket with size less than threshold by adding the information as a separate sub-packet, wherein the information of said sub-packet is not decoded by a subsequent decoding if the decoding unit is not in an initiation phase of the decoding but actually has the current full set of visible primitives, whereby the decoding process is able to ignore re-encoded primitives except during initiation.

26. The method according to claim 1, wherein the step a) of determining comprises the sub-steps of:
 a1) determining graphics primitives that actually become newly visible for substantially each frame of the image sequence,
 a2) determining vertices belonging to the newly visible primitives that are currently not encoded; and wherein the step b) of adding comprises the sub-steps:
 b1) adding information describing the newly visible primitives for the frames to the second database, and
 b2) adding information describing the corresponding vertices determined in step a2) to the second database so that, for substantially each frame of the sequence, the second database contains encoded visibility event information including the newly visible primitives and corresponding vertices that are not already encoded.

27. The method according to claim 26, wherein the step b2) of adding comprises the substeps of:
 b2a) determining, for each of said vertices determined in step a2), an insertion location, by array index, in an unused position in a list of vertices of visible primitives comprising a source display list of vertices, and
 b2b) adding information to the second database representing said vertices together with said array index value in said source display list of vertices for the frame whereby the subsequent process of adding new vertices to a destination display list of vertices, having a sequence equivalent to the source display list of vertices, during decoding of said information is simplified because the addition location is predetermined and whereby a newly visible primitive may reference a vertex encoded in an earlier frame thereby substantially reducing storage and transmission requirements by exploiting the considerable amount of vertex sharing that occurs within primitive meshes.

28. The method according to claim 1, wherein the step a) of determining comprises the step of determining the newly visible graphics primitives for a viewport that is larger than the displayed viewport.

29. The method according to claim 1, wherein the step a) of determining comprises the step of determining the newly visible graphics primitives determined from a plurality of substantially adjacent viewports representing a field-of-view that is greater than the instantaneously displayed field-of-view displayed during decoding whereby the destination display list of visible primitives that result from the decoding contains a superset of visible primitive that is sufficient to allow interactive rotation of the view direction vector about the viewpoint to obtain dynamic yaw, pitch and roll capability during decoding and display of encoded sequence.

30. The method according to claim 1, wherein the step a) of determining comprises determining the newly visible graphics primitives from a plurality of viewpoints for a single frame of said sequence wherein the plurality of viewpoints for a single frame are arranged on a first curve and wherein the step b) of adding information comprises adding information which represents primitives that are newly visible from said plurality of viewpoints for each of said frames.

31. The method according to claim 30, further comprising the step of determining a second space curve wherein the second space curve represents a space-time trajectory of viewpoint motion for the image sequence and intersects the first curve containing said viewpoints for the single frame whereby said encoding represents the visibility from a surface containing said space-time trajectory.

32. The method according to claim 1, wherein the step of a) determining comprises the steps of:
 arranging a plurality of viewpoints for a single frame on a substantially planar region;
 determining the newly visible graphics primitives from the plurality of viewpoints for a single frame of said sequence; and wherein the step b) of adding information comprises adding separate data packets which represents newly invisible primitive information from said plurality of viewpoints for each of said frames.

33. The method according to claim 32, further comprising the step of determining a second space curve that represents a space-time trajectory of viewpoint motion for the encoded image sequence and intersects the substantially planar region containing said viewpoints for a single frame, whereby said encoding represents the visibility from a volume containing said space-time curve.

34. The method according to claim 1, wherein said information additionally includes information describing the motion of camera and other objects during said sequence.

35. The method according to claim 1, further comprising the step of periodically adding material information comprising parameters that affect the shading of encoded primitives.

36. The method according to claim 1, further comprising the step of periodically adding material information comprising parameters that reference specific material information that is prestored in a decoder.

37. The method according to claim 36, wherein the parameters are modifiable by a user of the decoder to allow selection of the prestored material information.

38. The method according to claim 1, further comprising the steps of:
 c) determining image regions, for substantially each frame of the image sequence, that contain exposed surfaces which require rendering methods that can not be performed on a decoder but which can be performed on the encoder; and
 d) rendering said image regions on the encoder;
 wherein the step b) of adding comprising the step of adding information 1) describing the newly visible primitives; and 2) generated in the rendering step d) describing said image regions.

39. The method according to claim 1, wherein the step b) of determining comprises the sub-steps of:
   b1) rendering for substantially each frame of said sequence, said graphics primitives, wherein said rendering comprises writing samples from said primitives to an augmented depth buffer wherein said augmented depth buffer includes, for substantially each sample location, a reference to the source primitive for the sample;
   b2) determining, for substantially each frame of said sequence, the set of primitives that are visible in said frames by reading said augmented image buffer to determine the closest primitive at each sample location; and
   b3) comparing the set of primitives determined to be visible for the current frame to the set of primitives determined to be visible for an earlier frame wherein the comparing is made to identify those primitives visible in the set of visible primitives for the current frame but not in the set of visible primitives for the earlier frame,
   wherein the step c) of adding comprises adding those primitives identified to be newly visible in the comprising step b3).

40. The method according to claim 39, wherein the comparing step b3) further comprises the step of comparing the set of primitives determined to be visible for the current frame to the set of primitives determined to be visible for an earlier frame wherein the comparing is made to identify those primitives visible in the set of visible primitives for the earlier frame but not in the set of visible primitives for the current frame, and wherein step c) of adding further comprises the step of adding information representing primitives, identified in said additional comparing step, as newly invisible primitives.

41. The method according to claim 1 wherein the step a) of determining comprises the substeps of:
   a1) transforming previously visible primitives in a current frame;
   a2) classifying the previously visible primitives to a viewport;
   a3) rasterizing the previously visible primitives;
   a4) storing both depth and primitive references for each of the previously visible primitives for a preceding frame and the current frame in an augmented depth buffer;
   a5) determining, after the step a4) of storing, and using the augmented depth buffer, locations in the current frame where previously invisible primitives may be newly exposed;
   a6) visibility tracing in the locations of the current frame where the invisible primitives may be newly exposed to find newly exposed visible primitives; and
   a7) subsequently rasterizing newly exposed primitives using depth-comparison rasterization.

42. The method according to claim 41, wherein the step a6) of visibility tracing comprises ray casting using a set of grids wherein the grids comprise a subdivision of the represented space containing said graphic primitives.

43. The method according to claim 42, wherein said set of grids comprises a hierarchy of grids wherein grids at deeper levels of the hierarchy reference primitives from a high level-of-detail representation of the represented objects and grids at upper levels of the hierarchy reference primitives from a low level-of-detail representation of the represented objects.

44. The method according to claim 41, wherein the step b) of adding comprises the substeps of:
   b 1) adding separate data packets which represent newly visible primitive information for substantially each of the corresponding frames;
   b2) determining the size of each of said data packets;
   b3) comparing each of said sizes to a predetermined threshold value to determine if the size of each of said data packets exceeds said threshold value; and
   b4) modifying the data packets which have a size larger than said threshold value to have a size less than said threshold value, wherein the step c3) of modifying comprises the substeps of:
      b4a) redetermining said newly visible primitives for the corresponding frame data packets, by visibility tracing in said regions of potentially newly exposed primitives using a lower level-of-detail database, and
      b4b) adding information describing redetermined newly visible primitives to corresponding data packets, whereby the number of newly visible primitives and the size of the corresponding packet is reduced.

45. The method according to claim 41, further comprising the steps of:
   c) determining image regions, for substantially each frame of the image sequence, that contain exposed surfaces which require ray tracing that cannot be performed on a decoder unit but which can be performed on an encoding unit; and
   d) rendering said image regions on the encoder by ray tracing,
   wherein the step b) of adding comprises the step of adding information 1) describing the newly visible primitives, and 2) describing said image regions generated in the rendering step d), whereby said image information can be displayed on a decoder that cannot be produced by rendering the visible primitives on the decoder.

46. The method according to claim 1, wherein the step a) of determining comprises the steps of:
   a1) reading, for substantially each frame of said sequence, data representing each of said frames wherein said data representing comprises of an augmented depth buffer wherein said augmented depth buffer includes, for substantially each sample location, a reference to the source primitive for the sample,
   a2) determining, for substantially each frame of said sequence, the set of primitives that are visible in said frames by reading said augmented image buffer to determine the closest primitive at each sample location,
   a3) comparing the set of primitives determined to be visible for the current frame to the set of primitives determined to be visible for an earlier frame wherein the comparing is made to identify those primitives visible in the set of visible primitives for the current frame but not in the set of visible primitives for the earlier frame,
   wherein the step c) of adding comprises adding those primitives identified to be newly visible in the step b3).

47. The method according to claim 46, wherein the comparing step a3) further comprises the additional step of comparing the set of primitives determined to be visible for the current frame to the set of primitives determined to be visible for an earlier frame wherein the comparing is made to identify those primitives visible in the set of visible primitives for the earlier frame but not in the set of visible primitives for the current frame, and wherein step c) of adding further comprises the step of adding information representing primitives, identified in said additional comparing step, as newly invisible primitives.

48. In a computer-implemented method of encoding an image sequence by visibility event encoding, a method of separately encoding a synchronizing data stream, the method of separately encoding comprising the steps of:

determining substantially all primitives that form a complete set of visible primitives for substantially each frame of the sequence; and encoding a separate initiation data stream including the substantially all primitives determined in the determining step to form a complete set of visible primitives for substantially each frame of the sequence, wherein each packet of the separate initiation data stream corresponds to a frame packet of a visibility event encoding, whereby a decoding unit accessing the separate initiation stream does not need an extended time to receive a completely visible set of primitives during the initiation of decoding at an arbitrary frame.

49. The method according to claim 48, further comprising the step of, for each frame packet of the sequence, including information indicating the number of frames until a full set of visible primitives is encoded, whereby the display of an incomplete set of visible primitives by a decoder can be prevented by delaying the display process by said number of frames from the initiation of decoding.

50. A method, performed on a decoder, of maintaining a display list of graphics primitives to be displayed, the method comprising the steps of:

a) receiving information describing the primitives that become newly visible for substantially each frame of an image sequence; and b) adding information describing the newly visible primitives for a corresponding frame of said sequence to said display list, whereby said information comprises a visibility event encoding and said method of maintaining comprises a decoding of the encoded information.

51. The method according to claim 50, further comprising the steps of:

c) transforming primitives, wherein said primitives are stored in object-space representation, by a 3-D transformation corresponding to a current frame of said sequence of images; and d) rendering primitives using a depth buffer.

52. The method according to claim 51, wherein the step b) of adding comprises adding information describing the newly visible primitives for a corresponding frame of said sequence to said list of visible primitives after the display of said corresponding frame whereby the delayed addition of said newly visible primitives does not delay the display of said frame and whereby the transient failure to display said primitive is relatively unnoticed by a viewer because of the visual system's limited acuity for newly exposed objects.

53. The method according to claim 50, wherein the step b) of adding comprises adding information describing newly visible primitives for a corresponding frame of said sequence before the display of said corresponding frame.

54. The method according to claim 50, further comprising the steps of:

c) receiving information describing the primitives that become newly invisible for substantially each frame of said sequence; and d) removing from said list of visible primitives the graphics information associated with the newly invisible graphics primitives.

55. The method according to claim 54, wherein the step c) of receiving information describing newly invisible graphics primitives comprises the step of receiving an index, i, with the information for each of said newly invisible graphics primitives; and wherein the step d) of removing comprises marking as unused the i-th location in said list of visible graphics primitives.

56. The method according to claim 54, wherein the step a) of receiving information describing newly visible primitives comprises the step of receiving an index, i, with the graphics information for each of said newly visible graphics primitives;

and wherein the step b) of adding comprises the sub-step of adding the graphics information at the i-th location in said list of visible graphics primitives;

and wherein the step c) of receiving information describing newly invisible primitives comprises the step of receiving an index, n, with the list of newly invisible graphics primitives;

and wherein the step d) of removing comprises marking as unused the n-th location in said list of visible graphics primitives.

57. The method according to claim 50, wherein the step a) of receiving information comprises the sub-step of receiving an index, i, with the information for each of said newly visible graphics primitives; and wherein the step b) of adding the graphics information comprises the sub-step of adding the graphics information at the i-th location in said list of visible graphics primitives, wherein said list comprises a destination display list of primitives.

58. The method according to claim 50, wherein said information describing newly visible primitives is stored in a data storage device and wherein the step of receiving comprises the sub-step of receiving information from a streaming source wherein said streaming source is produced by reading from said storage device.

59. The method according to claim 50, wherein the step a) of receiving comprises the sub-steps of:

receiving graphics information before the graphics information is needed, the graphics information including a specified initial frame number at which the graphics information is to be added to the list of visible graphics;

buffering the graphics information until the graphics information is needed; and the step b) of adding comprises the substep of adding the graphics information to the list of visible graphics primitives when said primitive's specified initial frame number is equal to or greater than the frame number of the currently displayed frame.

60. The method according to claim 59, wherein the step a) of receiving comprises the sub-step of receiving graphics information before the graphics information is needed, the graphics information including a specified initial frame number at which the graphics information is to be displayed from the list of visible primitives; and the step of displaying comprises the substep of displaying primitives from said list of visible primitives if said primitive's specified initial frame number is equal to or greater than the frame number of the currently displayed frame.

61. The method according to claim 50, wherein said information describing newly visible primitives and newly invisible primitives is stored in a data storage device and wherein the step of receiving comprises the sub-step of receiving information from a streaming data source wherein said streaming source is produced by reading from said storage device.

62. The method according to claim 61, wherein the step a) of receiving further comprises the sub-steps of:
   a1) determining, based on changes in an input device to said decoder, the current position of the viewpoint on a predetermined space-time curve wherein said space-time curve represents a viewpoint trajectory corresponding to the viewpoint trajectory used during the encoding of said information describing newly visible primitives for said sequence; and
   a2) controlling the read rate of said storage device containing said information describing newly visible primitives wherein said information comprises packets of information wherein each packet contains information describing the newly visible for a specific frame of the sequence,
   wherein said controlling comprises serially reading said data packets containing said information at a rate that causes the reading of the datapacket corresponding to the current position of the viewpoint to occur at a time that is substantially equal to the display time for the currently displayed frame,
   whereby said input to decoder unit allows interactive control of viewpoint velocity along said space-curve during decoding.

63. The method according to claim 62 further comprising the steps displaying frames of the sequence that are between times corresponding to the encoded visibility event packets using transformation values interpolated from keyframe data, wherein said keyframe data is received as part of the information received in the step a) of receiving;
   whereby the display rate can be maintained during periods when the desired viewpoint velocity during decoding is slower than the viewpoint velocity employed during encoding of said information.

64. The method according to claim 50, wherein the step a) of receiving information describing newly visible primitives comprises the substeps of receiving a streaming information from a streaming source wherein the streaming data source is an encoding unit encoding said information substantially in real-time.

65. The method according to claim 64, wherein the step a) of receiving information describing newly visible primitives in real-time further comprises the substeps of:
   a1) determining, based on changes in an input device to said decoder, the position of the viewpoint and orientation of the view direction for the current frame;
   a2) transmitting, from said decoder, information describing the current viewpoint position and view direction to an encoding unit;
   a3) determining, on said encoding unit, the newly visible primitives for said frame based on the position of said viewpoint and said view direction;
   a4) transmitting, from said encoding unit, said information describing newly visible primitives; and
   a5) receiving, on said decoding unit, an index, i, with the graphics information for each newly visible graphics primitive,
   wherein the step b) of adding the graphics information comprises the sub-step of adding the graphics information at the i-th location in said list of visible graphics primitives.

66. The method according to claim 50 wherein said information comprises additional information describing motion of camera and other represented objects that occurs during said image sequence.

67. The method according to claim 66 wherein said additional information is represented as keyframe data and wherein the method further comprises the steps of:
   c) transforming primitives, wherein said primitives are stored in object-space representation, by a 3-D transformation corresponding to a current frame of said sequence of images wherein said transformation is determined from said keyframe data; and
   d) rendering primitives using a depth buffer.

68. The method according to claim 50, further comprising the additional step of periodically receiving information describing primitives that are visible in a current frame but that are not newly visible in the current frame; whereby the number of missed primitives that occur during the initiation of decoding and display is reduced.

69. The method according to claim 68, wherein said additional information is received as a sub-packet of information distinct from a sub-packet of information comprising the description of the newly visible primitives for a frame; and wherein the step b) of adding comprises adding information from these said subpackets only if the decoder does not have the current complete set of visible primitives.

70. The method according to claim 68, wherein the step of receiving additional information comprises receiving both previously visible primitives and receiving information indicating at which frame a complete set of visible primitives will have been received; and delaying display of said list of visible primitives until said information indicates that said list contains a complete set of visible primitives, whereby incomplete images are not displayed.

71. The method according to claim 50, further comprising the step of:
   c) receiving from a transmitting data source, during the initiation of decoding, information describing the complete set of visible primitives for a starting frame of the sequence,
   wherein the receiving step a) comprises receiving from a second transmitting data source, after the reception of a complete set of visible primitives for a frame, information describing the primitives that become newly visible for substantially each frame of said sequence subsequent to the starting frame whereby the subsequent display of graphics information received in the receiving steps occurs without missed primitives.

72. The method according to claim 50, further comprising the steps of:
   c) sending a signal, from said decoder, to an initiation server unit wherein said signal is a request for a complete set of visible primitives for a frame of said sequence that is substantially equal to the frame of said sequence for which information describing the newly visible and newly invisible primitives that is currently being transmitted from a transmission source received by said decoder; and
   d) receiving, from said initiation server unit, data comprising the complete set of visible primitives for the requested frame or a later frame,
   wherein in the receiving step a) comprises the substep of subsequently receiving information from said transmission source, whereby the subsequent display of graphics information received in the receiving steps occurs without missed primitives.

73. The method according to claim 50, wherein the step of b) of adding the graphics information describing the newly visible primitives to said list of visible primitives comprises the steps of:
adding the graphics information to a first destination display list when the rendering step is rendering newly visible graphics primitives from a second destination display list; and
adding the graphics information to the second destination display list when the rendering step is rendering newly visible graphics primitives from the first destination display list; and
wherein the step of rendering comprises the steps of:
periodically rendering from the first destination display list; and
periodically rendering from the second destination display list.

74. A method, performed on a decoder, of maintaining a display list of graphics primitives, the method comprising the steps of:
a) receiving information describing the primitives that become potentially newly visible for substantially each frame of an image sequence; and
b) adding information describing the potentially newly visible primitives for a corresponding frame of said sequence to said display list,
whereby said information comprises a visibility event encoding representing primitives visible from a specified set of viewpoints and/or view volumes whereby the set of encoded primitives allows a predefined degree of viewpoint and/or view direction vector motion during decoding of the encoded information.

75. The method according to claim 74 wherein the step a) of receiving comprises the step of receiving information describing graphics primitives that become visible from a plurality of viewpoints during substantially each frame of said sequence.

76. The method according to claim 75 further comprising the steps of:
c) determining, based on changes in an input device to said decoder, the current position of the viewpoint in a predetermined region in three space wherein said region contains a viewpoint trajectory corresponding to the viewpoint trajectory used during the encoding of said information;
d) transforming said potentially visible primitives by a transformation matrix describing the viewing transformation corresponding to said current position of the viewpoint; and
e) rasterizing, after the step d) of transforming, said primitives.

77. The method according to claim 74, wherein the step a) of receiving comprises the step of receiving information describing graphics primitives that become visible from a plurality of view directions during substantially each frame of said sequence.

78. The method according to claim 15, further comprising the steps of:
c) determining, based on changes in an input device to said decoder, the current position of the view direction vector in a predetermined region in three space wherein said region contains a viewpoint trajectory corresponding to the viewpoint trajectory used during the encoding of said information;
d) transforming said potentially visible primitives by a transformation matrix describing the viewing transformation corresponding to said current position of the view direction vector; and
e) rasterizing, after the step of transforming, said primitives.

79. The method according to claim 74, wherein the step a) of receiving comprises the step of receiving information describing graphics primitives that become visible from a plurality of viewpoints and view directions during substantially each frame of said sequence.

80. The method according to claim 74, wherein said information describing newly visible graphics primitives comprises the set of primitives that are determined to be newly visible from a plurality of view frustrums wherein said view frustrums share a common viewpoint.

81. A computer apparatus for generating a computer generated image sequence, the computer apparatus comprising:
a transformer for transforming previously visible primitives, wherein said primitives are stored in a storage area for previously visible primitives;
a classifier for classifying the previously visible primitives to a viewport;
a rasterizer for rasterizing the previously visible primitives;
an augmented depth buffer for storing both depth and primitive references for each of the previously visible primitives for a preceding frame and the current frame, and for determining in the current frame where invisible primitives may be newly exposed; and
a visibility tracer for visibility tracing in the locations in the current frame where the invisible primitives may be newly exposed to find newly exposed visible primitives;
wherein the rasterizer also rasterizes newly exposed primitives using depth-comparison rasterization;
and wherein newly visible primitives are added to said storage device storing previously visible primitives.

82. A computer program product comprising:
a computer storage medium and a computer program code mechanism embedded in the computer storage medium for causing a computer to generate an image sequence, the computer program code mechanism comprising:
a first computer code device configured to transform previously visible primitives wherein said primitives are stored in a storage area for previously visible primitives;
a second computer code device configured to classify the previously visible primitives to a viewport;
a third computer code device configured to rasterize the previously visible primitives;
a fourth computer code device configured to store both depth and primitive references for each of the previously visible primitives for a preceding frame and the current frame in an augmented depth buffer;
a fifth computer code device configured to determine, after storing by the fourth computer code device, and using the augmented depth buffer, locations in the current frame where invisible primitives may be newly exposed;
a sixth computer code device configured to find newly exposed visible primitives by performing visibility tracing in the locations in the current frame where the invisible primitives may be newly exposed;
a seventh computer code device configured to rasterize potentially newly exposed primitives using depth-comparison rasterization; and
an eighth computer code device configured to add the newly exposed primitives to said storage area for visible primitives.

83. A computer-implemented method of generating an image sequence, the method comprising the steps of:
- a) transforming graphics primitives visible in a previous frame;
- b) classifying the previously visible primitives to a viewport;
- c) rasterizing the previously visible primitives for a current frame;
- d) storing, in a first augmented depth buffer for a current frame, depth values and primitive references produced by rasterizing the previously visible primitives for the current frame;
- e) retaining, in a second augmented depth buffer for the previous frame, the depth values and primitive references produced by rasterizing said previously visible primitives for the previous frame;
- f) comparing pixels of the first augmented depth buffer to corresponding pixels of the second augmented depth buffer to identify a location in the current frame that may contain a newly exposed primitive;
- g) searching in said location to find a newly visible primitive in the current frame using an image-order, front-to-back visibility tracing method of visible surface determination;
- h) adding the newly exposed primitive to a list of visible primitives; and
- i) rasterizing the newly visible primitive using depth-comparison rasterization to complete the current frame.

84. The method according to claim 83, wherein said graphics primitives are polygons.

85. The method according to claim 84, wherein the step f) of comparing comprises the step of determining, using the first augmented depth buffer, locations in the current frame in which none of the previously visible primitives are rasterized.

86. The method according to claim 84, wherein the step f) of comparing comprises the step of comparing pixels of the first augmented depth buffer to corresponding pixels of the second augmented depth buffer to identify a location in the current frame in which:
1) a first primitive of the previously visible primitives was rasterized for the current frame whereas a second primitive of the previously visible primitives was rasterized for the previous frame, and
2) a depth value of the location in the current frame is greater than the depth value of the location in the previous frame.

87. The method according to claim 84, wherein the step f) of comparing comprises the step of restricting a region of the first augmented depth buffer in which visibility tracing for a newly visible primitive is performed by exploiting visibility coherence of convex surface representations by comparing pixels of the first augmented depth buffer to corresponding pixels of the second augmented depth buffer to identify a location in the current frame in which:
1) a first primitive of the previously visible primitives of a first convex object was rasterized for the current frame whereas a second primitive of the previously visible primitives of a substantially different convex object was rasterized for the preceding frame, and
2) a depth value of the location for the current frame is greater than the depth value for the preceding frame.

88. The method according to claim 84, wherein the step g) of searching comprises the step of visibility tracing by ray casting using a set of grids, wherein the set of grids comprise a subdivision of a represented object-space containing the visible graphics primitives.

89. The method according to claim 88, wherein the step g) of searching by ray casting further comprises the step of organizing the set of grids into a hierarchy of grids wherein grids at deeper levels of the hierarchy reference primitives from a high level-of-detail representation of represented objects and grids at upper levels of the hierarchy reference primitives from a low level-of-detail representation of the represented objects.

90. The method according to claim 88, wherein the step g) of searching by ray casting further comprises the sub-steps of:
- g1) casting a ray into a sampled image-space region wherein the ray intersects cells of the set of grids in the represented object space using an image-space sampling density that reflects a minimum image-space size of intersected cells;
- g2) determining a candidate set of all primitives associated with intersected cells;
- g3) testing the candidate set of all primitives associated with the intersected cells against the list of visible primitives to determine primitives in the candidate set that are not in the list of visible primitives; and
- g4) considering to be newly visible, primitives determined in the testing sub-step g3) even if not actually visible.

91. The method according to claim 90, wherein the sub-step g1) of casting comprises the sub-sub-step of detecting regions of the image which completely contain a projection of a substantially convex object thereby limiting the required depth of the visibility search, the sub-sub-step comprising the sub-sub-steps of:
- g1a) identifying image space regions in which a plurality of samples form a convex pattern in image-space, wherein each of the plurality of samples intersects, as a closest ray-object intersection, primitives belonging to substantially one convex object; and
- g1b) limiting a depth of rays cast into an image-region within said convex pattern to the depth of said intersections of said of rays with said substantially one convex object.

92. The method according to claim 84, wherein the step g) of searching by visibility tracing comprises the step of searching for newly visible primitives by employing substantially reduced sampling densities in regions between first and second samples from the same primitive if the first and second samples are separated by a predetermined object-space distance.

93. The method according to claim 84, further comprising the step of j) removing invisible primitives from the list of visible primitives.

94. The method according to claim 93, further comprising the step of classifying as non-removable a primitive corresponding to a moving object with an image-plane velocity greater than a threshold; and
wherein the step j) of removing invisible primitives comprises the step of removing from the list of visible primitives only invisible primitives not classified as non-removable.

95. The method according to claim 93, further comprising the step of classifying primitives corresponding to moving objects as non-occludable; and
wherein the step j) of removing invisible primitives comprises the step of removing from the list of visible primitives only invisible primitives not classified as non-occludable.

96. The method according to claim 93, further comprising the step of:
  classifying poorly occluding primitives as non-occluding; and
  wherein the step j) of removing invisible primitives comprises the steps of:
    removing invisible primitives from the list of visible primitives that are occluded by primitives not classified as non-occluding; and
    leaving invisible primitives on the list of visible primitives that are occluded by primitives classified as non-occluding.

97. The method according to claim 96, wherein the step of leaving invisible primitives comprises the steps of:
  reading from a multi-level depth buffer; and
  determining from the multi-level depth buffer if a rasterized candidate primitive would have been visible if the rasterized candidate primitive had not been obscured by a primitive classified as non-occluding.

98. The method according to claim 84, further comprising the step j) of removing invisible that are outside of the view frustum for the current frame.

99. The method according to claim 84, further comprising the step j) of removing invisible primitives that are completely occluded in the current frame.

100. The method according to claim 99, wherein the step j) of removing invisible primitives that are completely occluded comprises the sub-steps of:
  j1) reading the augmented depth buffer for the current frame after rasterizing all of the previously visible and newly visible primitives;
  j2) determining, during the step of reading, primitives in the list of visible primitives that are not represented by at least one sample in a visible level of the augmented depth buffer; and
  j3) removing the primitives determined in step j2) from the list of visible primitives.

101. The method according to claim 84, further comprising the steps of:
  j) assigning each of plural sub-image processors a respective sub-image forming a tiling of an overall image, wherein each of the plural sub-image processors is connected to both a data storage device that is shared among the plural sub-image processors, and at one of a local storage device and a cache data storage device;
  k) maintaining, by each of the plural sub-image processors, a corresponding sub-image reprojection list of visible primitives for each corresponding sub-image, the step of maintaining comprising the sub-steps of:
    k1) transforming, by each of the plural sub-image processors, primitives in the corresponding sub-image reprojection list of visible primitives,
    k2) classifying, by sub-image, wherein the step b) of classifying comprises the sub-step of classifying primitives in the corresponding sub-image reprojection list of visible primitives to the corresponding sub-image and neighboring sub-images to which the primitives may redistribute,
    k3) redistributing, to respective sub-image reprojection lists, the primitives in the corresponding sub-image reprojection list which redistribute to other respective sub-images, and
    k4) adding, to the corresponding sub-image reprojection list the primitives redistributed from other sub-images; and
  wherein, for each of the plural sub-image processors, the step c) of rasterizing comprises the sub-step c1) of rasterizing each of the primitives in the corresponding sub-image reprojection list into an augmented depth buffer corresponding to the sub-image;
  wherein, for each of the plural sub-image processors, the step f) of comparing comprises the sub-step f1) of comparing pixels of the first augmented depth buffer to corresponding pixels of the second augmented depth buffer to identify locations in the current frame that may contain newly exposed primitives;
  wherein, for each of the plural sub-image processors, the step g) of searching comprises the sub-step g1) of searching in said locations to find newly visible primitives using an image-order, front-to-back visibility tracing method of visible surface determination comprises the step of visibility tracing the locations in corresponding sub-images where invisible primitives may be newly exposed to find newly exposed primitives;
  wherein, for each of the plural sub-image processors, the step h) of rasterizing, comprises the sub-step h1) of rasterizing corresponding newly exposed sub-image primitives to form the overall image; and
  wherein, for each of the plural sub-image processors, the step i) of adding comprises the sub-step i1) of adding the newly visible primitives, determined in the step g) of searching by visibility tracing, to the corresponding sub-image reprojection list.

102. The method according to claim 101,
  wherein the step j) of assigning comprises assigning each of plural sub-image geometry processors as said sub-image processors, wherein each of the plural sub-image geometry processors is further connected to a sub-image rasterization-visibility tracing processor;
  wherein the step k) of maintaining, including sub-steps k1) through k4), are performed by the plural sub-image geometry processors using a corresponding sub-image reprojection list of visible primitives for each corresponding sub-image in object-space representation:
  wherein the steps c1), f1), g1), h1) and i1) are performed by corresponding processors of the sub-image rasterization visibility tracing processors.

103. The method according to claim 102, further comprising the steps of:
  l) transmitting, after the sub-step k4) of adding, by each of said sub-image geometry processors, to a corresponding sub-image rasterization-visibility tracing processor, a transformed, image-space representation of each of the primitives in the corresponding sub-image reprojection list;
  wherein, for each sub-image rasterization-visibility tracing processor, the step i) of adding comprises the step of transmitting the primitives in object-space representation, determined to be newly visible in a sub-image by the visibility tracing step g), to a corresponding sub-image reprojection list accessed by a corresponding sub-image geometry processor.

104. The method according to claim 103, wherein the step l) of transmitting comprises the sub-step of l1) storing the transmitted primitives, in image-space representation, in a list of visible primitives for the corresponding sub-image rasterization-visibility tracing processor whereby the sub-image rasterizing processor can directly access the list of visible primitives for the sub-image after the rasterization of the primitives.

105. The method according to claim 104, wherein the sub-step of l1) of transmitting enables removing primitives subsequently determined to be occluded by the rasterization-visibility tracing processor by further comprising the sub-steps of:

11a) transmitting, with each primitive, the index location of the primitive in said object-space sub-image list of visible primitives maintained by the sub-image geometry processor; and 11b) storing the transmitted primitive, together with a corresponding index location in the corresponding object-space list maintained by the corresponding sub-image geometry processor.

106. The method according to claim 105, further comprising the step m) of removing occluded graphics primitives from the corresponding object-space and image-space sub-image lists maintained by the respective sub-image processors, the step m) of removing comprising the sub-steps of:

m1) reading, by the sub-image rasterization-visibility tracing processor, exposed samples of the corresponding augmented sub-image depth buffer, after rasterizing all of the sub-image primitives;

m2) determining, using the augmented sub-image depth buffer, source primitives corresponding to the exposed samples;

m3) writing data to the corresponding image-space sub-image reprojection list to indicate which of the primitives are represented by exposed samples in the augmented sub-image buffer;

m4) subsequently reading the image-space sub-image reprojection list to identify primitives that were not indicated to be exposed by the indicating step m3);

m5) transmitting, to the corresponding sub-image geometry processor by the sub-image rasterization-visibility tracing processors, previously transmitted indices in the object-space visible primitive list, of those primitives not indicated to be exposed in the step m4); and m6) indicating as removed from the object-space sub-image visible primitive list, by the corresponding sub-image geometry processor, the primitives for which indices are transmitted to the processor in step m5.

107. The method according to claim 106, wherein the sub-step m1) of reading comprises the step of reading using a spatially coherent read pattern that minimizes non-local memory accesses.

108. The method according to claim 106, wherein the sub-step m3) of writing comprises writing an index of the corresponding primitive in the image-space sub-image reprojection list; and wherein the determining sub-step m2) directly references the image-space sub-image display list for efficiency.

109. The method according to claim 101, wherein the step j) of assigning comprises the step of statically assigning each of plural sub-image processors to a respective sub-image before the step a) of transforming.

110. The method according to claim 101, wherein the step j) of assigning comprises statically assigning each of plural sub-image processors to a plurality of sub-images.

111. The method according to claim 101, wherein the sub-step k2) of classifying comprises the sub-sub-steps of:

k2a) storing a bitcode for each previously visible primitive in a sub-image indicating which borders of the sub-image are intersected by each edge of the each previously visible primitive; and k2b) determining, for each frame, redistribution of the each previously visible primitive to adjacent sub-images based on changes in the bitcode.

112. The method according to claim 101, further comprising the step l) of removing occluded graphics primitives from corresponding sub-image reprojection lists maintained by the respective sub-image processors, the step l) of removing comprising the sub-steps of:

l1) reading, by the sub-image processor, the exposed samples of the corresponding augmented sub-image depth buffer, following the rasterization of all of the sub-image primitives;

l2) determining, during said sub-step l1) of reading of augmented sub-image depth buffer, the source primitives corresponding to the exposed samples of the buffer;

l3) indicating exposed primitives, by writing data to the corresponding sub-image reprojection list which indicates which of the primitives are represented by exposed samples in the augmented sub-image buffer;

l4) subsequently reading the sub-image reprojection list to identify those primitives that were not indicated to be exposed by indicating step l3); and l5) removing the primitives identified as occluded in step l4) from the corresponding sub-image reprojection list.

113. A computer-implemented method of generating an image sequence, the method comprising the steps of:

a) transforming graphics primitives visible in a previous frame;

b) classifying the previously visible primitives to a viewport;

c) rasterizing the previously visible primitives for a current frame;

d) storing, in a first augmented depth buffer for the current frame, depth values and primitive references produced by rasterizing said previously visible primitives for the current frame;

e) retaining, in a second augmented depth buffer for the previous frame, the depth values and primitive references produced by rasterizing said previously visible primitives for the previous frame;

f) determining, using the first augmented depth buffer, a location in the current frame which potentially contains a primitive that has newly penetrated the view frustum, the step f) of determining comprising the sub-steps of:

f1) subtracting a previous view frustum from a current view frustum to produce a difference frustum, f2) projecting the difference frustum onto the viewport for the current frame, and f3) identifying locations in the first augmented depth buffer that correspond to the projection of the difference frustum;

g) searching in said location to find a newly visible primitive in the current frame using an image-order, front-to-back, visibility tracing method of visible surface determination;

h) adding the newly exposed primitives to a list of visible primitives; and i) rasterizing the newly visible primitive using depth-comparison rasterization to complete the current frame.

114. The method according to claim 113, wherein the step g) of searching comprises searching using an image-order, front-to-back ray casting method of visible surface determination wherein a depth of the search is limited to regions of space in which said difference frustum and rays of said ray casting method intersect.

* * * * *